US009822304B2

(12) United States Patent
Kawamura et al.

(10) Patent No.: US 9,822,304 B2
(45) Date of Patent: Nov. 21, 2017

(54) LIQUID CRYSTAL COMPOSITION AND LIQUID CRYSTAL DISPLAY ELEMENT CONTAINING THE SAME

(71) Applicant: DIC Corporation, Tokyo (JP)

(72) Inventors: Joji Kawamura, Kita-adachi-gun (JP); Makoto Negishi, Kita-adachi-gun (JP); Yoshinori Iwashita, Ichihara (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/777,814

(22) PCT Filed: Mar. 25, 2013

(86) PCT No.: PCT/JP2013/058537
§ 371 (c)(1),
(2) Date: Sep. 17, 2015

(87) PCT Pub. No.: WO2014/155480
PCT Pub. Date: Oct. 2, 2014

(65) Prior Publication Data
US 2016/0060525 A1 Mar. 3, 2016

(51) Int. Cl.
*G02F 1/1333* (2006.01)
*C09K 19/34* (2006.01)
(Continued)

(52) U.S. Cl.
CPC ........ *C09K 19/3402* (2013.01); *C09K 19/062* (2013.01); *C09K 19/063* (2013.01);
(Continued)

(58) Field of Classification Search
CPC ............... G02F 1/1333; G02F 1/13394; C09K 19/3402; C09K 19/062; C09K 19/063; C09K 19/44; C09K 19/20; C09K 19/3066; C09K 2019/0448; C09K 2019/0466; C09K 2019/122; C09K 2019/123; C09K 2019/124; C09K 2019/3004; C09K 2019/3006; C09K 2019/3009; C09K 2019/301; C09K 2019/3015; C09K 2019/3016; C09K 2019/3021;
(Continued)

(56) References Cited

U.S. PATENT DOCUMENTS 8,012,369 B2 * 9/2011 Saito ...................... C09K 19/44 252/299.01
2009/0091703 A1 4/2009 Matsumura et al.
2009/0256114 A1 10/2009 Yamashita et al.
2010/0051865 A1 3/2010 Yoshino et al.
2010/0060843 A1 3/2010 Saito et al.
2010/0272927 A1 10/2010 Hiraoka et al.
(Continued)

FOREIGN PATENT DOCUMENTS

CN 102643653 A 8/2012
JP 2008-37918 A 2/2008
(Continued)

OTHER PUBLICATIONS

International Search Report dated Jun. 25, 2013, issued in counterpart International Application No. PCT/JP2013/058537 (6 pages).

*Primary Examiner* — Geraldina Visconti
(74) *Attorney, Agent, or Firm* — Westerman, Hattori, Daniels & Adrian

(57) ABSTRACT

It is an object of the present invention to provide a liquid crystal composition having positive Δ∈, having a liquid crystal phase in a wide temperature range, having high solubility at low temperatures, having high ODF process compatibility, having a high specific resistance and voltage holding ratio, and being insensitive to heat and light. In order to achieve this object, there is provided a liquid crystal composition containing at least one compound represented by the following general formula (i) and at least one compound represented by the following general formula (ii).

[Chem. 1]

(i)

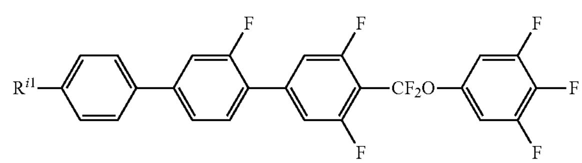

(wherein $R^{i1}$ denotes an alkyl group having 2 to 5 carbon atoms)

[Chem. 2]

(ii)

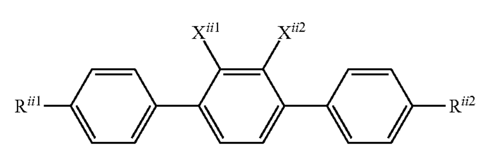

(wherein $R^{ii1}$ and $R^{ii2}$ independently denote an alkyl group having 1 to 5 carbon atoms or an alkenyl group having 2 to 5 carbon atoms, and $X^{ii1}$ and $X^{ii2}$ independently denote a hydrogen atom or a fluorine atom)

11 Claims, 1 Drawing Sheet

(51) Int. Cl.

| | |
|---|---|
| ***C09K 19/06*** | (2006.01) |
| ***C09K 19/44*** | (2006.01) |
| ***C09K 19/20*** | (2006.01) |
| *C09K 19/04* | (2006.01) |
| *C09K 19/12* | (2006.01) |
| *C09K 19/30* | (2006.01) |
| *G02F 1/1339* | (2006.01) |

(52) U.S. Cl.

CPC .......... *C09K 19/20* (2013.01); *C09K 19/3066* (2013.01); *C09K 19/44* (2013.01); *C09K 2019/0448* (2013.01); *C09K 2019/0466* (2013.01); *C09K 2019/122* (2013.01); *C09K 2019/123* (2013.01); *C09K 2019/124* (2013.01); *C09K 2019/301* (2013.01); *C09K 2019/3004* (2013.01); *C09K 2019/3006* (2013.01); *C09K 2019/3009* (2013.01); *C09K 2019/3015* (2013.01); *C09K 2019/3016* (2013.01); *C09K 2019/3019* (2013.01); *C09K 2019/3021* (2013.01); *C09K 2019/3025* (2013.01); *C09K 2019/3071* (2013.01); *C09K 2019/3077* (2013.01); *C09K 2019/3078* (2013.01); *C09K 2019/3422* (2013.01); *G02F 1/13394* (2013.01)

(58) Field of Classification Search

CPC .... C09K 2019/3025; C09K 2019/3071; C09K 2019/3077; C09K 2019/3078; C09K 2019/3422

USPC .............. 252/299.01, 299.6, 299.61; 428/1.1

See application file for complete search history.

(56) References Cited

U.S. PATENT DOCUMENTS

| | | | |
|---|---|---|---|
| 2010/0302498 | A1 | 12/2010 | Saito |
| 2011/0149227 | A1 | 6/2011 | Saito et al. |
| 2011/0291048 | A1 | 12/2011 | Hamano et al. |
| 2011/0315925 | A1 | 12/2011 | Hiraoka et al. |
| 2012/0169974 | A1 | 7/2012 | Hattori et al. |

FOREIGN PATENT DOCUMENTS

| | | | |
|---|---|---|---|
| JP | 2008-38018 | A | 2/2008 |
| JP | 2008-088433 | A | 4/2008 |
| JP | 2009-84560 | A | 4/2009 |
| JP | 2009-215556 | A | 9/2009 |
| JP | 2009-270102 | A | 11/2009 |
| JP | 2010-53211 | A | 3/2010 |
| JP | 2010-254871 | A | 11/2010 |
| JP | 2010-275390 | A | 12/2010 |
| JP | 2011-52120 | A | 3/2011 |
| JP | 2012-516920 | A | 7/2012 |
| JP | 2013-166936 | A | 8/2013 |
| WO | 2008/102641 | A1 | 8/2008 |
| WO | 2010/024142 | A1 | 3/2010 |
| WO | 2010/090076 | A1 | 8/2010 |
| WO | 2010/106910 | A1 | 9/2010 |
| WO | 2011/030708 | A1 | 3/2011 |
| WO | 2012/020642 | A1 | 2/2012 |
| WO | 2013/016948 | A1 | 2/2013 |
| WO | 2013/018796 | A1 | 2/2013 |

* cited by examiner

LIQUID CRYSTAL COMPOSITION AND LIQUID CRYSTAL DISPLAY ELEMENT CONTAINING THE SAME

TECHNICAL FIELD

The present invention relates to a nematic liquid crystal composition having positive anisotropy of dielectric constant (Δ∈) useful as a liquid crystal display material and to a liquid crystal display element containing the liquid crystal composition.

BACKGROUND ART

Liquid crystal display elements are used in various measuring instruments, automotive panels, word processors, electronic notebooks, printers, computers, television sets, clocks and watches, and advertising boards, as well as clocks and watches and electronic calculators. Typical liquid crystal display modes include twisted nematic (TN), super-twisted nematic (STN), vertical thin-film transistor (TFT), and in-plane switching (IPS) TFT. Liquid crystal compositions for use in such liquid crystal display elements should be insensitive to external stimuli, such as water, air, heat, and light, have a liquid crystal phase in as wide a temperature range as possible around room temperature, have low viscosity, and have a low driving voltage. A liquid crystal composition is composed of several to tens of compounds so as to achieve optimum anisotropy of dielectric constant (Δ∈) or optimum anisotropy of reflective index (Δn) of each display element.

Liquid crystal compositions having negative Δ∈ are used in vertical alignment (VA) displays. Liquid crystal compositions having positive Δ∈ are used in horizontal alignment displays, such as TN, STN, and in-plane switching (IPS) displays. In a drive system reported previously, a liquid crystal composition having positive Δ∈ is vertically aligned in the absence of voltage, and a transverse electric field is applied for display. Thus, there is an increasing demand for liquid crystal compositions having positive Δ∈. There is also a demand for low-voltage drive, high-speed response, and a wide operating temperature range in any drive system. In other words, there is a demand for positive Δ∈ having a large absolute value, low viscosity (η), and a high nematic phase-isotropic liquid phase transition temperature (Tni). In order to set the product Δn×d of Δn and the cell gap (d) at a predetermined value, the Δn of a liquid crystal composition must be adjusted in an appropriate range for the cell gap. Furthermore, because high-speed responsivity is important for liquid crystal display elements for use in television sets, liquid crystal compositions should have low rotational viscosity (γ1).

For example, a liquid crystal composition containing a combination of compounds represented by the following formulae (A-1) to (A-3), which are liquid crystal compounds having positive Δ∈, and a compound represented by the formula (B), which is a liquid crystal compound having neutral Δ∈, is disclosed as a liquid crystal composition designed for high-speed responsivity. It is widely known in the field of liquid crystal compositions that among the characteristics of such a liquid crystal composition, the liquid crystal compound having positive Δ∈ has a —$CF_2O$— structure, and the liquid crystal compound having neutral Δ∈ has an alkenyl group (Patent Literature 1 to Patent Literature 4).

[Chem. 1]

(A-1)

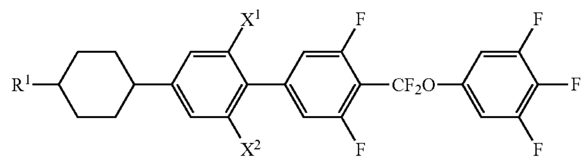

(A-2)

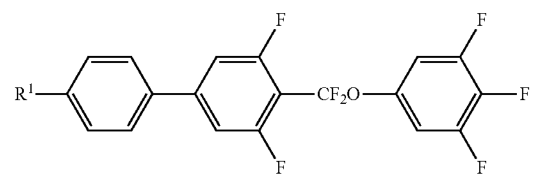

(A-3)

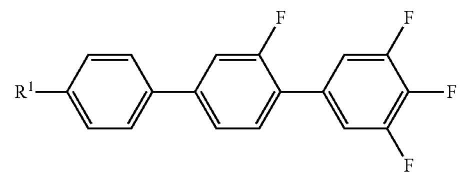

(B)

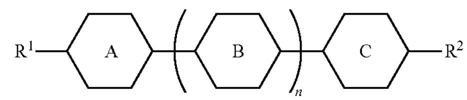

The manner in which liquid crystal display elements are to be used and methods for producing the liquid crystal display elements change with the increasing number of applications of liquid crystal display elements. In order to adapt to such changes, it is necessary to optimize characteristics other than known basic physical properties. More specifically, VA and IPS liquid crystal display elements containing liquid crystal compositions have come to be widely used, and very large, 50-inch or more, display elements are put to practical use. Methods for filling substrates with liquid crystal compositions also change with increases in substrate size. A one drop fill (ODF) method has become the mainstream instead of the known vacuum injection method. However, deterioration in display quality due to drop marks of liquid crystal compositions on substrates has become an issue.

In a process of manufacturing a liquid crystal display element by the ODF method, the amount of liquid crystal composition to be dropped should be optimally adjusted to the size of a liquid crystal display element. When the amount of dropped liquid crystal composition deviates significantly from the optimum amount, this disturbs the balance of the designed refractive index or driving electric field of liquid crystal display elements, thereby causing display defects, such as spots and poor contrast. In particular, the optimum amount of dropped liquid crystal is small in small liquid crystal display elements frequently used in popular smartphones. Thus, it is difficult to control the deviation from the optimum value within a certain range. Thus, in order to maintain high manufacturing yields of liquid crystal display elements, liquid crystal compositions should not be greatly affected by rapid pressure changes in dropping apparatuses or impacts due to dropping of liquid crystal and should be consistently dropped for extended periods.

Thus, liquid crystal compositions for use in active-matrix driven liquid crystal display elements driven in TFT elements should have improved high-speed responsivity, specific resistance, voltage holding ratio, and insensitivity to external stimuli, such as light and heat, of the liquid crystal display elements, while methods for manufacturing the liquid crystal display elements are taken into consideration.

CITATION LIST

Patent Literature

PTL 1: Japanese Unexamined Patent Application Publication No. 2008-037918
PTL 2: Japanese Unexamined Patent Application Publication No. 2008-038018
PTL 3: Japanese Unexamined Patent Application Publication No. 2010-275390
PTL 4: Japanese Unexamined Patent Application Publication No. 2011-052120

SUMMARY OF INVENTION

Technical Problem

Accordingly, it is an object of the present invention to provide a liquid crystal composition having positive Δ∈, having a liquid crystal phase in a wide temperature range, having low viscosity, having high solubility at low temperatures, having a high specific resistance and voltage holding ratio, and being insensitive to heat and light. It is another object of the present invention to use the liquid crystal composition to efficiently provide a liquid crystal display element having reduced display defects due to burn-in and drop marks and having high display quality. It is still another object of the present invention to provide a liquid crystal display element containing the liquid crystal composition.

Solution to Problem

The present invention includes the following aspects.

(1) A liquid crystal composition containing at least one compound represented by a general formula (i) and at least one compound represented by a general formula (ii).

[Chem. 2]

(i)

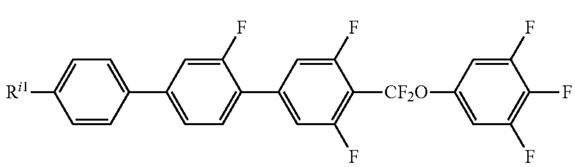

(wherein $R^{i1}$ denotes an alkyl group having 2 to 5 carbon atoms)

[Chem. 3]

(ii)

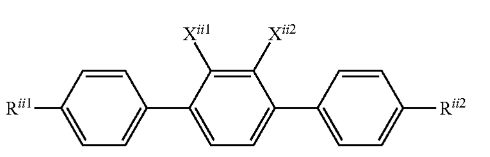

(wherein $R^{ii1}$ and $R^{ii2}$ independently denote an alkyl group having 1 to 5 carbon atoms or an alkenyl group having 2 to 5 carbon atoms, and $X^{ii1}$ and $X^{ii2}$ independently denote a hydrogen atom or a fluorine atom)

(2) The liquid crystal composition according to (1), further containing at least one compound represented by a general formula (L).

[Chem. 4]

$$R^{L1}-B^{L1}-L^{L1}-B^{L2}\left(L^{L2}-B^{L3}\right)_{OL}R^{L2} \quad (L)$$

(wherein $R^{L1}$ and $R^{L2}$ independently denote an alkyl group having 1 to 8 carbon atoms, and one or two or more nonadjacent —CH2- of the alkyl group may be independently substituted with —CH═CH—, —C≡C—, —O—, —CO—, —COO—, or —OCO—, OL is 0, 1, 2, or 3, $B^{L1}$, $B^{L2}$, and $B^{L3}$ independently denote a group selected from the group consisting of (a) a 1,4-cyclohexylene group (one —CH2- or two or more nonadjacent —CH2- of this group may be substituted with —O—), and (b) a 1,4-phenylene group (one —CH═ or two or more nonadjacent —CH═ of this group may be substituted with —N═), the group (a) and the group (b) may be independently substituted with a cyano group, a fluorine atom, or a chlorine atom, $L^{L1}$ and $L^{L2}$ independently denote a single bond, —$CH_2CH_2$—, —$(CH_2)_4$—, —$OCH_2$—, —$CH_2O$—, —COO—, —OCO—, —$OCF_2$—, —$CF_2O$—, —CH═N—N═CH—, —CH═CH—, —CF═CF—, or —C≡C—, and in the case that OL is 2 or 3 and there are a plurality of LL2s, the plurality of LL2s may be the same or different, and in the case that OL is 2 or 3 and there are a plurality of $B^{L3}$s, the plurality of $B^{L3}$s may be the same or different, provided that the at least one compound is not the compound(s) selected from a group represented by the general formula (ii))

(3) The liquid crystal composition according to (1) or (2), further containing at least one compound represented by a general formula (M).

[Chem. 5]

(M)

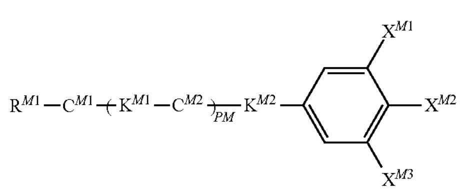

(wherein $R^{M1}$ denotes an alkyl group having 1 to 8 carbon atoms, and one or two or more nonadjacent —CH2- of the alkyl group may be independently substituted with —CH═CH—, —C≡C—, —O—, —CO—, —COO—, or —OCO—, PM is 0, 1, 2, 3, or 4, $C^{M1}$ and $C^{M2}$ independently denote a group selected from the group consisting of (d) a 1,4-cyclohexylene group (one —CH2- or two or more nonadjacent —CH2- of this group may be substituted with —O— or —S—), and (e) a 1,4-phenylene group (one —CH= or two or more nonadjacent —CH= of this group may be substituted with —N=), the group (d) and the group (e) may be independently substituted with a cyano group, a fluorine atom, or a chlorine atom, $K^{M1}$ and $K^{M2}$ independently denote a single bond, $—CH_2CH_2—$, $—(CH_2)_4—$, $—OCH_2—$, $—CH_2O—$, $—OCF_2—$, $—CF_2O—$, —COO—, —OCO—, or —C≡C—, in the case that PM is 2, 3, or 4 and there are a plurality of $K^{M1}$s, the plurality of $K^{M1}$s may be the same or different, and in the case that PM is 2, 3, or 4 and there are a plurality of $C^{M2}$s, the plurality of $C^{M2}$s may be the same or different, $X^{M1}$ and $X^{M3}$ independently denote a hydrogen atom, a chlorine atom, or a fluorine atom, and $X^{M2}$ denotes a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group. the compound represented by the formula (i)

(4) The liquid crystal composition according to (3), containing at least one compound represented by a general formula (X-2-1) as a compound or compounds represented by the general formula (M).

[Chem. 6]

(X-2-1)

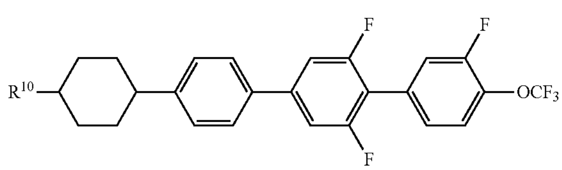

(wherein $R^{10}$ denotes an alkyl group having 1 to 5 carbon atoms, an alkenyl group having 2 to 5 carbon atoms, or an alkoxy group having 1 to 4 carbon atoms)

(5) The liquid crystal composition according to (4), containing a compound represented by a formula (39.2) as a compound represented by the general formula (X-2-1).

[Chem. 7]

(39.2)

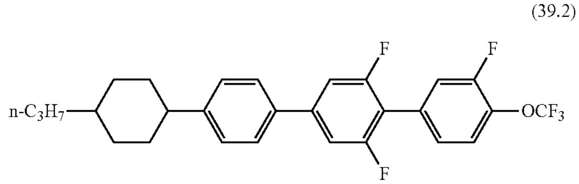

(6) The liquid crystal composition according to (2), containing at least one compound represented by a general formula (I-4) as a compound or compounds represented by the general formula (L).

[Chem. 8]

(I-4)

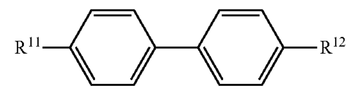

(wherein $R^{11}$ and $R^{12}$ independently denote an alkyl group having 1 to 5 carbon atoms, an alkenyl group having 4 or 5 carbon atoms, or an alkoxy group having 1 to 4 carbon atoms)

(7) The liquid crystal composition according to (6), containing a compound represented by a formula (5.2) as a compound represented by the general formula (I-4).

[Chem. 9]

(5.2)

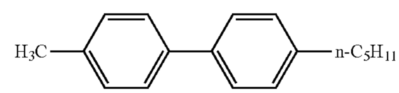

(8) The liquid crystal composition according to (1), containing at least one compound represented by a general formula (IV-1) as a compound or compounds represented by the general formula (ii).

[Chem. 10]

(IV-1)

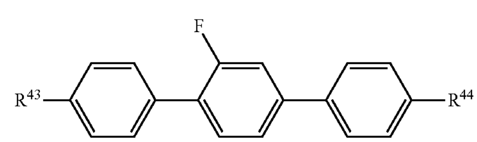

(wherein $R^{43}$ and $R^{44}$ independently denote an alkyl group having 1 to 5 carbon atoms)

(9) The liquid crystal composition according to (8), containing a compound represented by a formula (18.3) as a compound represented by the general formula (IV-1).

[Chem. 11]

(18.3)

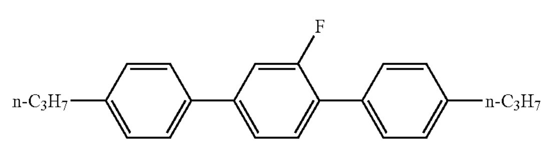

(10) The liquid crystal composition according to (8), containing a compound represented by a formula (18.4) and/or a compound represented by a formula (18.5) as a compound or compounds represented by the general formula (IV-1), the compound represented by the formula (18.4) and/or the compound represented by the formula (18.5) constituting 7% or more.

[Chem. 12]

(18.4)

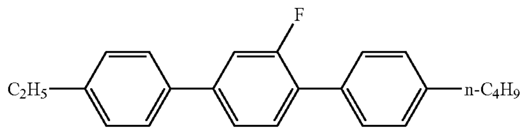

(18.5)

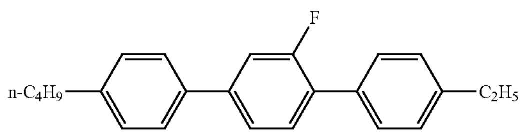

(11) The liquid crystal composition according to (2), containing at least one compound represented by a general formula (V-2) as a compound or compounds represented by the general formula (L).

[Chem. 13]

(V-2)

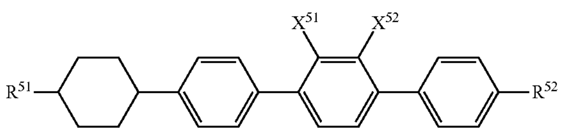

(wherein $R^{51}$ and $R^{52}$ independently denote an alkyl group having 1 to 5 carbon atoms, an alkenyl group having 2 to 5 carbon atoms, or an alkoxy group having 1 to 4 carbon atoms, and $X^{51}$ and $X^{52}$ independently denote a fluorine atom or a hydrogen atom)

(12) The liquid crystal composition according to (11), containing a compound represented by a formula (23.2) and/or a compound represented by a formula (24.2) as a compound or compounds represented by the general formula (V-2).

[Chem. 14]

(23.2)

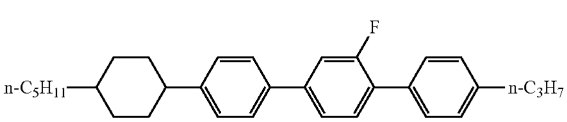

(24.2)

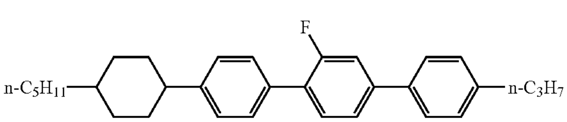

(13) The liquid crystal composition according to (11), containing a compound represented by a formula (23.1) and/or a compound represented by a formula (24.1) as a compound or compounds represented by the general formula (V-2), the compound represented by the formula (23.1) and/or the compound represented by the formula (24.1) constituting 6% or more.

[Chem. 15]

(23.1)

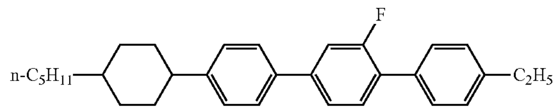

(24.1)

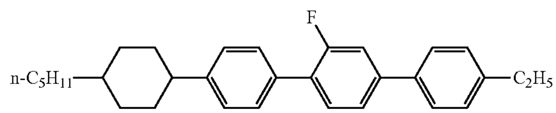

(14) The liquid crystal composition according to (3), containing at least one compound represented by a general formula (VIII-1) as a compound or compounds represented by the general formula (M).

[Chem. 16]

(VIII-1)

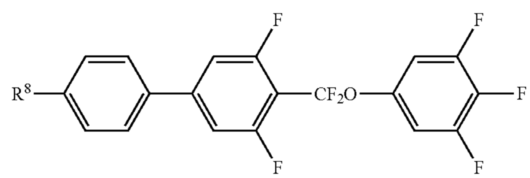

(wherein $R^8$ denotes an alkyl group having 1 to 5 carbon atoms, an alkenyl group having 2 to 5 carbon atoms, or an alkoxy group having 1 to 4 carbon atoms)

(15) The liquid crystal composition according to (14), containing a compound represented by a formula (26.1) as a compound represented by the general formula (VIII-1).

[Chem. 17]

(26.1)

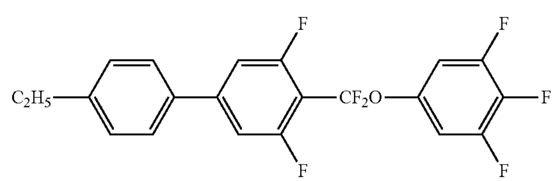

(16) The liquid crystal composition according to (2), containing at least one compound represented by a general formula (I-2) as a compound or compounds represented by the general formula (L).

[Chem. 18]

(I-2)

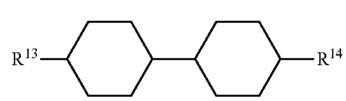

(wherein $R^{13}$ and $R^{14}$ independently denote an alkyl group having 1 to 5 carbon atoms)

(17) The liquid crystal composition according to (16), containing a compound represented by a formula (3.4) as a compound represented by the general formula (I-2).

[Chem. 19]

(3.4)

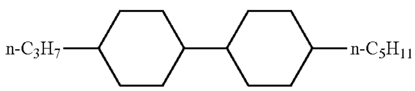

(18) The liquid crystal composition according to (16), containing a compound represented by a formula (3.3) as a compound represented by the general formula (I-2), the compound represented by the formula (3.3) constituting 6% or more.

[Chem. 20]

(3.3)

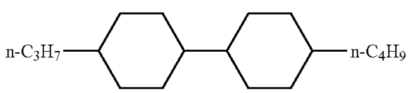

(19) The liquid crystal composition according to (16), containing a compound or compounds represented by the general formula (I-2) and a compound represented by the formula (3.1), the compound(s) represented by the general formula (I-2) and the compound represented by the formula (3.1) constituting 13% or more.

[Chem. 21]

(3.1)

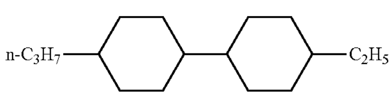

(20) The liquid crystal composition according to (2), containing at least one compound represented by a general formula (I-5) as a compound or compounds represented by the general formula (L).

[Chem. 22]

(I-5)

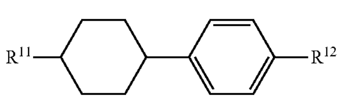

(wherein $R^{11}$ denotes an alkyl group having 1 to 5 carbon atoms, an alkenyl group having 2 to 5 carbon atoms, or an alkoxy group having 1 to 4 carbon atoms, and $R^{12}$ denotes an alkyl group having 1 to 5 carbon atoms, an alkenyl group having 4 or 5 carbon atoms, or an alkoxy group having 1 to 4 carbon atoms)

(21) The liquid crystal composition according to (20), containing a compound represented by a formula (6.6) as a compound represented by the general formula (I-5).

[Chem. 23]

(6.6)

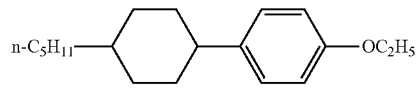

(22) The liquid crystal composition according to (20), containing a compound represented by a formula (6.3) as a compound represented by the general formula (I-5), the compound represented by the formula (6.3) constituting 8% or more.

[Chem. 24]

(6.3)

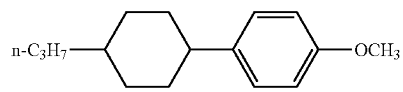

(23) The liquid crystal composition according to (2), containing a compound represented by a general formula (II-1) as a compound represented by the general formula (L).

[Chem. 25]

(II-1)

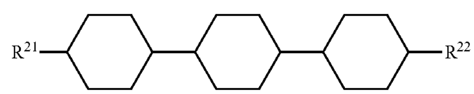

($R^{21}$ and $R^{22}$ independently denote an alkenyl group having 2 to 5 carbon atoms, an alkyl group having 1 to 5 carbon atoms, or an alkoxy group having 1 to 4 carbon atoms)

(24) The liquid crystal composition according to (23), containing at least one compound represented by a general formula (10.1) as a compound or compounds represented by the general formula (II-1).

[Chem. 26]

(10.1)

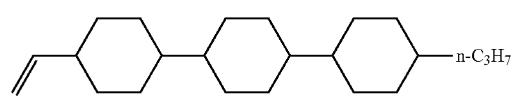

(25) The liquid crystal composition according to (3), containing a compound represented by a general formula (IX-2-2) as a compound represented by the general formula (M).

[Chem. 27]

(IX-2-2)

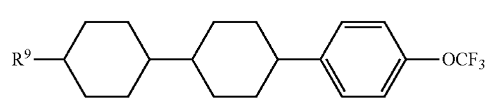

(wherein $R^9$ denotes an alkyl group having 1 to 5 carbon atoms, an alkenyl group having 2 to 5 carbon atoms, or an alkoxy group having 1 to 4 carbon atoms)

(26) The liquid crystal composition according to (25), containing a compound represented by a formula (31.4) as a compound represented by the general formula (IX-2-2).

[Chem. 28]

(31.4)

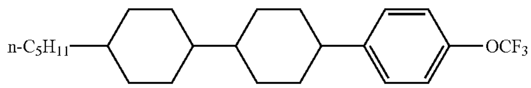

(27) The liquid crystal composition according to (25), containing a compound represented by a formula (31.2) as a compound represented by the general formula (IX-2-2), the compound represented by the formula (31.2) constituting 0.5% or more and less than 8%.

[Chem. 29]

(31.2)

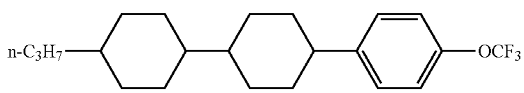

(28) The liquid crystal composition according to (3), containing at least one compound represented by a general formula (XIV-2-2) as a compound or compounds represented by the general formula (M).

[Chem. 30]

(XIV-2-2)

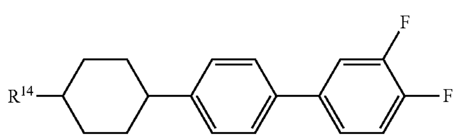

(wherein $R^{14}$ denotes an alkyl group having 1 to 5 carbon atoms, an alkenyl group having 2 to 5 carbon atoms, or an alkoxy group having 1 to 4 carbon atoms)

(29) The liquid crystal composition according to (28), containing a compound represented by a formula (54.2) and/or a compound represented by a formula (54.4) as a compound or compounds represented by the general formula (XIV-2-2).

[Chem. 31]

(54.2)

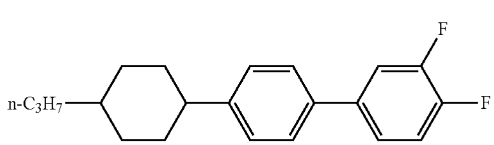

-continued (54.4)

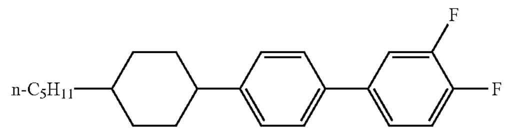

(30) The liquid crystal composition according to (3), containing at least one compound represented by a general formula (X-4-1) as a compound or compounds represented by the general formula (M).

[Chem. 32]

(X-4-1)

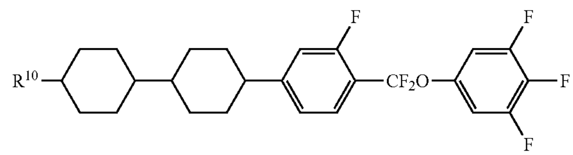

(wherein $R^{10}$ denotes an alkyl group having 1 to 5 carbon atoms, an alkenyl group having 2 to 5 carbon atoms, or an alkoxy group having 1 to 4 carbon atoms)

(31) The liquid crystal composition according to (30), containing a compound represented by a formula (42.3) as a compound represented by the general formula (X-4-1).

[Chem. 33]

(42.3)

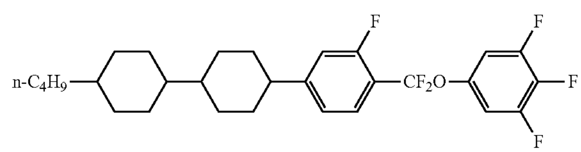

(32) The liquid crystal composition according to (2), containing a compound represented by a general formula (I-1-1) as a compound represented by the general formula (L), the compound represented by the general formula (I-1-1) constituting 14% or more.

[Chem. 34]

(I-1-1)

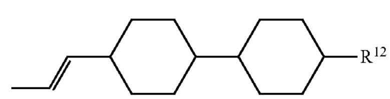

(wherein $R^{12}$ denotes an alkyl group having 1 to 5 carbon atoms, an alkenyl group having 2 to 5 carbon atoms, or an alkoxy group having 1 to 5 carbon atoms)

(33) The liquid crystal composition according to (32), containing a compound represented by a formula (1.3) as a compound represented by the general formula (I-1-1), the compound represented by the formula (1.3) constituting 14% or more.

[Chem. 35]

(1.3)

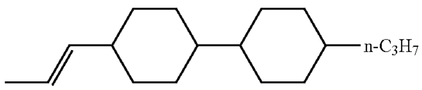

(34) The liquid crystal composition according to (2), containing a compound represented by a general formula (II-2) as a compound represented by the general formula (L), the compound represented by the general formula (II-2) constituting 5% or more.

[Chem. 36]

(II-2)

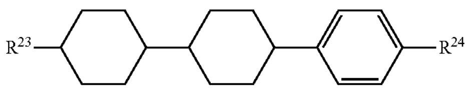

($R^{23}$ denotes an alkenyl group having 2 to 5 carbon atoms, and $R^{24}$ denotes an alkyl group having 1 to 5 carbon atoms or an alkoxy group having 1 to 4 carbon atoms)

(35) The liquid crystal composition according to (34), containing a compound represented by a formula (11.2) as a compound represented by the general formula (II-2), the compound represented by the formula (11.2) constituting 5% or more.

[Chem. 37]

(11.2)

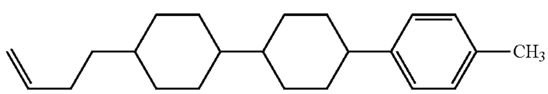

(36) The liquid crystal composition according to (1), containing a compound represented by a general formula (IV-2) as a compound represented by the general formula (ii).

[Chem. 38]

(IV-2)

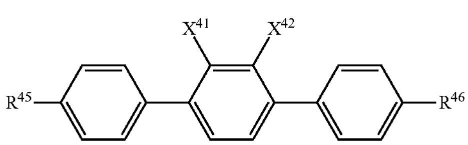

(wherein $R^{45}$ and $R^{46}$ independently denote an alkyl group having 1 to 5 carbon atoms or an alkenyl group having 2 to 5 carbon atoms, at least one of $R^{45}$ and $R^{46}$ denotes an alkenyl group having 2 to 5 carbon atoms, and $X^{41}$ and $X^{42}$ independently denote a hydrogen atom or a fluorine atom)

(37) The liquid crystal composition according to (36), containing a compound represented by a formula (19.1) and/or a compound represented by a formula (19.2) as a compound or compounds represented by the general formula (IV-2), the compound represented by the formula (19.1) and/or the compound represented by the formula (19.2) constituting 0.5% or more and less than 5%.

[Chem. 39]

(19.1)

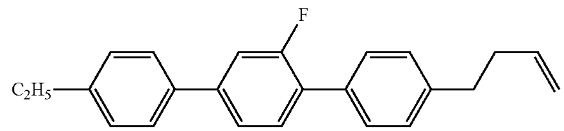

(19.2)

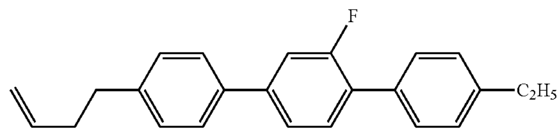

(38) The liquid crystal composition according to (36), containing a compound represented by a formula (19.31) and/or a compound represented by a formula (19.32) as a compound or compounds represented by the general formula (IV-2), the compound represented by the formula (19.31) and/or the compound represented by the formula (19.32) constituting 0.5% or more and less than 5%.

[Chem. 40]

(19.31)

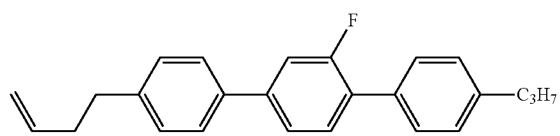

(19.32)

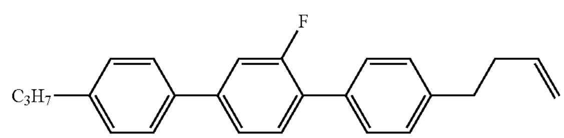

(39) The liquid crystal composition according to (36), containing a compound represented by a formula (19.3) and/or a compound represented by a formula (19.4) as a compound or compounds represented by the general formula (IV-2), the compound represented by the formula (19.3) and/or the compound represented by the formula (19.4) constituting 6% or more.

[Chem. 41]

(19.3)

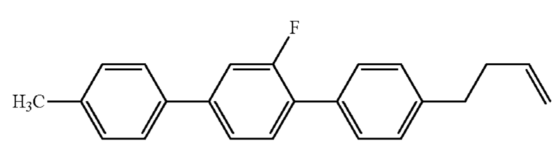

(19.4)

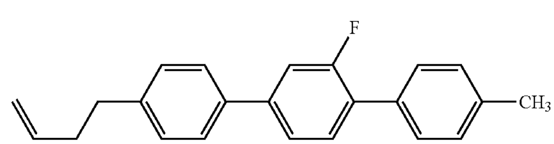

(40) The liquid crystal composition according to (3), containing a compound represented by a general formula (X-6) as a compound represented by the general formula (M), the compound represented by the general formula (X-6) constituting 0.5% or more and less than 5%.

[Chem. 42]

(X-6)

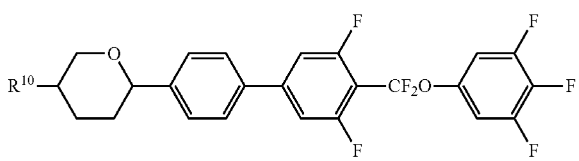

(wherein $R^{10}$ denotes an alkyl group having 1 to 5 carbon atoms, an alkenyl group having 2 to 5 carbon atoms, or an alkoxy group having 1 to 4 carbon atoms)

(41) The liquid crystal composition according to (40), containing a compound represented by a formula (44.1) as a compound represented by the general formula (X-6), the compound represented by the formula (44.1) constituting 0.5% or more and less than 5%.

[Chem. 43]

(44.1)

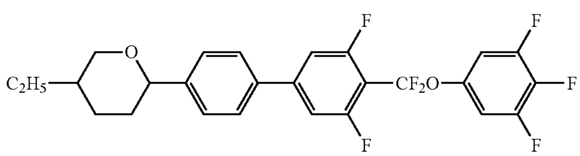

(42) The liquid crystal composition according to (2), containing a compound represented by a general formula (III) as a compound represented by the general formula (L), the compound represented by the general formula (III) constituting 6% or more.

[Chem. 44]

(III)

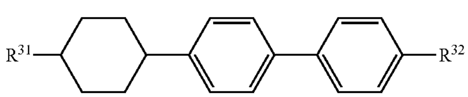

($R^{31}$ and $R^{32}$ independently denote an alkenyl group having 2 to 5 carbon atoms, an alkyl group having 1 to 5 carbon atoms, or an alkoxy group having 1 to 4 carbon atoms)

(43) The liquid crystal composition according to (42), containing a compound represented by a formula (15.1) as a compound represented by the general formula (III), the compound represented by the formula (15.1) constituting 6% or more.

[Chem. 45]

(15.1)

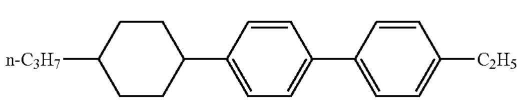

(44) The liquid crystal composition according to (3), containing a compound represented by a general formula (X-1-2) as a compound represented by the general formula (M), the compound represented by the general formula (X-1-2) constituting 6% or more.

[Chem. 46]

(X-1-2)

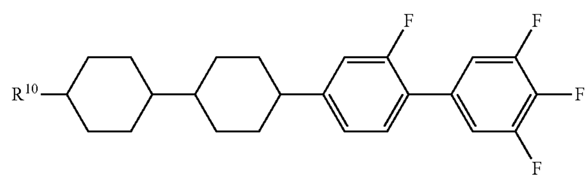

(wherein $R^{10}$ denotes an alkyl group having 1 to 5 carbon atoms, an alkenyl group having 2 to 5 carbon atoms, or an alkoxy group having 1 to 4 carbon atoms)

(45) The liquid crystal composition according to (44), containing a compound represented by a formula (37.2) as a compound represented by the general formula (X-1-2), the compound represented by the formula (37.2) constituting 6% or more.

[Chem. 47]

(37.2)

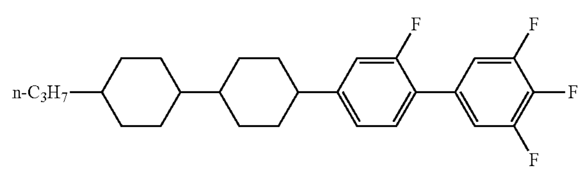

(46) The liquid crystal composition according to (3), containing a compound represented by a general formula (IX-1-1) as a compound represented by the general formula (M), the compound represented by the general formula (IX-1-1) constituting 0.5% or more and less than 5%.

[Chem. 48]

(IX-1-1)

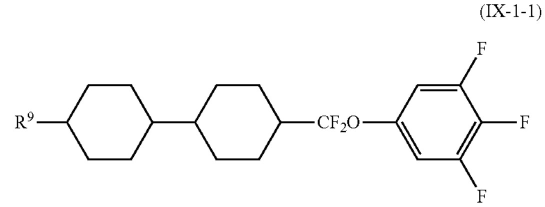

(wherein $R^9$ denotes an alkyl group having 1 to 5 carbon atoms, an alkenyl group having 2 to 5 carbon atoms, or an alkoxy group having 1 to 4 carbon atoms)

(47) The liquid crystal composition according to (46), containing a compound represented by a formula (28.3) as a compound represented by the general formula (IX-1-1), the compound represented by the formula (28.3) constituting 0.5% or more and less than 5%.

[Chem. 49]

(28.3)

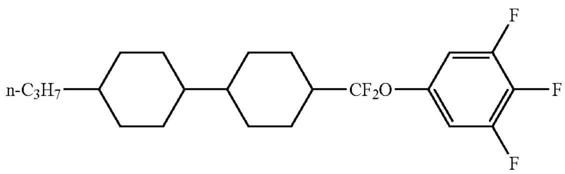

(48) The liquid crystal composition according to (3), containing a compound represented by a general formula (XIV-1-1) as a compound represented by the general formula (M), the compound represented by the general formula (XIV-1-1) constituting 8% or more.

[Chem. 50]

(XIV-1-1)

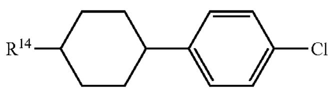

(wherein $R^{14}$ denotes an alkyl group having 1 to 7 carbon atoms, an alkenyl group having 2 to 7 carbon atoms, or an alkoxy group having 1 to 7 carbon atoms)

(49) The liquid crystal composition according to (48), containing a compound represented by a formula (51.1) as a compound represented by the general formula (XIV-1-1), the compound represented by the formula (51.1) constituting 8% or more.

[Chem. 51]

(51.1)

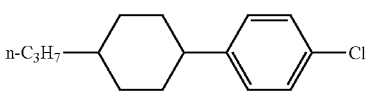

(50) The liquid crystal composition according to (3), containing a compound represented by a general formula (IX-2-3) as a compound represented by the general formula (M), the compound represented by the general formula (IX-2-3) constituting 0.5% or more and less than 5%.

[Chem. 52]

(IX-2-3)

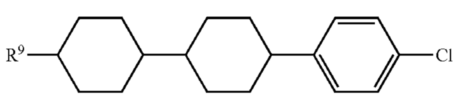

(wherein $R^9$ denotes an alkyl group having 1 to 5 carbon atoms, an alkenyl group having 2 to 5 carbon atoms, or an alkoxy group having 1 to 4 carbon atoms)

(51) The liquid crystal composition according to (50), containing a compound represented by a formula (32.2) as a compound represented by the general formula (IX-2-3), the compound represented by the formula (32.2) constituting 0.5% or more and less than 5%.

[Chem. 53]

(32.2)

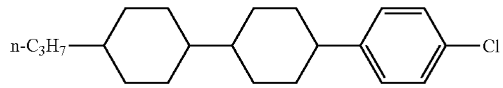

(52) The liquid crystal composition according to (50), containing a compound represented by a formula (32.4) as a compound represented by the general formula (IX-2-3), the compound represented by the formula (32.4) constituting 0.5% or more and less than 5%.

[Chem. 54]

(32.4)

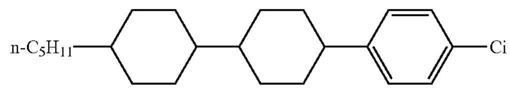

(53) The liquid crystal composition according to (3), containing a compound represented by a general formula (X-1-1) as a compound represented by the general formula (M), the compound represented by the general formula (X-1-1) constituting 0.5% or more and less than 4%.

[Chem. 55]

(X-1-1)

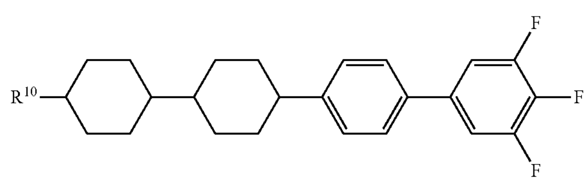

(wherein $R^{10}$ denotes an alkyl group having 1 to 5 carbon atoms, an alkenyl group having 2 to 5 carbon atoms, or an alkoxy group having 1 to 4 carbon atoms)

(54) The liquid crystal composition according to (53), containing a compound represented by a formula (36.1) as a compound represented by the general formula (X-1-1), the compound represented by the formula (36.1) constituting 0.5% or more and less than 4%.

[Chem. 56]

(36.1)

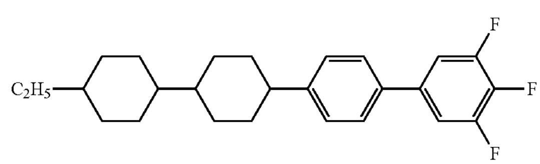

(55) The liquid crystal composition according to (3), containing a compound represented by a general formula (X-3-1) as a compound represented by the general formula (M), the compound represented by the general formula (X-3-1) constituting 0.5% or more and less than 2%.

[Chem. 57]

(X-3-1)

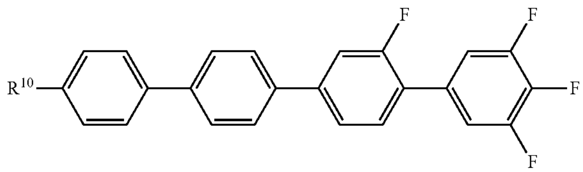

(wherein $R^{10}$ denotes an alkyl group having 1 to 5 carbon atoms, an alkenyl group having 2 to 5 carbon atoms, or an alkoxy group having 1 to 4 carbon atoms)

(56) The liquid crystal composition according to (55), containing a compound represented by a formula (41.2) as a compound represented by the general formula (X-3-1), the compound represented by the formula (41.2) constituting 0.5% or more and less than 2%.

[Chem. 58]

(41.2)

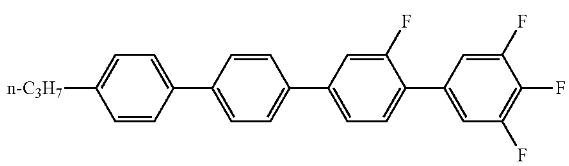

(57) A liquid crystal display element for active-matrix driving, containing the liquid crystal composition according to any one of (1) to (56).

(58) The liquid crystal display element for active-matrix driving according to (57), wherein the liquid crystal display element operates in an IPS mode.

(59) The liquid crystal display element for active-matrix driving according to (57), wherein the liquid crystal display element operates in a VA-IPS mode.

(60) The liquid crystal display element for active-matrix driving according to (57), wherein the liquid crystal display element operates in an FFS mode.

(61) The liquid crystal display element for active-matrix driving according to (57), wherein the liquid crystal display element operates in an ECB mode.

(62) The liquid crystal display element for active-matrix driving according to (57), wherein the liquid crystal display element operates in an OCB mode.

(63) The liquid crystal display element for active-matrix driving according to (57), wherein the liquid crystal display element operates in a VA mode.

(64) A liquid crystal display including the liquid crystal display element for active-matrix driving according to any one of (57) to (63).

Advantageous Effects of Invention

While retaining low viscosity, high specific resistance, and a high voltage holding ratio, a composition having positive anisotropy of dielectric constant according to the present invention has much higher solubility at low temperatures than before and can be consistently dropped for extended periods in a process of manufacturing a liquid crystal display element by the ODF method. Thus, a composition according to the present invention can be used to efficiently produce a liquid crystal display element having reduced display defects resulting from a manufacturing process and having high display quality, and has high practicality in (applicability to) liquid crystal products. Liquid crystal display elements of an in-plane switching (IPS) type or a fringe field switching (FFS) type containing the composition can have high high-speed response.

DESCRIPTION OF EMBODIMENTS

Figure 1:
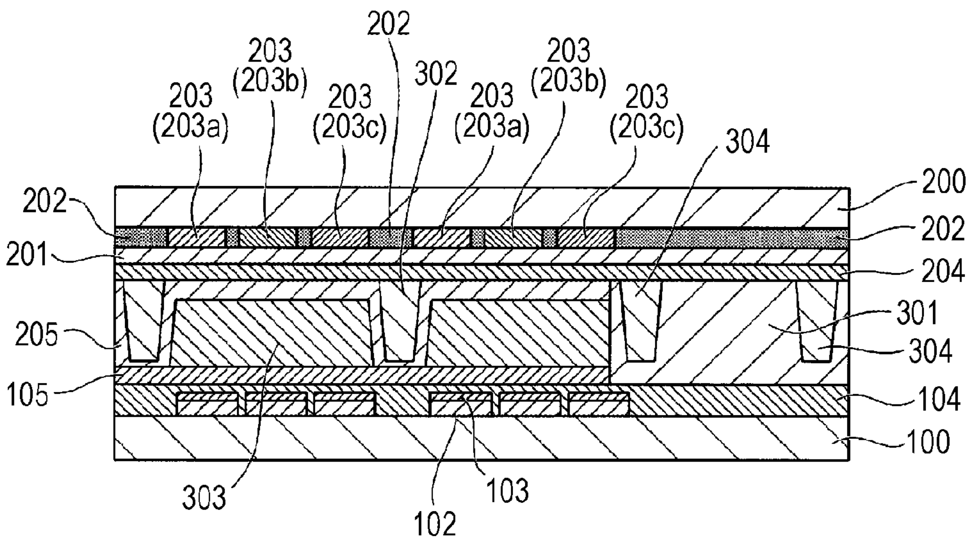
FIG. 1 is a cross-sectional view of a liquid crystal display element according to the present invention. A substrate including 100 to 105 is referred to as a "back plane", and a substrate including 200 to 205 is referred to as a "front plane".

A liquid crystal composition according to the present invention contains at least one compound represented by the following general formula (i) and at least one compound represented by the following general formula (ii). The liquid crystal composition will be described below. Unless otherwise specified, "%" means "% by mass".

[Chem. 59]

(i)

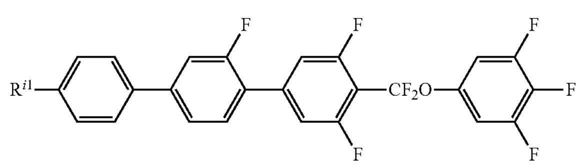

(wherein $R^{i1}$ denotes an alkyl group having 2 to 5 carbon atoms)

[Chem. 60]

(ii)

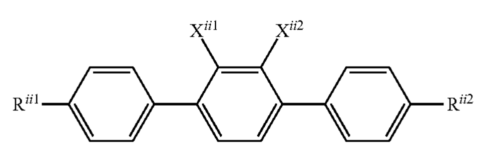

(wherein $R^{ii1}$ and $R^{ii2}$ independently denote an alkyl group having 1 to 5 carbon atoms or an alkenyl group having 2 to 5 carbon atoms, and $X^{ii1}$ and $X^{ii2}$ independently denote a hydrogen atom or a fluorine atom)

<Compound(s) Represented by General Formula (i)>

A liquid crystal composition according to the present invention contains at least one compound represented by the general formula (i).

[Chem. 61]

(i)

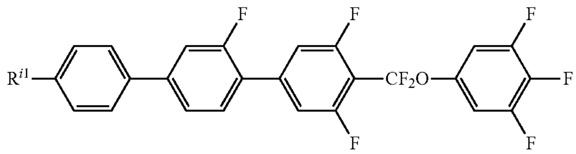

(wherein $R^{i1}$ denotes an alkyl group having 2 to 5 carbon atoms)

In consideration of solubility at low temperatures, transition temperature, and electrical reliability, the amount of the compound(s) represented by the general formula (i) preferably ranges from 0.5% to 30% by mass, 2% to 25% by mass, or 2% to 22% by mass of the total mass of a liquid crystal composition of the present invention. Among these, the amount of the compound(s) represented by the general formula (i) preferably ranges from 2% to 20% by mass, 2% to 12% by mass, 2% to 8% by mass, 2% to 5% by mass, 2% to 4% by mass, 4% to 22% by mass, 5% to 22% by mass, 10% to 22% by mass, 14% to 22% by mass, 20% to 22% by mass, 4% to 5% by mass, 5% to 8% by mass, 10% to 12% by mass, or 14% to 20% by mass of the total mass of a liquid crystal composition of the present invention.

More specifically, the compound(s) represented by the general formula (i) for use in a liquid crystal composition according to the present invention is/are preferably at least one compound selected from a compound group represented by the formulae (45.1) to (45.4), particularly preferably at least one compound selected from a compound group represented by the formulae (45.2) to (45.4), more preferably a compound represented by the formula (45.2).

[Chem. 62]

(45.1)

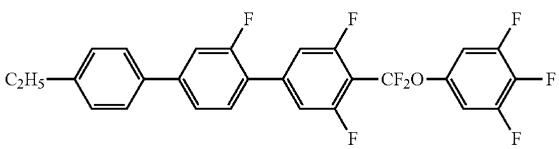

(45.2)

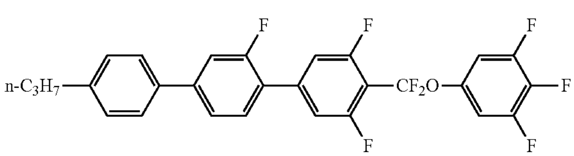

(45.3)

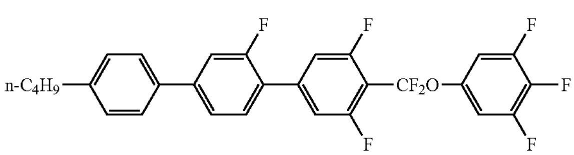

(45.4)

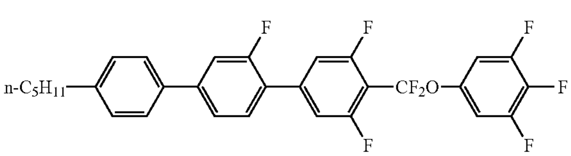

In consideration of solubility at low temperatures, transition temperature, and electrical reliability, the amount of the compound represented by the formula (45.2) in a liquid crystal composition according to the present invention preferably ranges from 1% to 25% by mass, preferably 2% to 20% by mass, preferably 2% to 15% by mass, particularly preferably 2% to 12% by mass, of the total mass of the liquid crystal composition. Particularly preferred are 2% to 10% by mass, 2% to 6% by mass, 2% to 5% by mass, 2% to 4% by mass, 3% to 11% by mass, 4% to 11% by mass, and 4% to 5% by mass, for example.

In consideration of solubility at low temperatures, transition temperature, and electrical reliability, the amount of the compound represented by the formula (45.3) in a liquid crystal composition according to the present invention preferably ranges from 1% to 20% by mass, preferably 1% to 15% by mass, preferably 1% to 10% by mass, particularly preferably 2% to 9% by mass, of the total mass of the liquid crystal composition. Particularly preferred are 4% to 9% by mass, 5% to 9% by mass, 2% to 8% by mass, 2% to 7% by mass, 2% to 4% by mass, 4% to 8% by mass, and 5% to 7% by mass, for example.

In consideration of solubility at low temperatures, transition temperature, and electrical reliability, the amount of the compound represented by the formula (45.4) in a liquid crystal composition according to the present invention preferably ranges from 1% to 20% by mass, preferably 1% to 15% by mass, preferably 1% to 10% by mass, particularly preferably 2% to 10% by mass, of the total mass of the liquid crystal composition. Particularly preferred are 4% to 10% by mass, 5% to 10% by mass, 2% to 7% by mass, 2% to 6% by mass, and 5% to 7% by mass, for example.

The compound(s) represented by the general formula (i) may be appropriately combined with any compound in each embodiment in consideration of solubility at low temperatures, transition temperature, electrical reliability, and birefringence index. For example, one compound is used in one embodiment of the present invention, two compounds are combined in another embodiment, and three or more compounds are combined in still another embodiment.

For example, when one compound represented by the general formula (i) is contained, the amount of the compound represented by the general formula (i) in one embodiment preferably ranges from 0.5% to 16% by mass, 1% to 13% by mass, or 2% or more by mass 10% by mass.

<Compound(s) Represented by General Formula (ii)>

A liquid crystal composition according to the present invention contains at least one compound represented by the following general formula (ii).

{Chem. 63]

(ii)

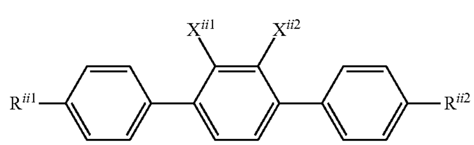

(wherein $R^{ii1}$ and $R^{ii2}$ independently denote an alkyl group having 1 to 5 carbon atoms or an alkenyl group having 2 to 5 carbon atoms, and $X^{ii1}$ and $X^{ii2}$ independently denote a hydrogen atom or a fluorine atom)

Although compounds of any types may be combined, these compounds are appropriately combined in a manner that depends on the desired characteristics, such as solubility at low temperatures, transition temperature, electrical reliability, and birefringence index. For example, one compound is used in one embodiment of the present invention. Alternatively, two compounds are used in another embodiment of the present invention. Alternatively, three compounds are used in still another embodiment of the present invention. Alternatively, four compounds are used in still another embodiment of the present invention. Alternatively, five compounds are used in still another embodiment of the present invention. Alternatively, at least six compounds are used in still another embodiment of the present invention.

For example, the compound(s) represented by the general formula (ii) is/are preferably at least one compound selected from a compound group represented by the general formula (IV-1).

[Chem. 64]

(IV-1)

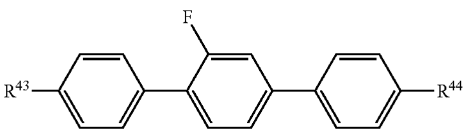

In the general formula (IV-1), $R^{43}$ and $R^{44}$ independently denote an alkyl group having 1 to 5 carbon atoms.

The amount of compound(s) represented by the general formula (IV-1) should be appropriately adjusted in a manner that depends on the desired characteristics, such as solubility at low temperatures, transition temperature, electrical reliability, birefringence index, process compatibility, drop marks, burn-in, and/or anisotropy of dielectric constant.

For example, in one embodiment, the amount of compound(s) represented by the general formula (IV-1) ranges from 0.5% to 30% by mass of the total mass of a liquid crystal composition of the present invention. In another embodiment of the present invention, the amount ranges from 3% to 30% by mass. In still another embodiment of the present invention, the amount ranges from 3% to 20% by mass. In still another embodiment of the present invention, the amount ranges from 3% to 15% by mass. In still another embodiment of the present invention, the amount ranges from 3% to 12% by mass. In still another embodiment of the present invention, the amount ranges from 4% to 30% by mass. In still another embodiment of the present invention, the amount ranges from 6% to 30% by mass.

For example, the compound(s) represented by the general formula (IV-1) is/are preferably at least one compound selected from a compound group represented by the formulae (18.1) to (18.9).

[Chem. 65]

(18.1)

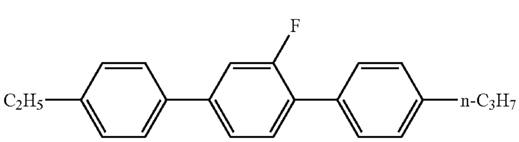

(18.2)

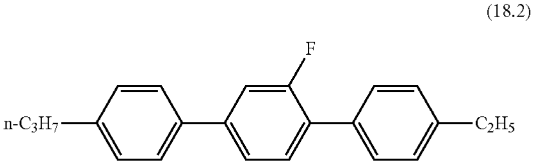

-continued (18.3)

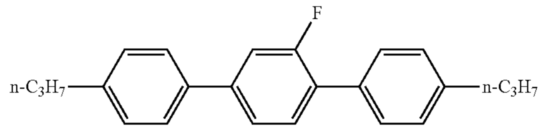

(18.4)

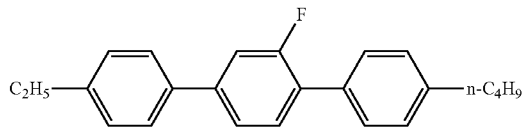

(18.5)

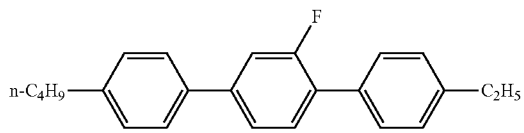

(18.6)

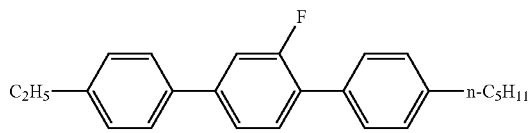

(18.7)

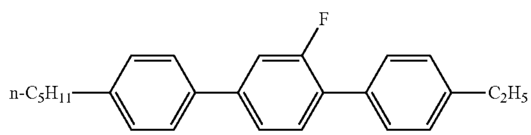

(18.8)

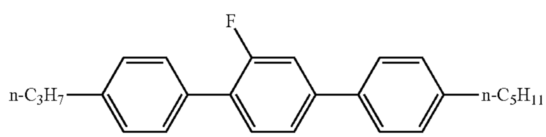

(18.9)

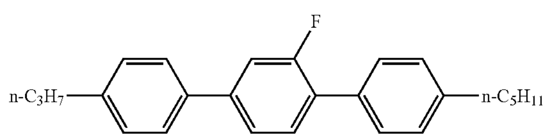

Although compounds of any types may be combined, one to three of these compounds are preferably contained, and one to four of these compounds are more preferably contained. Because a broad molecular weight distribution of a compound to be selected is also effective for solubility, for example, the following compounds are preferably appropriately combined: one compound represented by the formula (18.1) or (18.2), one compound represented by the formula (18.4) or (18.5), and one compound represented by the formula (18.6) or (18.7). Among these, the compounds represented by the formulae (18.1), (18.3), (18.4), (18.6), and (18.9) are preferably contained.

When only one compound is contained, the compound represented by the formula (18.4) is preferably selected. When two compounds are contained, the compounds represented by the formulae (18.1) and (18.6) are preferably selected. When three compounds are contained, the compounds represented by the formulae (18.1), (18.4), and (18.6) are preferably selected.

When at least one compound represented by the general formula (i) and at least the compound represented by the formula (18.3) as a compound represented by the general formula (ii) are contained, the amount of the compound represented by the formula (18.3) preferably ranges from 0.5% to 12% by mass, 4% to 11% by mass, or 7% to 9% by mass in one embodiment.

Alternatively, or in addition, for example, the compound(s) represented by the general formula (ii) is/are preferably at least one compound selected from a compound group represented by the general formula (IV-2).

[Chem. 66]

(IV-2)

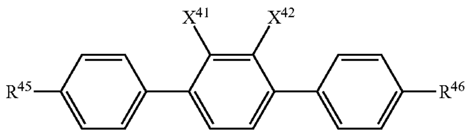

In the general formula (IV-2), $R^{45}$ and $R^{46}$ independently denote an alkyl group having 1 to 5 carbon atoms or an alkenyl group having 2 to 5 carbon atoms, at least one of $R^{45}$ and $R^{46}$ denotes an alkenyl group having 2 to 5 carbon atoms, and $X^{41}$ and $X^{42}$ independently denote a hydrogen atom or a fluorine atom.

Although compounds of any types may be combined, these compounds are appropriately combined in a manner that depends on the desired characteristics, such as solubility at low temperatures, transition temperature, electrical reliability, and birefringence index.

The amount of compound(s) represented by the general formula (IV-2) should be appropriately adjusted in a manner that depends on the desired characteristics, such as solubility at low temperatures, transition temperature, electrical reliability, birefringence index, process compatibility, drop marks, burn-in, and/or anisotropy of dielectric constant. For example, the amount of the compound(s) represented by the general formula (IV-2) preferably ranges from 1% to 20% by mass of the total mass of a liquid crystal composition of the present invention. The amount of the compound(s) represented by the general formula (IV-2) more preferably ranges from 1% to 15% by mass, 1% to 13%, 2% to 15% by mass, 2% to 13% by mass, 4% to 13% by mass, 1% to 4% by mass, or 2% to 4% by mass, for example.

For example, the compound(s) represented by the general formula (IV-2) is/are preferably at least one compound selected from a compound group represented by the following formulae (19.1) to (19.8), particularly preferably a compound represented by the formula (19.2).

[Chem. 67]

(19.1)

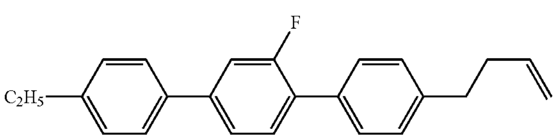

(19.2)

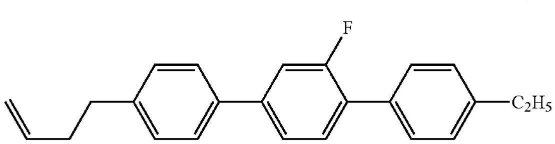

-continued (19.3)

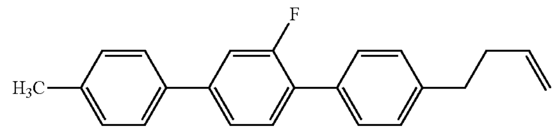

(19.31)

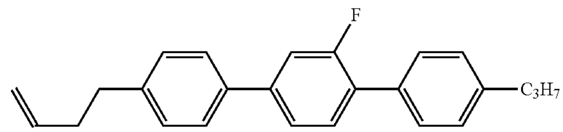

(19.32)

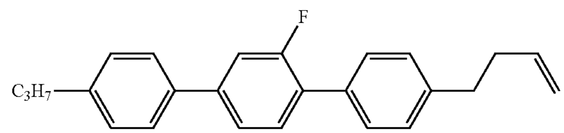

(19.33)

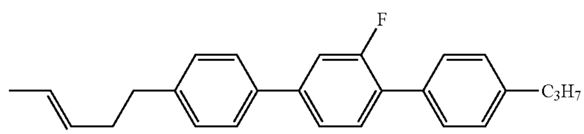

(19.34)

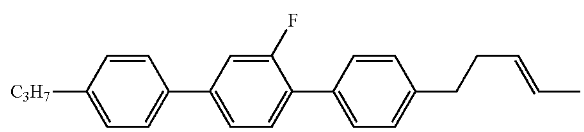

(19.4)

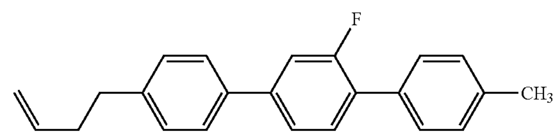

(19.5)

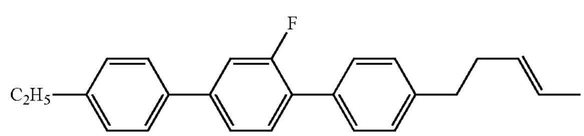

(19.6)

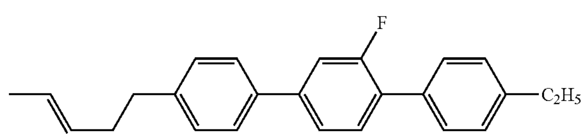

(19.7)

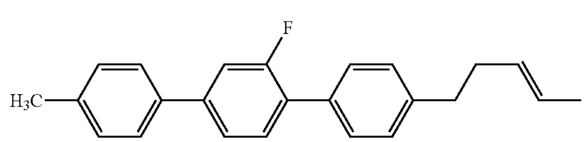

(19.8)

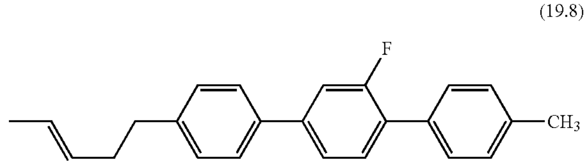

A broad molecular weight distribution of a compound selected as a component of a liquid crystal composition is also effective for solubility. Thus, in order to improve the solubility of a liquid crystal composition, for example, one compound represented by the formula (19.1) or (19.2), one compound represented by the formula (19.3) or (19.4), one compound represented by the formula (19.5) or (19.6), and one compound represented by the formula (19.7) or (19.8) are preferably appropriately combined.

In consideration of solubility at low temperatures, transition temperature, and electrical reliability, the amount of the compound represented by the formula (19.2) in a liquid crystal composition according to the present invention is preferably 0.5% or more by mass and less than 14% by mass, 0.5% or more by mass and less than 11% by mass, 0.5% or more by mass and less than 8% by mass, or 0.5% or more by mass and less than 5% by mass of the total mass of the liquid crystal composition.

In consideration of solubility at low temperatures, transition temperature, and electrical reliability, the amount of the compound represented by the formula (19.31) in a liquid crystal composition according to the present invention is preferably 0.5% or more by mass and less than 14% by mass, 0.5% or more by mass and less than 11% by mass, 0.5% or more by mass and less than 8% by mass, or 0.5% or more by mass and less than 5% by mass of the total mass of the liquid crystal composition.

In consideration of solubility at low temperatures, transition temperature, and electrical reliability, the amount of the compound represented by the formula (19.4) in a liquid crystal composition according to the present invention preferably ranges from 3% to 25% by mass, 5% to 20% by mass, 5% to 15% by mass, or 10% to 15% by mass of the total mass of the liquid crystal composition.

A liquid crystal composition according to the present invention preferably contains one or two compounds represented by the general formula (ii).

More specifically, one or two selected from (18.1) to (18.9) represented by the general formula (IV-1) and the formulae (19.1) to (19.8) represented by the general formula (IV-2) are preferably contained.

<Composition of Liquid Crystal Composition According to Present Invention>

The total amount of the compound(s) represented by the general formula (i) and the compound(s) represented by the general formula (ii) preferably ranges from 5% to 35% by mass, 10% to 30% by mass, 15% to 25% by mass, or 6% to 25% by mass of the total mass of the liquid crystal composition.

(The Case where a Liquid Crystal Composition According to the Present Invention Contains at least One Compound Represented by the General Formula (i) and at least One Compound Represented by the General Formula (ii))

When a liquid crystal composition according to the present invention contains at least one compound represented by the general formula (i), the liquid crystal composition preferably contains one or two compounds represented by the general formula (ii).

More specifically, one or two selected from (18.1) to (18.9) represented by the general formula (IV-1) and the formulae (19.1) to (19.8) represented by the general formula (IV-2) are preferably contained as a compound or compounds represented by the general formula (ii).

When a liquid crystal composition according to the present invention contains at least one compound represented by the general formula (i) and at least the compound represented by the following formula (18.3) as a compound represented by the general formula (ii), the amount of the compound represented by the formula (18.3) preferably ranges from 0.5% to 12% by mass, 4% or more and less than 10% by mass, or 7% to 9% by mass in one embodiment.

[Chem. 68]

(18.3)

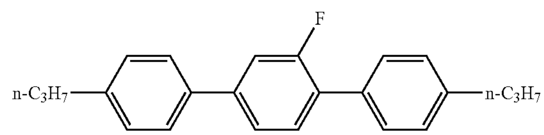

When a liquid crystal composition according to the present invention contains at least one compound represented by the general formula (i) and at least the compound represented by the following formula (19.2) as a compound represented by the general formula (ii), the amount of the compound represented by the formula (19.2) is preferably 0.5% or more by mass and less than 5% by mass, 1% or more by mass and less than 5% by mass, or 3% or more by mass and less than 5% by mass in one embodiment.

[Chem. 69]

(19.2)

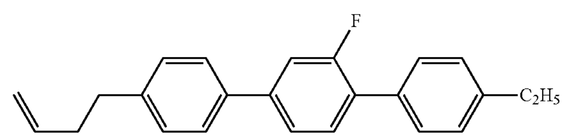

When a liquid crystal composition according to the present invention contains at least one compound represented by the general formula (i) and at least the compound represented by the following formula (18.4) as a compound represented by the general formula (ii), the amount of the compound represented by the formula (18.4) is preferably more than 6% by mass and 15% or less by mass, more than 6% by mass and 12% or less by mass, or more than 6% by mass and 9% or less by mass in one embodiment.

[Chem. 70]

(18.4)

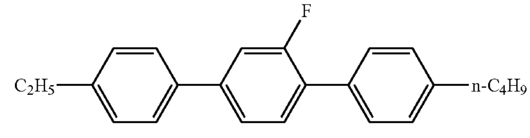

When a liquid crystal composition according to the present invention contains at least one compound represented by the general formula (i) and at least the compound represented by the following formula (19.4) as a compound represented by the general formula (ii), the amount of the compound represented by the formula (19.4) is preferably more than 5% by mass and 14% or less by mass, more than 5% by mass and less than 11% by mass, or more than 5% by mass and 8% or less by mass in one embodiment.

[Chem. 71]

(19.4)

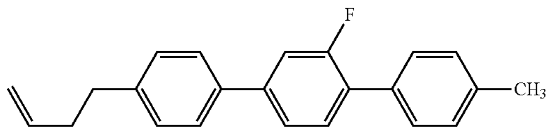

When a liquid crystal composition according to the present invention contains at least one compound represented by the general formula (i) and at least the compound represented by the following formula (19.31) as a compound represented by the general formula (ii), the amount of the compound represented by the formula (19.31) is preferably 0.5% or more by mass and less than 5% by mass, 1% or more by mass and less than 5% by mass, or 2% or more by mass and less than 5% by mass in one embodiment.

[Chem. 72]

(19.31)

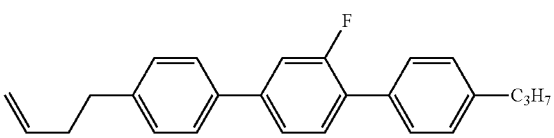

A liquid crystal composition according to the present invention that contains at least one compound represented by the general formula (i) and at least one compound represented by the general formula (ii) preferably further contains at least one of the following compounds.

[Chem. 73]

(54.2)

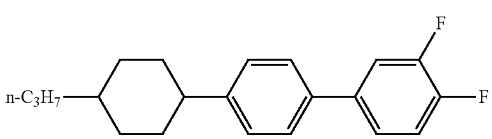

(54.4)

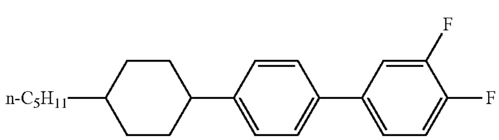

(26.1)

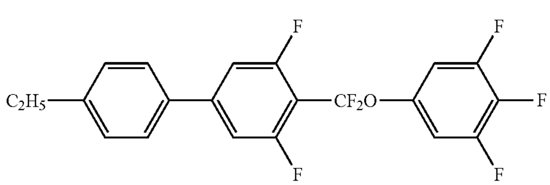

(42.3)

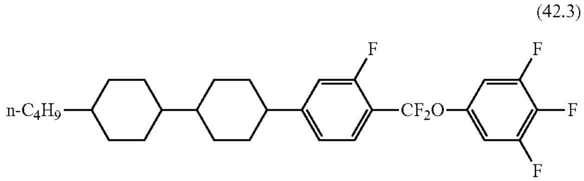

-continued (31.4)

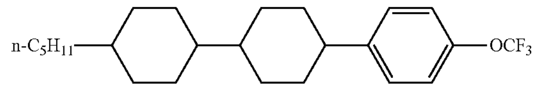

(39.2)

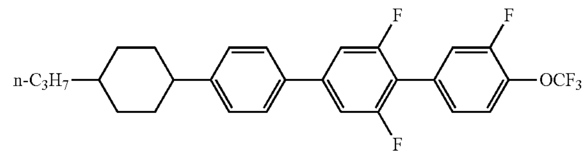

(3.4)

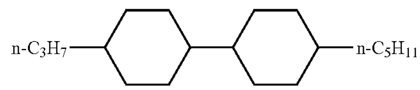

(10.1)

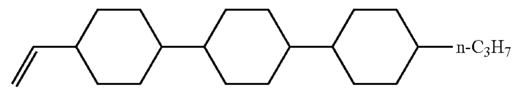

(12.3)

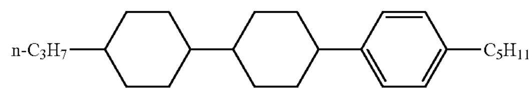

(6.6)

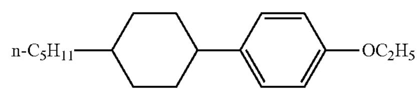

(5.2)

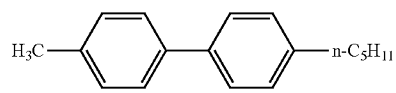

(23.2)

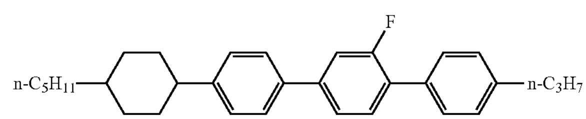

When at least one compound represented by the general formula (i), at least one compound represented by the general formula (ii), and the compound represented by the formula (54.2) are contained, the amount of the compound represented by the formula (54.2) preferably ranges from 0.5% to 10% by mass, 2% to 8% by mass, or 6% to 7% by mass in one embodiment.

When at least one compound represented by the general formula (i) and the compound represented by the formula (54.4) are contained, the amount of the compound represented by the formula (54.4) preferably ranges from 0.5% to 8% by mass, 2% to 7% by mass, or 4% to 5% by mass in one embodiment.

When at least one compound represented by the general formula (i), at least one compound represented by the general formula (ii), and the compound represented by the formula (26.1) are contained, the amount of the compound represented by the formula (26.1) preferably ranges from 0.5% to 8% by mass, 2% to 7% by mass, or 4% to 5% by mass in one embodiment.

When at least one compound represented by the general formula (i), at least one compound represented by the general formula (ii), and the compound represented by the formula (42.3) are contained, the amount of the compound represented by the formula (42.3) preferably ranges from 0.5% to 5% by mass, 2% to 4% by mass, or 2% to 3% by mass in one embodiment.

When at least one compound represented by the general formula (i), at least one compound represented by the general formula (ii), and the compound represented by the formula (31.4) are contained, the amount of the compound represented by the formula (31.4) preferably ranges from 0.5% to 5% by mass, 1% to 3% by mass, or 1% to 2% by mass in one embodiment.

When at least one compound represented by the general formula (i), at least one compound represented by the general formula (ii), and the compound represented by the formula (39.2) are contained, the amount of the compound represented by the formula (39.2) preferably ranges from 0.5% to 9% by mass, 3% to 7% by mass, or 5% to 6% by mass in one embodiment.

When at least one compound represented by the general formula (i), at least one compound represented by the general formula (ii), and the compound represented by the formula (3.4) are contained, the amount of the compound represented by the formula (3.4) preferably ranges from 0.5% to 7% by mass, 2% to 6% by mass, or 3% to 4% by mass in one embodiment.

When at least one compound represented by the general formula (i), at least one compound represented by the general formula (ii), and the compound represented by the formula (10.1) are contained, the amount of the compound represented by the formula (10.1) preferably ranges from 0.5% to 11% by mass, 3% to 9% by mass, or 7% to 8% by mass in one embodiment.

When at least one compound represented by the general formula (i), at least one compound represented by the general formula (ii), and the compound represented by the formula (12.3) are contained, the amount of the compound represented by the formula (12.3) preferably ranges from 0.5% to 4% by mass, 0.5% to 2% by mass, or 0.5% to 1% by mass in one embodiment.

When at least one compound represented by the general formula (i), at least one compound represented by the general formula (ii), and the compound represented by the formula (6.6) are contained, the amount of the compound represented by the formula (6.6) preferably ranges from 0.5% to 8% by mass, 2% to 6% by mass, or 4% to 5% by mass in one embodiment.

When at least one compound represented by the general formula (i), at least one compound represented by the general formula (ii), and the compound represented by the formula (5.2) are contained, the amount of the compound represented by the formula (5.2) preferably ranges from 0.5% to 15% by mass, 9% to 13% by mass, or 11% to 12% by mass in one embodiment.

When at least one compound represented by the general formula (i), at least one compound represented by the general formula (ii), and the compound represented by the formula (23.2) are contained, the amount of the compound represented by the formula (23.2) preferably ranges from 0.5% to 11% by mass, 2% to 9% by mass, or 5% to 8% by mass in one embodiment.

When at least one compound represented by the general formula (i) and at least one compound represented by the general formula (ii) are contained, the following compounds are also preferably contained.

When at least one compound represented by the general formula (i), at least one compound represented by the general formula (ii), and a compound represented by the following formula (1.3) are contained, the amount of the compound represented by the formula (1.3) is preferably more than 13% by mass and 21% or less by mass, more than 13% by mass and 19% or less by mass, or more than 13% by mass and 16% or less by mass in one embodiment.

[Chem. 74]

(1.3)

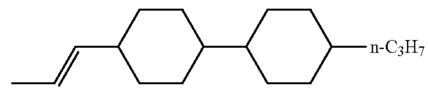

When at least one compound represented by the general formula (i), at least one compound represented by the general formula (ii), and a compound represented by the following formula (11.2) are contained, the amount of the compound represented by the formula (11.2) is preferably more than 4% by mass and 20% or less by mass, more than 5% by mass and 18% or less by mass, or more than 8% by mass and 18% or less by mass in one embodiment.

[Chem. 75]

(11.2)

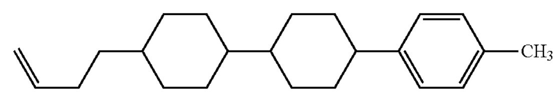

When at least one compound represented by the general formula (i), at least one compound represented by the general formula (ii), and a compound represented by the following formula (31.2) are contained, the amount of the compound represented by the formula (31.3) is preferably 0.5% or more by mass and less than 8% by mass, 2% or more by mass and less than 8% by mass, or 5% or more by mass and less than 8% by mass in one embodiment.

[Chem. 76]

(31.2)

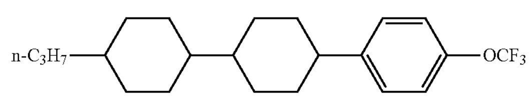

When at least one compound represented by the general formula (i), at least one compound represented by the general formula (ii), and a compound represented by the following formula (44.1) are contained, the amount of the compound represented by the formula (44.1) is preferably 0.5% or more by mass and less than 5% by mass, 1% or more by mass and less than 5% by mass, or 2% by mass and less than 5% by mass in one embodiment.

[Chem. 77]

(44.1)

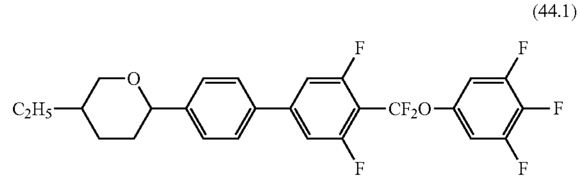

When at least one compound represented by the general formula (i), at least one compound represented by the general formula (ii), and a compound represented by the following formula (23.1) are contained, the amount of the compound represented by the formula (23.1) is preferably more than 5% by mass and 14% or less by mass, more than 6% by mass and 11% or less by mass, or more than 7% by mass and 10% or less by mass in one embodiment.

[Chem. 78]

(23.1)

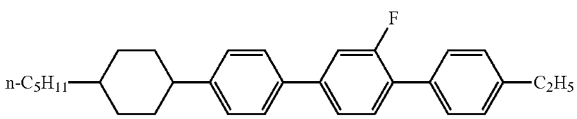

When at least one compound represented by the general formula (i), at least one compound represented by the general formula (ii), and a compound represented by the following formula (3.3) are contained, the amount of the compound represented by the formula (3.3) is preferably more than 5% by mass and 20% or less by mass, more than 6% by mass and 20% or less by mass, or more than 10% by mass and 15% or less by mass in one embodiment.

[Chem. 79]

(3.3)

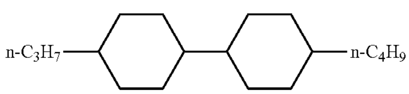

When at least one compound represented by the general formula (i), at least one compound represented by the general formula (ii), and a compound represented by the following formula (15.1) are contained, the amount of the compound represented by the formula (15.1) is preferably more than 5% by mass and 14% or less by mass, more than 6% by mass and 11% or less by mass, or more than 7% by mass and 10% or less by mass in one embodiment.

[Chem. 80]

(15.1)

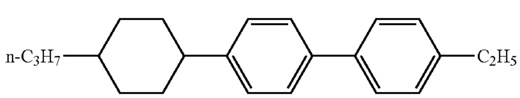

When at least one compound represented by the general formula (i), at least one compound represented by the general formula (ii), and a compound represented by the following formula (37.2) are contained, the amount of the compound represented by the formula (37.2) is preferably more than 5% by mass and 14% or less by mass, more than 6% by mass and 10% or less by mass, or more than 6% by mass and 8% or less by mass in one embodiment.

[Chem. 81]

(37.2)

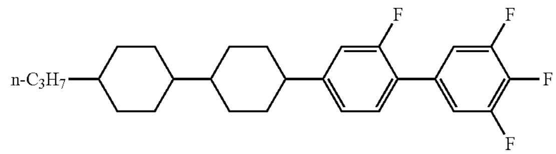

When at least one compound represented by the general formula (i), at least one compound represented by the general formula (ii), and a compound represented by the following formula (3.1) are contained, the amount of the compound represented by the formula (3.1) is preferably more than 12% by mass and 30% or less by mass, more than 14% by mass and 30% or less by mass, or more than 16% by mass and 25% or less by mass in one embodiment.

[Chem. 82]

(3.1)

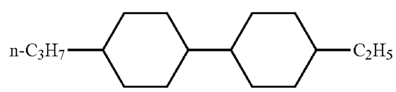

When at least one compound represented by the general formula (i), at least one compound represented by the general formula (ii), and a compound represented by the following formula (28.3) are contained, the amount of the compound represented by the formula (28.3) is preferably 0.5% or more by mass and less than 5% by mass, 1% or more by mass and less than 5% by mass, or 2% or more by mass and less than 5% by mass in one embodiment.

[Chem. 83]

(28.3)

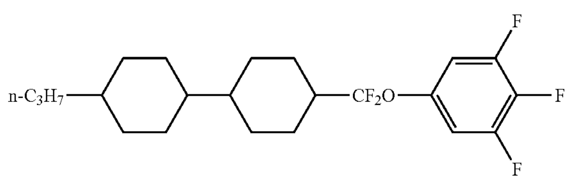

When at least one compound represented by the general formula (i), at least one compound represented by the general formula (ii), and a compound represented by the following formula (51.1) are contained, the amount of the compound represented by the formula (51.1) is preferably more than 7% by mass and 20% or less by mass, more than 10% by mass and 20% or less by mass, or more than 16% by mass and 20% or less by mass in one embodiment.

[Chem. 84]

(51.1)

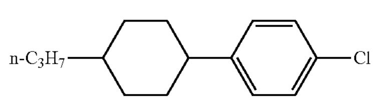

When at least one compound represented by the general formula (i), at least one compound represented by the general formula (ii), and a compound represented by the following formula (32.2) are contained, the amount of the compound represented by the formula (32.2) is preferably 0.5% or more by mass and less than 5% by mass, 1% or more by mass and less than 5% by mass, or 2% or more by mass and less than 5% by mass in one embodiment.

[Chem. 85]

(32.2)

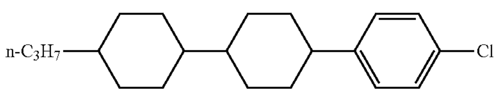

When at least one compound represented by the general formula (i), at least one compound represented by the general formula (ii), and a compound represented by the following formula (32.4) are contained, the amount of the compound represented by the formula (32.4) is preferably 0.5% or more by mass and less than 5% by mass, 1% or more by mass and less than 5% by mass, or 2% or more by mass and less than 5% by mass in one embodiment.

[Chem. 86]

(32.4)

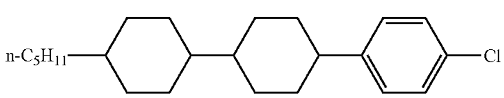

When at least one compound represented by the general formula (i), at least one compound represented by the general formula (ii), and a compound represented by the following formula (6.3) are contained, the amount of the compound represented by the formula (6.3) is preferably more than 7% by mass and 16% by mass, more than 9% by mass and 13% or less by mass, or more than 10% by mass and 12% or less by mass in one embodiment.

[Chem. 87]

(6.3)

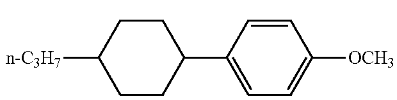

When at least one compound represented by the general formula (i), at least one compound represented by the general formula (ii), and a compound represented by the following formula (36.1) are contained, the amount of the compound represented by the formula (36.1) is preferably 0.5% or more by mass and less than 4% by mass, 1% or more by mass and less than 4% by mass, or 2% by mass and less than 4% by mass in one embodiment.

[Chem. 88]

(36.1)

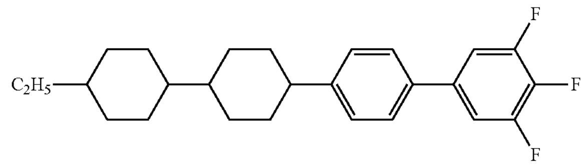

When at least one compound represented by the general formula (i), at least one compound represented by the general formula (ii), and a compound represented by the following formula (41.2) are contained, the amount of the compound represented by the formula (41.2) is preferably 0.5% or more by mass and less than 2% by mass in one embodiment.

[Chem. 89]

(41.2)

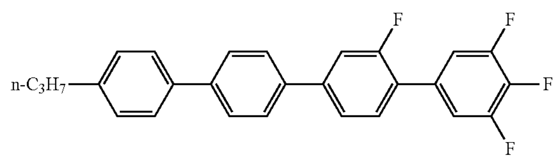

When a liquid crystal composition according to the present invention contains at least one compound represented by the general formula (i), at least one compound represented by the general formula (ii), a compound represented by the following general formula (I-5), a compound represented by the following general formula (II-2), and a compound represented by the following general formula (V-2), the total amount of these compounds preferably ranges from 25% to 50% by mass, 30% to 49% by mass, 35% to 40% by mass, or 39% by mass per 100% by mass of the liquid crystal composition.

When a liquid crystal composition according to the present invention contains at least one compound represented by the general formula (i), at least one compound represented by the general formula (ii), a compound represented by the following general formula (I-2), a compound represented by the following general formula (IX-2-3), a compound represented by the following general formula (V-2), and a compound represented by the following general formula (XIV-1-1), the total amount of these compounds preferably ranges from 70% to 100% by mass, 75% to 90% by mass, 80% to 85% by mass, or 81% by mass per 100% by mass of the liquid crystal composition.

When a liquid crystal composition according to the present invention contains at least one compound represented by the general formula (i), at least one compound represented by the general formula (ii), a compound represented by the following general formula (I-1-1), a compound represented by the following general formula (II-2), a compound represented by the following general formula (IX-2-2), and a compound represented by the following general formula (X-6), the total amount of these compounds preferably ranges from 40% to 70% by mass, 50% to 60% by mass, 53% to 58% by mass, or 55% by mass per 100% by mass of the liquid crystal composition.

When a liquid crystal composition according to the present invention contains at least one compound represented by the general formula (i), at least one compound represented by the general formula (ii), a compound represented by the following general formula (II-2), a compound represented by the following general formula (IX-1-1), a compound represented by the following general formula (IX-2-2), and a compound represented by the following general formula (X-6), the total amount of these compounds preferably ranges from 20% to 50% by mass, 25% to 40% by mass, 33% to 37% by mass, or 35% by mass per 100% by mass of the liquid crystal composition.

When a liquid crystal composition according to the present invention contains at least one compound represented by the general formula (i), at least one compound represented by the general formula (ii), a compound represented by the following general formula (III), a compound represented by the following general formula (X-2-1), and a compound represented by the following general formula (X-4-1), the total amount of these compounds preferably ranges from 20% to 50% by mass, 25% to 40% by mass, 33% to 37% by mass, or 35% by mass per 100% by mass of the liquid crystal composition.

When a liquid crystal composition according to the present invention contains at least one compound represented by the general formula (i), at least one compound represented by the general formula (ii), a compound represented by the following general formula (I-1-1), a compound represented by the following general formula (I-4), a compound represented by the following general formula (II-1), a compound represented by the following general formula (VIII-1), and a compound represented by the following general formula (X-2-1), the total amount of these compounds preferably ranges from 50% to 80% by mass, 60% to 70% by mass, 63% to 68% by mass, or 66% by mass per 100% by mass of the liquid crystal composition.

When a liquid crystal composition according to the present invention contains at least one compound represented by the general formula (i), at least one compound represented by the general formula (ii), a compound represented by the following general formula (I-1-1), a compound represented by the following general formula (I-4), a compound represented by the following general formula (VIII-1), and a compound represented by the following general formula (X-2-1), the total amount of these compounds preferably ranges from 40% to 70% by mass, 50% to 65% by mass, 55% to 60% by mass, or 58% by mass per 100% by mass of the liquid crystal composition.

When a liquid crystal composition according to the present invention contains at least one compound represented by the general formula (i), at least one compound represented by the general formula (ii), and a compound represented by the following general formula (X-1-1), the total amount of these compounds preferably ranges from 10% to 25% by mass, 10% to 20% by mass, 12% to 17% by mass, or 15% by mass per 100% by mass of the liquid crystal composition.

When a liquid crystal composition according to the present invention contains at least one compound represented by the general formula (i), at least one compound represented by the general formula (ii), a compound represented by the following general formula (I-5), a compound represented by the following general formula (II-2), a compound represented by the following general formula (IX-2-2), a compound represented by the following general formula (X-1-2), and a compound represented by the following general formula (X-3-1), the total amount of these compounds preferably ranges from 25% to 55% by mass, 30% to 45% by mass, 35% to 40% by mass, or 37% by mass per 100% by mass of the liquid crystal composition.

When a liquid crystal composition according to the present invention contains at least one compound represented by the general formula (i), at least one compound represented by the general formula (ii), a compound represented by the following general formula (III), a compound represented by the following general formula (X-1-2), and a compound represented by the following general formula (XIV-2-2), the total amount of these compounds preferably ranges from 25% to 55% by mass, 30% to 45% by mass, 37% to 42% by mass, or 39% by mass per 100% by mass of the liquid crystal composition.

(The Case where a Liquid Crystal Composition According to the Present Invention Contains at least Two Compounds Represented by the General Formula (i) and at least One Compound Represented by the General Formula (ii))

When a liquid crystal composition according to the present invention contains a compound represented by the following formula (45.2) and at least another compound represented by the general formula (i) as compounds represented by the general formula (i) and at least one compound represented by the general formula (ii), the amount of the compound represented by the formula (45.2) is preferably 0.5% or more by mass and less than 3% by mass, 1% or more by mass and less than 3% by mass, or 2% or more by mass and less than 3% by mass in one embodiment.

[Chem. 90]

(45.2)

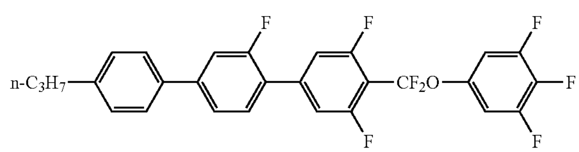

When a liquid crystal composition according to the present invention contains at least two compounds represented by the general formula (i) and at least the compound represented by the following formula (19.2) as a compound represented by the general formula (ii), the amount of the compound represented by the formula (19.2) is preferably 0.5% or more by mass and less than 5% by mass, 1% or more by mass and less than 5% by mass, or 3% or more by mass and less than 5% by mass in one embodiment.

[Chem. 91]

(19.2)

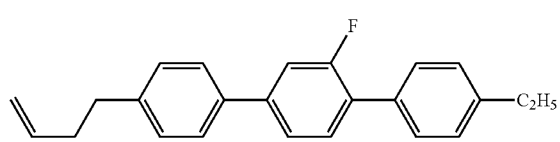

When a liquid crystal composition according to the present invention contains at least two compounds represented by the general formula (i) and at least the compound represented by the following formula (19.4) as a compound represented by the general formula (ii), the amount of the compound represented by the formula (19.4) is preferably 0.5% or more by mass and less than 5% by mass, 1% or more by mass and less than 5% by mass, or 3% or more by mass and less than 5% by mass in one embodiment.

[Chem. 92]

(19.4)

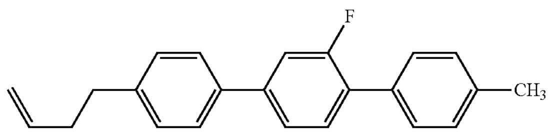

When a liquid crystal composition according to the present invention contains at least two compounds represented by the general formula (i) and at least one compound represented by the general formula (ii), the liquid crystal composition preferably further contains the following compounds.

[Chem. 93]

(44.1)

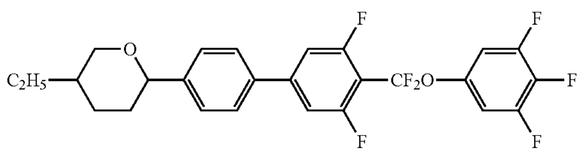

(44.2)

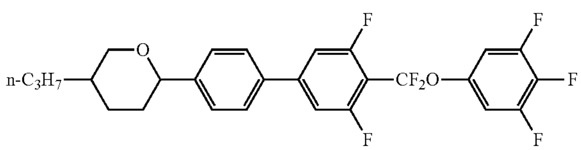

(31.4)

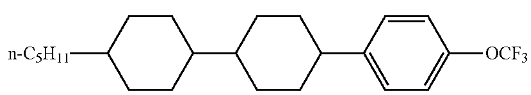

(3.4)

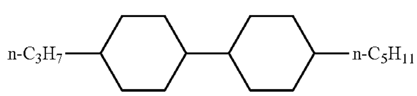

(6.6)

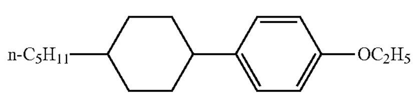

(23.2)

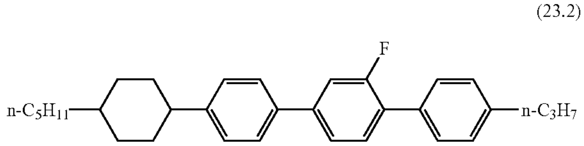

When at least two compounds represented by the general formula (i), at least one compound represented by the general formula (ii), and a compound represented by the formula (44.1) are contained, the amount of the compound represented by the formula (44.1) preferably ranges from 0.5% to 7% by mass, 1% to 5% by mass, or 3% to 4% by mass in one embodiment.

When at least two compounds represented by the general formula (i), at least one compound represented by the general formula (ii), and a compound represented by the formula (44.2) are contained, the amount of the compound represented by the formula (44.2) preferably ranges from 0.5% to 10% by mass, 1% to 9% by mass, or 3% to 8% by mass in one embodiment.

When at least two compounds represented by the general formula (i), at least one compound represented by the general formula (ii), and the compound represented by the formula (31.4) are contained, the amount of the compound represented by the formula (31.4) preferably ranges from 0.5% to 5% by mass, 0.5% to 3% by mass, or 1% to 2% by mass in one embodiment.

When at least two compounds represented by the general formula (i), at least one compound represented by the general formula (ii), and a compound represented by the formula (3.4) are contained, the amount of the compound represented by the formula (3.4) preferably ranges from 0.5% to 7% by mass, 1% to 6% by mass, or 3% to 4% by mass in one embodiment.

When at least two compounds represented by the general formula (i), at least one compound represented by the general formula (ii), and a compound represented by the formula (6.6) are contained, the amount of the compound represented by the formula (6.6) preferably ranges from 0.5% to 8% by mass, 2% to 6% by mass, or 4% to 5% by mass in one embodiment.

When at least two compounds represented by the general formula (i), at least one compound represented by the general formula (ii), and a compound represented by the formula (23.2) are contained, the amount of the compound represented by the formula (23.2) preferably ranges from 0.5% to 11% by mass, 3% to 9% by mass, or 5% to 8% by mass in one embodiment.

When at least two compounds represented by the general formula (i) are contained, the following compounds are also preferably contained.

When at least two compounds represented by the general formula (i), at least one compound represented by the general formula (ii), and a compound represented by the following formula (1.3) are contained, the amount of the compound represented by the formula (1.3) is preferably more than 10% by mass and 19% or less by mass, more than 10% by mass and 16% or less by mass, or more than 10% by mass and 13% or less by mass in one embodiment.

[Chem. 94]

(1.3)

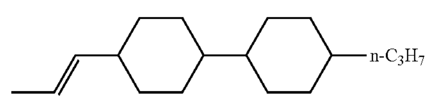

When at least two compounds represented by the general formula (i), at least one compound represented by the general formula (ii), and a compound represented by the following formula (2.2) are contained, the amount of the compound represented by the formula (2.2) is preferably more than 30% by mass and 45% or less by mass, more than 32% by mass and 40% or less by mass, or more than 33% by mass and 39% or less by mass in one embodiment.

[Chem. 95]

(2.2)

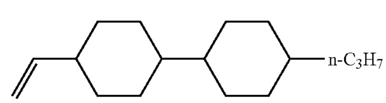

When at least two compounds represented by the general formula (i), at least one compound represented by the general formula (ii), and a compound represented by the following formula (26.2) are contained, the amount of the compound represented by the formula (26.2) preferably ranges from 0.5% to less than 14% by mass, 2% or more by mass and less than 14% by mass, or 2% or more and less than 10% by mass in one embodiment.

[Chem. 96]

(26.2)

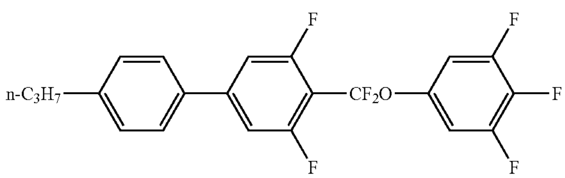

When at least two compounds represented by the general formula (i), at least one compound represented by the general formula (ii), and a compound represented by the following formula (11.1) are contained, the amount of the compound represented by the formula (11.1) is preferably more than 12% by mass and 21% or less by mass, more than 13% by mass and 18% or less by mass, or more than 13% by mass and 17% or less by mass in one embodiment.

[Chem. 97]

(11.1)

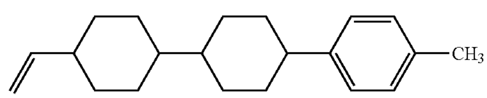

When at least two compounds represented by the general formula (i), at least one compound represented by the general formula (ii), and a compound represented by the following formula (11.2) are contained, the amount of the compound represented by the formula (11.2) is preferably more than 4% by mass and 20% or less by mass, more than 8% by mass and 20% or less by mass, or more than 8% by mass and 18% or less by mass in one embodiment.

[Chem. 98]

(11.2)

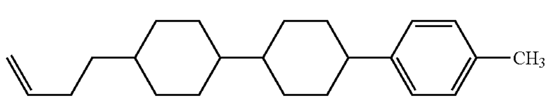

When at least two compounds represented by the general formula (i), at least one compound represented by the general formula (ii), and the compound represented by the following formula (31.2) are contained, the amount of the compound represented by the formula (31.2) is preferably 0.5% or more by mass and less than 8% by mass % by mass, 2% or more by mass and less than 8% by mass, or 5% or more by mass and less than 8% by mass in one embodiment.

[Chem. 99]

(31.2)

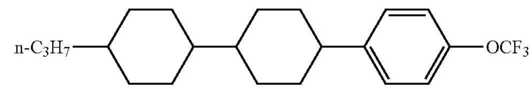

When at least two compounds represented by the general formula (i), at least one compound represented by the general formula (ii), and a compound represented by the following formula (23.1) are contained, the amount of the compound represented by the formula (23.1) is preferably more than 3% by mass and 14% or less by mass, more than 5% by mass and 11% or less by mass, or more than 7% by mass and 11% or less by mass in one embodiment.

[Chem. 100]

(23.1)

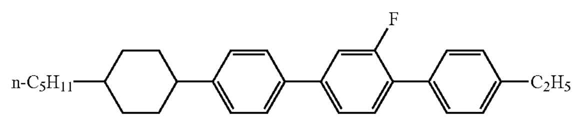

When at least two compounds represented by the general formula (i), at least one compound represented by the general formula (ii), and a compound represented by the following formula (3.3) are contained, the amount of the compound represented by the formula (3.3) is preferably more than 5% by mass and 20% or less by mass, more than 8% by mass and 20% or less by mass, or more than 10% by mass and 15% or less by mass in one embodiment.

[Chem. 101]

(3.3)

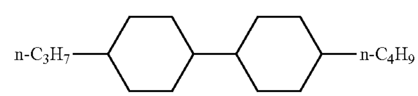

When at least two compounds represented by the general formula (i), at least one compound represented by the general formula (ii), and a compound represented by the following formula (3.1) are contained, the amount of the compound represented by the formula (3.1) is preferably more than 6% by mass and 35% or less by mass, more than 10% by mass and 35% or less by mass, or more than 15% by mass and 25% or less by mass in one embodiment.

[Chem. 102]

(3.1)

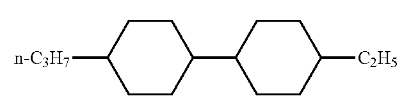

When at least two compounds represented by the general formula (i), at least one compound represented by the general formula (ii), and a compound represented by the following formula (28.3) are contained, the amount of the compound represented by the formula (28.3) is preferably 0.5% or more by mass and less than 5% by mass, 1% or less by mass and less than 5% by mass, or 1% or more by mass and less than 3% by mass in one embodiment.

[Chem. 103]

(28.3)

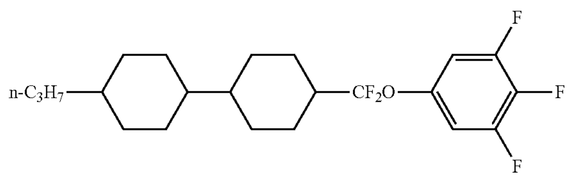

When at least two compounds represented by the general formula (i), at least one compound represented by the general formula (ii), and a compound represented by the following formula (51.1) are contained, the amount of the compound represented by the formula (51.1) is preferably more than 5% by mass and 25% or less by mass, more than 8% by mass and 25% or less by mass, or more than 15% by mass and 20% or less by mass in one embodiment.

[Chem. 104]

(51.1)

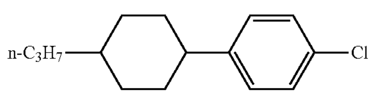

When at least two compounds represented by the general formula (i), at least one compound represented by the general formula (ii), and a compound represented by the following formula (32.2) are contained, the amount of the compound represented by the formula (32.2) is preferably 0.5% or more by mass and less than 5% by mass, 1% or more by mass and less than 5% by mass, or 2% or more by mass and less than 5% by mass in one embodiment.

[Chem. 105]

(32.2)

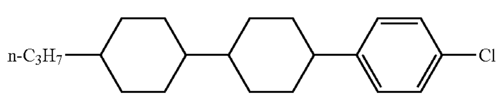

When at least two compounds represented by the general formula (i), at least one compound represented by the general formula (ii), and a compound represented by the following formula (32.4) are contained, the amount of the compound represented by the formula (32.4) is preferably 0.5% or more by mass and less than 5% by mass, 1% or more by mass and less than 5% by mass, or 2% or more by mass and less than 5% by mass in one embodiment.

[Chem. 106]

(32.4)

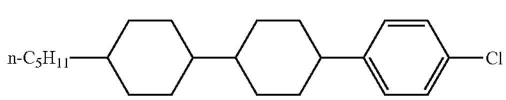

When a liquid crystal composition according to the present invention contains at least two compounds represented by the general formula (i) and at least one compound represented by the general formula (ii), the total amount of these compounds preferably ranges from 5% to 25% by mass, 10% to 20% by mass, 12% to 17% by mass, or 13% to 16% by mass per 100% by mass of the liquid crystal composition.

When a liquid crystal composition according to the present invention contains at least two compounds represented by the general formula (i), at least one compound represented by the general formula (ii), a compound represented by the following general formula (I-1-1), a compound represented by the following general formula (I-5), a compound represented by the following general formula (II-2), a compound represented by the following general formula (V-2), and a compound represented by the following general formula (VIII-1), the total amount of these compounds preferably ranges from 60% to 85% by mass, 65% to 80% by mass, 70% to 75% by mass, or 73% by mass per 100% by mass of the liquid crystal composition.

When a liquid crystal composition according to the present invention contains at least two compounds represented by the general formula (i), at least one compound represented by the general formula (ii), a compound represented by the following general formula (I-2), a compound represented by the following general formula (IX-2-3), a compound represented by the following general formula (V-2), a compound represented by the following general formula (VIII-1), and a compound represented by the following general formula (XIV-1-1), the total amount of these compounds preferably ranges from 90% to 100% by mass, 95% to 100% by mass, 98% to 100% by mass, or 100% by mass per 100% by mass of the liquid crystal composition.

When a liquid crystal composition according to the present invention contains at least two compounds represented by the general formula (i), at least one compound represented by the general formula (ii), a compound represented by the following general formula (I-1-1), a compound represented by the following general formula (I-1-2), a compound represented by the following general formula (II-2), a compound represented by the following general formula (IX-2-2), a compound represented by the following general formula (VIII-1), and a compound represented by the following general formula (X-6), the total amount of these compounds preferably ranges from 92% to 100% by mass, 96% to 100% by mass, 98% to 100% by mass, or 100% by mass per 100% by mass of the liquid crystal composition.

When a liquid crystal composition according to the present invention contains at least two compounds represented by the general formula (i), at least one compound represented by the general formula (ii), a compound represented by the following general formula (I-1-1), a compound represented by the following general formula (I-1-2), a compound represented by the following general formula (II-2), a compound represented by the following general formula (IX-1-1), a compound represented by the following general formula (IX-2-2), and a compound represented by the following general formula (X-6), the total amount of these compounds preferably ranges from 93% to 100% by mass, 97% to 100% by mass, 99% to 100% by mass, or 100% by mass per 100% by mass of the liquid crystal composition.

(The Case where a Liquid Crystal Composition According to the Present Invention Contains at least Three Compounds Represented by the General Formula (i) and at least One Compound Represented by the General Formula (ii))

When a liquid crystal composition according to the present invention contains a compound represented by the following formula (45.2) and at least two other compounds represented by the general formula (i) as compounds represented by the general formula (i) and at least one compound represented by the general formula (ii), the amount of the compound represented by the formula (45.2) is preferably 0.5% or more by mass and less than 3% by mass, 1% or more by mass and less than 3% by mass, or 2% or more by mass and less than 3% by mass in one embodiment.

[Chem. 107]

(45.2)

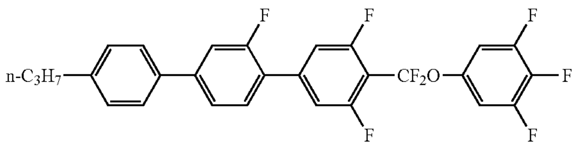

When a liquid crystal composition according to the present invention contains a compound represented by the following formula (45.4) and at least two other compounds represented by the general formula (i) as compounds represented by the general formula (i) and at least one compound represented by the general formula (ii), the amount of the compound represented by the formula (45.4) preferably ranges from 0.5% to 7% by mass, 1% to 6% by mass, or 2% to 4% by mass in one embodiment.

[Chem. 108]

(45.4)

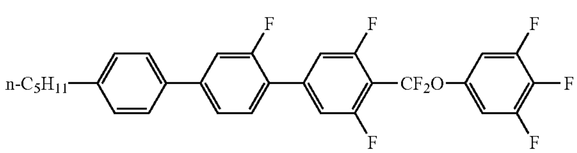

When a liquid crystal composition according to the present invention contains at least three compounds represented by the general formula (i) and at least a compound represented by the following formula (18.1) as a compound represented by the general formula (ii), the amount of the compound represented by the formula (18.1) is preferably more than 2% by mass and 11% or less by mass, more than 2% by mass and 8% or less by mass, or more than 2% by mass and 5% or less by mass in one embodiment.

[Chem. 109]

(18.1)

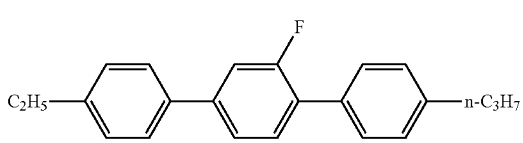

When at least three compounds represented by the general formula (i) and at least one compound represented by the general formula (ii) are contained, the following compounds are also preferably contained.

[Chem. 110]

(3.1)

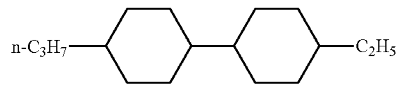

(3.3)

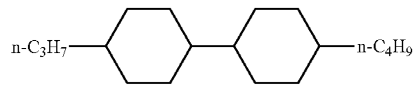

(3.4)

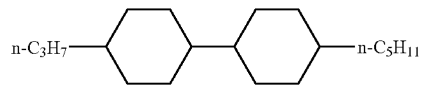

(2.3)

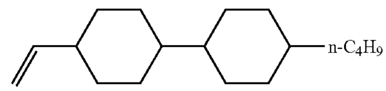

(6.6)

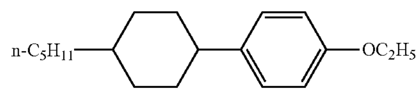

(11.1)

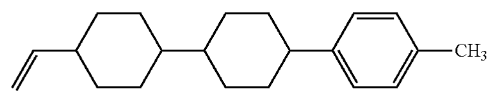

(11.2)

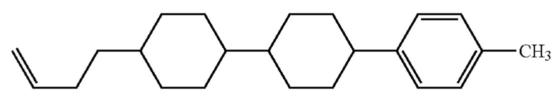

(23.1)

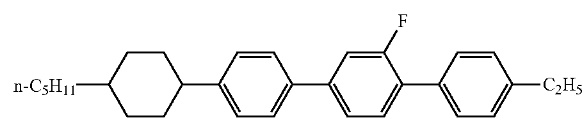

(23.2)

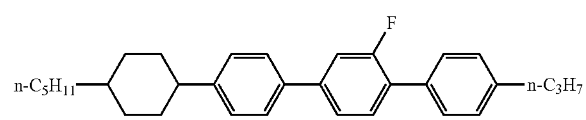

(51.1)

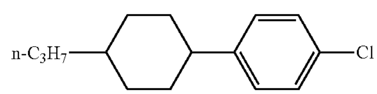

(32.2)

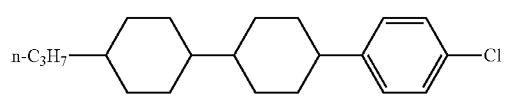

(32.4)

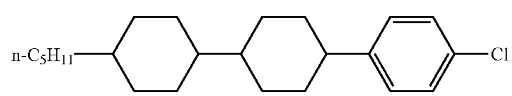

When at least three compounds represented by the general formula (i), at least one compound represented by the general formula (ii), and the compound represented by the formula (3.1) are contained, the amount of the compound represented by the formula (3.1) preferably ranges from 0.5% to 25% by mass, 10% to 24% by mass, or 21% to 22% by mass in one embodiment.

When at least three compounds represented by the general formula (i), at least one compound represented by the general formula (ii), and the compound represented by the formula (3.3) are contained, the amount of the compound represented by the formula (3.3) preferably ranges from 0.5% to 17% by mass, 7% to 15% by mass, or 13% to 14% by mass in one embodiment.

When at least three compounds represented by the general formula (i), at least one compound represented by the general formula (ii), and the compound represented by the formula (3.4) are contained, the amount of the compound represented by the formula (3.4) preferably ranges from 0.5% to 7% by mass, 1% to 5% by mass, or 3% to 4% by mass in one embodiment.

When at least three compounds represented by the general formula (i), at least one compound represented by the general formula (ii), and the compound represented by the formula (2.3) are contained, the amount of the compound represented by the formula (2.3) preferably ranges from 0.5% to 18% by mass, 7% to 17% by mass, or 14% to 15% by mass in one embodiment.

When at least three compounds represented by the general formula (i), at least one compound represented by the general formula (ii), and the compound represented by the formula (6.6) are contained, the amount of the compound represented by the formula (6.6) preferably ranges from 0.5% to 8% by mass, 2% to 7% by mass, or 4% to 5% by mass in one embodiment.

When at least three compounds represented by the general formula (i), at least one compound represented by the general formula (ii), and the compound represented by the formula (11.1) are contained, the amount of the compound represented by the formula (11.1) preferably ranges from 0.5% to 19% by mass, 7% to 17% by mass, or 15% to 16% by mass in one embodiment.

When at least three compounds represented by the general formula (i), at least one compound represented by the general formula (ii), and the compound represented by the formula (11.2) are contained, the amount of the compound represented by the formula (11.2) preferably ranges from 0.5% to 14% by mass, 5% to 13% by mass, or 10% to 11% by mass in one embodiment.

When at least three compounds represented by the general formula (i), at least one compound represented by the general formula (ii), and the compound represented by the formula (23.1) are contained, the amount of the compound represented by the formula (23.1) preferably ranges from 0.5% to 12% by mass, 3% to 10% by mass, or 4% to 9% by mass in one embodiment.

When at least three compounds represented by the general formula (i), at least one compound represented by the general formula (ii), and the compound represented by the formula (23.2) are contained, the amount of the compound represented by the formula (23.2) preferably ranges from 0.5% to 11% by mass, 3% to 10% by mass, or 5% to 8% by mass in one embodiment.

When at least three compounds represented by the general formula (i), at least one compound represented by the general formula (ii), and the compound represented by the formula (51.1) are contained, the amount of the compound represented by the formula (51.1) preferably ranges from 0.5% to 23% by mass, 10% to 22% by mass, or 19% to 20% by mass in one embodiment.

When at least three compounds represented by the general formula (i), at least one compound represented by the general formula (ii), and the compound represented by the formula (32.2) are contained, the amount of the compound represented by the formula (32.2) preferably ranges from 0.5% to 8% by mass, 2% to 7% by mass, or 4% to 5% by mass in one embodiment.

When at least three compounds represented by the general formula (i), at least one compound represented by the general formula (ii), and the compound represented by the formula (32.4) are contained, the amount of the compound represented by the formula (32.4) preferably ranges from 0.5% to 8% by mass, 2% to 6% by mass, or 4% to 5% by mass in one embodiment.

When at least three compounds represented by the general formula (i) and at least one compound represented by the general formula (ii) are contained, the following compounds are also preferably contained.

When at least three compounds represented by the general formula (i), at least one compound represented by the general formula (ii), and a compound represented by the following formula (1.3) are contained, the amount of the compound represented by the formula (1.3) is preferably more than 5% by mass and 14% or less by mass, more than 7% by mass and 14% or less by mass, or more than 9% by mass and 12% or less by mass in one embodiment.

[Chem. 111]

(1.3)

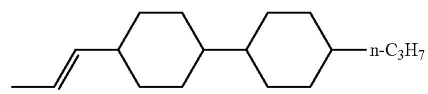

When at least three compounds represented by the general formula (i), at least one compound represented by the general formula (ii), and a compound represented by the following formula (26.2) are contained, the amount of the compound represented by the formula (26.2) is preferably more than 1% by mass and less than 14% by mass, 1% or more and less than 10% by mass, or 2% or more by mass and less than 9% by mass in one embodiment.

[Chem. 112]

(26.2)

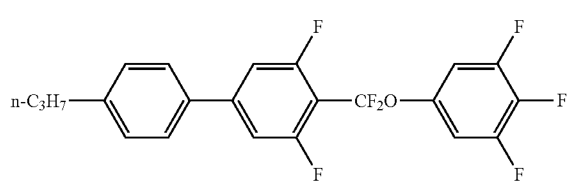

When at least three compounds represented by the general formula (i), at least one compound represented by the general formula (ii), and a compound represented by the following formula (2.4) are contained, the amount of the compound represented by the formula (2.4) is preferably more than 1% by mass and less than 15% by mass, 6% or more by mass and less than 15% by mass, 11% or more by mass and less than 15% by mass in one embodiment.

[Chem. 113]

(2.4)

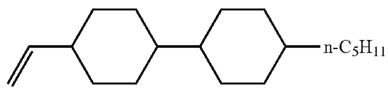

When a liquid crystal composition according to the present invention contains at least three compounds represented by the general formula (i) and at least one compound represented by the general formula (ii), the total amount of these compounds preferably ranges from 5% to 25% by mass, 10% to 20% by mass, 12% to 17% by mass, or 13% to 16% by mass per 100% by mass of the liquid crystal composition.

When a liquid crystal composition according to the present invention contains at least three compounds represented by the general formula (i), at least one compound represented by the general formula (ii), a compound represented by the following general formula (I-1-1), a compound represented by the following general formula (I-1-2), a compound represented by the following general formula (I-5), a compound represented by the following general formula (II-2), a compound represented by the following general formula (V-2), and a compound represented by the following general formula (VIII-1), the total amount of these compounds preferably ranges from 93% to 100% by mass, 97% to 100% by mass, 99% to 100% by mass, or 100% by mass per 100% by mass of the liquid crystal composition.

When a liquid crystal composition according to the present invention contains at least three compounds represented by the general formula (i), at least one compound represented by the general formula (ii), a compound represented by the following general formula (I-2), a compound represented by the following general formula (IX-2-3), a compound represented by the following general formula (V-2), a compound represented by the following general formula (VIII-1), and a compound represented by the following general formula (XIV-1-1), the total amount of these compounds preferably ranges from 93% to 100% by mass, 97% to 100% by mass, 99% to 100% by mass, or 100% by mass per 100% by mass of the liquid crystal composition.

(The Case where a Liquid Crystal Composition According to the Present Invention Contains at least One Compound Represented by the General Formula (i) and at least Two Compounds Represented by the General Formula (ii))

When a liquid crystal composition according to the present invention contains two compounds represented by the general formula (ii), the liquid crystal composition preferably contains one compound represented by the general formula (i) compound represented by the general formula (i).

More specifically, when a liquid crystal composition according to the present invention contains two compounds represented by the general formula (ii), the liquid crystal composition preferably contains only one of compounds represented by the following formulae (45.1) to (45.4) as a compound represented by the general formula (i). Among these, a compound represented by the formula (45.2) or a compound represented by the formula (45.3) is preferably contained.

[Chem. 114]

(45.1)

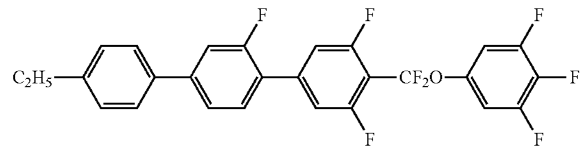

(45.2)

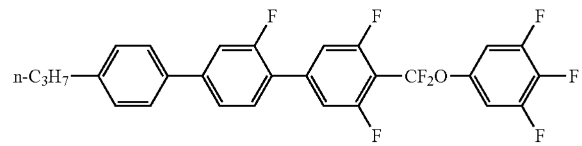

(45.3)

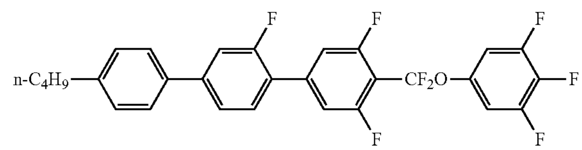

(45.4)

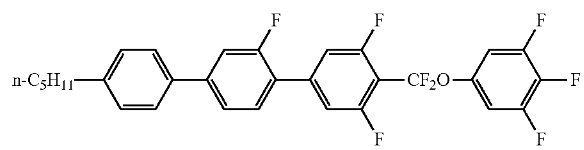

When a liquid crystal composition according to the present invention contains at least one compound represented by the general formula (i) and a compound represented by the following formula (18.3) and at least another compound represented by the general formula (ii) as compounds represented by the general formula (ii), the amount of the compound represented by the formula (18.3) preferably ranges from 0.5% to 11% by mass, 4% to 9% by mass, or 7% to 8% by mass in one embodiment.

[Chem. 115]

(18.3)

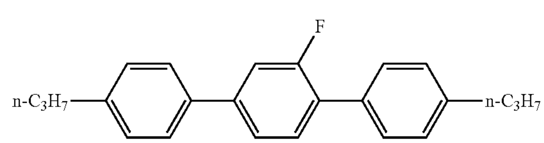

When a liquid crystal composition according to the present invention contains at least one compound represented by the general formula (i) and a compound represented by the following formula (18.4) and at least another compound represented by the general formula (ii) as compounds represented by the general formula (ii), the amount of the compound represented by the formula (18.4) is preferably more than 6% by mass and 15% by mass, more than 6% by mass and 12% or less by mass, or more than 6% by mass and 9% or less by mass in one embodiment.

[Chem. 116]

(18.4)

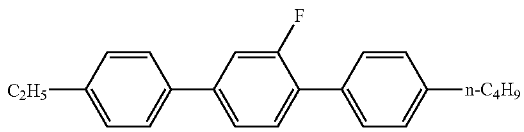

When a liquid crystal composition according to the present invention contains at least one compound represented by the general formula (i) and a compound represented by the following formula (19.2) and at least another compound represented by the general formula (ii) as compounds represented by the general formula (ii), the amount of the compound represented by the formula (19.2) is preferably 0.5% or more by mass and less than 5% by mass, 1% or more by mass and less than 5% by mass, or 2% or more by mass and less than % by mass in one embodiment.

[Chem. 117]

(19.2)

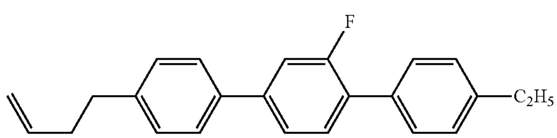

When a liquid crystal composition according to the present invention contains at least one compound represented by the general formula (i) and a compound represented by the following formula (19.31) and at least another compound represented by the general formula (ii) as compounds represented by the general formula (ii), the amount of the compound represented by the formula (19.31) is preferably 0.5% or more by mass and less than 5% by mass, 1% or more by mass and less than 5% by mass, or 2% or more by mass and less than % by mass in one embodiment.

[Chem. 118]

(19.31)

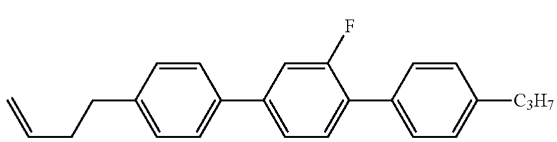

When a liquid crystal composition according to the present invention contains at least a compound represented by the following formula (45.3) as a compound represented by the general formula (i) and at least two compounds represented by the general formula (ii), the amount of the compound represented by the formula (45.3) is preferably 0.5% or more by mass and less than 7% by mass, 1% or more by mass and less than 7% by mass, or 4% or more by mass and less than 7% by mass in one embodiment.

[Chem. 119]

(45.3)

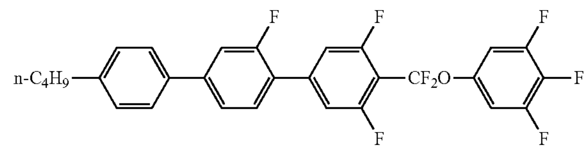

When at least one compound represented by the general formula (i) and at least two compounds represented by the general formula (ii) are contained, the following compounds are also preferably contained.

[Chem. 120]

(5.2)

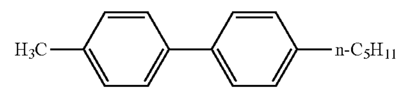

(10.1)

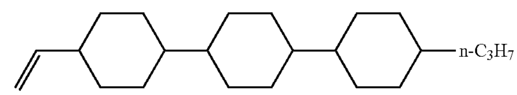

(12.3)

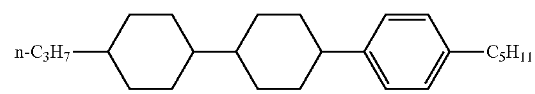

(26.1)

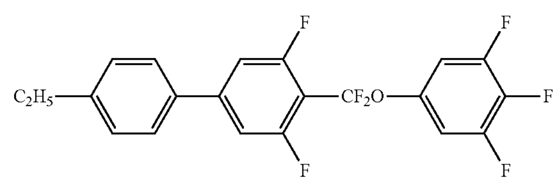

(39.2)

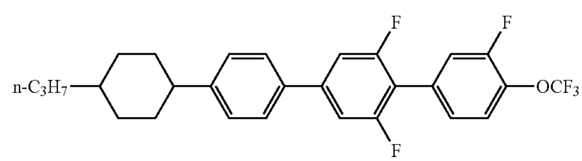

(42.3)

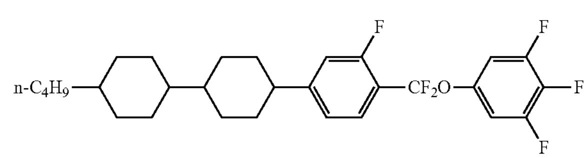

When at least one compound represented by the general formula (i), at least two compounds represented by the general formula (ii), and the compound represented by the formula (5.2) are contained, the amount of the compound represented by the formula (5.2) preferably ranges from 0.5% to 15% by mass, 5% to 15% by mass, or 11% to 12% by mass in one embodiment.

When at least one compound represented by the general formula (i), at least two compounds represented by the general formula (ii), and the compound represented by the formula (10.1) are contained, the amount of the compound represented by the formula (10.1) preferably ranges from 0.5% to 11% by mass, 4% to 9% by mass, or 7% to 8% by mass in one embodiment.

When at least one compound represented by the general formula (i), at least two compounds represented by the general formula (ii), and the compound represented by the formula (12.3) are contained, the amount of the compound represented by the formula (12.3) preferably ranges from 0.1% to 4% by mass, 0.1% to 2% by mass, or 0.1% to 1% by mass in one embodiment.

When at least one compound represented by the general formula (i), at least two compounds represented by the general formula (ii), and the compound represented by the formula (26.1) are contained, the amount of the compound represented by the formula (26.1) preferably ranges from 0.5% to 8% by mass, 2% to 6% by mass, or 4% to 5% by mass in one embodiment.

When at least one compound represented by the general formula (i), at least two compounds represented by the general formula (ii), and the compound represented by the formula (39.2) are contained, the amount of the compound represented by the formula (39.2) preferably ranges from 0.5% to 9% by mass, 3% to 7% by mass, or 5% to 6% by mass in one embodiment.

When at least one compound represented by the general formula (i), at least two compounds represented by the general formula (ii), and the compound represented by the formula (42.3) are contained, the amount of the compound represented by the formula (42.3) preferably ranges from 0.5% to 6% by mass, 2% to 4% by mass, or 2% to 3% by mass in one embodiment.

When at least one compound represented by the general formula (i) and at least two compounds represented by the general formula (ii) are contained, the following compounds are also preferably contained.

When at least one compound represented by the general formula (i), at least two compounds represented by the general formula (ii), and a compound represented by the following formula (1.3) are contained, the amount of the compound represented by the formula (1.3) is preferably more than 12% by mass and 21% or less by mass, more than 12% by mass and 18% or less by mass, or more than 12% by mass and 15% or less by mass in one embodiment.

[Chem. 121]

(1.3)

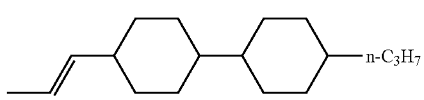

When at least one compound represented by the general formula (i), at least two compounds represented by the general formula (ii), and a compound represented by the following formula (5.4) are contained, the amount of the compound represented by the formula (5.4) is preferably more than 8% by mass and 11% or less by mass, more than 8% by mass and 14% or less by mass, or more than 8% by mass and 17% or less by mass in one embodiment.

[Chem. 122]

(5.4)

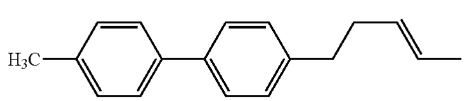

When at least one compound represented by the general formula (i), at least two compounds represented by the general formula (ii), and a compound represented by the following formula (36.2) are contained, the amount of the compound represented by the formula (36.2) is preferably more than 4% by mass and 13% or less by mass, more than 5% by mass and 10% or less by mass, or more than 5% by mass and 7% or less by mass in one embodiment.

[Chem. 123]

(36.2)

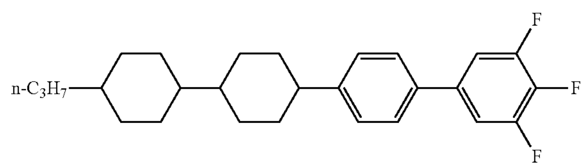

When at least one compound represented by the general formula (i), at least two compounds represented by the general formula (ii), and a compound represented by the following formula (36.1) are contained, the amount of the compound represented by the formula (36.1) is preferably 0.5% or more by mass and less than 4% by mass, 1% or more by mass and less than 4% by mass, or 2% or more by mass and less than 4% by mass in one embodiment.

[Chem. 124]

(36.1)

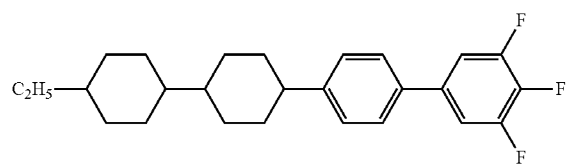

When at least one compound represented by the general formula (i), at least two compounds represented by the general formula (ii), and a compound represented by the following formula (15.1) are contained, the amount of the compound represented by the formula (15.1) is preferably more than 5% by mass and 14% or less by mass, more than 5% by mass and 11% or less by mass, or more than 5% by mass and 8% or less by mass in one embodiment.

[Chem. 125]

(15.1)

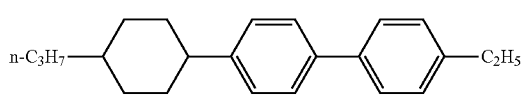

When a liquid crystal composition according to the present invention contains at least one compound represented by the general formula (i) and at least two compounds represented by the general formula (ii), the total amount of these compounds preferably ranges from 10% to 30% by mass, 12% to 25% by mass, or 18% to 25% by mass per 100% by mass of the liquid crystal composition.

When a liquid crystal composition according to the present invention contains at least one compound represented by the general formula (i), at least two compounds represented by the general formula (ii), a compound represented by the following general formula (I-4), a compound represented by the following general formula (III), a compound represented by the following general formula (X-2-1), and a compound represented by the following general formula (X-4-1), the total amount of these compounds preferably ranges from 30% to 60% by mass, 45% to 50% by mass, 42% to 46% by mass, or 44% by mass per 100% by mass of the liquid crystal composition.

When a liquid crystal composition according to the present invention contains at least one compound represented by the general formula (i), at least two compounds represented by the general formula (ii), a compound represented by the following general formula (I-1-1), a compound represented by the following general formula (I-4), a compound represented by the following general formula (II-1), a compound represented by the following general formula (VIII-1), and a compound represented by the following general formula (X-2-1), the total amount of these compounds preferably ranges from 50% to 80% by mass, 60% to 75% by mass, 64% to 69% by mass, or 66% by mass per 100% by mass of the liquid crystal composition.

When a liquid crystal composition according to the present invention contains at least one compound represented by the general formula (i), at least two compounds represented by the general formula (ii), and a compound represented by the following general formula (X-1-1), the total amount of these compounds preferably ranges from 10% to 40% by mass, 15% to 35% by mass, 18% to 32% by mass, or 19% to 31% by mass per 100% by mass of the liquid crystal composition.

When a liquid crystal composition according to the present invention contains at least one compound represented by the general formula (i), at least two compounds represented by the general formula (ii), a compound represented by the following general formula (I-1-1), a compound represented by the following general formula (I-4), a compound represented by the following general formula (VIII-1), and a compound represented by the following general formula (X-2-1), the total amount of these compounds preferably ranges from 45% to 75% by mass, 50% to 65% by mass, 55% to 60% by mass, or 58% by mass per 100% by mass of the liquid crystal composition.

A liquid crystal composition according to the present invention may further contain at least one compound represented by the general formula (L).

[Chem. 126]

$$R^{L1}—B^{L1}—L^{L1}—B^{L2}—(L^{L2}—B^{L3})_{OL}—R^{L2} \qquad (L)$$

In the general formula (L), $R^{L1}$ and $R^{L2}$ independently denote an alkyl group having 1 to 8 carbon atoms, and one or two or more nonadjacent —$CH_2$— of the alkyl group may be independently substituted with —CH═CH—, —C≡C—, —O—, —CO—, —COO—, or —OCO—.

OL is 0, 1, 2, or 3.

$B^{L1}$, $B^{L2}$, and $B^{L3}$ independently denote a group selected from the group consisting of (a) a 1,4-cyclohexylene group (one —$CH_2$— or at least two nonadjacent —$CH_2$— of this group may be substituted with —O—), and (b) a 1,4-phenylene group (one —CH═ or at least two nonadjacent —CH═ of this group may be substituted with —N═), At least one hydrogen atom of the group (a) and the group (b) may be independently substituted with a cyano group, a fluorine atom, or a chlorine atom.

$L^{L1}$ and $L^{L2}$ independently denote a single bond, —$CH_2CH_2$—, —$(CH_2)_4$—, —$OCH_2$—, —$CH_2O$—, —COO—, —OCO—, —$OCF_2$—, —$CF_2O$—, —CH═N—N═CH—, —CH═CH—, —CF═CF—, or —C≡C—.

In the case that OL is 2 or 3 and there are a plurality of $L^{L2}$s, the plurality of $L^{L2}$s may be the same or different.

In the case that OL is 2 or 3 and there are a plurality of $B^{L3}$s, the plurality of $B^{L3}$s may be the same or different.

However, the at least one compound is not the compound(s) represented by the formula (ii).

Although compounds of any types may be combined, these compounds are appropriately combined in a manner that depends on the desired characteristics, such as solubility at low temperatures, transition temperature, electrical reliability, and birefringence index (anisotropy of reflective index). For example, one compound is used in one embodiment of the present invention. Alternatively, two compounds are used in another embodiment of the present invention. Alternatively, three compounds are used in still another embodiment of the present invention. Alternatively, four compounds are used in still another embodiment of the present invention. Alternatively, five compounds are used in still another embodiment of the present invention. Alternatively, six compounds are used in still another embodiment of the present invention. Alternatively, seven compounds are used in still another embodiment of the present invention. Alternatively, eight compounds are used in still another embodiment of the present invention. Alternatively, nine compounds are used in still another embodiment of the present invention. Alternatively, at least ten compounds are used in still another embodiment of the present invention.

The amount of compound(s) represented by the general formula (L) in a liquid crystal composition according to the present invention should be appropriately adjusted in a manner that depends on the desired characteristics, such as solubility at low temperatures, transition temperature, electrical reliability, birefringence index, process compatibility, drop marks, burn-in, and/or anisotropy of dielectric constant.

For example, in one embodiment of the present invention, the amount of the compound(s) ranges from 1% to 95% by mass of the total mass of a liquid crystal composition of the present invention. In another embodiment of the present invention, the amount ranges from 10% to 95% by mass. In still another embodiment of the present invention, the amount ranges from 20% to 95% by mass. In still another embodiment of the present invention, the amount ranges from 30% to 95% by mass. In still another embodiment of the present invention, the amount ranges from 40% to 95% by mass. In still another embodiment of the present invention, the amount ranges from 50% to 95% by mass. In still another embodiment of the present invention, the amount ranges from 55% to 95% by mass. In still another embodiment of the present invention, the amount ranges from 60% to 95% by mass. In still another embodiment of the present invention, the amount ranges from 65% to 95% by mass. In still another embodiment of the present invention, the amount ranges from 70% to 95% by mass. In still another embodiment of the present invention, the amount ranges from 75% to 95% by mass. In still another embodiment of the present invention, the amount ranges from 80% to 95% by mass.

For example, in one embodiment of the present invention, the amount of the compound(s) ranges from 1% to 95% by mass of the total mass of a liquid crystal composition of the present invention. In another embodiment of the present invention, the amount ranges from 1% to 85% by mass. In still another embodiment of the present invention, the amount ranges from 1% to 75% by mass. In still another embodiment of the present invention, the amount ranges from 1% to 65% by mass. In still another embodiment of the present invention, the amount ranges from 1% to 55% by mass. In still another embodiment of the present invention, the amount ranges from 1% to 45% by mass. In still another embodiment of the present invention, the amount ranges from 1% to 35% by mass. In still another embodiment of the present invention, the amount ranges from 1% to 25% by mass.

When a liquid crystal composition according to the present invention having low viscosity and a high response speed is desired, the lower limit is preferably high, and the upper limit is preferably high. When a liquid crystal composition according to the present invention having high Tni and high temperature stability is desired, the lower limit is preferably high, and the upper limit is preferably high. When the anisotropy of dielectric constant is increased in order to maintain a low driving voltage, the lower limit is preferably low, and the upper limit is preferably low.

When the ring structures to which $R^{L1}$ and $R^{L2}$ are bonded are phenyl groups (aromatic), each of $R^{L1}$ and $R^{L2}$ is preferably a linear alkyl group having 1 to 5 carbon atoms, a linear alkoxy group having 1 to 4 (or more) carbon atoms, or an alkenyl group having 4 or 5 carbon atoms. When the ring structures to which $R^{L1}$ and $R^{L2}$ are bonded are saturated ring structures, such as cyclohexane, pyran, and dioxane, each of $R^{L1}$ and $R^{L2}$ is preferably a linear alkyl group having 1 to 5 carbon atoms, a linear alkoxy group having 1 to 4 (or more) carbon atoms, or a linear alkenyl group having 2 to 5 carbon atoms.

When a chemically stable liquid crystal composition is desired, the compound(s) represented by the general formula (L) preferably contain(s) no chlorine atom in its(their) molecule(s).

For example, the compound(s) represented by the general formula (L) is/are preferably selected from a compound group represented by the general formula (I)

[Chem. 127]

$$R^{11}\text{-}A^{11}\text{-}A^{12}\text{-}R^{12} \qquad \text{(I)}$$

In the general formula (I), $R^{11}$ and $R^{12}$ independently denote an alkyl group having 1 to 5 carbon atoms, an alkoxy group having 1 to 5 carbon atoms, or an alkenyl group having 2 to 5 carbon atoms, and $A^{11}$ and $A^{12}$ independently denote a 1,4-cyclohexylene group, a 1,4-phenylene group, a 2-fluoro-1,4-phenylene group, or a 3-fluoro-1,4-phenylene group. However, the compound(s) is/are not the compound(s) represented by the formula (ii).

Although compounds of any types may be combined, these compounds are appropriately combined in a manner that depends on the desired characteristics, such as solubility at low temperatures, transition temperature, electrical reliability, and birefringence index. For example, one compound is used in one embodiment of the present invention. Alternatively, two compounds are used in another embodiment of the present invention. Alternatively, three compounds are used in still another embodiment of the present invention. Alternatively, four compounds are used in still another embodiment of the present invention. Alternatively, five compounds are used in still another embodiment of the present invention. Alternatively, at least six compounds are used in still another embodiment of the present invention.

The amount of compound(s) represented by the general formula (I) in a liquid crystal composition according to the present invention should be appropriately adjusted in a manner that depends on the desired characteristics, such as solubility at low temperatures, transition temperature, electrical reliability, birefringence index, process compatibility, drop marks, burn-in, and/or anisotropy of dielectric constant.

For example, in one embodiment of the present invention, the amount of compound(s) represented by the general formula (I) ranges from 3% to 75% by mass of the total mass of a liquid crystal composition of the present invention. In another embodiment of the present invention, the amount ranges from 15% to 75% by mass. In still another embodiment of the present invention, the amount ranges from 18% to 75% by mass. In still another embodiment of the present invention, the amount ranges from 20% to 75% by mass. In still another embodiment of the present invention, the amount ranges from 29% to 75% by mass. In still another embodiment of the present invention, the amount ranges from 35% to 75% by mass. In still another embodiment of the present invention, the amount ranges from 42% to 75% by mass. In still another embodiment of the present invention, the amount ranges from 47% to 75% by mass. In still another embodiment of the present invention, the amount ranges from 53% to 75% by mass. In still another embodiment of the present invention, the amount ranges from 56% to 75% by mass. In still another embodiment of the present invention, the amount ranges from 60% to 75% by mass. In still another embodiment of the present invention, the amount ranges from 65% to 75% by mass.

For example, in one embodiment of the present invention, the amount of compound(s) represented by the general formula (I) ranges from 3% to 65% by mass of the total mass of a liquid crystal composition of the present invention. In another embodiment of the present invention, the amount ranges from 3% to 55% by mass. In still another embodiment of the present invention, the amount ranges from 3% to 50% by mass. In still another embodiment of the present invention, the amount ranges from 3% to 45% by mass. In still another embodiment of the present invention, the amount ranges from 3% to 40% by mass. In still another embodiment of the present invention, the amount ranges from 3% to 35% by mass. In still another embodiment of the present invention, the amount ranges from 3% to 30% by mass.

When a liquid crystal composition according to the present invention having low viscosity and a high response speed is desired, the lower limit is preferably high, and the upper limit is preferably high. When a liquid crystal composition according to the present invention having high Tni and high temperature stability is desired, the lower limit is preferably medium, and the upper limit is preferably medium. When the anisotropy of dielectric constant is increased in order to maintain a low driving voltage, the lower limit is preferably low, and the upper limit is preferably low.

When the ring structures to which $R^{11}$ and $R^{12}$ are bonded are phenyl groups (aromatic), each of $R^{11}$ and $R^{12}$ is preferably a linear alkyl group having 1 to 5 carbon atoms, a linear alkoxy group having 1 to 4 carbon atoms, or an alkenyl group having 4 or 5 carbon atoms. When the ring structures to which $R^{11}$ and $R^{12}$ are bonded are saturated ring structures, such as cyclohexane, pyran, and dioxane, each of $R^{11}$ and $R^{12}$ is preferably a linear alkyl group having 1 to 5 carbon atoms, a linear alkoxy group having 1 to 4 carbon atoms, or a linear alkenyl group having 2 to 5 carbon atoms.

The compound(s) represented by the general formula (I) is/are preferably at least one compound selected from a compound group represented by the general formula (I-1).

[Chem. 128]

(I-1)

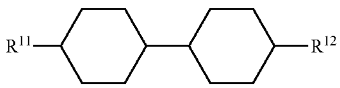

In the general formula (I-1), $R^{11}$ and $R^{12}$ independently denote an alkyl group having 1 to 5 carbon atoms, an alkoxy group having 1 to 5 carbon atoms, or an alkenyl group having 2 to 5 carbon atoms.

Although compounds of any types may be combined, these compounds are appropriately combined in a manner that depends on the desired characteristics, such as solubility at low temperatures, transition temperature, electrical reliability, and birefringence index. For example, one compound is used in one embodiment of the present invention. Alternatively, two compounds are used in another embodiment of the present invention. Alternatively, three compounds are used in still another embodiment of the present invention. Alternatively, four compounds are used in still another embodiment of the present invention. Alternatively, at least five compounds are used in still another embodiment of the present invention.

When a liquid crystal composition according to the present invention contains a compound represented by the general formula (I-1), the amount of this compound should be appropriately adjusted in a manner that depends on the desired characteristics, such as solubility at low temperatures, transition temperature, electrical reliability, birefringence index, process compatibility, drop marks, burn-in, and/or anisotropy of dielectric constant.

For example, in one embodiment of the present invention, the amount of compound(s) represented by the general formula (I-1) ranges from 3% to 70% by mass of the total mass of a liquid crystal composition of the present invention. In still another embodiment of the present invention, the amount ranges from 15% to 70% by mass. In still another embodiment of the present invention, the amount ranges from 18% to 70% by mass. In still another embodiment of the present invention, the amount ranges from 25% to 70% by mass. In still another embodiment of the present invention, the amount ranges from 29% to 70% by mass. In still another embodiment of the present invention, the amount ranges from 31% to 70% by mass. In still another embodiment of the present invention, the amount ranges from 35% to 70% by mass. In still another embodiment of the present invention, the amount ranges from 43% to 70% by mass. In still another embodiment of the present invention, the amount ranges from 47% to 70% by mass. In still another embodiment of the present invention, the amount ranges from 50% to 70% by mass. In still another embodiment of the present invention, the amount ranges from 53% to 70% by mass. In still another embodiment of the present invention, the amount ranges from 56% to 70% by mass.

For example, in one embodiment of the present invention, the amount of compound(s) represented by the general formula (I-1) ranges from 2% to 60% by mass of the total mass of a liquid crystal composition of the present invention. In still another embodiment of the present invention, the amount ranges from 2% to 50% by mass. In still another embodiment of the present invention, the amount ranges from 2% to 45% by mass. In still another embodiment of the present invention, the amount ranges from 2% to 40% by mass. In still another embodiment of the present invention, the amount ranges from 2% to 35% by mass. In still another embodiment of the present invention, the amount ranges from 2% to 30% by mass. In still another embodiment of the present invention, the amount ranges from 2% to 26% by mass.

When a liquid crystal composition according to the present invention having low viscosity and a high response speed is desired, the lower limit is preferably high, and the upper limit is preferably high. When a liquid crystal composition according to the present invention having high Tni and high temperature stability is desired, the lower limit is preferably medium, and the upper limit is preferably medium. When the anisotropy of dielectric constant is increased in order to maintain a low driving voltage, the lower limit is preferably low, and the upper limit is preferably low.

Alternatively, or in addition, the compound(s) represented by the general formula (I-1) is/are preferably at least one compound selected from a compound group represented by the general formula (I-1-1).

[Chem. 129]

(I-1-1)

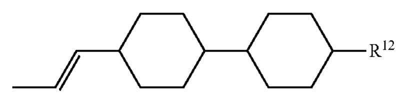

In the general formula (I-1-1), $R^{12}$ denotes an alkyl group having 1 to 5 carbon atoms, an alkenyl group having 2 to 5 carbon atoms, or an alkoxy group having 1 to 5 carbon atoms.

The amount of compound(s) represented by the general formula (I-1-1) in a liquid crystal composition according to the present invention should be appropriately adjusted in a manner that depends on the desired characteristics, such as solubility at low temperatures, transition temperature, electrical reliability, birefringence index, process compatibility, drop marks, burn-in, and/or anisotropy of dielectric constant.

For example, in one embodiment of the present invention, the amount of compound(s) represented by the general formula (I-1-1) ranges from 1% to 35% by mass of the total mass of a liquid crystal composition of the present invention. In another embodiment of the present invention, the amount ranges from 2% to 30% by mass. In still another embodiment of the present invention, the amount ranges from 4% to 30% by mass. In still another embodiment of the present invention, the amount ranges from 6% to 30% by mass. In still another embodiment of the present invention, the amount ranges from 8% to 30% by mass. In still another embodiment of the present invention, the amount ranges from 9% to 30% by mass. In still another embodiment of the present invention, the amount ranges from 10% to 30% by mass.

For example, in one embodiment of the present invention, the amount of compound(s) represented by the general formula (I-1-1) ranges from 2% to 26% by mass of the total mass of a liquid crystal composition of the present invention. In another embodiment of the present invention, the amount ranges from 2% to 22% by mass. In still another embodiment of the present invention, the amount ranges from 2% to 17% by mass. In still another embodiment of the present invention, the amount ranges from 2% to 16% by mass. In still another embodiment of the present invention, the amount ranges from 2% to 14% by mass. In still another embodiment of the present invention, the amount ranges from 2% to 13% by mass. In still another embodiment of the present invention, the amount ranges from 2% to 12% by mass. In still another embodiment of the present invention, the amount ranges from 2% to 5% by mass.

The compound(s) represented by the general formula (I-1-1) is/are preferably a compound selected from a compound group represented by the formulae (1.1) to (1.3), a compound represented by the formula (1.2) or (1.3), or particularly preferably a compound represented by the formula (1.3).

[Chem. 130]

(1.1)

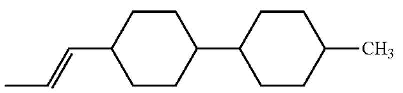

(1.2)

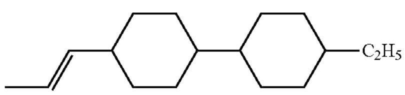

(1.3)

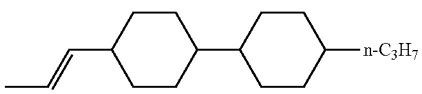

When a compound represented by the formula (1.2) or (1.3) is used alone, a large amount of the compound represented by the formula (1.2) is effective in improving the response speed, and the amount of the compound represented by the formula (1.3) is preferably in the following range so as to provide an electrically and optically reliable liquid crystal composition having a high response speed.

For example, in one embodiment of the present invention, the amount of the compound represented by the formula (1.3) ranges from 1% to 25% by mass of the total mass of a liquid crystal composition of the present invention. In another embodiment of the present invention, the amount ranges from 2% to 25% by mass. In still another embodiment of the present invention, the amount ranges from 4% to 25% by mass. In still another embodiment of the present invention, the amount ranges from 6% to 25% by mass. In still another embodiment of the present invention, the amount ranges from 7% to 25% by mass. In still another embodiment of the present invention, the amount ranges from 8% to 25% by mass. In still another embodiment of the present invention, the amount ranges from 9% to 25% by mass. In still another embodiment of the present invention, the amount ranges from 10% to 25% by mass.

For example, in one embodiment of the present invention, the amount of the compound represented by the formula (1.3) ranges from 2% to 22% by mass of the total mass of a liquid crystal composition of the present invention. In another embodiment of the present invention, the amount ranges from 2% to 18% by mass. In still another embodiment of the present invention, the amount ranges from 2% to 17% by mass. In still another embodiment of the present invention, the amount ranges from 2% to 16% by mass. In still another embodiment of the present invention, the amount ranges from 2% to 14% by mass. In still another embodiment of the present invention, the amount ranges from 2% to 13% by mass. In still another embodiment of the present invention, the amount ranges from 2% to 5% by mass.

Alternatively, or in addition, the compound(s) represented by the general formula (I-1) is/are preferably at least one compound selected from a compound group represented by the general formula (I-1-2).

[Chem. 131]

(I-1-2)

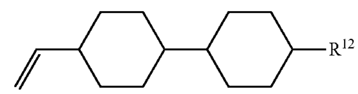

In the general formula (I-1-2), $R^{12}$ denotes an alkyl group having 1 to 5 carbon atoms, an alkoxy group having 1 to 5 carbon atoms, or an alkenyl group having 2 to 5 carbon atoms.

Although compounds of any types may be combined, these compounds are appropriately combined in a manner that depends on the desired characteristics, such as solubility at low temperatures, transition temperature, electrical reliability, and birefringence index. For example, one compound is used in one embodiment of the present invention. Alternatively, two compounds are used in another embodiment of the present invention. Alternatively, three compounds are used in still another embodiment of the present invention.

The amount of compound(s) represented by the general formula (I-1-2) in a liquid crystal composition according to the present invention should be appropriately adjusted in a manner that depends on the desired characteristics, such as solubility at low temperatures, transition temperature, electrical reliability, birefringence index, process compatibility, drop marks, burn-in, and/or anisotropy of dielectric constant.

For example, in one embodiment of the present invention, the amount of compound(s) represented by the general formula (I-1-2) ranges from 1% to 25% by mass of the total mass of a liquid crystal composition of the present invention. In another embodiment of the present invention, the amount ranges from 2% to 25% by mass. In still another embodiment of the present invention, the amount ranges from 4% to 25% by mass. In still another embodiment of the present invention, the amount ranges from 6% to 25% by mass. In still another embodiment of the present invention, the amount ranges from 7% to 25% by mass. In still another embodiment of the present invention, the amount ranges from 8% to 25% by mass. In still another embodiment of the present invention, the amount ranges from 9% to 25% by mass. In still another embodiment of the present invention, the amount ranges from 10% to 25% by mass. In still another embodiment of the present invention, the amount ranges from 15% to 50% by mass.

For example, in one embodiment of the present invention, the amount of compound(s) represented by the general formula (I-1-2) ranges from 2% to 22% by mass of the total mass of a liquid crystal composition of the present invention. In another embodiment of the present invention, the amount ranges from 2% to 18% by mass. In still another embodiment of the present invention, the amount ranges from 2% to 17% by mass. In still another embodiment of the present invention, the amount ranges from 2% to 16% by mass. In still another embodiment of the present invention, the amount ranges from 2% to 14% by mass. In still another embodiment of the present invention, the amount ranges from 2% to 13% by mass.

The compound(s) represented by the general formula (I-1-2) is/are preferably at least one compound selected from a compound group represented by the formulae (2.1) to (2.4) or a compound represented by the formula (2.3) and/or a compound represented by the formula (2.4). In order to improve solubility at low temperatures, it is undesirable that the amount of the compound represented by the formula (2.3) or (2.4) be 30% or more by mass.

[Chem. 132]

(2.1)

(2.2)

(2.3)

(2.4)

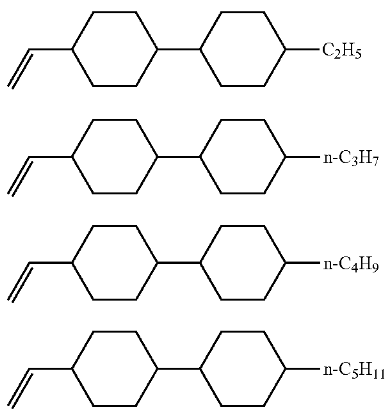

From the perspective of the response speed and electrical and optical reliability, the amount of the compound represented by the formula (2.2) in the liquid crystal composition is preferably 3% or more by mass, 10% or more by mass, 12% or more by mass, 15% or more by mass, 20% or more by mass, 22% or more by mass, 23% or more by mass, 24% or more by mass, 30% or more by mass, or 37% or more by mass of the total mass of a liquid crystal composition of the present invention.

The amount of the compound represented by the formula (2.2) in the liquid crystal composition is preferably 60% or less by mass, 50% or less by mass, 46% or less by mass, 45% or less by mass, 44% or less by mass, 42% or less by mass, 40% or less by mass, 38% or less by mass, 36% or less by mass, 32% or less by mass, 26% or less by mass, or 17% or less by mass of the total mass of a liquid crystal composition of the present invention.

Among these, the amount of the compound represented by the formula (2.2) in the liquid crystal composition preferably ranges from 1% to 60% by mass, 1% to 50% by mass, 10% to 50% by mass, 10% to 45% by mass, 10% to 26% by mass, 12% to 17% by mass, 3% to 15% by mass, 5% to 12% by mass, 15% to 38% by mass, 15% to 32% by mass, 20% to 45% by mass, 20% to 42% by mass, 22% to 44% by mass, 24% to 40% by mass, 23% to 36% by mass, 29% to 42% by mass, 30% to 50% by mass, 35% to 50% by mass, 37% to 46% by mass, or 30% to 38% by mass of the total mass of a liquid crystal composition of the present invention.

The amount of the compound represented by the formula (2.3) in a liquid crystal composition according to the present invention preferably ranges from 1% to 25% by mass, 5% by mass 20% or less by mass, 10% to 15% by mass, or 6% to 15% by mass of the total mass of the liquid crystal composition.

The amount of the compound represented by the formula (2.4) in a liquid crystal composition according to the present invention preferably ranges from 1% to 25% by mass, more preferably 5% by mass 20% or less by mass, preferably 10% to 15% by mass, preferably 6% to 15% by mass, of the total mass of the liquid crystal composition.

A liquid crystal composition according to the present invention may further contain a compound represented by the formula (2.5), which has a structure similar to the structure of the compound(s) represented by the general formula (I-1-2).

[Chem. 133]

(2.5)

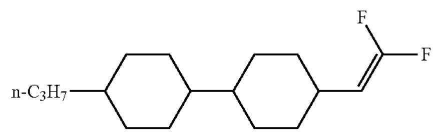

The amount of the compound represented by the formula (2.5) is preferably adjusted in a manner that depends on the desired characteristics, such as solubility at low temperatures, transition temperature, electrical reliability, and birefringence index, and preferably ranges from 0% to 40% by mass, 10% to 40% by mass, or 15% to 35% by mass of a liquid crystal composition of the present invention.

Alternatively, or in addition, the compound(s) represented by the general formula (I) is/are preferably at least one compound selected from a compound group represented by the general formula (I-2).

[Chem. 134]

(I-2)

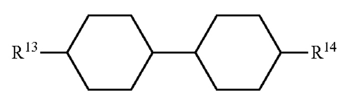

In the general formula (I-2), $R^{13}$ and $R^{14}$ independently denote an alkyl group having 1 to 5 carbon atoms.

Although compounds of any types may be combined, these compounds are combined in a manner that depends on the desired characteristics, such as solubility at low temperatures, transition temperature, electrical reliability, and birefringence index. For example, one compound is used in one embodiment of the present invention. Alternatively, two compounds are used in another embodiment of the present invention. Alternatively, three compounds are used in still another embodiment of the present invention.

The amount of compound(s) represented by the general formula (I-2) in a liquid crystal composition according to the present invention should be appropriately adjusted in a manner that depends on the desired characteristics, such as solubility at low temperatures, transition temperature, electrical reliability, birefringence index, process compatibility, drop marks, burn-in, and/or anisotropy of dielectric constant.

For example, in one embodiment of the present invention, the amount of compound(s) represented by the general formula (I-2) ranges from 1% to 30% by mass of the total mass of a liquid crystal composition of the present invention. In another embodiment of the present invention, the amount ranges from 2% to 30% by mass. In still another embodiment of the present invention, the amount ranges from 4% to 30% by mass. In still another embodiment of the present invention, the amount ranges from 6% to 30% by mass. In still another embodiment of the present invention, the amount ranges from 10% to 30% by mass. In still another embodiment of the present invention, the amount ranges from 15% to 30% by mass. In still another embodiment of the present invention, the amount ranges from 20% to 30% by mass.

For example, in one embodiment of the present invention, the amount of compound(s) represented by the general formula (I-2) ranges from 1% to 25% by mass of the total mass of a liquid crystal composition of the present invention. In another embodiment of the present invention, the amount ranges from 1% to 23% by mass. In still another embodiment of the present invention, the amount ranges from 1% to 18% by mass. In still another embodiment of the present invention, the amount ranges from 1% to 15% by mass. In still another embodiment of the present invention, the amount ranges from 1% to 12% by mass. In still another embodiment of the present invention, the amount ranges from 1% to 10% by mass. In still another embodiment of the present invention, the amount ranges from 1% to 5% by mass. In still another embodiment of the present invention, the amount ranges from 3% to 38% by mass.

The compound(s) represented by the general formula (I-2) is/are preferably at least one compound selected from a compound group represented by the formulae (3.1) to (3.4) or a compound or compounds represented by the formula(e) (3.1), (3.3), and/or (3.4). In particular, the compound represented by the formula (3.2) is preferred in order to particularly improve the response speed of a liquid crystal composition according to the present invention. A compound represented by the formula (3.3) and/or a compound represented by the formula (3.4) is preferably used to determine Tni that is higher than the response speed. In order to improve solubility at low temperatures, it is undesirable for the amount of the compound represented by the formula (3.3) or (3.4) to be 20% or more by mass.

[Chem. 135]

(3.1)

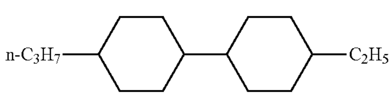

(3.2)

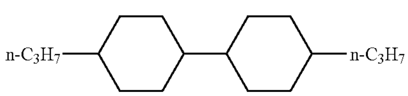

(3.3)

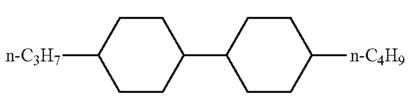

(3.4)

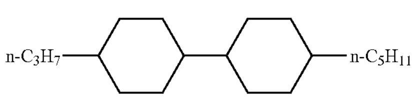

The amount of the compound represented by the formula (3.3) in a liquid crystal composition according to the present invention preferably ranges from 2% to 40% by mass of the total mass of the liquid crystal composition. The amount of the compound represented by the formula (3.3) more preferably ranges from 3% to 40% by mass, 4% to 40% by mass, 10% to 40% by mass, 12% to 40% by mass, 14% to 40% by mass, 16% to 40% by mass, 20% to 40% by mass, 23% to 40% by mass, 26% to 40% by mass, 30% to 40% by mass, 34% to 40% by mass, 37% to 40% by mass, or 3% to 4% by mass, 3% to 10% by mass, 3% to 12% by mass, 3% to 14% by mass, 4% to 13% by mass, 3% to 16% by mass, 3% to 20% by mass, 3% to 23% by mass, 3% to 26% by mass, 3% to 30% by mass, 3% to 34% by mass, or 3% to 37% by mass, for example.

Alternatively, or in addition, the compound(s) represented by the general formula (I) is/are preferably at least one compound selected from a compound group represented by the general formula (I-3).

[Chem. 136]

(I-3)

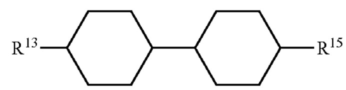

In the general formula (I-3), $R^{13}$ denotes an alkyl group having 1 to 5 carbon atoms, and $R^{15}$ denotes an alkoxy group having 1 to 4 carbon atoms.

Although compounds of any types may be combined, these compounds are combined in a manner that depends on the desired characteristics, such as solubility at low temperatures, transition temperature, electrical reliability, and birefringence index. For example, one compound is used in one embodiment of the present invention. Alternatively, two compounds are used in another embodiment of the present invention. Alternatively, three compounds are used in still another embodiment of the present invention.

The amount of compound(s) represented by the general formula (I-3) in a liquid crystal composition according to the present invention should be appropriately adjusted in a manner that depends on the desired characteristics, such as solubility at low temperatures, transition temperature, electrical reliability, birefringence index, process compatibility, drop marks, burn-in, and/or anisotropy of dielectric constant.

For example, in one embodiment of the present invention, the amount of compound(s) represented by the general formula (I-3) ranges from 3% to 60% by mass of the total mass of a liquid crystal composition of the present invention. In another embodiment of the present invention, the amount ranges from 4% to 60% by mass. In still another embodiment of the present invention, the amount ranges from 15% to 60% by mass. In still another embodiment of the present invention, the amount ranges from 25% to 60% by mass. In still another embodiment of the present invention, the amount ranges from 30% to 60% by mass. In still another embodiment of the present invention, the amount ranges from 35% to 60% by mass. In still another embodiment of the present invention, the amount ranges from 38% to 60% by mass. In still another embodiment of the present invention, the amount ranges from 40% to 60% by mass. In still another embodiment of the present invention, the amount ranges from 42% to 60% by mass. In still another embodiment of the present invention, the amount ranges from 45% to 60% by mass. In still another embodiment of the present invention, the amount ranges from 47% to 60% by mass. In still another embodiment of the present invention, the amount ranges from 50% to 60% by mass.

For example, in one embodiment of the present invention, the amount of the compound(s) ranges from 3% to 55% by mass of the total mass of a liquid crystal composition of the present invention. In another embodiment of the present invention, the amount ranges from 3% to 45% by mass. In still another embodiment of the present invention, the amount ranges from 3% to 40% by mass. In still another embodiment of the present invention, the amount ranges from 3% to 30% by mass. In still another embodiment of the present invention, the amount ranges from 3% to 20% by mass. In still another embodiment of the present invention, the amount ranges from 3% to 15% by mass. In still another embodiment of the present invention, the amount ranges from 3% to 5% by mass.

When solubility at low temperatures is regarded as important, greater amounts are effective. When the response speed is regarded as important, smaller amounts are effective. When reduced drop marks or improved burn-in characteristics are desired, the amount is preferably set in a medium range.

The compound(s) represented by the general formula (I-3) is/are preferably at least one compound selected from a compound group represented by the formulae (4.1) to (4.3) or a compound represented by the formula (4.3).

[Chem. 137]

(4.1)

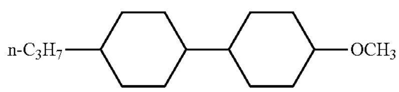

(4.2)

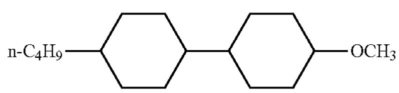

(4.3)

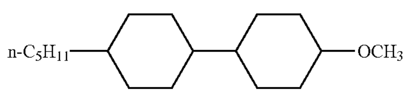

The amount of the compound represented by the formula (4.3) preferably ranges from 2% to 30% by mass, 4% to 30% by mass, 6% to 30% by mass, 8% to 30% by mass, 10% to 30% by mass, 12% to 30% by mass, 14% to 30% by mass, 16% to 30% by mass, 18% to 25% by mass, 20% to 24% by mass, particularly preferably 22% to 23% by mass, of the total mass of a liquid crystal composition of the present invention.

Alternatively, or in addition, the compound(s) represented by the general formula (I) is/are preferably at least one compound selected from a compound group represented by the general formula (I-4).

[Chem. 138]

(I-4)

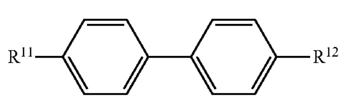

In the general formula (I-4), $R^{11}$ and $R^{12}$ independently denote an alkyl group having 1 to 5 carbon atoms, an alkenyl group having 4 or 5 carbon atoms, or an alkoxy group having 1 to 4 carbon atoms.

Although compounds of any types may be combined, these compounds are combined in a manner that depends on the desired characteristics, such as solubility at low temperatures, transition temperature, electrical reliability, and birefringence index. For example, one compound is used in one embodiment of the present invention. Alternatively, two compounds are used in another embodiment of the present invention.

The amount of compound(s) represented by the general formula (I-4) in a liquid crystal composition according to the present invention should be appropriately adjusted in a manner that depends on the desired characteristics, such as solubility at low temperatures, transition temperature, electrical reliability, birefringence index, process compatibility, drop marks, burn-in, and/or anisotropy of dielectric constant.

For example, in one embodiment of the present invention, the amount of compound(s) represented by the general formula (I-4) ranges from 2% to 50% by mass of the total mass of a liquid crystal composition of the present invention. In another embodiment of the present invention, the amount ranges from 5% to 50% by mass. In still another embodiment of the present invention, the amount ranges from 6% to 50% by mass. In still another embodiment of the present invention, the amount ranges from 8% to 50% by mass. In still another embodiment of the present invention, the amount ranges from 10% to 50% by mass. In still another embodiment of the present invention, the amount ranges from 12% to 50% by mass. In still another embodiment of the present invention, the amount ranges from 15% to 50% by mass. In still another embodiment of the present invention, the amount ranges from 20% to 50% by mass. In still another embodiment of the present invention, the amount ranges from 25% to 50% by mass. In still another embodiment of the present invention, the amount ranges from 30% to 50% by mass. In still another embodiment of the present invention, the amount ranges from 35% to 50% by mass. In still another embodiment of the present invention, the amount ranges from 40% to 50% by mass.

For example, in one embodiment of the present invention, the amount of the compound(s) ranges from 2% to 40% by mass of the total mass of a liquid crystal composition of the present invention. In another embodiment of the present invention, the amount ranges from 2% to 35% by mass. In still another embodiment of the present invention, the amount ranges from 2% to 30% by mass. In still another embodiment of the present invention, the amount ranges from 2% to 20% by mass. In still another embodiment of the present invention, the amount ranges from 2% to 15% by mass. In still another embodiment of the present invention, the amount ranges from 2% to 10% by mass.

When high birefringence indexes are desired, greater amounts are effective. When high Tni is regarded as important, smaller amounts are effective. When reduced drop marks or improved burn-in characteristics are desired, the amount is preferably set in a medium range.

The compound(s) represented by the general formula (I-4) is/are preferably at least one compound selected from a compound group represented by the formulae (5.1) to (5.4) or at least one compound selected from a compound group represented by the formulae (5.2) to (5.4).

[Chem. 139]

(5.1)

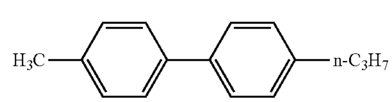

-continued (5.2)

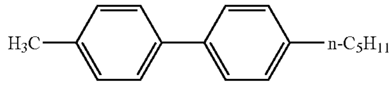

(5.3)

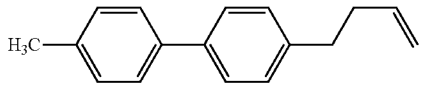

(5.4)

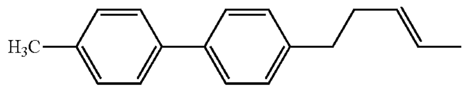

The amount of the compound represented by the formula (5.4) preferably ranges from 2% to 30% by mass of the total mass of a liquid crystal composition of the present invention. Among these, preferred are 4% to 30% by mass, 6% to 30% by mass, 8% to 30% by mass, 10% to 30% by mass, 12% to 30% by mass, 14% to 30% by mass, 16% to 30% by mass, 18% to 30% by mass, 20% to 30% by mass, 22% to 30% by mass, 23% to 30% by mass, 24% to 30% by mass, 25% to 30% by mass, and 4% to 6% by mass, 4% to 8% by mass, 4% to 10% by mass, 4% to 12% by mass, 4% to 14% by mass, 4% to 16% by mass, 4% to 18% by mass, 4% to 20% by mass, 4% to 22% by mass, 4% to 23% by mass, 4% to 24% by mass, and 4% to 25% by mass, for example.

Alternatively, or in addition, the compound(s) represented by the general formula (I) is/are preferably at least one compound selected from a compound group represented by the general formula (I-5).

[Chem. 140]

(I-5)

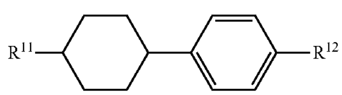

In the general formula (I-5), $R^{11}$ denotes an alkyl group having 1 to 5 carbon atoms, an alkenyl group having 2 to 5 carbon atoms, or an alkoxy group having 1 to 4 carbon atoms, and $R^{12}$ denotes an alkyl group having 1 to 5 carbon atoms, an alkenyl group having 4 or 5 carbon atoms, or an alkoxy group having 1 to 4 carbon atoms.

Although compounds of any types may be combined, these compounds are combined in a manner that depends on the desired characteristics, such as solubility at low temperatures, transition temperature, electrical reliability, and birefringence index. For example, one compound is used in one embodiment of the present invention. Alternatively, two compounds are used in another embodiment of the present invention.

The amount of compound(s) represented by the general formula (I-5) in a liquid crystal composition according to the present invention should be appropriately adjusted in a manner that depends on the desired characteristics, such as solubility at low temperatures, transition temperature, electrical reliability, birefringence index, process compatibility, drop marks, burn-in, and/or anisotropy of dielectric constant.

For example, in one embodiment of the present invention, the amount of the compound(s) ranges from 1% to 50% by mass of the total mass of a liquid crystal composition of the present invention. In another embodiment of the present invention, the amount ranges from 5% to 50% by mass. In still another embodiment of the present invention, the amount ranges from 8% to 50% by mass. In still another embodiment of the present invention, the amount ranges from 11% to 50% by mass. In still another embodiment of the present invention, the amount ranges from 13% to 50% by mass. In still another embodiment of the present invention, the amount ranges from 15% to 50% by mass. In still another embodiment of the present invention, the amount ranges from 17% to 50% by mass. In still another embodiment of the present invention, the amount ranges from 20% to 50% by mass. In still another embodiment of the present invention, the amount ranges from 25% to 50% by mass. In still another embodiment of the present invention, the amount ranges from 30% to 50% by mass. In still another embodiment of the present invention, the amount ranges from 35% to 50% by mass. In still another embodiment of the present invention, the amount ranges from 40% to 50% by mass.

For example, in one embodiment of the present invention, the amount of the compound(s) ranges from 1% to 40% by mass of the total mass of a liquid crystal composition of the present invention. In another embodiment of the present invention, the amount ranges from 1% to 35% by mass. In still another embodiment of the present invention, the amount ranges from 1% to 30% by mass. In still another embodiment of the present invention, the amount ranges from 1% to 20% by mass. In still another embodiment of the present invention, the amount ranges from 1% to 15% by mass. In still another embodiment of the present invention, the amount ranges from 1% to 10% by mass. In still another embodiment of the present invention, the amount ranges from 1% to 5% by mass.

When solubility at low temperatures is regarded as important, greater amounts are effective. When the response speed is regarded as important, smaller amounts are effective. When reduced drop marks or improved burn-in characteristics are desired, the amount is preferably set in a medium range.

The compound(s) represented by the general formula (I-5) is/are preferably at least one compound selected from a compound group represented by the formulae (6.1) to (6.6) or a compound or compounds represented by the formula(e) (6.3), (6.4), and/or (6.6).

[Chem. 141]

(6.1)

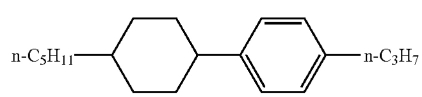

(6.2)

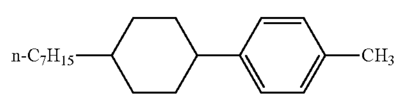

(6.3)

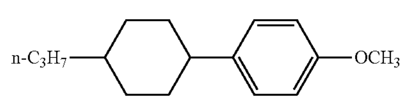

(6.4)

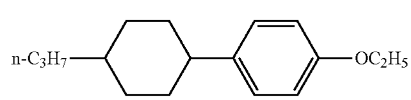

(6.5)

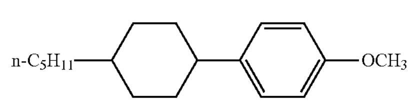

-continued (6.6)

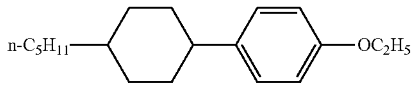

The amount of the compound represented by the formula (6.6) preferably ranges from 2% to 30% by mass, 4% to 30% by mass, 5% to 30% by mass, 6% to 30% by mass, 9% to 30% by mass, 12% to 30% by mass, 14% to 30% by mass, 16% to 30% by mass, 18% to 25% by mass, 20% to 24% by mass, or 22% to 23% by mass of the total mass of a liquid crystal composition of the present invention.

A liquid crystal composition according to the present invention may further contain a compound represented by the formula (6.7) and/or a compound represented by the formula (6.8) as a compound or compounds represented by the general formula (I-5).

[Chem. 142]

(6.7)

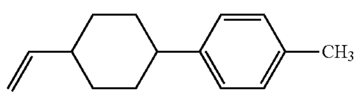

(6.8)

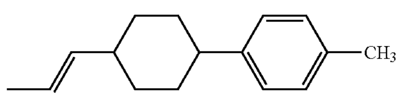

The amount of the compound represented by the formula (6.7) is preferably adjusted in a manner that depends on the desired characteristics, such as solubility at low temperatures, transition temperature, electrical reliability, and birefringence index, and is preferably 2% or more by mass, 3% or more by mass, 5% or more by mass, or 7% or more by mass of the total mass of a liquid crystal composition of the present invention. 4% to 16% by mass is also preferred.

Alternatively, or in addition, the compound(s) represented by the general formula (I) is/are preferably at least one compound selected from a compound group represented by the general formula (I-6).

[Chem. 143]

(I-6)

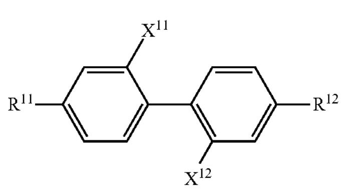

In the formula (I-6), $R^{11}$ and $R^{12}$ independently denote an alkyl group having 1 to 5 carbon atoms, an alkenyl group having 4 or 5 carbon atoms, or an alkoxy group having 1 to 4 carbon atoms, $X^{11}$ and $X^{12}$ independently denote a fluorine atom or a hydrogen atom, and one of $X^{11}$ and $X^{12}$ denotes a fluorine atom.

The amount of compound(s) represented by the general formula (I-6) preferably ranges from 2% to 30% by mass, 4% to 30% by mass, 5% to 30% by mass, 6% to 30% by mass, 9% to 30% by mass, 12% to 30% by mass, 14% to 30% by mass, 16% to 30% by mass, 18% to 25% by mass, 20% to 24% by mass, or 22% to 23% by mass of the total mass of a liquid crystal composition of the present invention.

The compound(s) represented by the general formula (I-6) is/are preferably a compound represented by the formula (7.1).

[Chem. 144]

(7.1)

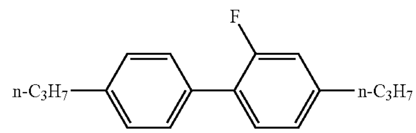

Alternatively, or in addition, the compound(s) represented by the general formula (I) is/are preferably a compound selected from a compound group represented by the general formula (I-7).

[Chem. 145]

(I-7)

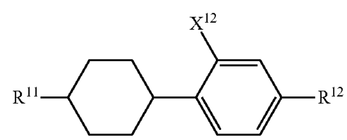

In the general formula (I-7), $R^{11}$ and $R^{12}$ independently denote an alkyl group having 1 to 5 carbon atoms, an alkenyl group having 2 to 5 carbon atoms, or an alkoxy group having 1 to 4 carbon atoms, and $X^{12}$ denotes a fluorine atom or a chlorine atom.

The amount of compound(s) represented by the general formula (I-7) preferably ranges from 1% to 20% by mass, 1% to 15% by mass, 1% to 10% by mass, or 1% to 5% by mass of the total mass of a liquid crystal composition of the present invention.

The compound(s) represented by the general formula (I-7) is/are preferably a compound represented by the formula (8.1).

The compound represented by the formula (8.1) is preferably contained as a compound represented by the general formula (I-7).

[Chem. 146]

(8.1)

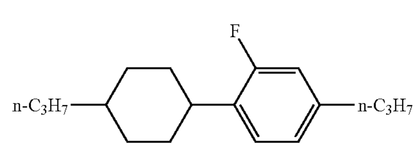

Alternatively, or in addition, the compound(s) represented by the general formula (I) is/are preferably at least one compound selected from a compound group represented by the general formula (I-8).

[Chem. 147]

(I-8)

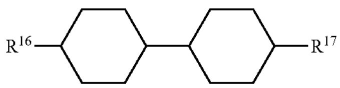

In the general formula (I-8), $R^{16}$ and $R^{17}$ independently denote an alkenyl group having 2 to 5 carbon atoms.

Although compounds of any types may be combined, one to three compounds are preferably combined in a manner that depends on the desired characteristics, such as solubility at low temperatures, transition temperature, electrical reliability, and birefringence index.

Depending on the desired characteristics, such as solubility at low temperatures, transition temperature, electrical reliability, birefringence index, process compatibility, drop marks, burn-in, and/or anisotropy of dielectric constant, the amount of compound(s) represented by the general formula (I-8) preferably ranges from 1% to 30% by mass, 1% to 25% by mass, 1% to 20% by mass, 1% to 18% by mass, or 3% to 18% by mass of the total mass of a liquid crystal composition of the present invention.

The compound(s) represented by the general formula (I-8) is/are preferably at least one compound selected from a compound group represented by the formulae (9.1) to (9.10) or a compound or compounds represented by the formula(e) (9.2), (9.4), and/or (9.7).

[Chem. 148]

(9.1)

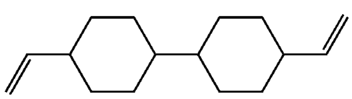

(9.2)

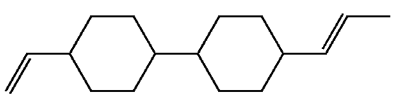

(9.3)

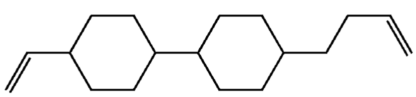

(9.4)

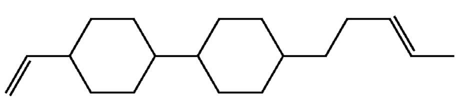

(9.5)

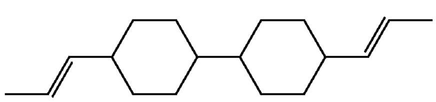

(9.6)

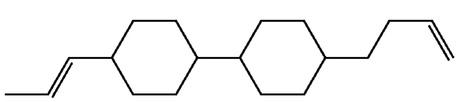

(9.7)

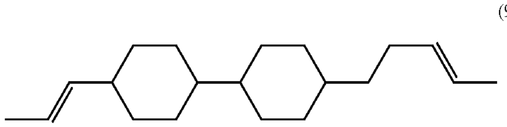

(9.8)

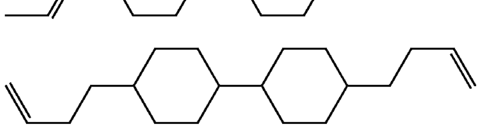

-continued (9.9)

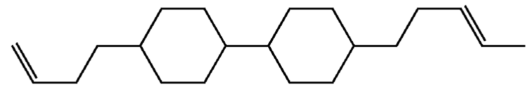

(9.10)

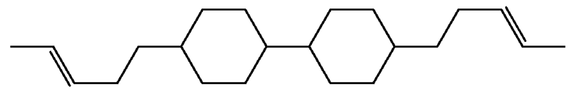

Alternatively, or in addition, for example, the compound(s) represented by the general formula (L) is/are preferably at least one compound selected from the compounds represented by the general formula (II).

[Chem. 149]

(II)

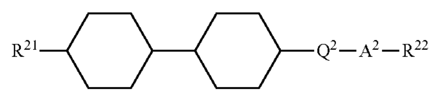

In the general formula (II), $R^{21}$ and $R^{22}$ independently denote an alkenyl group having 2 to 5 carbon atoms, an alkyl group having 1 to 5 carbon atoms, or an alkoxy group having 1 to 4 carbon atoms, $A^2$ denotes a 1,4-cyclohexylene group or a 1,4-phenylene group, and $Q^2$ denotes a single bond, —COO—, —$CH_2$—$CH_2$—, or $CF_2O$—.

Although compounds of any types may be combined, these compounds are combined in a manner that depends on the desired characteristics, such as solubility at low temperatures, transition temperature, electrical reliability, and birefringence index. For example, one compound is used in one embodiment of the present invention. Alternatively, two compounds are used in another embodiment of the present invention. Alternatively, three compounds are used in still another embodiment of the present invention. Alternatively, at least four compounds are used in still another embodiment of the present invention.

The amount of compound(s) represented by the general formula (II) in a liquid crystal composition according to the present invention should be appropriately adjusted in a manner that depends on the desired characteristics, such as solubility at low temperatures, transition temperature, electrical reliability, birefringence index, process compatibility, drop marks, burn-in, and/or anisotropy of dielectric constant.

For example, in one embodiment of the present invention, the amount of compound(s) represented by the general formula (II) ranges from 3% to 50% by mass of the total mass of a liquid crystal composition of the present invention. In another embodiment of the present invention, the amount ranges from 5% to 50% by mass. In still another embodiment of the present invention, the amount ranges from 7% to 50% by mass. In still another embodiment of the present invention, the amount ranges from 10% to 50% by mass. In still another embodiment of the present invention, the amount ranges from 14% to 50% by mass. In still another embodiment of the present invention, the amount ranges from 16% to 50% by mass. In still another embodiment of the present invention, the amount ranges from 20% to 50% by mass. In still another embodiment of the present invention, the amount ranges from 23% to 50% by mass. In still another embodiment of the present invention, the amount ranges from 26% to 50% by mass. In still another embodiment of the present invention, the amount ranges from 30% to 50% by mass. In still another embodiment of the present invention, the amount ranges from 35% to 50% by mass. In still another embodiment of the present invention, the amount ranges from 40% to 50% by mass.

For example, in one embodiment of the present invention, the amount of compound(s) represented by the general formula (II) ranges from 3% to 40% by mass of the total mass of a liquid crystal composition of the present invention. In another embodiment of the present invention, the amount ranges from 3% to 35% by mass. In still another embodiment of the present invention, the amount ranges from 3% to 30% by mass. In still another embodiment of the present invention, the amount ranges from 3% to 20% by mass. In still another embodiment of the present invention, the amount ranges from 3% to 15% by mass. In still another embodiment of the present invention, the amount ranges from 3% to 10% by mass. In still another embodiment of the present invention, the amount ranges from 3% to 5% by mass.

For example, the compound(s) represented by the general formula (II) is/are preferably at least one compound selected from a compound group represented by the general formula (II-1).

[Chem. 150]

(II-1)

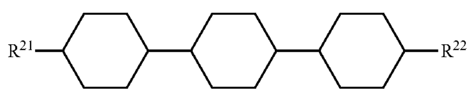

In the general formula (II-1), $R^{21}$ and $R^{22}$ independently denote an alkenyl group having 2 to 5 carbon atoms, an alkyl group having 1 to 5 carbon atoms, or an alkoxy group having 1 to 4 carbon atoms.

The amount of the compound(s) represented by the general formula (II-1) is preferably adjusted in a manner that depends on the desired characteristics, such as solubility at low temperatures, transition temperature, electrical reliability, and birefringence index, and preferably ranges from 4% to 24% by mass, preferably 8% to 18% by mass, more preferably 12% to 14% by mass.

For example, the compound(s) represented by the general formula (II-1) is/are preferably a compound represented by the formula (10.1) and/or a compound represented by the formula (10.2).

[Chem. 151]

(10.1)

(10.2)

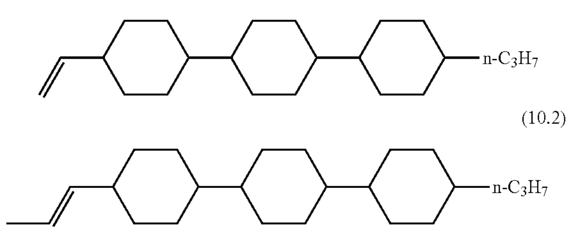

For example, the compound(s) represented by the general formula (II) is/are preferably at least one compound selected from a compound group represented by the general formula (II-2).

[Chem. 152]

(II-2)

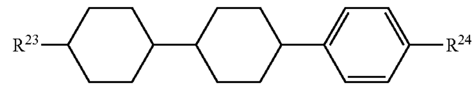

($R^{23}$ denotes an alkenyl group having 2 to 5 carbon atoms, and $R^{24}$ denotes an alkyl group having 1 to 5 carbon atoms or an alkoxy group having 1 to 4 carbon atoms.)

Although any compounds represented by the general formula (II-2) may be combined, these compounds are combined in a manner that depends on the desired characteristics, such as solubility at low temperatures, transition temperature, electrical reliability, and birefringence index. For example, one compound is used in one embodiment of the present invention. Alternatively, at least two compounds are used in another embodiment of the present invention.

The amount of compound(s) represented by the general formula (II-2) in a liquid crystal composition according to the present invention should be appropriately adjusted in a manner that depends on the desired characteristics, such as solubility at low temperatures, transition temperature, electrical reliability, birefringence index, process compatibility, drop marks, burn-in, and/or anisotropy of dielectric constant.

For example, in one embodiment of the present invention, the amount of compound(s) represented by the general formula (II-2) ranges from 3% to 35% by mass of the total mass of a liquid crystal composition of the present invention. In another embodiment of the present invention, the amount ranges from 4% to 35% by mass. In still another embodiment of the present invention, the amount ranges from 5% to 35% by mass. In still another embodiment of the present invention, the amount ranges from 8% to 35% by mass. In still another embodiment of the present invention, the amount ranges from 9% to 35% by mass. In still another embodiment of the present invention, the amount ranges from 10% to 35% by mass. In still another embodiment of the present invention, the amount ranges from 11% to 35% by mass. In still another embodiment of the present invention, the amount ranges from 12% to 35% by mass. In still another embodiment of the present invention, the amount ranges from 13% to 35% by mass. In still another embodiment of the present invention, the amount ranges from 15% to 35% by mass. In still another embodiment of the present invention, the amount ranges from 20% to 35% by mass.

For example, in one embodiment of the present invention, the amount of compound(s) represented by the general formula (II-2) ranges from 3% to 30% by mass of the total mass of a liquid crystal composition of the present invention. In another embodiment of the present invention, the amount ranges from 3% to 26% by mass. In still another embodiment of the present invention, the amount ranges from 3% to 20% by mass. In still another embodiment of the present invention, the amount ranges from 3% to 16% by mass. In still another embodiment of the present invention, the amount ranges from 3% to 15% by mass. In still another embodiment of the present invention, the amount ranges from 3% to 14% by mass. In still another embodiment of the present invention, the amount ranges from 3% to 13% by mass. In still another embodiment of the present invention, the amount ranges from 3% to 12% by mass. In still another embodiment of the present invention, the amount ranges from 3% to 10% by mass. In still another embodiment of the present invention, the amount ranges from 3% to 9% by mass. In still another embodiment of the present invention, the amount ranges from 3% to 7% by mass.

For example, the compound(s) represented by the general formula (II-2) is/are preferably at least one compound selected from a compound group represented by the formulae (11.1) to (11.3)

[Chem. 153]

(11.1)

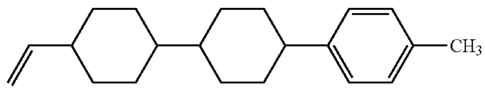

(11.2)

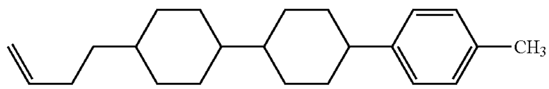

(11.3)

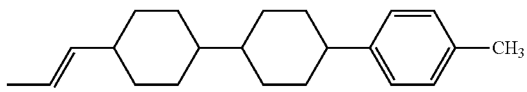

Depending on the desired characteristics, such as solubility at low temperatures, transition temperature, electrical reliability, and birefringence index, the compound represented by the formula (11.1), the compound represented by the formula (11.2), or both the compound represented by the formula (11.1) and the compound represented by the formula (11.2) may be contained, or all the compounds represented by the formulae (11.1) to (11.3) may be contained.

The amount of the compound represented by the formula (11.1) preferably ranges from 1% to 30% by mass, 2% to 25% by mass, or 2% to 20% by mass of the total mass of a liquid crystal composition of the present invention. Among these, preferred are 2% to 10% by mass, 3% to 7% by mass, 3% to 5% by mass, 4% to 12% by mass, 5% to 15% by mass, 6% to 14% by mass, 6% to 13% by mass, 8% to 15% by mass, 12% to 20% by mass, and 13% to 16% by mass, for example.

The amount of the compound represented by the formula (11.2) preferably ranges from 1% to 30% by mass, 1% to 25% by mass, 1% to 20% by mass, or 1% to 17% by mass of the total mass of a liquid crystal composition of the present invention. Among these, for example, in one embodiment, 1% to 11% by mass is preferred, 3% to 11% by mass is preferred, 5% to 11% by mass is more preferred, 6% to 11% by mass is more preferred, and 9% to 11% by mass is more preferred. In another embodiment, 2% to 15% by mass is preferred, 2% to 9% by mass is preferred, and 4% to 5% by mass is more preferred. In still another embodiment, 5% to 17% by mass is preferred.

When both the compound represented by the formula (11.1) and the compound represented by the formula (11.2) are contained, the total mass of these compounds preferably ranges from 1% to 45% by mass, 1% to 40% by mass, 1% to 35% by mass, 1% to 30% by mass, 3% to 30% by mass, 3% to 26% by mass, 3% to 20% by mass, 3% to 16% by mass, 3% to 15% by mass, 3% to 14% by mass, 3% to 13% by mass, 3% to 12% by mass, 3% to 10% by mass, 3% to 9% by mass, 3% to 7% by mass, 4% to 30% by mass, 5% to 30% by mass, 8% to 30% by mass, 9% to 30% by mass, 10% to 30% by mass, 11% to 30% by mass, 12% to 30% by mass, 13% to 30% by mass, or 15% to 30% by mass of the total mass of a liquid crystal composition of the present invention. Among these, preferred are 4% to 12% by mass, 5% to 9% by mass, 8% to 13% by mass, 9% to 14% by mass, 12% to 16% by mass, 11% to 26% by mass, and 11% to 20% by mass, for example.

Alternatively, or in addition, for example, the compound(s) represented by the general formula (II) is/are preferably at least one compound selected from a compound group represented by the general formula (II-3).

[Chem. 154]

(II-3)

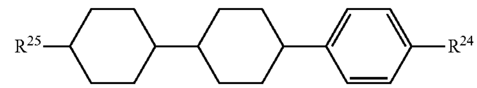

In the general formula (II-3), $R^{25}$ denotes an alkyl group having 1 to 5 carbon atoms, and $R^{24}$ denotes an alkyl group having 1 to 5 carbon atoms or an alkoxy group having 1 to 4 carbon atoms.

Although compounds of any types may be combined, one to three of these compounds are preferably contained in a manner that depends on the desired characteristics, such as solubility at low temperatures, transition temperature, electrical reliability, and birefringence index.

The amount of compound(s) represented by the general formula (II-3) should be appropriately adjusted in a manner that depends on the desired characteristics, such as solubility at low temperatures, transition temperature, electrical reliability, birefringence index, process compatibility, drop marks, burn-in, and/or anisotropy of dielectric constant.

For example, the preferred amount of the compound(s) represented by the general formula (II-3) ranges from 2% to 45% by mass of the total mass of a liquid crystal composition of the present invention. Among these, preferred are 5% to 45% by mass, 8% to 45% by mass, 11% to 45% by mass, 14% to 45% by mass, 17% to 45% by mass, 20% to 45% by mass, 23% to 45% by mass, 26% to 45% by mass, or 29% to 45% by mass, and 2% to 45% by mass, 2% to 40% by mass, 2% to 35% by mass, 2% to 30% by mass, 2% to 25% by mass, 2% to 20% by mass, 2% to 15% by mass, and 2% to 10% by mass, for example.

For example, the compound(s) represented by the general formula (II-3) is/are preferably at least one compound selected from a compound group represented by the formulae (12.1) to (12.3).

[Chem. 155]

(12.1)

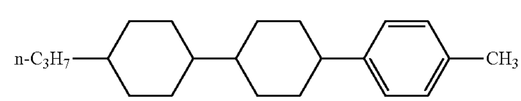

(12.2)

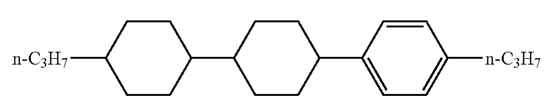

(12.3)

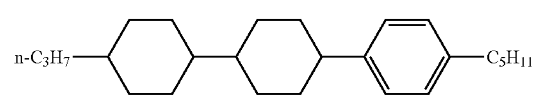

Depending on the desired characteristics, such as solubility at low temperatures, transition temperature, electrical reliability, and birefringence index, the compound represented by the formula (12.1), the compound represented by the formula (12.2), or both the compound represented by the formula (12.1) and the compound represented by the formula (12.2) may be contained.

The amount of the compound represented by the formula (12.1) preferably ranges from 3% to 40% by mass, 5% to 40% by mass, 7% to 40% by mass, 9% to 40% by mass, 11% to 40% by mass, 12% to 40% by mass, 13% to 40% by mass, 18% to 30% by mass, or 21% to 25% by mass of the total mass of a liquid crystal composition of the present invention.

The amount of the compound represented by the formula (12.2) preferably ranges from 3% to 40% by mass, 5% to 40% by mass, 8% to 40% by mass, 10% to 40% by mass, 12% to 40% by mass, 15% to 40% by mass, 17% to 30% by mass, or 19% to 25% by mass of the total mass of a liquid crystal composition of the present invention.

When both the compound represented by the formula (12.1) and the compound represented by the formula (12.2) are contained, the total mass of these compounds preferably ranges from 15% to 45% by mass, 19% to 45% by mass, 24% to 40% by mass, or 30% to 35% by mass of the total mass of a liquid crystal composition of the present invention.

The amount of the compound represented by the formula (12.3) preferably ranges from 0.05% to 2% by mass, 0.1% to 1% by mass, or 0.2% to 0.5% by mass of the total mass of a liquid crystal composition of the present invention. The compound represented by the formula (12.3) may be an optically active compound.

For example, the compound(s) represented by the general formula (II-3) is/are preferably at least one compound selected from a compound group represented by the general formula (II-3-1).

[Chem. 156]

(II-3-1)

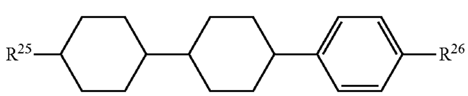

In the general formula (II-3-1), $R^{25}$ denotes an alkyl group having 1 to 5 carbon atoms, and $R^{26}$ denotes an alkoxy group having 1 to 4 carbon atoms.

Although compounds of any types may be combined, one to three of these compounds are preferably contained in a manner that depends on the desired characteristics, such as solubility at low temperatures, transition temperature, electrical reliability, and birefringence index.

The amount of the compound(s) represented by the general formula (II-3-1) is preferably adjusted in a manner that depends on the desired characteristics, such as solubility at low temperatures, transition temperature, electrical reliability, and birefringence index, and preferably ranges from 1% to 24% by mass, 4% to 18% by mass, or 6% to 14% by mass.

For example, the compound(s) represented by the general formula (II-3-1) is/are preferably at least one compound selected from a compound group represented by the formulae (13.1) to (13.4), particularly preferably a compound represented by the formula (13.3).

[Chem. 157]

(13.1)

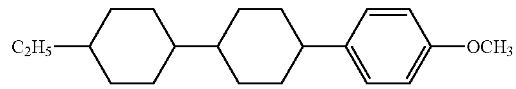

(13.2)

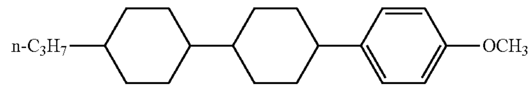

(13.3)

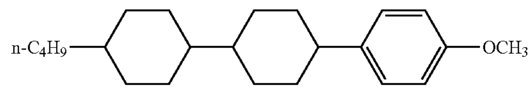

(13.4)

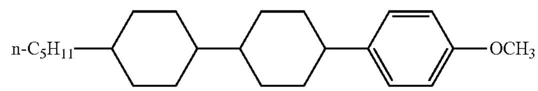

Alternatively, or in addition, for example, the compound(s) represented by the general formula (II) is/are preferably at least one compound selected from a compound group represented by the general formula (II-4).

[Chem. 158]

(II-4)

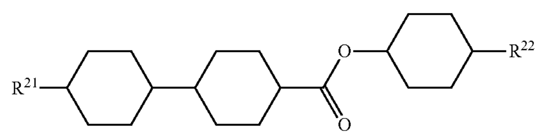

In the general formula (II-4), $R^{21}$ and $R^{22}$ independently denote an alkenyl group having 2 to 5 carbon atoms, an alkyl group having 1 to 5 carbon atoms, or an alkoxy group having 1 to 4 carbon atoms.

Although only one of these compounds or two or more of these compounds may be contained, these compounds are preferably appropriately combined in a manner that depends on the desired characteristics. Although compounds of any types may be combined, one or two of these compounds are preferably contained, and one to three of these compounds are more preferably contained, in a manner that depends on the desired characteristics, such as solubility at low temperatures, transition temperature, electrical reliability, and birefringence index.

The amount of the compound(s) represented by the general formula (II-4) preferably ranges from 1% to 15% by mass, 2% to 15% by mass, 3% to 15% by mass, 4% to 12% by mass, or 5% to 7% by mass of the total mass of a liquid crystal composition of the present invention.

For example, the compound(s) represented by the general formula (II-4) is/are preferably at least one compound selected from a compound group represented by the formulae (14.1) to (14.5), particularly preferably a compound represented by the formula (14.2) and/or a compound represented by the formula (14.5).

[Chem. 159]

(14.1)

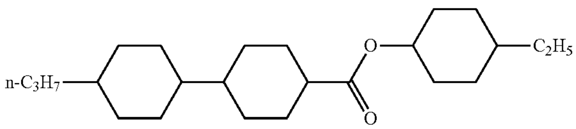

(14.2)

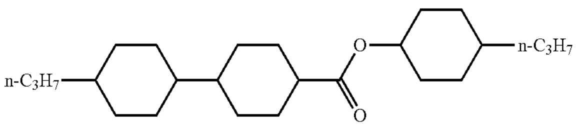

(14.3)

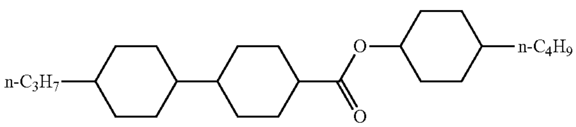

(14.4)

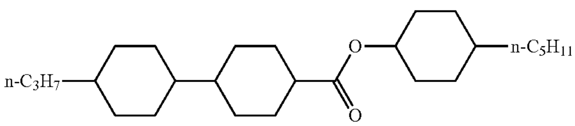

(14.5)

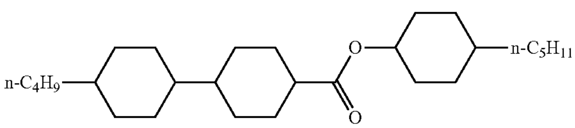

Alternatively, or in addition, the compound(s) represented by the general formula (L) is/are preferably at least one compound selected from a compound group represented by the general formula (III).

[Chem. 160]

(III)

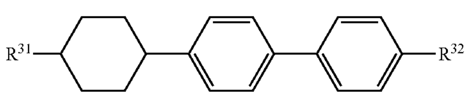

In the general formula (III), $R^{31}$ and $R^{32}$ independently denote an alkenyl group having 2 to 5 carbon atoms, an alkyl group having 1 to 5 carbon atoms, or an alkoxy group having 1 to 4 carbon atoms.

In consideration of desired solubility and birefringence index, the amount of compound(s) represented by the general formula (III) preferably ranges from 1% to 25% by mass, 2% to 20% by mass, or 2% to 15% by mass of the total mass of a liquid crystal composition of the present invention.

For example, the compound(s) represented by the general formula (III) is/are preferably a compound represented by the formula (15.1) and/or a compound represented by the formula (15.2), particularly preferably a compound represented by the formula (15.1). The amount of the compound represented by the formula (15.1) preferably ranges from 2% to 10% by mass or 7% to 9% by mass.

[Chem. 161]

(15.1)

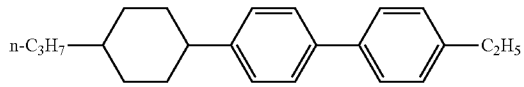

(15.2)

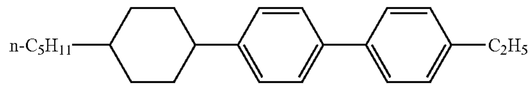

The compound(s) represented by the general formula (III) is/are preferably at least one compound selected from a compound group represented by the general formula (III-1).

[Chem. 162]

(III-1)

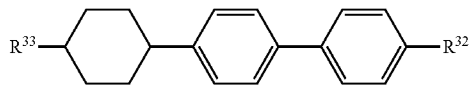

In the general formula (III-1), $R^{33}$ denotes an alkenyl group having 2 to 5 carbon atoms, and $R^{32}$ denotes an alkyl group having 1 to 5 carbon atoms or an alkoxy group having 1 to 4 carbon atoms.

The amount of the compound(s) represented by the general formula (III-1) is preferably adjusted in a manner that depends on the desired characteristics, such as solubility at low temperatures, transition temperature, electrical reliability, and birefringence index, and preferably ranges from 4% to 23% by mass, 6% to 18% by mass, or 10% to 13% by mass of the total mass of a liquid crystal composition of the present invention.

For example, the compound(s) represented by the general formula (III-1) is/are preferably a compound represented by the formula (16.1) and/or a compound represented by the formula (16.2).

[Chem. 163]

(16.1)

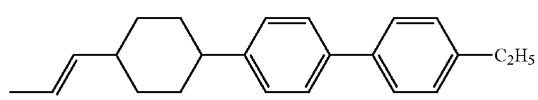

(16.2))

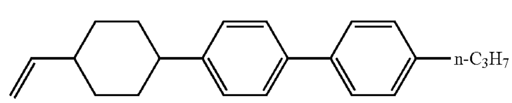

Alternatively, or in addition, the compound(s) represented by the general formula (III) is/are preferably at least one compound selected from a compound group represented by the general formula (III-2).

[Chem. 164]

(III-2)

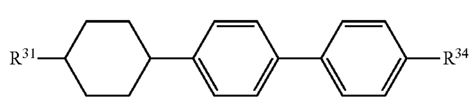

In the general formula (III-2), $R^{31}$ denotes an alkyl group having 1 to 5 carbon atoms, and $R^{34}$ denotes an alkoxy group having 1 to 4 carbon atoms.

The amount of the compound(s) represented by the general formula (III-2) is preferably adjusted in a manner that depends on the desired characteristics, such as solubility at low temperatures, transition temperature, electrical reliability, and birefringence index, and preferably ranges from 4% to 23% by mass, 6% to 18% by mass, or 10% to 13% by mass of the total mass of a liquid crystal composition of the present invention.

For example, the compound(s) represented by the general formula (III-2) is/are preferably at least one compound selected from a compound group represented by the formulae (17.1) to (17.3), particularly preferably a compound represented by the formula (17.3).

[Chem. 165]

(17.1)

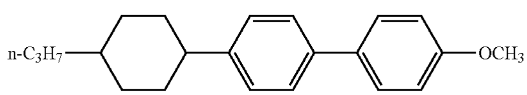

(17.2)

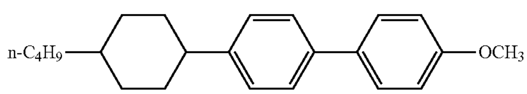

(17.3)

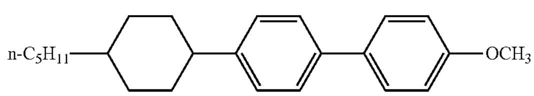

The compound(s) represented by the general formula (L) is/are preferably at least one compound selected from a compound group represented by the general formula (V).

[Chem. 166]

(V)

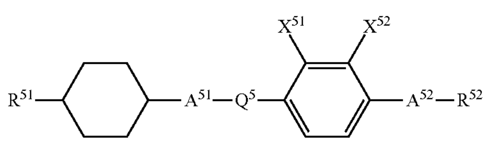

In the general formula (V), $R^{51}$ and $R^{52}$ independently denote an alkyl group having 1 to 5 carbon atoms, an alkenyl group having 2 to 5 carbon atoms, or an alkoxy group having 1 to 4 carbon atoms, $A^{51}$ and $A^{52}$ independently denote a 1,4-cyclohexylene group or a 1,4-phenylene group, $Q^5$ denotes a single bond or —COO—, and $X^{51}$ and $X^{52}$ independently denote a fluorine atom or a hydrogen atom.

Although compounds of any types may be combined, these compounds are appropriately combined in a manner that depends on the desired characteristics, such as solubility at low temperatures, transition temperature, electrical reliability, and birefringence index.

For example, one compound is used in one embodiment of the present invention. Alternatively, two compounds are used in another embodiment of the present invention. Alternatively, three compounds are used in still another embodiment of the present invention. Alternatively, four compounds are used in still another embodiment of the present invention.

For example, in one embodiment, the amount of compound(s) represented by the general formula (V) ranges from 2% to 40% by mass of the total mass of a liquid crystal composition of the present invention. In another embodiment of the present invention, the amount ranges from 4% to 40% by mass. In still another embodiment of the present invention, the amount ranges from 7% to 40% by mass. In still another embodiment of the present invention, the amount ranges from 10% to 40% by mass. In still another embodiment of the present invention, the amount ranges from 12% to 40% by mass. In still another embodiment of the present invention, the amount ranges from 15% to 40% by mass. In still another embodiment of the present invention, the amount ranges from 17% to 40% by mass. In still another embodiment of the present invention, the amount ranges from 18% to 40% by mass. In still another embodiment of the present invention, the amount ranges from 20% to 40% by mass. In still another embodiment of the present invention, the amount ranges from 22% to 40% by mass.

For example, in one embodiment of the present invention, the amount of the compound(s) ranges from 2% to 30% by mass of the total mass of a liquid crystal composition of the present invention. In another embodiment of the present invention, the amount of the compound(s) ranges from 2% to 25% by mass. In still another embodiment of the present invention, the amount of the compound(s) ranges from 2% to 20% by mass. In still another embodiment of the present invention, the amount of the compound(s) ranges from 2% to 15% by mass. In still another embodiment of the present invention, the amount of the compound(s) ranges from 2% to 10% by mass. In still another embodiment of the present invention, the amount of the compound(s) ranges from 2% to 5% by mass. In still another embodiment of the present invention, the amount of the compound(s) ranges from 2% to 4% by mass.

The compound(s) represented by the general formula (V) is/are preferably a compound or compounds represented by the general formula (V-1).

[Chem. 167]

(V-1)

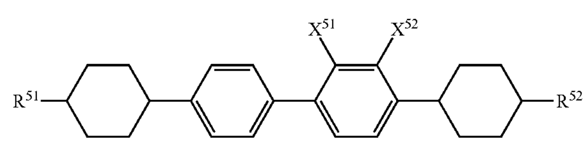

In the general formula (V-1), $R^{51}$ and $R^{52}$ independently denote an alkyl group having 1 to 5 carbon atoms, an alkenyl group having 2 to 5 carbon atoms, or an alkoxy having 1 to 4 carbon atoms, and $X^{51}$ and $X^{52}$ independently denote a fluorine atom or a hydrogen atom.

The compound(s) represented by the general formula (V-1) is/are preferably a compound or compounds represented by the general formula (V-1-1).

[Chem. 168]

(V-1-1)

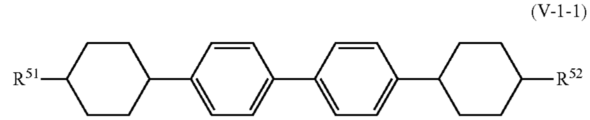

In the general formula (V-1-1), $R^{51}$ and $R^{52}$ independently denote an alkyl group having 1 to 5 carbon atoms, an alkenyl group having 2 to 5 carbon atoms, or an alkoxy group having 1 to 4 carbon atoms.

The amount of the compound(s) represented by the general formula (V-1-1) preferably ranges from 1% to 15% by mass, more preferably 2% to 10% by mass, still more preferably 3% to 10% by mass, particularly preferably 3% to 7% by mass, of the total mass of a liquid crystal composition of the present invention.

The compound(s) represented by the general formula (V-1-1) is/are preferably at least one compound selected from a compound group represented by the formulae (20.1) to (20.4) or a compound represented by the formula (20.2).

[Chem. 169]

(20.1)

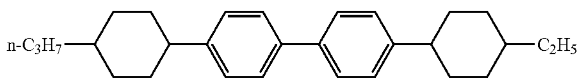

(20.2)

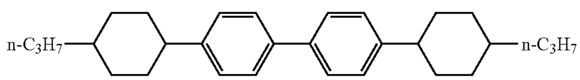

(20.3)

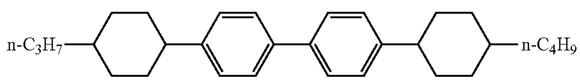

(20.4)

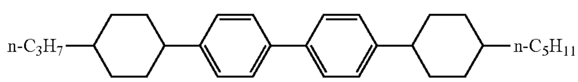

Alternatively, or in addition, the compound(s) represented by the general formula (V-1) is/are preferably a compound or compounds represented by the general formula (V-1-2).

[Chem. 170]

(V-1-2)

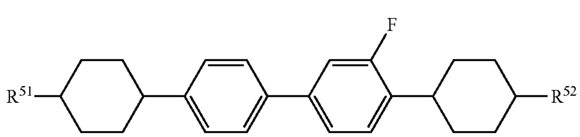

In the general formula (V-1-2), $R^{51}$ and $R^{52}$ independently denote an alkyl group having 1 to 5 carbon atoms, an alkenyl group having 2 to 5 carbon atoms, or an alkoxy group having 1 to 4 carbon atoms.

The amount of the compound(s) represented by the general formula (V-1-2) preferably ranges from 1% to 15% by mass, 1% to 10% by mass, 1% to 7% by mass, or 1% to 5% by mass of the total mass of a liquid crystal composition of the present invention.

The compound(s) represented by the general formula (V-1-2) is/are preferably at least one compound selected from a compound group represented by the formulae (21.1) to (21.3) or a compound represented by the formula (21.1).

[Chem. 171]

(21.1)

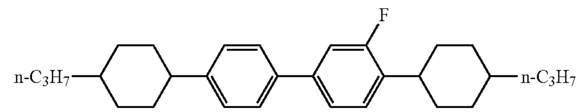

(21.2)

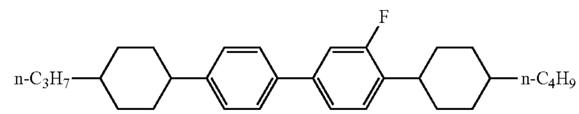

(21.3)

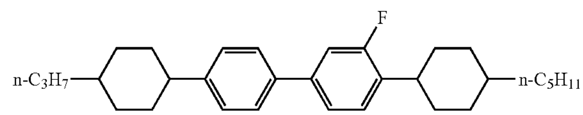

Alternatively, or in addition, the compound(s) represented by the general formula (V-1) is/are preferably a compound or compounds represented by the general formula (V-1-3).

[Chem. 172]

(V-1-3)

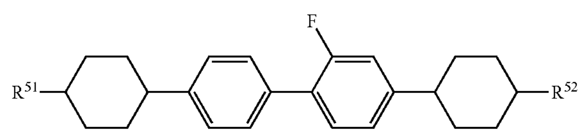

In the general formula (V-1-3), $R^{51}$ and $R^{52}$ independently denote an alkyl group having 1 to 5 carbon atoms, an alkenyl group having 2 to 5 carbon atoms, or an alkoxy group having 1 to 4 carbon atoms.

The amount of the compound(s) represented by the general formula (V-1-3) preferably ranges from 1% to 15% by mass, 2% to 15% by mass, 3% to 10% by mass, or 4% to 8% by mass of the total mass of a liquid crystal composition of the present invention.

The compound(s) represented by the general formula (V-1-3) is/are preferably at least one compound selected from a compound group represented by the formulae (22.1) to (22.3) or a compound represented by the formula (22.1).

[Chem. 173]

(22.1)

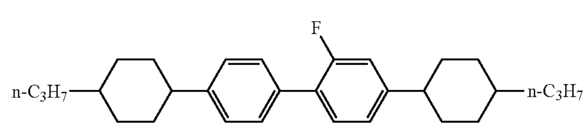

(22.2)

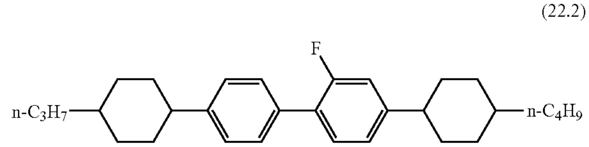

-continued (22.3)

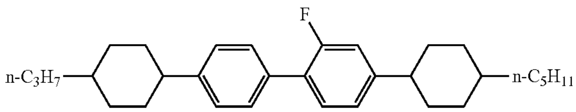

Alternatively, or in addition, the compound(s) represented by the general formula (V) is/are preferably a compound or compounds represented by the general formula (V-2).

[Chem. 174]

(V-2)

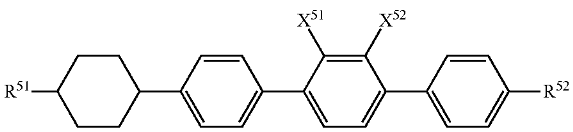

In the general formula (V-2), $R^{51}$ and $R^{52}$ independently denote an alkyl group having 1 to 5 carbon atoms, an alkenyl group having 2 to 5 carbon atoms, or an alkoxy group having 1 to 4 carbon atoms, and $X^{51}$ and $X^{52}$ independently denote a fluorine atom or a hydrogen atom.

Although compounds of any types may be combined, these compounds are appropriately combined in a manner that depends on the desired characteristics, such as solubility at low temperatures, transition temperature, electrical reliability, and birefringence index. For example, one compound is used in one embodiment of the present invention. Alternatively, at least two compounds are used in another embodiment of the present invention.

For example, in one embodiment, the amount of compound(s) represented by the general formula (V-2) ranges from 2% to 40% by mass of the total mass of a liquid crystal composition of the present invention. In another embodiment of the present invention, the amount of the compound(s) ranges from 4% to 40% by mass. In still another embodiment of the present invention, the amount of the compound(s) ranges from 7% to 40% by mass. In still another embodiment of the present invention, the amount of the compound(s) ranges from 10% to 40% by mass. In still another embodiment of the present invention, the amount of the compound(s) ranges from 12% to 40% by mass. In still another embodiment of the present invention, the amount of the compound(s) ranges from 15% to 40% by mass. In still another embodiment of the present invention, the amount of the compound(s) ranges from 17% to 40% by mass. In still another embodiment of the present invention, the amount of the compound(s) ranges from 18% to 40% by mass. In still another embodiment of the present invention, the amount of the compound(s) ranges from 20% to 40% by mass. In still another embodiment of the present invention, the amount of the compound(s) ranges from 22% to 40% by mass.

For example, in one embodiment of the present invention, the amount of the compound(s) represented by the general formula (V-2) ranges from 2% to 30% by mass of the total mass of a liquid crystal composition of the present invention. In another embodiment of the present invention, the amount of the compound(s) ranges from 2% to 25% by mass. In still another embodiment of the present invention, the amount of the compound(s) ranges from 2% to 20% by mass. In still another embodiment of the present invention, the amount of the compound(s) ranges from 2% to 15% by mass. In still another embodiment of the present invention, the amount of the compound(s) ranges from 2% to 10% by mass. In still another embodiment of the present invention, the amount of the compound(s) ranges from 2% to 5% by mass. In still another embodiment of the present invention, the amount of the compound(s) ranges from 2% to 4% by mass.

In an embodiment in which a liquid crystal composition according to the present invention desirably has high Tni, the amount of the compound(s) represented by the formula (V-2) is preferably increased. In an embodiment in which a liquid crystal composition according to the present invention desirably has low viscosity, the amount of the compound(s) represented by the formula (V-2) is preferably decreased.

The compound(s) represented by the general formula (V-2) is/are preferably a compound or compounds represented by the general formula (V-2-1).

[Chem. 175]

(V-2-1)

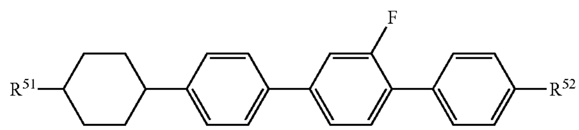

In the general formula (V-2-1), $R^{51}$ and $R^{52}$ independently denote an alkyl group having 1 to 5 carbon atoms, an alkenyl group having 2 to 5 carbon atoms, or an alkoxy group having 1 to 4 carbon atoms.

The compound(s) represented by the general formula (V-2-1) is/are preferably at least one compound selected from a compound group represented by the formulae (23.1) to (23.4) or a compound represented by the formula (23.1) and/or a compound represented by the formula (23.2).

[Chem. 176]

(23.1)

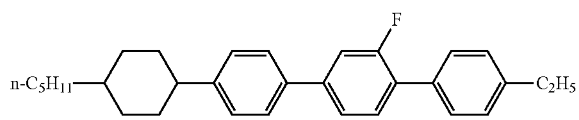

(23.2)

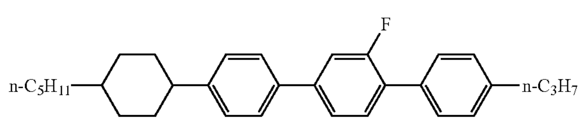

(23.3)

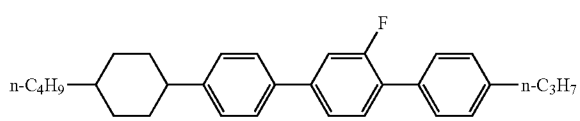

(23.4)

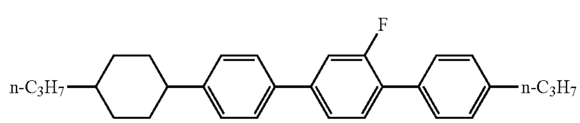

Alternatively, or in addition, the compound(s) represented by the general formula (V-2) is/are preferably a compound or compounds represented by the general formula (V-2-2).

[Chem. 177]

(V-2-2)

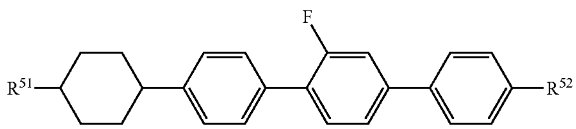

In the general formula (V-2-2), $R^{51}$ and $R^{52}$ independently denote an alkyl group having 1 to 5 carbon atoms, an alkenyl group having 2 to 5 carbon atoms, or an alkoxy group having 1 to 4 carbon atoms.

The amount of the compound(s) represented by the general formula (V-2-2) preferably ranges from 2% to 16% by mass, 3% to 13% by mass, or 4% to 10% by mass of the total mass of a liquid crystal composition of the present invention.

The compound(s) represented by the general formula (V-2-2) is/are preferably at least one compound selected from a compound group represented by the formulae (24.1) to (24.4) or a compound represented by the formula (24.1) and/or a compound represented by the formula (24.2).

[Chem. 178]

(24.1)

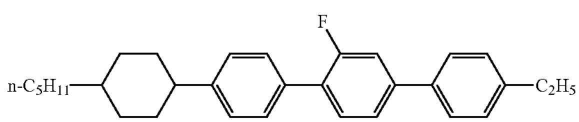

(24.2)

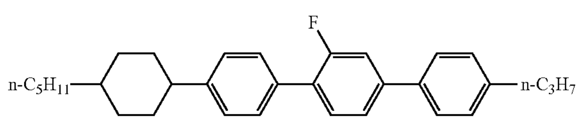

(24.3)

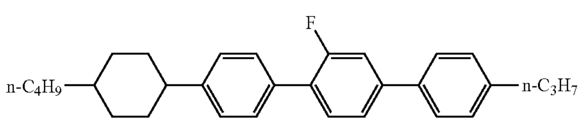

(24.4)

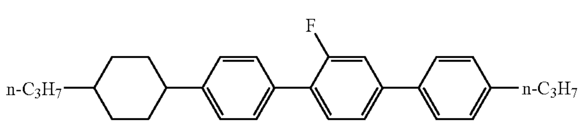

Alternatively, or in addition, the compound(s) represented by the general formula (V) is/are preferably a compounds or compounds represented by the general formula (V-3).

[Chem. 179]

(V-3)

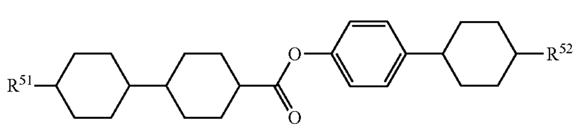

In the general formula (V-3), $R^{51}$ and $R^{52}$ independently denote an alkyl group having 1 to 5 carbon atoms, an alkenyl group having 2 to 5 carbon atoms, or an alkoxy group having 1 to 4 carbon atoms.

Although compounds of any types may be combined, these compounds are appropriately combined in a manner that depends on the desired characteristics, such as solubility at low temperatures, transition temperature, electrical reliability, and birefringence index. For example, one compound is used in one embodiment of the present invention. Alternatively, two compounds are used in another embodiment of the present invention. Alternatively, at least three compounds are used in still another embodiment of the present invention.

The amount of the compound(s) represented by the general formula (V-3) preferably ranges from 2% to 16% by mass, 4% to 16% by mass, 7% to 13% by mass, or 8% to 11% by mass of the total mass of a liquid crystal composition of the present invention.

The compound(s) represented by the general formula (V-3) is/are preferably at least one compound selected from a compound group represented by the formulae (25.1) to (25.3).

[Chem. 180]

(25.1)

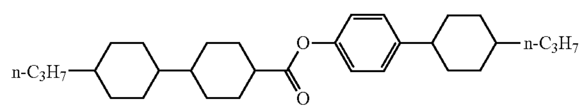

(25.2)

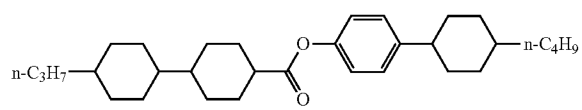

(25.3)

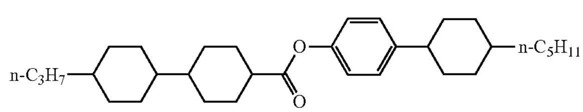

Alternatively, or in addition, the compound(s) represented by the general formula (V) is/are preferably a compound or compounds represented by the general formula (V'-3).

[Chem. 181]

(V'-3)

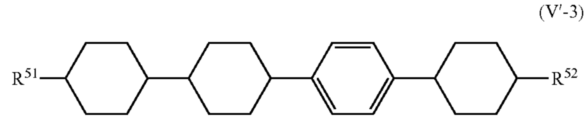

In the general formula (V'-3), $R^{51}$ and $R^{52}$ independently denote an alkyl group having 1 to 5 carbon atoms, an alkenyl group having 2 to 5 carbon atoms, or an alkoxy group having 1 to 4 carbon atoms.

Although compounds of any types may be combined, these compounds are appropriately combined in a manner that depends on the desired characteristics, such as solubility at low temperatures, transition temperature, electrical reliability, and birefringence index. For example, one compound is used in one embodiment of the present invention.

Alternatively, two compounds are used in another embodiment of the present invention. Alternatively, at least three compounds are used in still another embodiment of the present invention.

The amount of the compound(s) represented by the general formula (V'-3) preferably ranges from 2% to 16% by mass, 4% to 16% by mass, 7% to 13% by mass, or 8% to 11% by mass of the total mass of a liquid crystal composition of the present invention.

The compound(s) represented by the general formula (V'-3) is/are preferably at least one compound selected from a compound group represented by the formulae (25.31) to (25.33).

[Chem. 182]

(25.31)

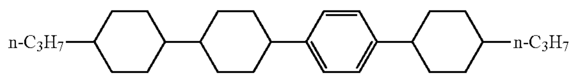

(25.32)

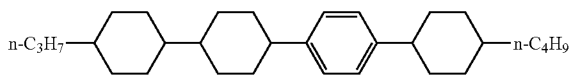

(25.33)

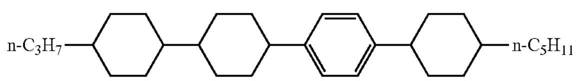

Alternatively, or in addition, the compound(s) represented by the general formula (V) for use in a liquid crystal composition according to the present invention is/are preferably a compound or compounds represented by the general formula (V-4).

[Chem. 183]

(V-4)

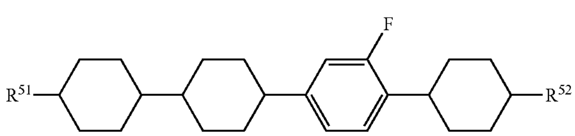

In the general formula (V-4), $R^{51}$ and $R^{52}$ independently denote an alkyl group having 1 to 5 carbon atoms, an alkenyl group having 2 to 5 carbon atoms, or an alkoxy group having 1 to 4 carbon atoms.

The amount of the compound(s) represented by the general formula (V-4) preferably ranges from 1% to 15% by mass, 2% to 15% by mass, 3% to 10% by mass, or 4% to 8% by mass of the total mass of a liquid crystal composition of the present invention.

The compound(s) represented by the general formula (V-4) is/are preferably at least one compound selected from a compound group represented by the formulae (25.11) to (25.13), more preferably a compound represented by the formula (25.13).

[Chem. 184]

(25.11)

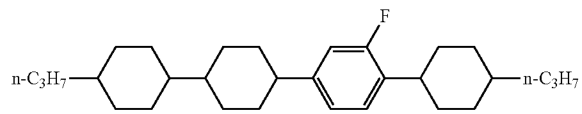

(25.12)

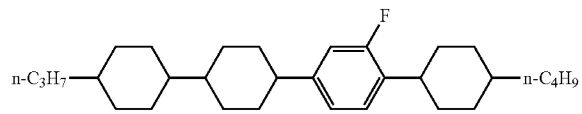

(25.13)

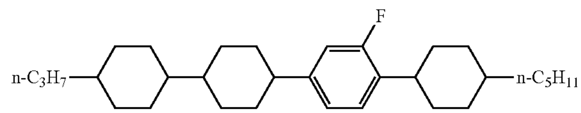

Alternatively, or in addition, the compound(s) represented by the general formula (L) for use in a liquid crystal composition according to the present invention is/are preferably a compound or compounds represented by the general formula (V'-5).

[Chem. 185]

(V'-5)

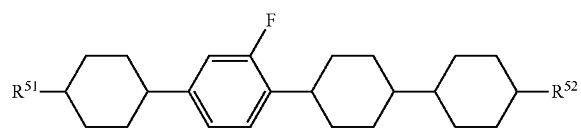

In the general formula (V'-5), $R^{51}$ and $R^{52}$ independently denote an alkyl group having 1 to 5 carbon atoms, an alkenyl group having 2 to 5 carbon atoms, or an alkoxy group having 1 to 4 carbon atoms.

The amount of the compound(s) represented by the general formula (V'-5) preferably ranges from 1% to 15% by mass, 2% to 15% by mass, or 2% to 13% by mass of the total mass of a liquid crystal composition of the present invention.

The compound(s) represented by the general formula (V'-5) is/are preferably at least one compound selected from a compound group represented by the formulae (25.21) to (25.25), more preferably a compound represented by the formula (25.21) and/or a compound represented by the formula (25.23).

[Chem. 186]

(25.21)

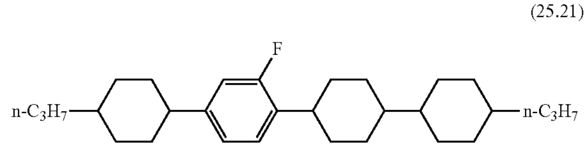

(25.22)

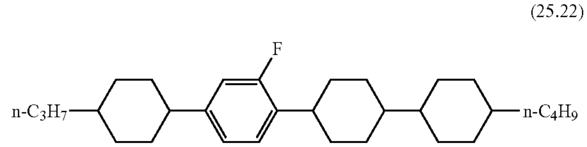

-continued (25.23)

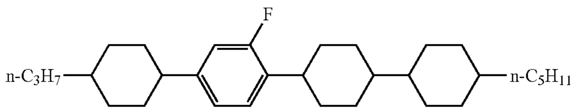

(25.24)

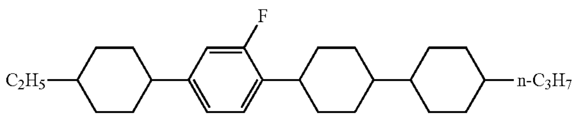

(25.25)

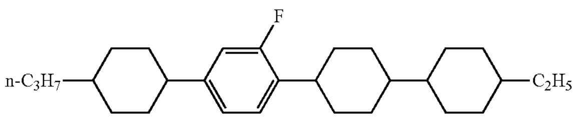

A liquid crystal composition according to the present invention may also further contain at least one compound represented by the general formula (VI).

[Chem. 187]

(VI)

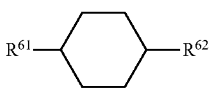

In the general formula (VI), $R^{61}$ and $R^{62}$ independently denote a linear alkyl group having 1 to 10 carbon atoms, a linear alkoxy group having 1 to 10 carbon atoms, or a linear alkenyl group having 2 to 10 carbon atoms.

Although compounds of any types may be combined, one to three, more preferably one to four, particularly preferably one to five or more, of these compounds are preferably contained in a manner that depends on the desired characteristics, such as solubility at low temperatures, transition temperature, electrical reliability, and birefringence index.

The amount of the compound(s) represented by the general formula (VI) preferably ranges from 0% to 35% by mass, 0% to 25% by mass, or 0% to 15% by mass of the total mass of a liquid crystal composition of the present invention.

More specifically, the following compounds are suitably used as compounds represented by the general formula (VI).

[Chem. 188]

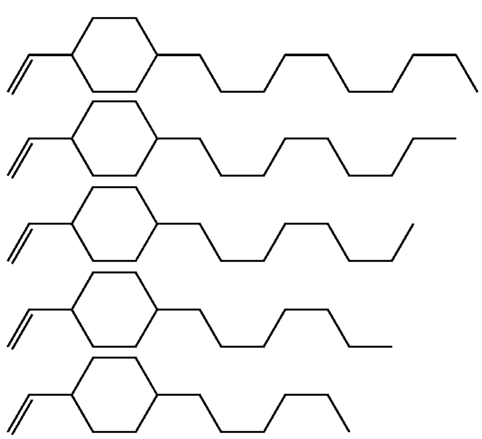

-continued

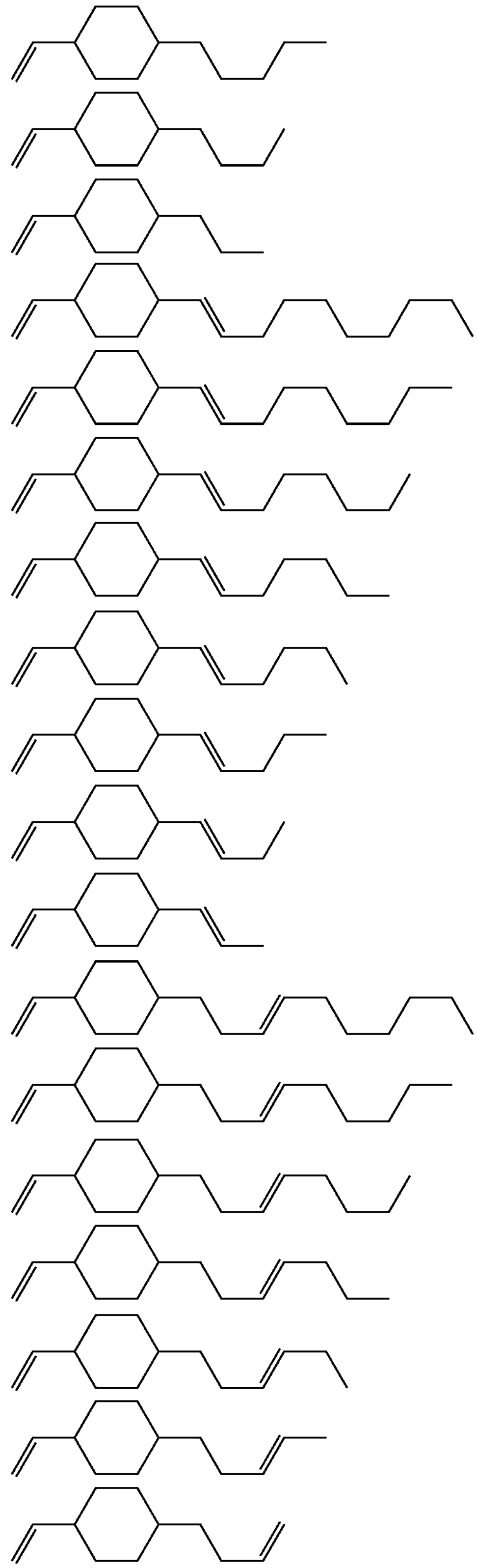

[Chem. 189]

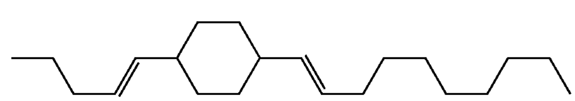

-continued
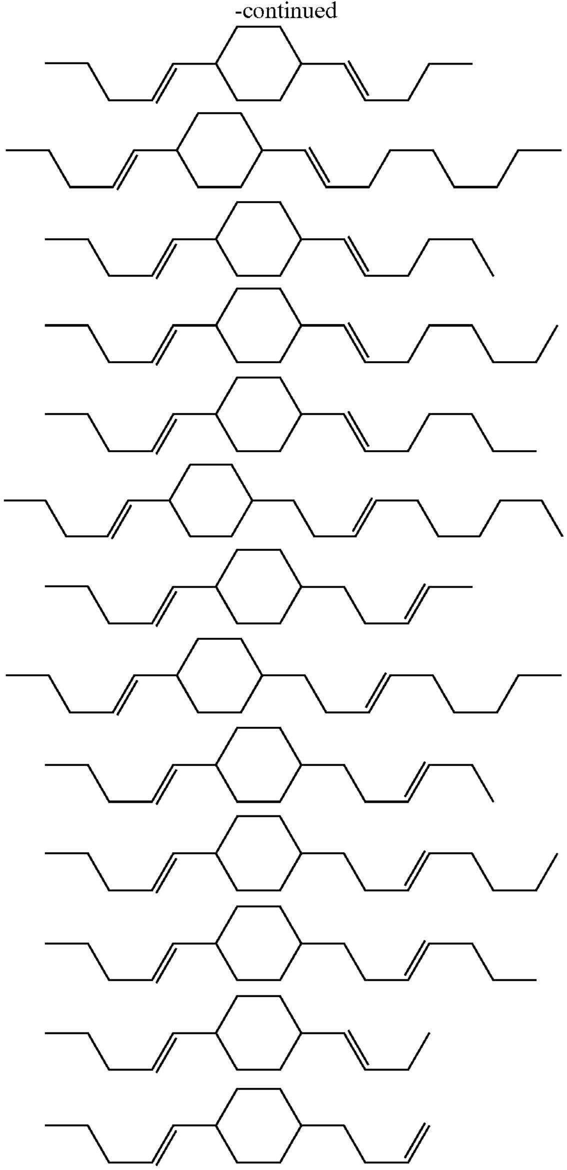
[Chem. 190]
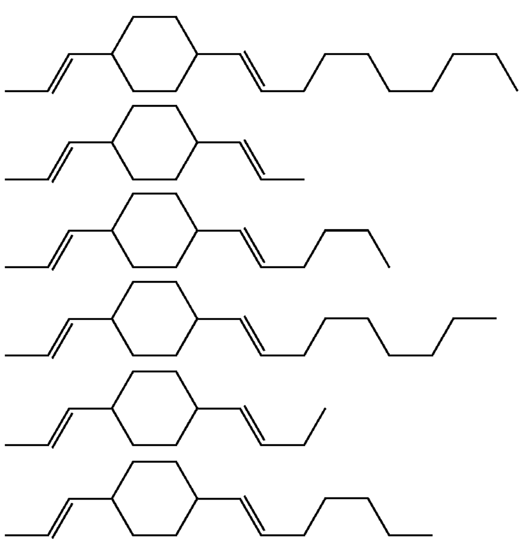
-continued
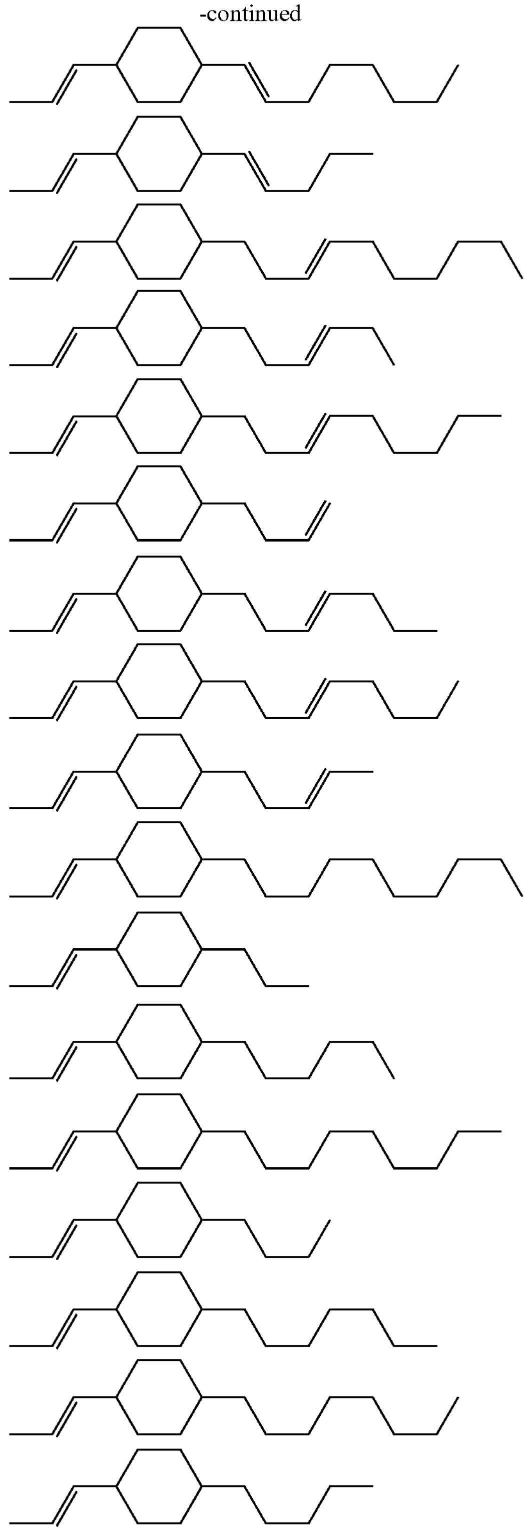
[Chem. 191]
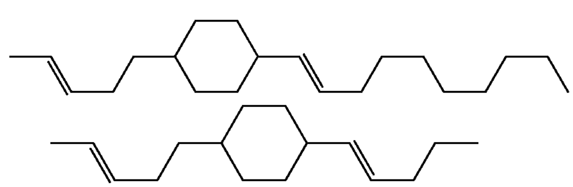

-continued

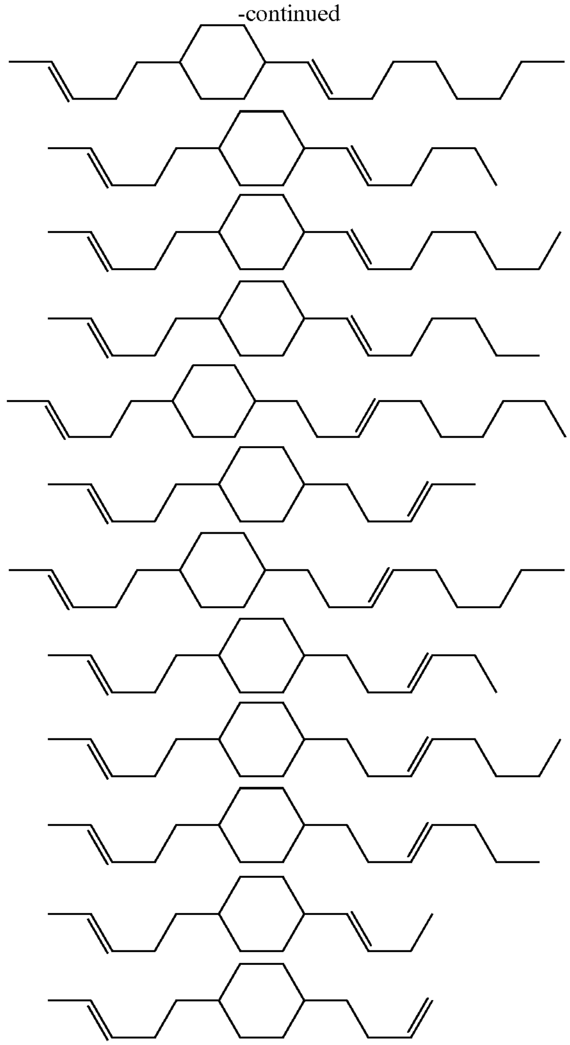

A liquid crystal composition according to the present invention may further contain at least one compound represented by the general formula (VII).

[Chem. 192]

(VII)

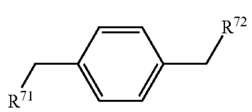

In the general formula (VII), $R^{71}$ and $R^{72}$ independently denote a linear alkyl group having 1 to 10 carbon atoms, a linear alkoxy group having 1 to 10 carbon atoms, or a linear alkenyl group having 4 to 10 carbon atoms.

Although compounds of any types may be combined, one to three, more preferably one to four, particularly preferably one to five or more, appropriately selected from these compounds are preferably contained in a manner that depends on the desired characteristics, such as solubility at low temperatures, transition temperature, electrical reliability, and birefringence index.

The amount of the compound(s) represented by the general formula (VII) preferably ranges from 0% to 35% by mass, more preferably 0% to 25% by mass, preferably 0% to 15% by mass, of the total mass of a liquid crystal composition of the present invention.

More specifically, the following compounds are suitably used as compounds represented by the general formula (VII).

[Chem. 193]

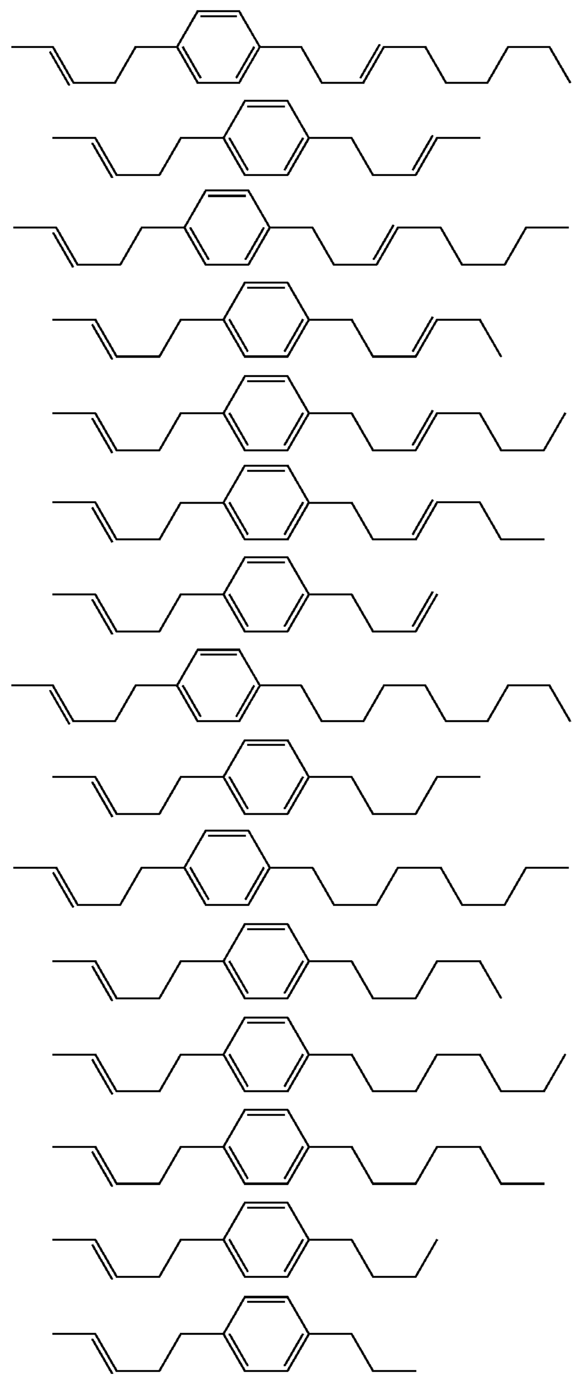

A liquid crystal composition according to the present invention also preferably further contains at least one compound represented by the following general formula (M).

[Chem. 194]

(M)

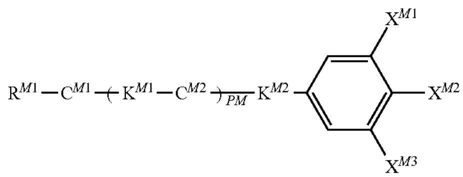

In the general formula (M), $R^{M1}$ denotes an alkyl group having 1 to 8 carbon atoms, and one or two or more nonadjacent —$CH_2$— of the alkyl group may be independently substituted with —CH═CH—, —C≡C—, —O—, —CO—, —COO—, or —OCO—, PM is 0, 1, 2, 3, or 4, $C^{M1}$ and $C^{M2}$ independently denote a group selected from the group consisting of (d) a 1,4-cyclohexylene group (one —$CH_2$— or two or more nonadjacent —$CH_2$— of this group may be substituted with —O— or —S—), and (e) a 1,4-phenylene group (one —CH═ or two or more nonadjacent —CH═ of this group may be substituted with —N═), the group (d) and the group (e) may be independently substituted with a cyano group, a fluorine atom, or a chlorine atom, $K^{M1}$ and $K^{M2}$ independently denote a single bond, —$CH_2CH_2$—, —$(CH_2)_4$—, —$OCH_2$—, —$CH_2O$—, —$OCF_2$—, —$CF_2O$—, —COO—, —OCO—, or —C≡C—, in the case that PM is 2, 3, or 4 and there are a plurality of $K^{M1}$s, the plurality of $K^{M1}$s may be the same or different, and in the case that PM is 2, 3, or 4 and there are a plurality of $C^{M2}$s, the plurality of $C^{M2}$s may be the same or different, $X^{M1}$ and $X^{M3}$ independently denote a hydrogen atom, a chlorine atom, or a fluorine atom, and $X^{M2}$ denotes a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group. However, the at least one compound is not the compound represented by the formula (i).

Although compounds of any types may be combined, these compounds are appropriately combined in a manner that depends on the desired characteristics, such as solubility at low temperatures, transition temperature, electrical reliability, and birefringence index. For example, one compound is used in one embodiment of the present invention. Alternatively, two compounds are used in another embodiment of the present invention. Alternatively, three compounds are used in still another embodiment of the present invention. Alternatively, four compounds are used in still another embodiment of the present invention. Alternatively, five compounds are used in still another embodiment of the present invention. Alternatively, six compounds are used in another embodiment of the present invention. Alternatively, at least seven compounds are used in still another embodiment of the present invention.

The amount of compound(s) represented by the general formula (M) in a liquid crystal composition according to the present invention should be appropriately adjusted in a manner that depends on the desired characteristics, such as solubility at low temperatures, transition temperature, electrical reliability, birefringence index, process compatibility, drop marks, burn-in, and/or anisotropy of dielectric constant.

In one embodiment of the present invention, the amount of the compound(s) represented by the general formula (M) ranges from 1% to 95% by mass of the total mass of a liquid crystal composition of the present invention. For example, in another embodiment of the present invention, the amount of the compound(s) ranges from 10% to 95% by mass. For example, in still another embodiment of the present invention, the amount of the compound(s) ranges from 20% to 95% by mass. For example, in still another embodiment of the present invention, the amount of the compound(s) ranges from 30% to 95% by mass. For example, in still another embodiment of the present invention, the amount of the compound(s) ranges from 40% to 95% by mass. For example, in still another embodiment of the present invention, the amount of the compound(s) ranges from 45% to 95% by mass. For example, in still another embodiment of the present invention, the amount of the compound(s) ranges from 50% to 95% by mass. For example, in still another embodiment of the present invention, the amount of the compound(s) ranges from 55% to 95% by mass. For example, in still another embodiment of the present invention, the amount of the compound(s) ranges from 60% to 95% by mass. For example, in still another embodiment of the present invention, the amount of the compound(s) ranges from 65% to 95% by mass. For example, in still another embodiment of the present invention, the amount of the compound(s) ranges from 70% to 95% by mass. For example, in still another embodiment of the present invention, the amount of the compound(s) ranges from 75% to 95% by mass. For example, in still another embodiment of the present invention, the amount of the compound(s) ranges from 80% to 95% by mass.

For example, in one embodiment of the present invention, the amount of compound(s) represented by the general formula (M) ranges from 1% to 85% by mass of the total mass of a liquid crystal composition of the present invention. In another embodiment of the present invention, the amount of the compound(s) ranges from 1% to 75% by mass. In still another embodiment of the present invention, the amount of the compound(s) ranges from 1% to 65% by mass. In still another embodiment of the present invention, the amount of the compound(s) ranges from 1% to 55% by mass. In still another embodiment of the present invention, the amount of the compound(s) ranges from 1% to 45% by mass. In still another embodiment of the present invention, the amount of the compound(s) ranges from 1% to 35% by mass. In still another embodiment of the present invention, the amount of the compound(s) ranges from 1% to 25% by mass.

When a liquid crystal composition according to the present invention having low viscosity and a high response speed is desired, the lower limit is preferably decreased, and the upper limit is preferably decreased. When a liquid crystal composition according to the present invention having high Tni and high temperature stability is desired, the lower limit is preferably decreased, and the upper limit is preferably decreased. When the anisotropy of dielectric constant is increased in order to maintain a low driving voltage, the lower limit is preferably increased, and the upper limit is preferably increased.

When the ring structure to which $R^{M1}$ is bonded is a phenyl group (aromatic), $R^{M1}$ is preferably a linear alkyl group having 1 to 5 carbon atoms, a linear alkoxy group having 1 to 4 carbon atoms, or an alkenyl group having 4 or 5 carbon atoms. When the ring structure to which $R^{M1}$ is bonded is a saturated ring structure, such as cyclohexane, pyran, or dioxane, $R^{M1}$ is preferably a linear alkyl group having 1 to 5 carbon atoms, a linear alkoxy group having 1 to 4 carbon atoms, or a linear alkenyl group having 2 to 5 carbon atoms.

When a chemically stable liquid crystal composition is desired, the compound(s) represented by the general formula (M) preferably contain(s) no chlorine atom in its(their) molecule(s). The amount of a compound having a chlorine atom in a liquid crystal composition of the present invention preferably ranges from 0% to 5% by mass, 0% to 3% by mass, 0% to 1% by mass, 0% to 0.5% by mass, or substantially zero percent of the total mass of the liquid crystal composition. The term "substantially zero percent" means that a liquid crystal composition contains only a compound unintentionally containing a chlorine atom, such as a compound produced as an impurity in the production of a compound.

For example, the compound(s) represented by the general formula (M) is/are preferably at least one compound selected from a compound group represented by the general formula (VIII).

[Chem. 195]

(VIII)

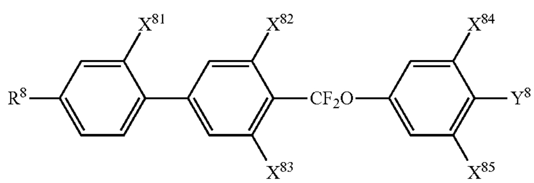

In the general formula (VIII), $R^8$ denotes an alkyl group having 1 to 5 carbon atoms, an alkenyl group having 2 to 5 carbon atoms, or an alkoxy group having 1 to 4 carbon atoms, $X^{81}$ to $X^{85}$ independently denote a hydrogen atom or a fluorine atom, and $Y^8$ denotes a fluorine atom or —$OCF_3$.

Although compounds of any types may be combined, these compounds are appropriately combined in a manner that depends on the desired characteristics, such as solubility at low temperatures, transition temperature, electrical reliability, and birefringence index. For example, one compound is used in one embodiment of the present invention. Alternatively, two compounds are used in another embodiment of the present invention. Alternatively, at least three compounds are used in still another embodiment of the present invention.

The amount of compound(s) represented by the general formula (VIII) in a liquid crystal composition according to the present invention should be appropriately adjusted in a manner that depends on the desired characteristics, such as solubility at low temperatures, transition temperature, electrical reliability, birefringence index, process compatibility, drop marks, burn-in, and/or anisotropy of dielectric constant.

For example, in one embodiment of the present invention, the amount of compound(s) represented by the general formula (VIII) ranges from 2% to 40% by mass of the total mass of a liquid crystal composition of the present invention. In still another embodiment of the present invention, the amount of the compound(s) ranges from 4% to 40% by mass. For example, in still another embodiment of the present invention, the amount of the compound(s) ranges from 5% to 40% by mass. For example, in still another embodiment of the present invention, the amount of the compound(s) ranges from 6% to 40% by mass. For example, in still another embodiment of the present invention, the amount of the compound(s) ranges from 7% to 40% by mass. For example, in still another embodiment of the present invention, the amount of the compound(s) ranges from 8% to 40% by mass. For example, in still another embodiment of the present invention, the amount of the compound(s) ranges from 9% to 40% by mass. For example, in still another embodiment of the present invention, the amount of the compound(s) ranges from 10% to 40% by mass. For example, in still another embodiment of the present invention, the amount of the compound(s) ranges from 11% to 40% by mass. For example, in still another embodiment of the present invention, the amount of the compound(s) ranges from 12% to 40% by mass. For example, in still another embodiment of the present invention, the amount of the compound(s) ranges from 14% to 40% by mass. For example, in still another embodiment of the present invention, the amount of the compound(s) ranges from 15% to 40% by mass. For example, in still another embodiment of the present invention, the amount of the compound(s) ranges from 21% to 40% by mass. For example, in still another embodiment of the present invention, the amount of the compound(s) ranges from 23% to 40% by mass.

For example, in one embodiment of the present invention, the amount of the compound(s) ranges from 2% to 30% by mass of the total mass of a liquid crystal composition of the present invention. In another embodiment of the present invention, the amount of the compound(s) ranges from 2% to 25% by mass. In still another embodiment of the present invention, the amount of the compound(s) ranges from 2% to 21% by mass. In still another embodiment of the present invention, the amount of the compound(s) ranges from 2% to 16% by mass. In still another embodiment of the present invention, the amount of the compound(s) ranges from 2% to 12% by mass. In still another embodiment of the present invention, the amount of the compound(s) ranges from 2% to 8% by mass. In still another embodiment of the present invention, the amount of the compound(s) ranges from 2% to 5% by mass.

When a liquid crystal composition according to the present invention having low viscosity and a high response speed is desired, the lower limit is preferably decreased, and the upper limit is preferably decreased. When a liquid crystal composition according to the present invention having high Tni and high temperature stability is desired, the lower limit is preferably decreased, and the upper limit is preferably decreased. When the anisotropy of dielectric constant is increased in order to maintain a low driving voltage, the lower limit is preferably increased, and the upper limit is preferably increased.

The compound(s) represented by the general formula (VIII) is/are preferably a compound or compounds represented by the general formula (VIII-1).

[Chem. 196]

(VIII-1)

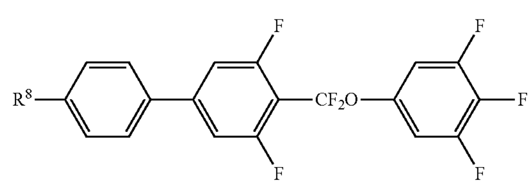

In the general formula (VIII-1), $R^8$ denotes an alkyl group having 1 to 5 carbon atoms, an alkenyl group having 2 to 5 carbon atoms, or an alkoxy group having 1 to 4 carbon atoms.

Although compounds of any types may be combined, these compounds are appropriately combined in a manner that depends on the desired characteristics, such as solubility at low temperatures, transition temperature, electrical reliability, and birefringence index. For example, one compound is used in one embodiment of the present invention. Alternatively, at least two compounds are used in another embodiment of the present invention.

More specifically, the compound(s) represented by the general formula (VIII-1) is/are preferably at least one compound selected from a compound group represented by the formulae (26.1) to (26.4) or a compound represented by the formula (26.1) and/or a compound represented by the formula (26.2), more preferably a compound represented by the formula (26.2).

[Chem. 197]

(26.1)

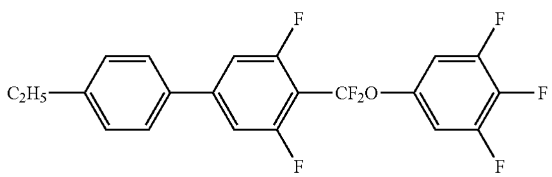

(26.2)

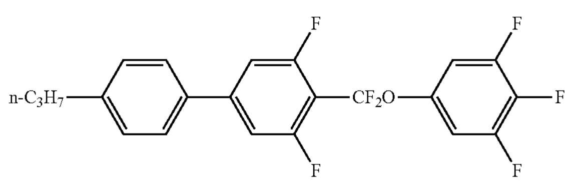

(26.3)

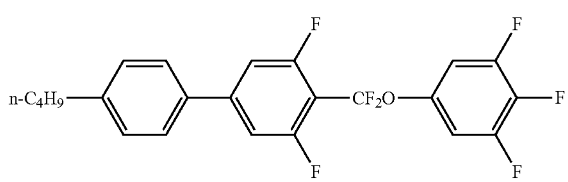

(26.4)

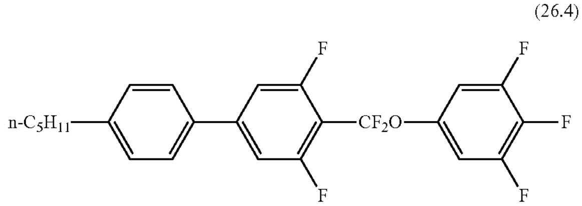

In consideration of solubility at low temperatures, transition temperature, electrical reliability, and birefringence index, the amount of the compound represented by the formula (26.1) preferably ranges from 1% to 20% by mass, more preferably 1% to 15% by mass, still more preferably 1% to 10% by mass, particularly preferably 1% to 7% by mass, of the total mass of a liquid crystal composition of the present invention. Particularly preferred are 1% to 6% by mass, 1% to 5% by mass, 1% to 3% by mass, 3% to 7% by mass, and 3% to 6% by mass, for example.

In consideration of solubility at low temperatures, transition temperature, electrical reliability, and birefringence index, the amount of the compound represented by the formula (26.2) preferably ranges from 1% to 30% by mass, more preferably 1% to 25% by mass, still more preferably 1% to 20% by mass, particularly preferably 1% to 18% by mass, of the total mass of a liquid crystal composition of the present invention. Particularly preferred are 1% to 2% by mass, 3% to 12% by mass, 4% to 12% by mass, 4% to 10% by mass, 6% to 12% by mass, 6% to 9% by mass, 6% to 8% by mass, 7% to 12% by mass, 8% to 11% by mass, 3% to 7% by mass, 5% to 10% by mass, and 12% to 18% by mass, for example.

The total amount of the compound represented by the formula (26.1) and the compound represented by the formula (26.2) preferably ranges from 1% to 30% by mass, more preferably 1% to 25% by mass, still more preferably 1% to 20% by mass, of the total mass of a liquid crystal composition of the present invention. Still more preferred are 1% to 18% by mass, 1% to 14% by mass, 1% to 10% by mass, 1% to 9% by mass, 1% to 8% by mass, 1% to 2% by mass, 5% to 10% by mass, 6% to 10% by mass, 6% to 9% by mass, 6% to 8% by mass, 8% to 12% by mass, 7% to 12% by mass, 9% to 14% by mass, and 12% to 18% by mass, for example.

Alternatively, or in addition, the compound(s) represented by the general formula (VIII) is/are preferably a compound or compounds represented by the general formula (VIII-2).

[Chem. 198]

(VIII-2)

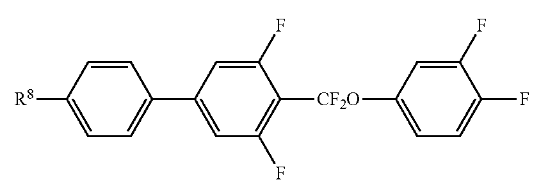

In the general formula (VIII-2), $R^8$ denotes an alkyl group having 1 to 5 carbon atoms, an alkenyl group having 2 to 5 carbon atoms, or an alkoxy group having 1 to 4 carbon atoms.

Although compounds of any types may be combined, these compounds are appropriately combined in a manner that depends on the desired characteristics, such as solubility at low temperatures, transition temperature, electrical reliability, and birefringence index. For example, one compound is used in one embodiment of the present invention. Alternatively, two compounds are used in another embodiment of the present invention. Alternatively, at least three compounds are used in still another embodiment of the present invention.

In consideration of solubility at low temperatures, transition temperature, electrical reliability, and birefringence index, the amount of the compound(s) represented by the general formula (VIII-2) preferably ranges from 2.5% to 25% by mass, 8% to 25% by mass, 10% to 20% by mass, or 12% to 15% by mass of the total mass of a liquid crystal composition of the present invention.

The compound(s) represented by the general formula (VIII-2) is/are preferably at least one compound selected from a compound group represented by the formulae (27.1) to (27.4) or a compound represented by the formula (27.2).

[Chem. 199]

(27.1)

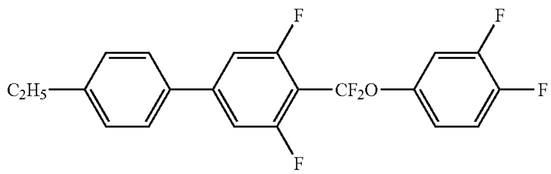

(27.2)

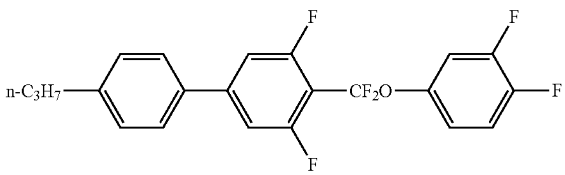

(27.3)

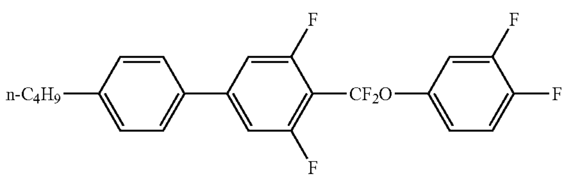

(27.4)

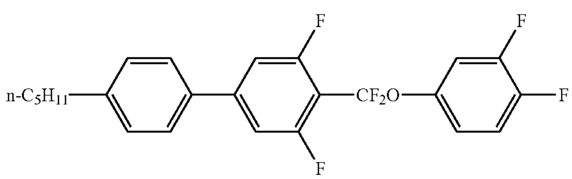

Alternatively, or in addition, the compound(s) represented by the general formula (VIII) is/are preferably a compound or compounds represented by the general formula (VIII-3)

[Chem. 200]

(VIII-3)

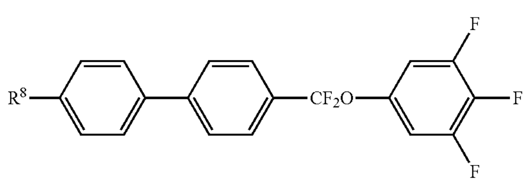

In the general formula (VIII-3), $R^8$ denotes an alkyl group having 1 to 5 carbon atoms, an alkenyl group having 2 to 5 carbon atoms, or an alkoxy group having 1 to 4 carbon atoms.

Although compounds of any types may be combined, these compounds are appropriately combined in a manner that depends on the desired characteristics, such as solubility at low temperatures, transition temperature, electrical reliability, and birefringence index. For example, one compound is used in one embodiment of the present invention. Alternatively, at least two compounds are used in another embodiment of the present invention.

More specifically, the compound(s) represented by the general formula (VIII-3) is/are preferably at least one compound selected from a compound group represented by the formulae (26.11) to (26.14) or a compound represented by the formula (26.11) and/or a compound represented by the formula (26.12), more preferably a compound represented by the formula (26.12).

[Chem. 201]

(26.11)

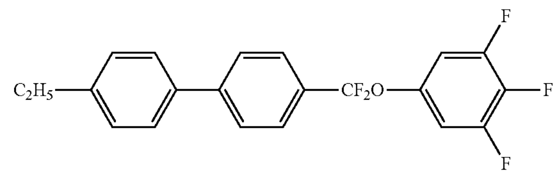

(26.12)

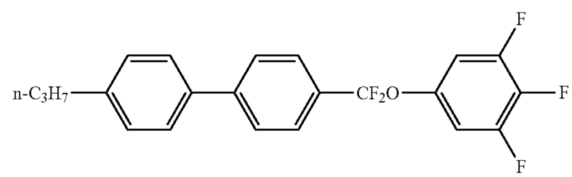

(26.13)

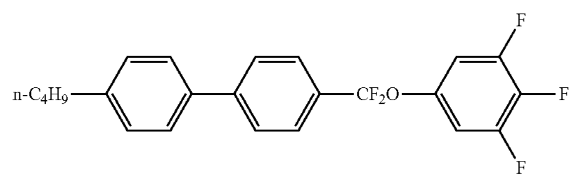

(26.14)

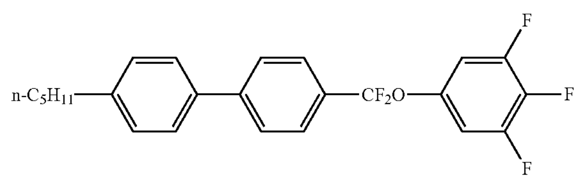

Alternatively, or in addition, the compound(s) represented by the general formula (VIII) is/are preferably a compound or compounds represented by the general formula (VIII-4).

[Chem. 202]

(VIII-4)

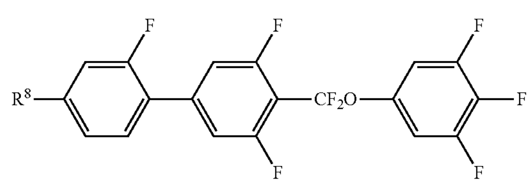

In the general formula (VIII-4), $R^8$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably combined in consideration of solubility at low temperatures, transition temperature, electrical reliability, and birefringence index.

The amount of the compound(s) represented by the general formula (VIII-4) is appropriately adjusted in consideration of characteristics such as solubility at low temperatures, transition temperature, electrical reliability, and birefringence index.

For example, the amount of the compound(s) represented by the general formula (VIII-4) based on the total mass of a liquid crystal composition of the present invention preferably ranges from 1% to 25% by mass in one embodiment of the present invention, 2% to 25% by mass in another embodiment, 3% to 20% by mass in still another embodiment, 3% to 13% by mass in still another embodiment, 3% to 10% by mass in still another embodiment, or 1% to 5% by mass in still another embodiment.

More specifically, the compound(s) represented by the general formula (VIII-4) for use in a liquid crystal composition according to the present invention is/are preferably at least one compound selected from a compound group represented by the formulae (26.21) to (26.24), particularly preferably a compound represented by the formula (26.24)

[Chem. 203]

(26.21)

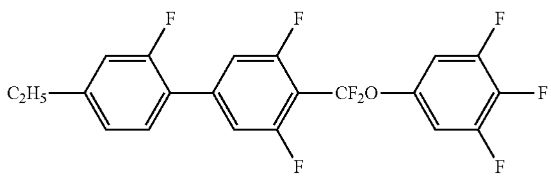

(26.22)

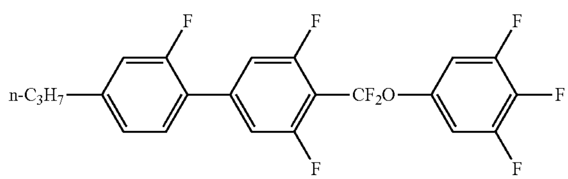

(26.23)

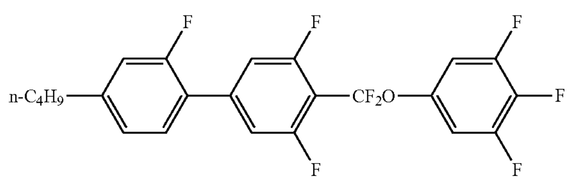

(26.24)

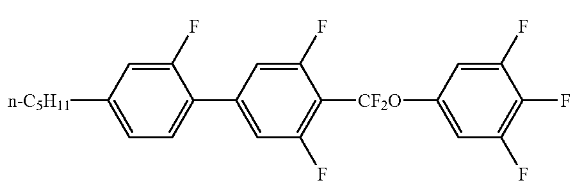

For example, the compound(s) represented by the general formula (M) is/are preferably at least one compound selected from a compound group represented by the general formula (IX).

[Chem. 204]

(IX)

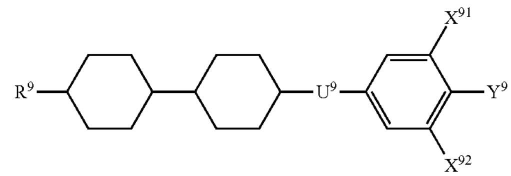

In the general formula (IX), $R^9$ denotes an alkyl group having 1 to 5 carbon atoms, an alkenyl group having 2 to 5 carbon atoms, or an alkoxy group having 1 to 4 carbon atoms, $X^{91}$ and $X^{92}$ independently denote a hydrogen atom or a fluorine atom, $Y^9$ denotes a fluorine atom, a chlorine atom, or —$OCF_3$, and $U^9$ denotes a single bond, —COO—, or —$CF_2O$—.

Although compounds of any types may be combined, these compounds are appropriately combined in a manner that depends on the desired characteristics, such as solubility at low temperatures, transition temperature, electrical reliability, and birefringence index. For example, one compound is used in one embodiment of the present invention. Alternatively, two compounds are used in another embodiment of the present invention. Alternatively, three compounds are used in still another embodiment of the present invention. Alternatively, four compounds are used in still another embodiment of the present invention. Alternatively, five compounds are used in still another embodiment of the present invention. Alternatively, at least six compounds are used in still another embodiment of the present invention.

The amount of compound(s) represented by the general formula (IX) in a liquid crystal composition according to the present invention should be appropriately adjusted in a manner that depends on the desired characteristics, such as solubility at low temperatures, transition temperature, electrical reliability, birefringence index, process compatibility, drop marks, burn-in, and/or anisotropy of dielectric constant.

For example, in one embodiment of the present invention, the amount of compound(s) represented by the general formula (IX) ranges from 2% to 70% by mass of the total mass of a liquid crystal composition of the present invention. In another embodiment of the present invention, the amount of the compound(s) ranges from 5% to 70% by mass. For example, in still another embodiment of the present invention, the amount of the compound(s) ranges from 8% to 70% by mass. For example, in still another embodiment of the present invention, the amount of the compound(s) ranges from 10% to 70% by mass. For example, in still another embodiment of the present invention, the amount of the compound(s) ranges from 12% to 70% by mass. For example, in still another embodiment of the present invention, the amount of the compound(s) ranges from 15% to 70% by mass. For example, in still another embodiment of the present invention, the amount of the compound(s) ranges from 17% to 70% by mass. For example, in still another embodiment of the present invention, the amount of the compound(s) ranges from 20% to 70% by mass. For example, in still another embodiment of the present invention, the amount of the compound(s) ranges from 24% to 70% by mass. For example, in still another embodiment of the present invention, the amount of the compound(s) ranges from 28% to 70% by mass. For example, in still another embodiment of the present invention, the amount of the compound(s) ranges from 30% to 70% by mass. For example, in still another embodiment of the present invention, the amount of the compound(s) ranges from 34% to 70% by mass. For example, in still another embodiment of the present invention, the amount of the compound(s) ranges from 39% to 70% by mass. For example, in still another embodiment of the present invention, the amount of the compound(s) ranges from 40% to 70% by mass. For example, in still another embodiment of the present invention, the amount of the compound(s) ranges from 42% to 70% by mass. For example, in still another embodiment of the present invention, the amount of the compound(s) ranges from 45% to 70% by mass.

For example, in one embodiment of the present invention, the amount of the compound(s) ranges from 3% to 60% by mass of the total mass of a liquid crystal composition of the present invention. In another embodiment of the present invention, the amount of the compound(s) ranges from 3% to 55% by mass. In still another embodiment of the present invention, the amount of the compound(s) ranges from 3% to 50% by mass. In still another embodiment of the present invention, the amount of the compound(s) ranges from 3% to 45% by mass. In still another embodiment of the present invention, the amount of the compound(s) ranges from 3% to 40% by mass. In still another embodiment of the present invention, the amount of the compound(s) ranges from 3% to 35% by mass. In still another embodiment of the present invention, the amount of the compound(s) ranges from 3% to 30% by mass. In still another embodiment of the present invention, the amount of the compound(s) is 25% by mass. In still another embodiment of the present invention, the amount of the compound(s) ranges from 3% to 20% by mass. In still another embodiment of the present invention, the amount of the compound(s) ranges from 3% to 15% by mass. In still another embodiment of the present invention, the amount of the compound(s) ranges from 3% to 10% by mass.

When a liquid crystal composition according to the present invention having low viscosity and a high response speed is desired, the lower limit is preferably decreased, and the upper limit is preferably decreased. When a liquid crystal composition according to the present invention having high Tni and resistance to burn-in is desired, the lower limit is preferably decreased, and the upper limit is preferably decreased. When the anisotropy of dielectric constant is increased in order to maintain a low driving voltage, the lower limit is preferably increased, and the upper limit is preferably increased.

The compound(s) represented by the general formula (IX) is/are preferably a compound or compounds represented by the general formula (IX-1).

[Chem. 205]

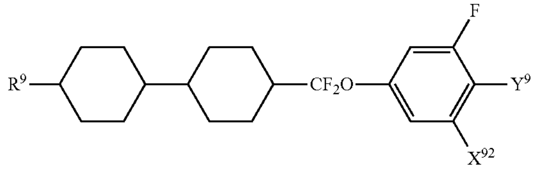

(IX-1)

In the general formula (IX-1), $R^9$ denotes an alkyl group having 1 to 5 carbon atoms, an alkenyl group having 2 to 5 carbon atoms, or an alkoxy group having 1 to 4 carbon atoms, $X^{92}$ denotes a hydrogen atom or a fluorine atom, and $Y^9$ denotes a fluorine atom or —$OCF_3$.

Although compounds of any types may be combined, these compounds are appropriately combined in a manner that depends on the desired characteristics, such as solubility at low temperatures, transition temperature, electrical reliability, and birefringence index. For example, one compound is used in one embodiment of the present invention. Alternatively, two compounds are used in another embodiment of the present invention. Alternatively, three compounds are used in still another embodiment of the present invention. Alternatively, at least four compounds are used in still another embodiment of the present invention.

The compound(s) represented by the general formula (IX-1) is/are preferably a compound or compounds represented by the general formula (IX-1-1).

[Chem. 206]

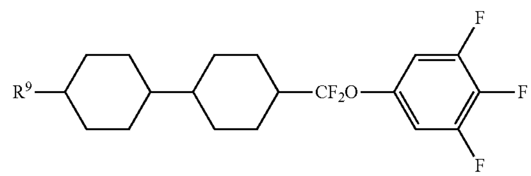

(IX-1-1)

In the general formula (IX-1-1), $R^9$ denotes an alkyl group having 1 to 5 carbon atoms, an alkenyl group having 2 to 5 carbon atoms, or an alkoxy group having 1 to 4 carbon atoms.

Although compounds of any types may be combined, these compounds are appropriately combined in a manner that depends on the desired characteristics, such as solubility at low temperatures, transition temperature, electrical reliability, and birefringence index. For example, one compound is used in one embodiment of the present invention. Alternatively, two compounds are used in another embodiment of the present invention. Alternatively, at least three compounds are used in still another embodiment of the present invention.

The amount of the compound(s) represented by the general formula (IX-1-1) is appropriately adjusted in each embodiment in consideration of solubility at low temperatures, transition temperature, electrical reliability, and birefringence index.

For example, in one embodiment of the present invention, the amount of compound(s) represented by the general formula (IX-1-1) ranges from 1% to 15% by mass of the total mass of a liquid crystal composition of the present invention. In another embodiment of the present invention, the amount of the compound(s) ranges from 1% to 10% by mass. For example, in still another embodiment of the present invention, the amount of the compound(s) ranges from 1% to 9% by mass. For example, in still another embodiment of the present invention, the amount of the compound(s) ranges from 1% to 8% by mass. For example, in still another embodiment of the present invention, the amount of the compound(s) ranges from 1% to 3% by mass.

For example, in one embodiment of the present invention, the amount of compound(s) represented by the general formula (IX-1-1) ranges from 2% to 17% by mass of the total mass of a liquid crystal composition of the present invention. In another embodiment of the present invention, the amount of the compound(s) ranges from 3% to 10% by mass. In still another embodiment of the present invention, the amount of the compound(s) ranges from 5% to 10% by mass. In still another embodiment of the present invention, the amount of the compound(s) ranges from 6% to 10% by mass. In still another embodiment of the present invention, the amount of the compound(s) ranges from 7% to 10% by mass. In still another embodiment of the present invention, the amount of the compound(s) ranges from 3% to 8% by mass. In still another embodiment of the present invention, the amount of the compound(s) ranges from 5% to 8% by mass. In still another embodiment of the present invention, the amount of the compound(s) ranges from 6% to 9% by mass.

The compound(s) represented by the general formula (IX-1-1) is/are preferably at least one compound selected from a compound group represented by the formulae (28.1), (28.2), (28.4), and (28.5) or a compound represented by the formula (28.5).

[Chem. 207]

(28.1)

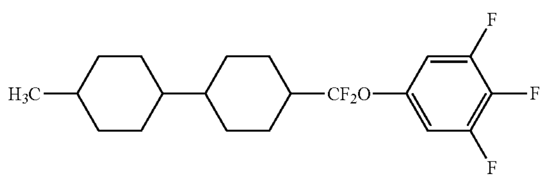

(28.2)

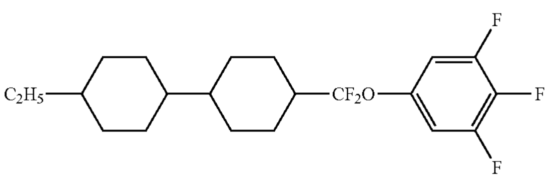

(28.3)

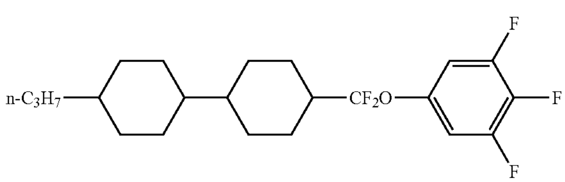

(28.4)

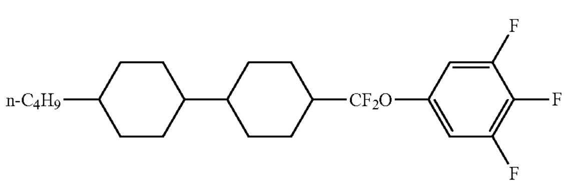

(28.5)

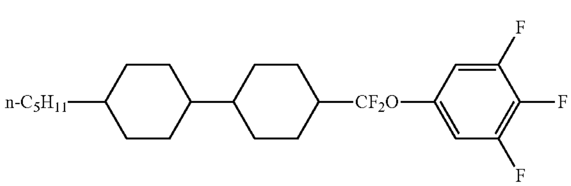

The amount of the compound represented by the formula (28.3) in the liquid crystal composition is preferably, but is not limited to, 1% or more by mass, 3% or more by mass, 5% or more by mass, 7% or more by mass, 10% or more by mass, 14% or more by mass, or 16% or more by mass of the total mass of the liquid crystal composition. In consideration of solubility at low temperatures, nematic phase-isotropic liquid phase transition temperature, and electrical reliability, the amount of the compound represented by the formula (i) in the liquid crystal composition is preferably 30% or less by mass, 25% or less by mass, 22% or less by mass, 20% or less by mass, 19% or less by mass, 15% or less by mass, 12% or less by mass, 10% or less by mass, 8% or less by mass, or less than 5% by mass of the total mass of the liquid crystal composition.

Among these, the amount of the compound represented by the formula (28.3) in the liquid crystal composition preferably ranges from 1% to 30% by mass, 1% to 25% by mass, 1% to 19% by mass, 1% to 8% by mass, 2% to 6% by mass, 3% to 8% by mass, 5% to 15% by mass, 5% to 11% by mass, 7% to 12% by mass, 7% to 20% by mass, 7% to 18% by mass, or 11% to 16% by mass of the total mass of the liquid crystal composition of the present invention.

In consideration of solubility at low temperatures, transition temperature, and electrical reliability, the amount of the compound represented by the formula (28.5) in a liquid crystal composition according to the present invention preferably ranges from 1% to 25% by mass, more preferably 1% to 20% by mass, still more preferably 1% to 15% by mass, particularly preferably 1% to 10% by mass of the total mass of the liquid crystal composition. Among these, preferred are 2% to 10% by mass, 3% to 10% by mass, 5% to 10% by mass, 6% to 10% by mass, 7% to 10% by mass, 1% to 10% by mass, 1% to 10% by mass, 1% to 9% by mass, 1% to 8% by mass, 1% to 3% by mass, 3% to 8% by mass, 5% to 8% by mass, and 6% to 9% by mass.

Alternatively, or in addition, the compound(s) represented by the general formula (IX-1) is/are preferably a compound or compounds represented by the general formula (IX-1-2).

[Chem. 208]

(IX-1-2)

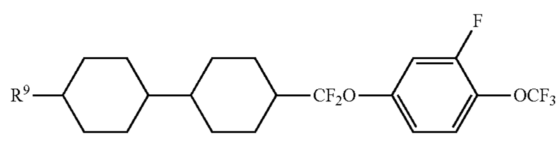

In the general formula (IX-1-2), $R^9$ denotes an alkyl group having 1 to 5 carbon atoms, an alkenyl group having 2 to 5 carbon atoms, or an alkoxy group having 1 to 4 carbon atoms.

Although compounds of any types may be combined, one to three compounds are preferably combined, and one to four compounds are more preferably combined, in consideration of solubility at low temperatures, transition temperature, electrical reliability, and birefringence index.

In consideration of solubility at low temperatures, transition temperature, and electrical reliability, the amount of the compound(s) represented by the general formula (IX-1-2) preferably ranges from 1% to 30% by mass, 5% to 30% by mass, 8% to 30% by mass, 10% to 25% by mass, 14% to 22% by mass, or 16% to 20% by mass of the total mass of a liquid crystal composition of the present invention.

The compound(s) represented by the general formula (IX-1-2) is/are preferably at least one compound selected from a compound group represented by the formulae (29.1)

to (29.4) or a compound represented by the formula (29.2) and/or a compound represented by the formula (29.4).

[Chem. 209]

(29.1)

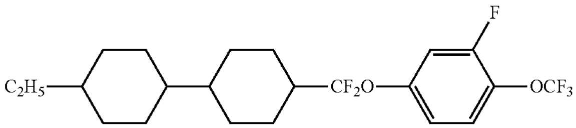

(29.2)

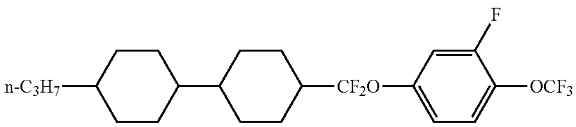

(29.3)

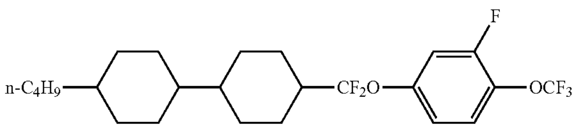

(29.4)

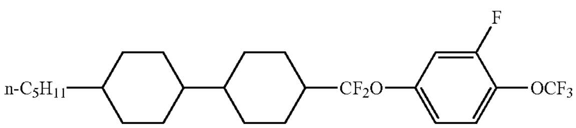

Alternatively, or in addition, the compound(s) represented by the general formula (IX) is/are preferably a compound or compounds represented by the general formula (IX-2).

[Chem. 210]

(IX-2)

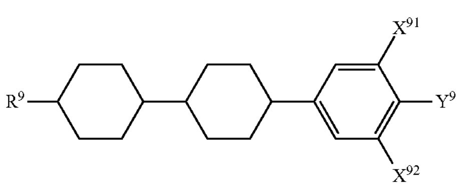

In the general formula (IX-2), $R^9$ denotes an alkyl group having 1 to 5 carbon atoms, an alkenyl group having 2 to 5 carbon atoms, or an alkoxy group having 1 to 4 carbon atoms, $X^{91}$ and $X^{92}$ independently denote a hydrogen atom or a fluorine atom, and $Y^9$ denotes a fluorine atom, a chlorine atom, or —$OCF_3$.

Although compounds of any types may be combined, compounds are appropriately combined in each embodiment in consideration of solubility at low temperatures, transition temperature, electrical reliability, and birefringence index. For example, one compound is used in one embodiment of the present invention, two compounds are combined in another embodiment, three compounds are combined in still another embodiment, four compounds are combined in still another embodiment, five compounds are combined in still another embodiment, and at least six compounds are combined in still another embodiment.

The compound(s) represented by the general formula (IX-2) is/are preferably a compound or compounds represented by the general formula (IX-2-1).

[Chem. 211]

(IX-2-1)

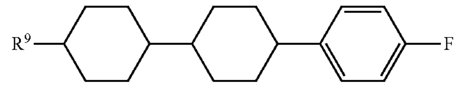

In the general formula (IX-2-1), $R^9$ denotes an alkyl group having 1 to 5 carbon atoms, an alkenyl group having 2 to 5 carbon atoms, or an alkoxy group having 1 to 4 carbon atoms.

Although compounds of any types may be combined, one to three compounds are preferably combined in consideration of solubility at low temperatures, transition temperature, electrical reliability, and birefringence index.

The amount of the compound(s) represented by the general formula (IX-2-1) is appropriately adjusted in consideration of characteristics such as solubility at low temperatures, transition temperature, electrical reliability, and birefringence index.

For example, in one embodiment of the present invention, the amount of the compound(s) represented by the general formula (IX-2-1) ranges from 1% to 40% by mass of the total mass of a liquid crystal composition of the present invention. In another embodiment, the amount of the compound(s) ranges from 2% to 40% by mass. In still another embodiment, the amount of the compound(s) ranges from 4% to 40% by mass. In still another embodiment, the amount of the compound(s) ranges from 10% to 40% by mass. In still another embodiment, the amount of the compound(s) ranges from 14% to 40% by mass. In still another embodiment, the amount of the compound(s) ranges from 16% to 40% by mass. In still another embodiment, the amount of the compound(s) ranges from 21% to 40% by mass.

For example, the amount of the compound(s) represented by the general formula (IX-2-1) based on the total mass of a liquid crystal composition of the present invention ranges from 1% to 30% by mass in one embodiment of the present invention, 1% to 25% by mass in another embodiment, 1% to 22% by mass in still another embodiment, 1% to 20% by mass in still another embodiment, 1% to 10% by mass in still another embodiment, 1% to 7% by mass in still another embodiment, or 1% to 5% by mass in still another embodiment.

The compound(s) represented by the general formula (IX-2-1) is/are preferably at least one compound selected from a compound group represented by the formulae (30.1) to (30.4) or a compound represented by the formula (30.1) and/or a compound represented by the formula (30.2).

[Chem. 212]

(30.1)

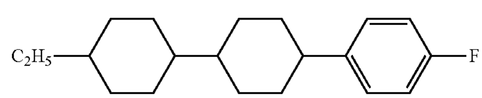

(30.2)

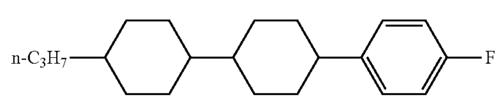

(30.3)

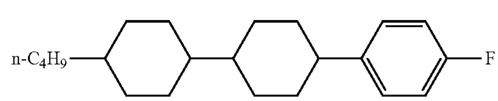

-continued (30.4)

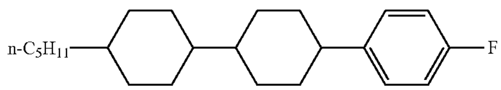

Alternatively, or in addition, the compound(s) represented by the general formula (IX-2) is/are preferably a compound or compounds represented by the general formula (IX-2-2).

[Chem. 213]

(IX-2-2)

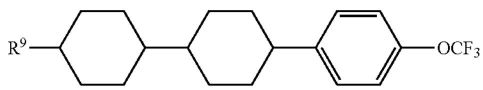

In the general formula (IX-2-2), $R^9$ denotes an alkyl group having 1 to 5 carbon atoms, an alkenyl group having 2 to 5 carbon atoms, or an alkoxy group having 1 to 4 carbon atoms.

Although compounds of any types may be combined, one to three compounds are preferably combined, and one to four compounds are more preferably combined, in consideration of solubility at low temperatures, transition temperature, electrical reliability, and birefringence index.

The amount of the compound(s) represented by the general formula (IX-2-2) is appropriately adjusted in each embodiment in consideration of characteristics such as solubility at low temperatures, transition temperature, electrical reliability, and birefringence index.

For example, the amount of the compound(s) represented by the general formula (IX-2-2) based on the total mass of a liquid crystal composition of the present invention ranges from 1% to 30% by mass in one embodiment of the present invention, 1% to 25% by mass in another embodiment, 1% to 20% by mass in still another embodiment, 1% to 15% by mass in still another embodiment, 1% to 11% by mass in still another embodiment, 1% to 10% by mass in still another embodiment, 1% to 9% by mass in still another embodiment, 1% to 8% by mass in still another embodiment, 2% to 9% by mass in still another embodiment, 7% to 10% by mass in still another embodiment, 5% to 8% by mass in still another embodiment, or 8% to 11% by mass in still another embodiment.

The compound(s) represented by the general formula (IX-2-2) is/are preferably at least one compound selected from a compound group represented by the formulae (31.1) to (31.4), at least one compound selected from a compound group represented by the formulae (31.2) to (31.4), or the compound represented by the formula (31.2).

[Chem. 214]

(31.1)

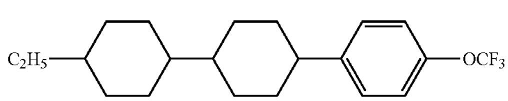

(31.2)

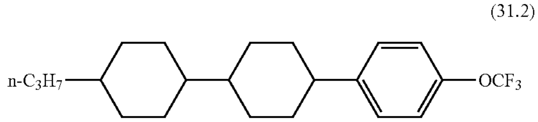

-continued (31.3)

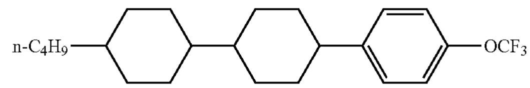

(31.4)

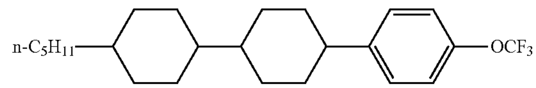

The amount of the compound represented by the formula (31.2) in a liquid crystal composition according to the present invention preferably ranges from 1% to 30% by mass, 1% by mass 25% or less by mass, 1% to 20% by mass, or 1% to 15% by mass of the total mass of the liquid crystal composition. Among these, preferred are 1% to 14% by mass, 2% to 9% by mass, 4% to 10% by mass, 5% to 8% by mass, and 8% to 11% by mass, for example.

The amount of the compound represented by the formula (31.4) in a liquid crystal composition according to the present invention preferably ranges from 1% to 20% by mass, 1% by mass 15% or less by mass, 1% to 5% by mass, or 2% to 5% by mass of the total mass of the liquid crystal composition.

Alternatively, or in addition, the compound(s) represented by the general formula (IX-2) is/are preferably a compound or compounds represented by the general formula (IX-2-3).

[Chem. 215]

(IX-2-3)

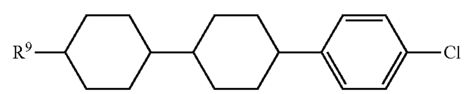

In the general formula (IX-2-3), $R^9$ denotes an alkyl group having 1 to 5 carbon atoms, an alkenyl group having 2 to 5 carbon atoms, or an alkoxy group having 1 to 4 carbon atoms.

Although compounds of any types may be combined, one or two compounds are preferably combined in consideration of solubility at low temperatures, transition temperature, electrical reliability, and birefringence index.

In consideration of solubility at low temperatures, transition temperature, and electrical reliability, the amount of the compound(s) represented by the general formula (IX-2-3) preferably ranges from 1% to 30% by mass, more preferably 3% to 20% by mass, still more preferably 6% to 15% by mass, still more preferably 8% to 10% by mass, of the total mass of a liquid crystal composition of the present invention.

The compound(s) represented by the general formula (IX-2-3) is/are preferably at least one compound selected from a compound group represented by the formulae (32.1) to (32.4) or a compound represented by the formula (32.2) and/or a compound represented by the formula (32.4).

[Chem. 216]

(32.1)

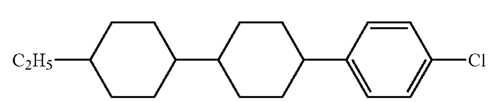

-continued (32.2)

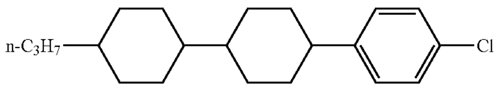

(32.3)

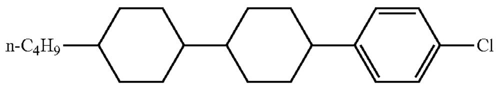

(32.4)

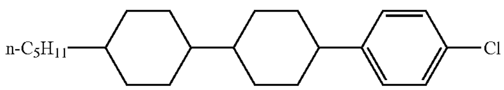

Alternatively, or in addition, the compound(s) represented by the general formula (IX-2) is/are preferably a compound or compounds represented by the general formula (IX-2-4).

[Chem. 217]

(IX-2-4)

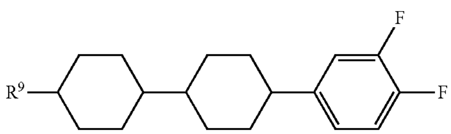

In the general formula (IX-2-4), $R^9$ denotes an alkyl group having 1 to 5 carbon atoms, an alkenyl group having 2 to 5 carbon atoms, or an alkoxy group having 1 to 4 carbon atoms.

In consideration of solubility at low temperatures, transition temperature, and electrical reliability, the amount of the compound(s) represented by the general formula (IX-2-4) preferably ranges from 1% to 30% by mass, more preferably 3% to 20% by mass, still more preferably 6% to 15% by mass, particularly preferably 8% to 10% by mass, of the total mass of a liquid crystal composition of the present invention.

The compound(s) represented by the general formula (IX-2-4) is/are preferably at least one compound selected from a compound group represented by the formulae (33.1) to (33.6) or a compound represented by the formula (33.1) and/or a compound represented by the formula (33.3).

[Chem. 218]

(33.1)

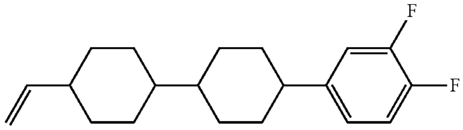

(33.2)

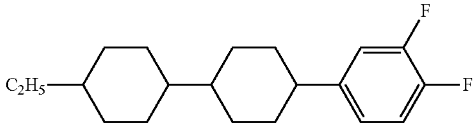

-continued (33.3)

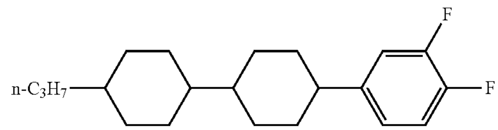

(33.4)

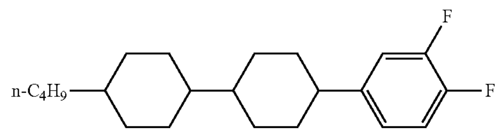

(33.5)

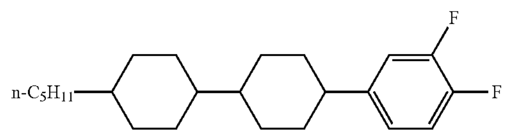

(33.6)

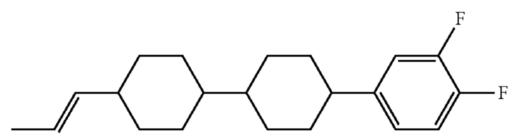

Alternatively, or in addition, the compound(s) represented by the general formula (IX-2) is/are preferably a compound or compounds represented by the general formula (IX-2-5).

[Chem. 219]

(IX-2-5)

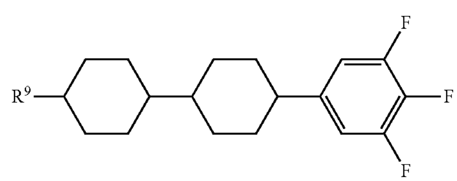

In the general formula (IX-2-5), $R^9$ denotes an alkyl group having 1 to 5 carbon atoms, an alkenyl group having 2 to 5 carbon atoms, or an alkoxy group having 1 to 4 carbon atoms.

Although compounds of any types may be combined, compounds are appropriately combined in each embodiment in consideration of solubility at low temperatures, transition temperature, electrical reliability, and birefringence index. For example, one compound is used in one embodiment of the present invention, two compounds are combined in another embodiment, three compounds are combined in still another embodiment, and at least four compounds are combined in still another embodiment.

The amount of the compound(s) represented by the general formula (IX-2-5) is appropriately adjusted in each embodiment in consideration of characteristics such as solubility at low temperatures, transition temperature, electrical reliability, and birefringence index.

For example, the amount of the compound(s) represented by the general formula (IX-2-5) based on the total mass of a liquid crystal composition of the present invention ranges from 1% to 30% by mass in one embodiment of the present invention, 2% to 25% by mass in another embodiment, 5% to 25% by mass in still another embodiment, 5% to 20% by mass in still another embodiment, 5% to 8% by mass in still another embodiment, 8% to 20% by mass in still another embodiment, 1% to 10% by mass in still another embodiment, or 1% to 4% by mass in still another embodiment.

When a liquid crystal composition according to the present invention having low viscosity and a high response speed is desired, the lower limit is preferably decreased, and the upper limit is preferably decreased. When a liquid crystal composition according to the present invention having high Tni and resistance to burn-in is desired, the lower limit is preferably decreased, and the upper limit is preferably decreased. When the anisotropy of dielectric constant is increased in order to maintain a low driving voltage, the lower limit is preferably increased, and the upper limit is preferably increased.

The compound(s) represented by the general formula (IX-2-5) is/are preferably at least one compound selected from a compound group represented by the formulae (34.1) to (34.7), more preferably a compound or compounds represented by the formula(e) (34.1), (34.2), (34.3) and/or (34.5).

[Chem. 220]

(34.1)

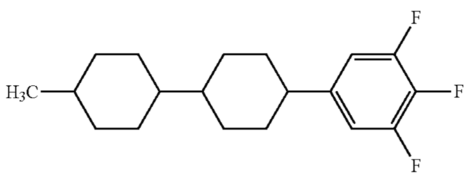

(34.2)

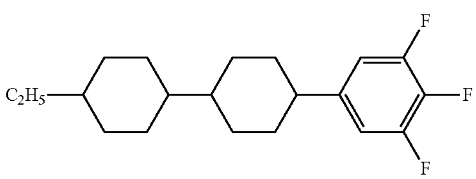

(34.3)

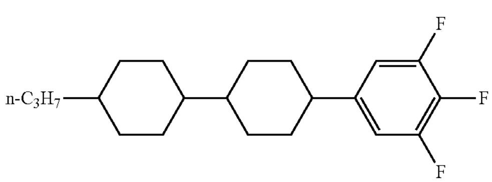

(34.4)

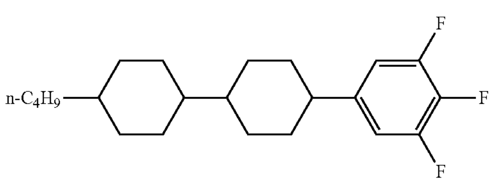

(34.5)

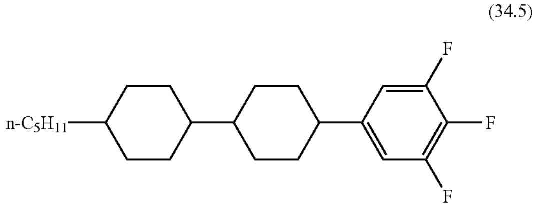

-continued (34.6)

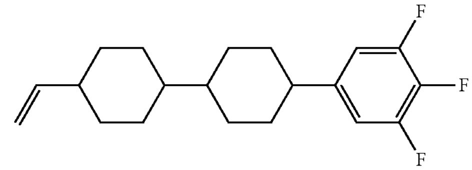

(34.7)

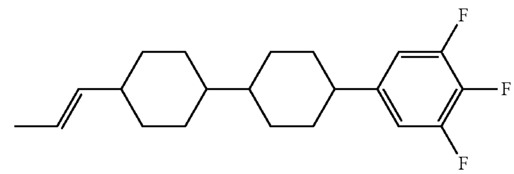

Alternatively, or in addition, the compound(s) represented by the general formula (IX) is/are preferably a compound or compounds represented by the general formula (IX-3).

[Chem. 221]

(IX-3)

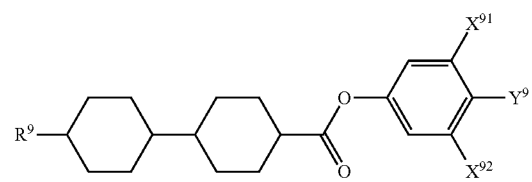

In the general formula (IX-3), $R^9$ denotes an alkyl group having 1 to 5 carbon atoms, an alkenyl group having 2 to 5 carbon atoms, or an alkoxy group having 1 to 4 carbon atoms, $X^{91}$ and $X^{92}$ independently denote a hydrogen atom or a fluorine atom, and $Y^9$ denotes a fluorine atom, a chlorine atom, or —$OCF_3$.

The compound(s) represented by the general formula (IX-3) is/are preferably a compound or compounds represented by the general formula (IX-3-1).

[Chem. 222]

(IX-3-1)

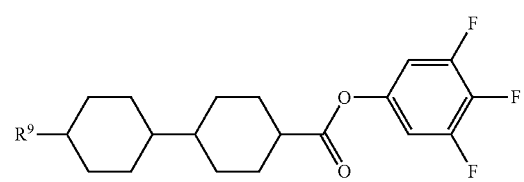

In the general formula (IX-3-1), $R^9$ denotes an alkyl group having 1 to 5 carbon atoms, an alkenyl group having 2 to 5 carbon atoms, or an alkoxy group having 1 to 4 carbon atoms.

Although compounds of any types may be combined, one or two compounds are preferably combined in consideration of solubility at low temperatures, transition temperature, electrical reliability, and birefringence index.

In consideration of solubility at low temperatures, transition temperature, and electrical reliability, the amount of the compound(s) represented by the general formula (IX-3-

1) preferably ranges from 3% to 30% by mass, 7% to 30% by mass, 13% to 20% by mass, or 15% to 18% by mass of the total mass of a liquid crystal composition of the present invention.

The compound(s) represented by the general formula (IX-3-1) is/are preferably at least one compound selected from a compound group represented by the formulae (35.1) to (35.4) or a compound represented by the formula (35.1) and/or a compound represented by the formula (35.2).

[Chem. 223]

(35.1)

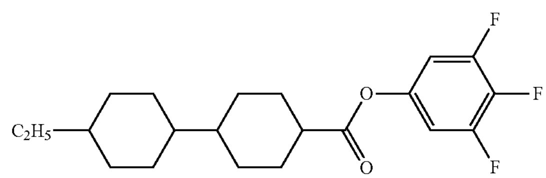

(35.2)

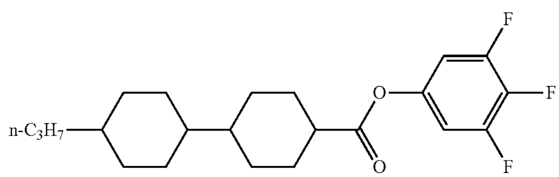

(35.3)

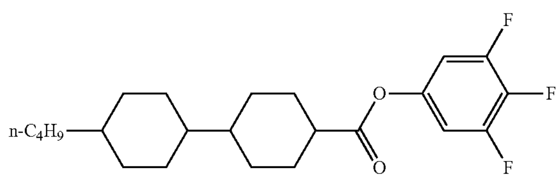

(35.4)

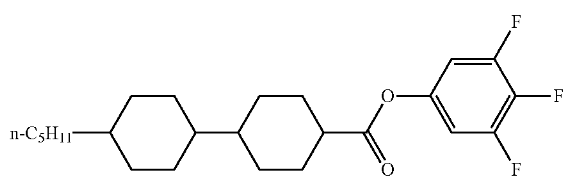

Alternatively, or in addition, the compound(s) represented by the general formula (M) is/are preferably a compound or compounds represented by the general formula (X)

[Chem. 224]

(X)

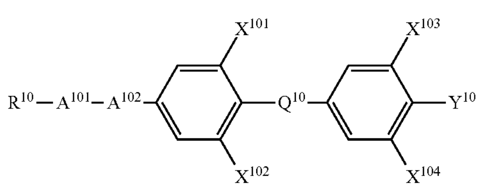

In the general formula (X), $X^{101}$ to $X^{104}$ independently denote a fluorine atom or a hydrogen atom, $Y^{10}$ denotes a fluorine atom, a chlorine atom, or —$OCF_3$, $Q^{10}$ denotes a single bond or —$CF_2O$—, $R^{10}$ denotes an alkyl group having 1 to 5 carbon atoms, an alkenyl group having 2 to 5 carbon atoms, or an alkoxy group having 1 to 4 carbon atoms, and $A^{101}$ and $A^{102}$ independently denote a 1,4-cyclohexylene group, a 1,4-phenylene group, or one of groups represented by the following formulae. A hydrogen atom of the 1,4-phenylene group may be substituted with a fluorine atom.

[Chem. 225]

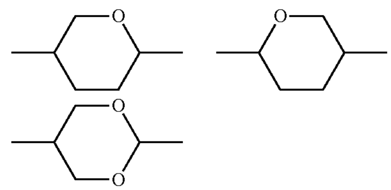

Although any compounds may be combined, compounds are appropriately combined in consideration of solubility at low temperatures, transition temperature, electrical reliability, and birefringence index. For example, one compound is used in one embodiment of the present invention. Alternatively, two compounds are used in another embodiment of the present invention. Alternatively, three compounds are used in still another embodiment. Alternatively, four compounds are used in still another embodiment. Alternatively, at least five compounds are used in still another embodiment.

The amount of the compound(s) represented by the general formula (X) is appropriately adjusted in each embodiment in consideration of characteristics such as solubility at low temperatures, transition temperature, electrical reliability, and birefringence index. For example, the amount of the compound(s) represented by the general formula (X) based on the total mass of a liquid crystal composition of the present invention ranges from 2% to 45% by mass in one embodiment of the present invention, 3% to 45% by mass in another embodiment, 6% to 45% by mass in still another embodiment, 8% to 45% by mass in still another embodiment, 9% to 45% by mass in still another embodiment, 11% to 45% by mass in still another embodiment, 12% to 45% by mass in still another embodiment, 18% to 45% by mass in still another embodiment, 19% to 45% by mass in still another embodiment, 23% to 45% by mass in still another embodiment, or 25% to 45% by mass in still another embodiment.

For example, the amount of the compound(s) represented by the general formula (X) based on the total mass of a liquid crystal composition of the present invention ranges from 2% to 35% by mass in one embodiment of the present invention, 2% to 30% by mass in another embodiment, 2% to 25% by mass in still another embodiment, 2% to 20% by mass in still another embodiment, 2% to 13% by mass in still another embodiment, 2% to 9% by mass in still another embodiment, 2% to 6% by mass in still another embodiment, or 2% to 3% by mass in still another embodiment.

When a liquid crystal composition according to the present invention having low viscosity and a high response speed is desired, the lower limit is preferably decreased, and the upper limit is preferably decreased. When a liquid crystal composition having resistance to burn-in is desired, the lower limit is preferably decreased, and the upper limit is preferably decreased. When the anisotropy of dielectric constant is increased in order to maintain a low driving voltage, the lower limit is preferably increased, and the upper limit is preferably increased.

The compound(s) represented by the general formula (X) for use in a liquid crystal composition according to the present invention is/are preferably a compound or compounds represented by the general formula (X-1).

[Chem. 226]

(X-1)

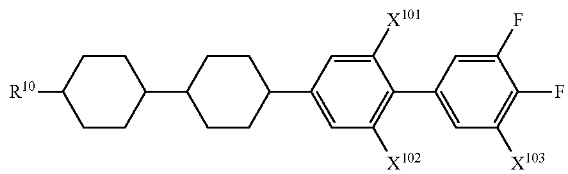

In the general formula (X-1), $X^{101}$ to $X^{103}$ independently denote a fluorine atom or a hydrogen atom, and $R^{10}$ denotes an alkyl group having 1 to 5 carbon atoms, an alkenyl group having 2 to 5 carbon atoms, or an alkoxy group having 1 to 4 carbon atoms.

Although any compounds may be combined, compounds are appropriately combined in each embodiment in consideration of solubility at low temperatures, transition temperature, electrical reliability, and birefringence index. For example, one compound is used in one embodiment of the present invention. Alternatively, two compounds are used in another embodiment of the present invention. Alternatively, three compounds are used in still another embodiment. Alternatively, four compounds are used in still another embodiment. Alternatively, at least five compounds are used in still another embodiment.

The amount of the compound(s) represented by the general formula (X-1) is appropriately adjusted in consideration of characteristics such as solubility at low temperatures, transition temperature, electrical reliability, and birefringence index.

For example, the amount of the compound(s) represented by the general formula (X-1) based on the total mass of a liquid crystal composition of the present invention ranges from 2% to 40% by mass in one embodiment of the present invention, 3% to 40% by mass in another embodiment, 5% to 40% by mass in still another embodiment, 6% to 40% by mass in still another embodiment, 7% to 40% by mass in still another embodiment, 8% to 40% by mass in still another embodiment, 9% to 40% by mass in still another embodiment, 13% to 40% by mass in still another embodiment, 18% to 40% by mass in still another embodiment, or 23% to 40% by mass in still another embodiment.

For example, the amount of the compound(s) represented by the general formula (X-1) based on the total mass of a liquid crystal composition of the present invention ranges from 2% to 30% by mass in one embodiment of the present invention, 2% to 25% by mass in another embodiment, 2% to 20% by mass in still another embodiment, 2% to 15% by mass in still another embodiment, 2% to 10% by mass in still another embodiment, 2% to 6% by mass in still another embodiment, or 2% to 4% by mass in still another embodiment.

The compound(s) represented by the general formula (X-1) for use in a liquid crystal composition according to the present invention is/are preferably a compound or compounds represented by the general formula (X-1-1).

[Chem. 227]

(X-1-1)

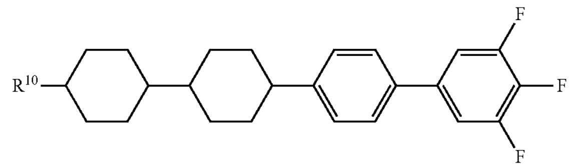

In the general formula (X-1-1), $R^{10}$ denotes an alkyl group having 1 to 5 carbon atoms, an alkenyl group having 2 to 5 carbon atoms, or an alkoxy group having 1 to 4 carbon atoms.

Although any compounds may be combined, compounds are appropriately combined in consideration of solubility at low temperatures, transition temperature, electrical reliability, and birefringence index. For example, one compound is used in one embodiment of the present invention. Alternatively, two compounds are used in another embodiment of the present invention. Alternatively, three compounds are used in still another embodiment. Alternatively, at least four compounds are used in still another embodiment.

The amount of the compound(s) represented by the general formula (X-1-1) is appropriately adjusted in consideration of characteristics such as solubility at low temperatures, transition temperature, electrical reliability, and birefringence index.

For example, the amount of the compound(s) represented by the general formula (X-1-1) based on the total mass of a liquid crystal composition of the present invention ranges from 3% to 30% by mass in one embodiment of the present invention, 4% to 30% by mass in another embodiment, 6% to 30% by mass in still another embodiment, 9% to 30% by mass in still another embodiment, 12% to 30% by mass in still another embodiment, 15% to 30% by mass in still another embodiment, 18% to 30% by mass in still another embodiment, or 21% to 30% by mass in still another embodiment.

For example, the amount of the compound(s) represented by the general formula (X-1-1) based on the total mass of a liquid crystal composition of the present invention ranges from 3% to 20% by mass in one embodiment of the present invention, 3% to 13% by mass in another embodiment, 3% to 10% by mass in still another embodiment, or 3% to 7% by mass in still another embodiment.

More specifically, the compound(s) represented by the general formula (X-1-1) for use in a liquid crystal composition according to the present invention is/are preferably at least one compound selected from a compound group represented by the formulae (36.1) to (36.4), particularly preferably a compound represented by the formula (36.1) and/or a compound represented by the formula (36.2).

[Chem. 228]

(36.1)

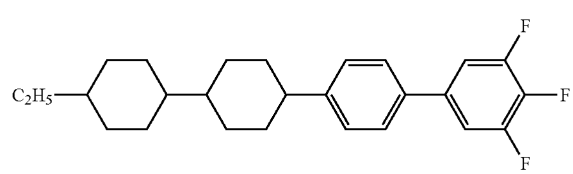

-continued (36.2)

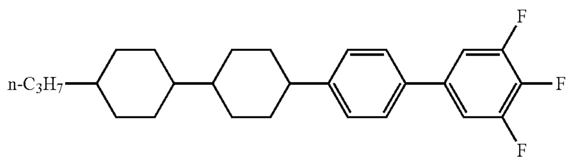

(36.3)

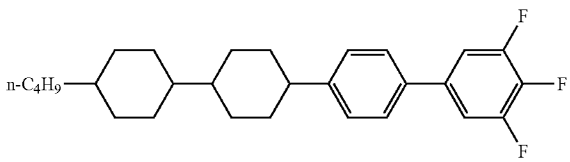

(36.4)

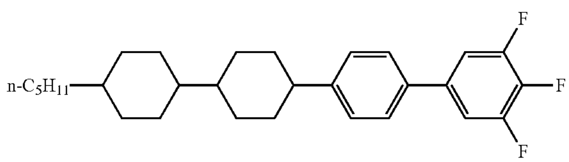

Alternatively, or in addition, the compound(s) represented by the general formula (X-1) for use in a liquid crystal composition according to the present invention is/are preferably a compound or compounds represented by the general formula (X-1-2).

[Chem. 229]

(X-1-2)

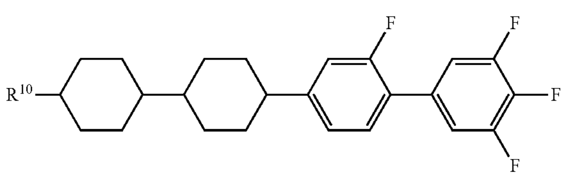

In the general formula (X-1-2), $R^{10}$ denotes an alkyl group having 1 to 5 carbon atoms, an alkenyl group having 2 to 5 carbon atoms, or an alkoxy group having 1 to 4 carbon atoms.

The amount of the compound(s) represented by the general formula (X-1-2) is appropriately adjusted in consideration of solubility at low temperatures, transition temperature, and electrical reliability.

For example, the amount of the compound(s) represented by the general formula (X-1-2) based on the total mass of a liquid crystal composition of the present invention ranges from 1% to 20% by mass in one embodiment of the present invention, 1% to 15% by mass in another embodiment, 1% to 10% by mass in still another embodiment, 1% to 6% by mass in still another embodiment, 1% to 4% by mass in still another embodiment, or 1% to 3% by mass in still another embodiment.

For example, the amount of the compound(s) represented by the general formula (X-1-2) based on the total mass of a liquid crystal composition of the present invention ranges from 3% to 10% by mass in one embodiment of the present invention, 4% to 10% by mass in another embodiment, or 6% to 10% by mass in still another embodiment.

More specifically, the compound(s) represented by the general formula (X-1-2) for use in a liquid crystal composition according to the present invention is/are preferably at least one compound selected from a compound group represented by the formulae (37.1) to (37.4), particularly preferably a compound represented by the formula (37.2).

[Chem. 230]

(37.1)

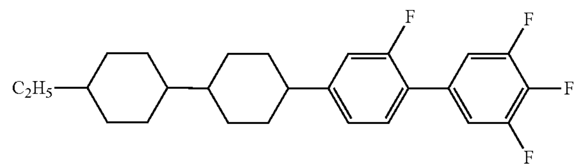

(37.2)

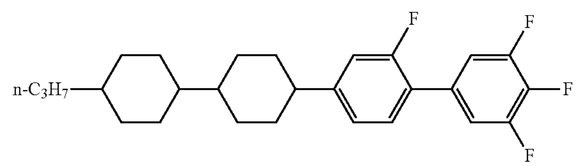

(37.3)

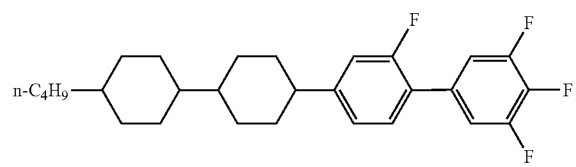

(37.4)

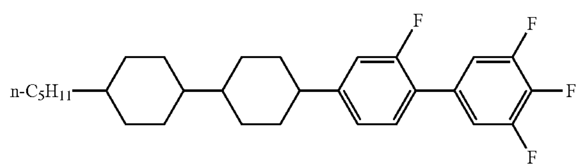

Alternatively, or in addition, the compound(s) represented by the general formula (X-1) for use in a liquid crystal composition according to the present invention is/are preferably a compound or compounds represented by the general formula (X-1-3)

[Chem. 231]

(X-1-3)

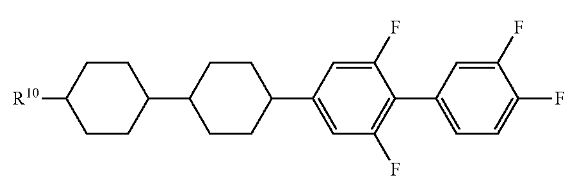

In the general formula (X-1-3), $R^{10}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably combined in consideration of solubility at low temperatures, transition temperature, electrical reliability, and birefringence index.

The amount of the compound(s) represented by the general formula (X-1-3) is appropriately adjusted in consideration of solubility at low temperatures, transition temperature, and electrical reliability.

For example, the amount of the compound(s) represented by the general formula (X-1-3) based on the total mass of a liquid crystal composition of the present invention ranges from 1% to 20% by mass in one embodiment of the present invention, 1% to 15% by mass in another embodiment, 1% to 10% by mass in still another embodiment, 1% to 8% by mass in still another embodiment, or 1% to 5% by mass in still another embodiment.

For example, the amount of the compound(s) represented by the general formula (X-1-3) based on the total mass of a liquid crystal composition of the present invention ranges from 3% to 20% by mass in one embodiment of the present invention, 5% to 20% by mass in another embodiment, or 5% to 15% by mass in still another embodiment.

More specifically, the compound(s) represented by the general formula (X-1-3) for use in a liquid crystal composition according to the present invention is/are preferably at least one compound selected from a compound group represented by the formulae (38.1) to (38.4), particularly preferably a compound represented by the formula (38.2).

[Chem. 232]

(38.1)

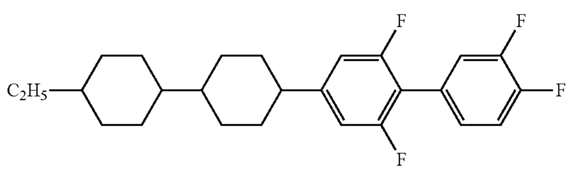

(38.2)

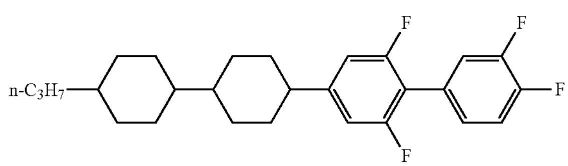

(38.3)

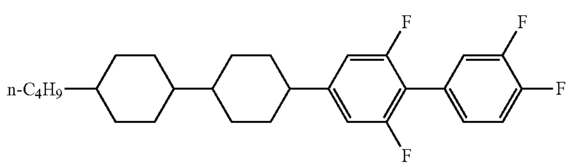

(38.4)

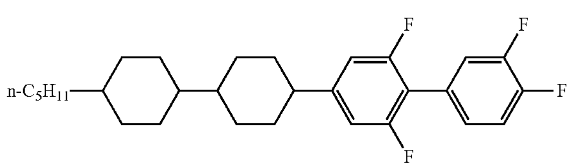

The amount of the compound represented by the formula (38.2) in a liquid crystal composition according to the present invention preferably ranges from 1% to 20% by mass, 1% by mass 15% or less by mass, 1% to 10% by mass, 1% to 8% by mass, 3% to 5% by mass, or 4% to 5% by mass of the total mass of the liquid crystal composition.

Alternatively, or in addition, the compound(s) represented by the general formula (X) for use in a liquid crystal composition according to the present invention is/are preferably a compound or compounds represented by the general formula (X-2).

[Chem. 233]

(X-2)

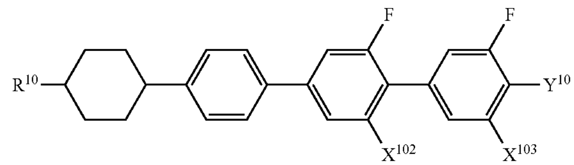

In the general formula (X-2), $X^{102}$ and $X^{103}$ independently denote a fluorine atom or a hydrogen atom, $Y^{10}$ denotes a fluorine atom, a chlorine atom, or —$OCF_3$, and $R^{10}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably combined in consideration of solubility at low temperatures, transition temperature, electrical reliability, and birefringence index.

The compound(s) represented by the general formula (X-2) for use in a liquid crystal composition according to the present invention is/are preferably a compound or compounds represented by the general formula (X-2-1).

[Chem. 234]

(X-2-1)

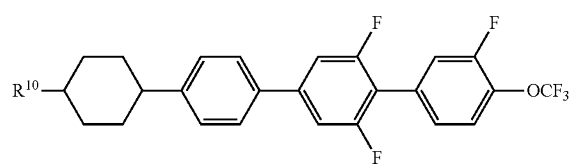

In the general formula (X-2-1), $R^{10}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably combined, and three or more compounds are more preferably combined, in consideration of solubility at low temperatures, transition temperature, electrical reliability, and birefringence index.

In consideration of solubility at low temperatures, transition temperature, and electrical reliability, the amount of the compound(s) represented by the general formula (X-2-1) preferably ranges from 1% to 20% by mass, 1% to 16% by mass, 1% to 12% by mass, or 1% to 10% by mass of the total mass of a liquid crystal composition of the present invention. Among these, the amount of the compound(s) represented by the general formula (X-2-1) preferably ranges from 1% to 5% by mass, 1% to 3% by mass, 5% to 10% by mass, or 6% to 9% by mass of the total mass of a liquid crystal composition of the present invention.

More specifically, the compound(s) represented by the general formula (X-2-1) for use in a liquid crystal composition according to the present invention is/are preferably at least one compound selected from a compound group represented by the formulae (39.1) to (39.4), particularly preferably a compound represented by the formula (39.2).

[Chem. 235]

(39.1)

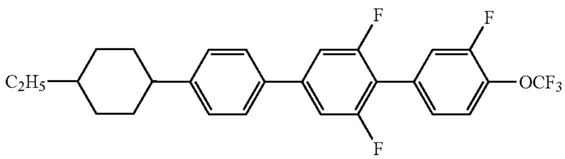

(39.2)

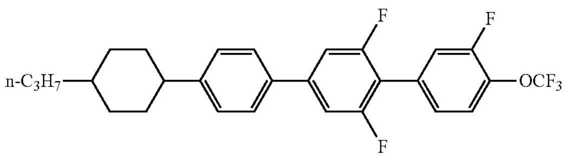

(39.3)

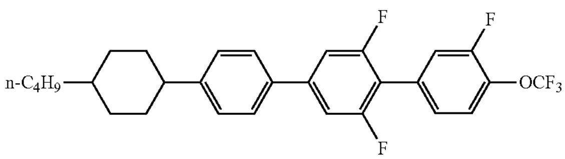

(39.4)

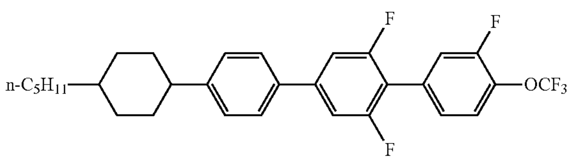

The amount of the compound represented by the formula (39.2) in a liquid crystal composition according to the present invention preferably ranges from 1% to 20% by mass, 1% by mass 16% or less by mass, 1% to 12% by mass, or 3% to 10% by mass of the total mass of the liquid crystal composition. Among these, the amount of the compound(s) represented by the general formula (39.2) preferably ranges from 1% to 5% by mass, 1% to 3% by mass, 5% to 10% by mass, or 6% to 9% by mass of the total mass of a liquid crystal composition of the present invention.

Alternatively, or in addition, the compound(s) represented by the general formula (X-2) for use in a liquid crystal composition according to the present invention is/are preferably a compound or compounds represented by the general formula (X-2-2).

[Chem. 236]

(X-2-2)

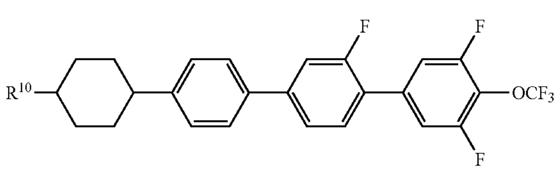

In the general formula (X-2-2), $R^{10}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably combined in consideration of solubility at low temperatures, transition temperature, electrical reliability, and birefringence index.

In consideration of solubility at low temperatures, transition temperature, and electrical reliability, the amount of the compound(s) represented by the general formula (X-2-2) preferably ranges from 3% to 20% by mass, 6% to 16% by mass, 9% to 12% by mass, or 9% to 10% by mass of the total mass of a liquid crystal composition of the present invention.

More specifically, the compound(s) represented by the general formula (X-2-2) for use in a liquid crystal composition according to the present invention is/are preferably at least one compound selected from a compound group represented by the formulae (40.1) to (40.4), particularly preferably a compound represented by the formula (40.2).

[Chem. 237]

(40.1)

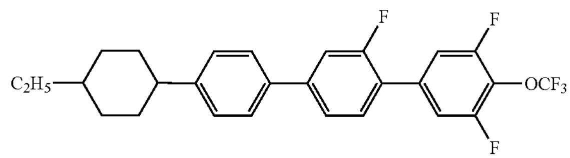

(40.2)

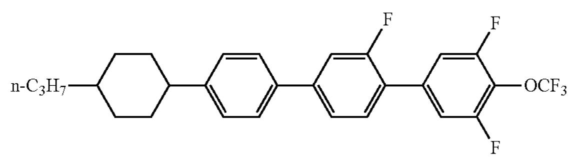

(40.3)

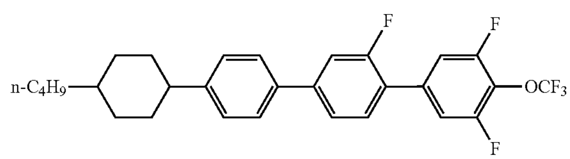

(40.4)

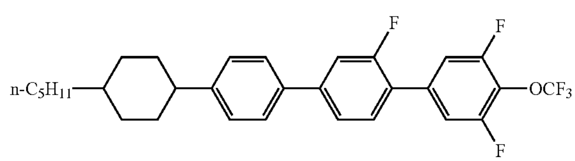

Alternatively, or in addition, the compound(s) represented by the general formula (X) is/are preferably a compound or compounds represented by the general formula (X-3).

[Chem. 238]

(X-3)

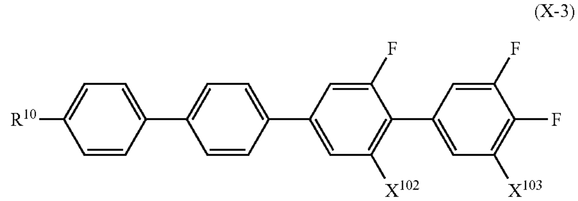

In the general formula (X-3), $X^{102}$ and $X^{103}$ independently denote a fluorine atom or a hydrogen atom, and $R^{10}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably combined in consideration of solubility at low temperatures, transition temperature, electrical reliability, and birefringence index.

The compound(s) represented by the general formula (X-3) for use in a liquid crystal composition according to the present invention is/are preferably a compound or compounds represented by the general formula (X-3-1).

[Chem. 239]

(X-3-1)

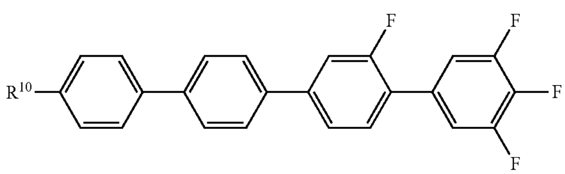

In the general formula (X-3-1), $R^{10}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably combined in consideration of solubility at low temperatures, transition temperature, electrical reliability, and birefringence index.

The amount of the compound(s) represented by the general formula (X-3-1) is appropriately adjusted in consideration of solubility at low temperatures, transition temperature, and electrical reliability.

For example, the amount of the compound(s) represented by the general formula (X-3-1) based on the total mass of a liquid crystal composition of the present invention ranges from 1% to 10% by mass in one embodiment of the present invention, 1% to 8% by mass in another embodiment, 1% to 6% by mass in still another embodiment, 1% to 4% by mass in still another embodiment, or 1% to 2% by mass in still another embodiment.

More specifically, the compound(s) represented by the general formula (X-3-1) for use in a liquid crystal composition according to the present invention is/are preferably at least one compound selected from a compound group represented by the formulae (41.1) to (41.4), particularly preferably a compound represented by the formula (41.2).

[Chem. 240]

(41.1)

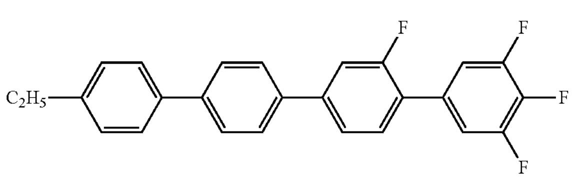

-continued (41.2)

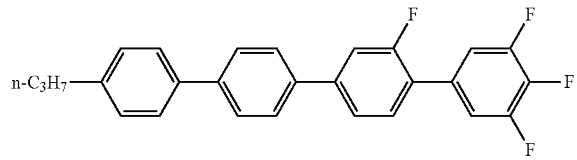

(41.3)

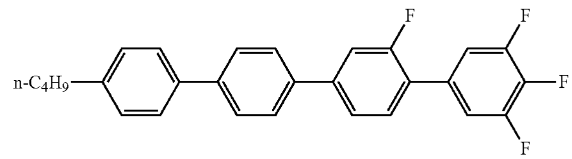

(41.4)

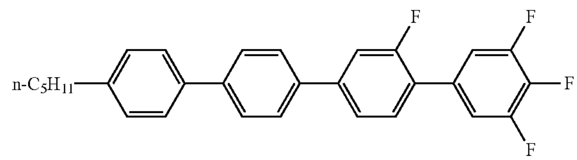

Alternatively, or in addition, the compound(s) represented by the general formula (X) is/are preferably a compound or compounds represented by the general formula (X-4).

[Chem. 241]

(X-4)

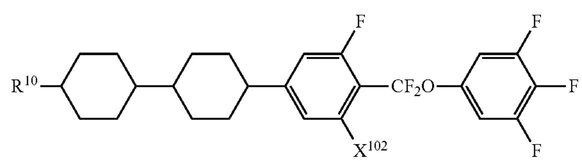

In the general formula (X-4), $X^{102}$ denotes a fluorine atom or a hydrogen atom, and $R^{10}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably combined, and three or more compounds are more preferably combined, in consideration of solubility at low temperatures, transition temperature, electrical reliability, and birefringence index.

The compound(s) represented by the general formula (X-4) for use in a liquid crystal composition according to the present invention is/are preferably a compound or compounds represented by the general formula (X-4-1).

[Chem. 242]

(X-4-1)

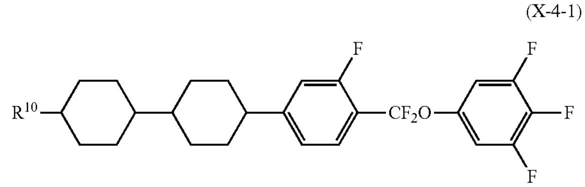

In the general formula (X-4-1), $R^{10}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably combined, and three or more compounds are more preferably combined, in consideration of solubility at low temperatures, transition temperature, electrical reliability, and birefringence index.

The amount of the compound(s) represented by the general formula (X-4-1) is appropriately adjusted in consideration of solubility at low temperatures, transition temperature, and electrical reliability.

The amount of the compound(s) represented by the general formula (X-4-1) preferably ranges from 2% to 20% by mass, 5% to 17% by mass, 10% to 15% by mass, or 10% to 13% by mass of the total mass of a liquid crystal composition of the present invention.

More specifically, the compound(s) represented by the general formula (X-4-1) for use in a liquid crystal composition according to the present invention is/are preferably at least one compound selected from a compound group represented by the formulae (42.1) to (42.4), particularly preferably a compound represented by the formula (42.3).

[Chem. 243]

(42.1)

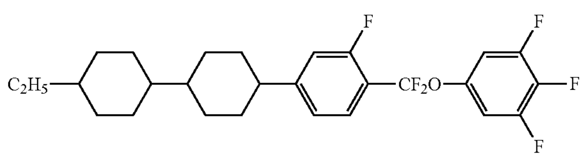

(42.2)

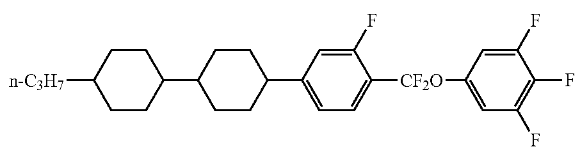

(42.3)

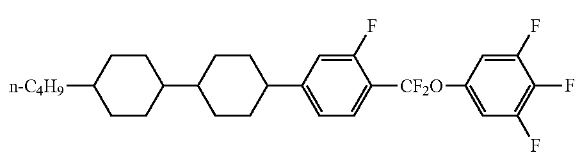

(42.4)

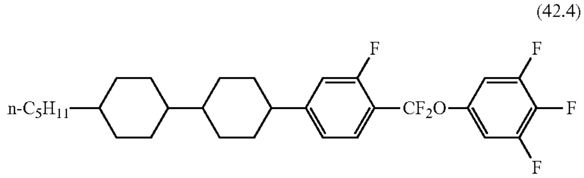

The compound(s) represented by the general formula (X-4) for use in a liquid crystal composition according to the present invention is/are preferably a compound or compounds represented by the general formula (X-4-4).

[Chem. 244]

(X-4-4)

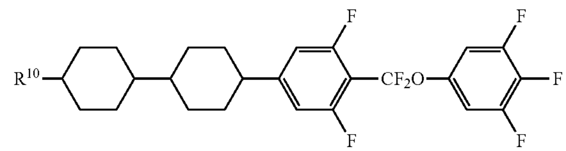

In the general formula (X-4-4), $R^{10}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably combined, and three or more compounds are more preferably combined, in consideration of solubility at low temperatures, transition temperature, electrical reliability, and birefringence index.

The amount of the compound(s) represented by the general formula (X-4-4) is appropriately adjusted in consideration of solubility at low temperatures, transition temperature, and electrical reliability.

The amount of the compound(s) represented by the general formula (X-4-4) preferably ranges from 2% to 20% by mass, 5% to 17% by mass, 10% to 15% by mass, or 10% to 13% by mass of the total mass of a liquid crystal composition of the present invention.

More specifically, the compound(s) represented by the general formula (X-4-4) for use in a liquid crystal composition according to the present invention is/are preferably at least one compound selected from a compound group represented by the formulae (42.31) to (42.34), particularly preferably a compound represented by the formula (42.33).

[Chem. 245]

(42.31)

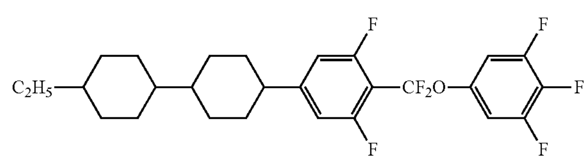

(42.32)

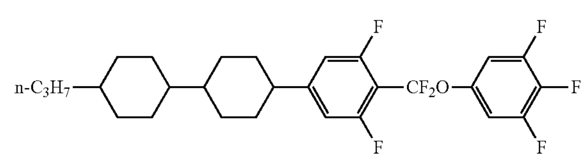

(42.33)

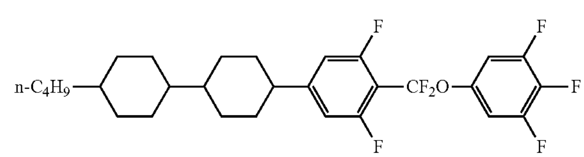

(42.34)

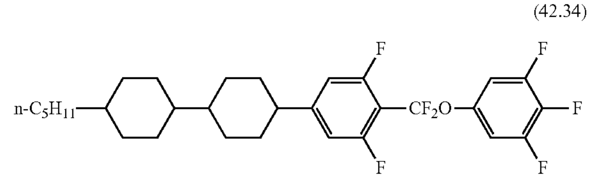

Alternatively, or in addition, the compound(s) represented by the general formula (X) for use in a liquid crystal composition according to the present invention is/are preferably a compound or compounds represented by the general formula (X-4-2).

[Chem. 246]

(X-4-2)

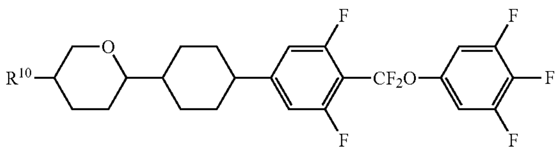

In the general formula (X-4-2), $R^{10}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably combined, and three or more compounds are more preferably combined, in consideration of solubility at low temperatures, transition temperature, electrical reliability, and birefringence index.

In consideration of solubility at low temperatures, transition temperature, and electrical reliability, the amount of the compound(s) represented by the general formula (X-4-2) preferably ranges from 2% to 20% by mass, 5% to 17% by mass, 10% to 15% by mass, or 10% to 13% by mass of the total mass of a liquid crystal composition of the present invention.

More specifically, the compound(s) represented by general formula (X-4-2) for use in a liquid crystal composition according to the present invention is/are preferably at least one compound selected from a compound group represented by the formulae (42.11) to (42.14), more preferably a compound represented by the formula (42.13) and/or a compound represented by the formula (42.14).

[Chem. 247]

(42.11)

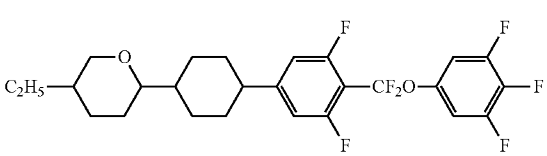

(42.12)

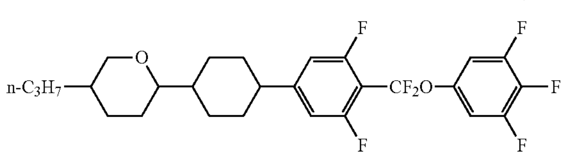

(42.13)

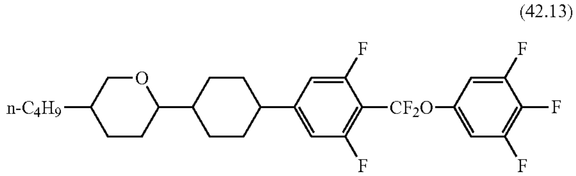

-continued (42.14)

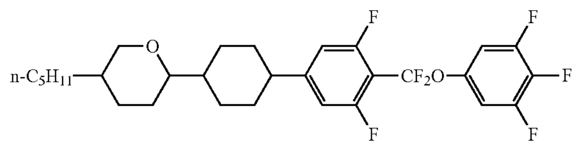

Alternatively, or in addition, the compound(s) represented by the general formula (X) for use in a liquid crystal composition according to the present invention is/are preferably a compound or compounds represented by the general formula (X-4-3).

[Chem. 248]

(X-4-3)

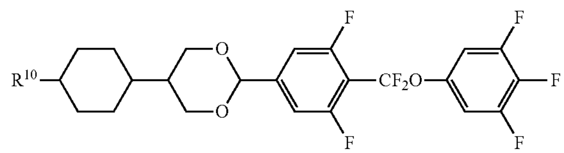

In the general formula (X-4-3), $R^{10}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably combined, and three or more compounds are more preferably combined, in consideration of solubility at low temperatures, transition temperature, electrical reliability, and birefringence index.

In consideration of solubility at low temperatures, transition temperature, and electrical reliability, the amount of the compound(s) represented by the general formula (X-4-3) preferably ranges from 2% to 20% by mass, 5% to 17% by mass, 10% to 15% by mass, or 10% to 13% by mass of the total mass of a liquid crystal composition of the present invention.

More specifically, the compound(s) represented by the general formula (X-4-3) for use in a liquid crystal composition according to the present invention is/are preferably at least one compound selected from a compound group represented by the formulae (42.21) to (42.24), more preferably a compound represented by the formula (42.22).

[Chem. 249]

(42.21)

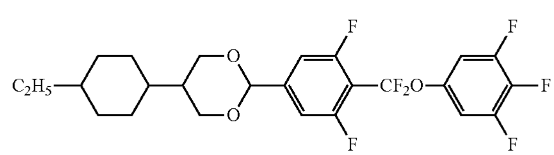

(42.22)

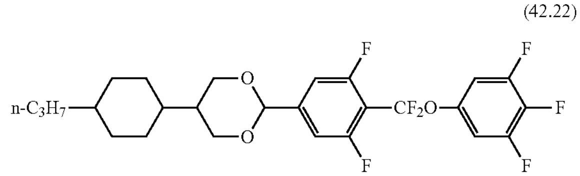

-continued (42.23)

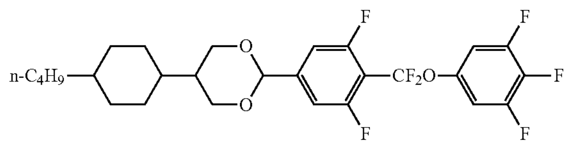

(42.24)

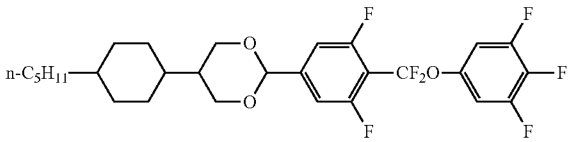

Alternatively, or in addition, the compound(s) represented by the general formula (X) is/are preferably a compound or compounds represented by the general formula (X-5).

[Chem. 250]

(X-5)

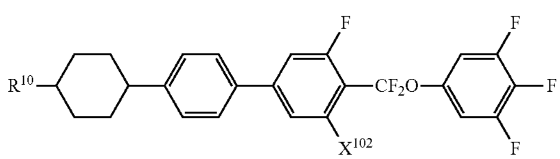

In the general formula (X-5), $X^{102}$ denotes a fluorine atom or a hydrogen atom, and $R^{10}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably combined, and three or more compounds are more preferably combined, in consideration of solubility at low temperatures, transition temperature, electrical reliability, and birefringence index.

The compound(s) represented by the general formula (X-5) is/are preferably a compound or compounds represented by the general formula (X-5-1).

[Chem. 251]

(X-5-1)

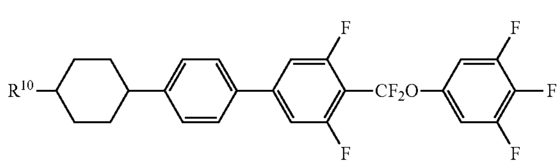

In the general formula (X-5-1), $R^{10}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably combined, and three or more compounds are more preferably combined, in consideration of solubility at low temperatures, transition temperature, electrical reliability, and birefringence index.

More specifically, the compound(s) represented by the general formula (X-5-1) is/are preferably at least one compound selected from a compound group represented by the formulae (43.1) to (43.4), particularly preferably a compound represented by the formula (43.2).

[Chem. 252]

(43.1)

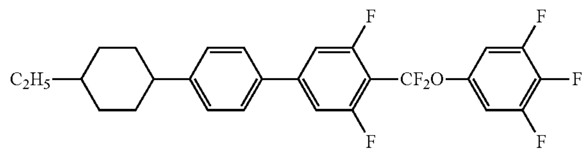

(43.2)

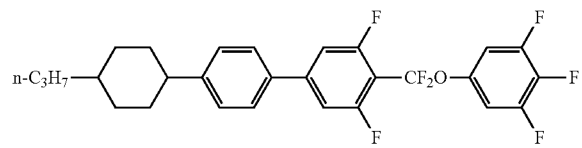

(43.3)

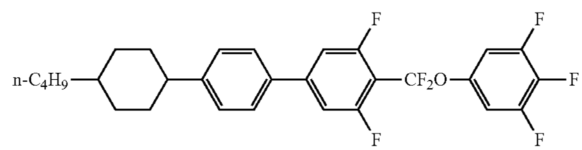

(43.4)

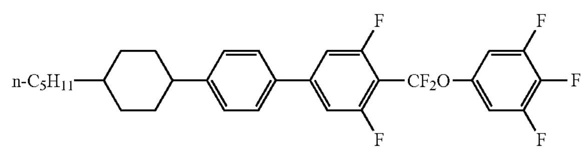

Alternatively, or in addition, the compound(s) represented by the general formula (X) is/are preferably a compound or compounds represented by the general formula (X-6).

[Chem. 253]

(X-6)

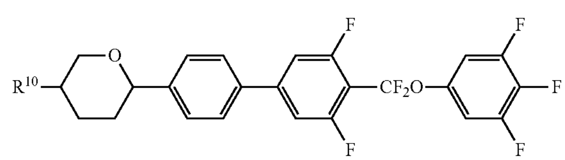

In the general formula (X-6), $R^{10}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably combined in consideration of solubility at low temperatures, transition temperature, electrical reliability, and birefringence index.

The amount of the compound(s) represented by the general formula (X-6) is appropriately adjusted in consideration of characteristics such as solubility at low temperatures, transition temperature, electrical reliability, and birefringence index.

For example, the amount of the compound(s) represented by the general formula (X-6) based on the total mass of a liquid crystal composition of the present invention ranges from 1% to 30% by mass in one embodiment of the present invention, 1% to 25% by mass in another embodiment, 1% to 20% by mass in still another embodiment, 1% to 15% by mass in still another embodiment, 2% to 14% by mass in still another embodiment, 2% to 12% by mass in still another embodiment, 2% to 9% by mass in still another embodiment, 2% to 8% by mass in still another embodiment, 2% to 6% by mass in still another embodiment, 2% to 5% by mass in still another embodiment, 3% to 14% by mass in still another embodiment, 5% to 14% by mass in still another embodiment, 7% to 14% by mass in still another embodiment, 8% to 14% by mass in still another embodiment, 9% to 14% by mass in still another embodiment, 9% to 12% by mass in still another embodiment, 3% to 8% by mass in still another embodiment, 3% to 6% by mass in still another embodiment, 4% to 7% by mass in still another embodiment, 4% to 5% by mass in still another embodiment, 5% to 8% by mass in still another embodiment, 5% to 6% by mass in still another embodiment, 7% to 8% by mass in still another embodiment, or 8% to 9% by mass in still another embodiment.

More specifically, the compound(s) represented by the general formula (X-6) is/are preferably at least one compound selected from a compound group represented by the formulae (44.1) to (44.4), particularly preferably a compound represented by the formula (44.1) and/or a compound represented by the formula (44.2).

[Chem. 254]

(44.1)

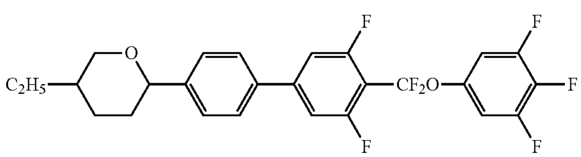

(44.2)

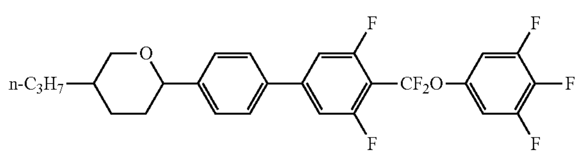

(44.3)

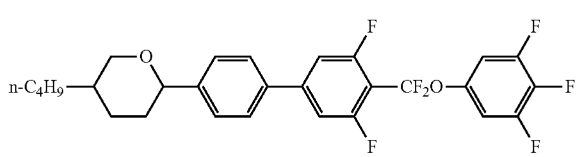

(44.4)

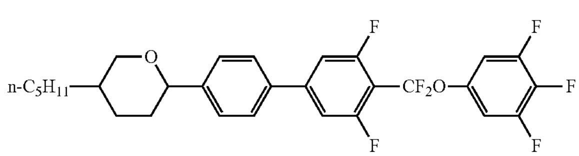

A liquid crystal compound according to the present invention may contain a compound represented by the general formula (X'-7), which is similar to a compound represented by the general formula (X), as a compound represented by the general formula (M).

[Chem. 255]

(X'-7)

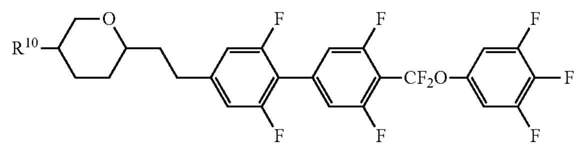

In the general formula (X'-7), $R^{10}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably combined in consideration of solubility at low temperatures, transition temperature, electrical reliability, and birefringence index.

The amount of the compound(s) represented by the general formula (X'-7) is appropriately adjusted in consideration of characteristics such as solubility at low temperatures, transition temperature, electrical reliability, and birefringence index.

For example, the amount of the compound(s) represented by the general formula (X'-7) based on the total mass of a liquid crystal composition of the present invention ranges from 4% to 30% by mass in one embodiment of the present invention, 5% to 30% by mass in another embodiment, 6% to 30% by mass in still another embodiment, 8% to 30% by mass in still another embodiment, 9% to 30% by mass in still another embodiment, 11% to 30% by mass in still another embodiment, 14% to 30% by mass in still another embodiment, or 18% to 30% by mass in still another embodiment.

For example, the amount of the compound(s) represented by the general formula (X'-7) based on the total mass of a liquid crystal composition of the present invention ranges from 4% to 20% by mass in one embodiment of the present invention, 4% to 13% by mass in another embodiment, 4% to 10% by mass in still another embodiment, or 4% to 7% by mass in still another embodiment.

More specifically, the compound(s) represented by the general formula (X'-7) for use in a liquid crystal composition according to the present invention is/are preferably at least one compound selected from a compound group represented by the formulae (44.11) to (44.14), more preferably a compound represented by the formula (44.13).

[Chem. 256]

(44.11)

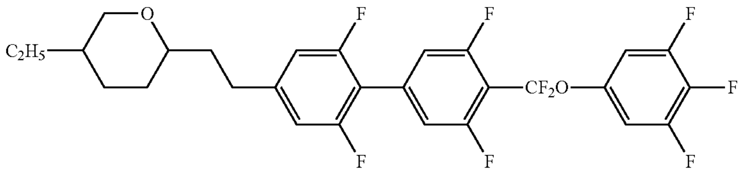

(44.12)

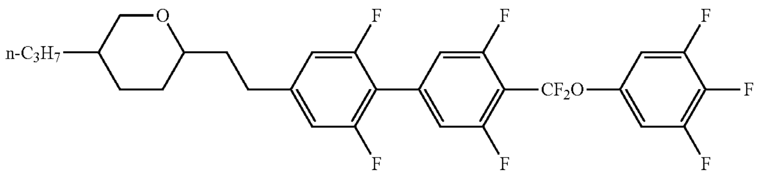

(44.13)

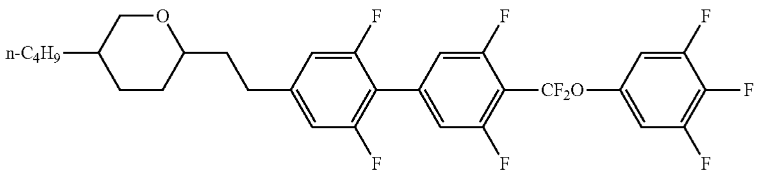

(44.14)

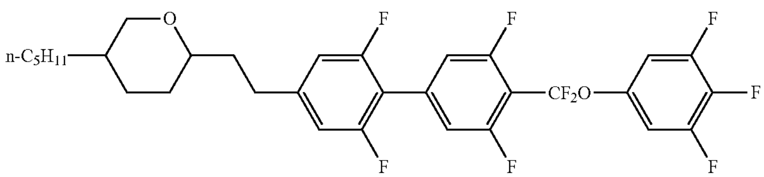

Alternatively, or in addition, the compound(s) represented by the general formula (X) is/are preferably a compound or compounds represented by the general formula (X-8).

[Chem. 257]

(X-8)

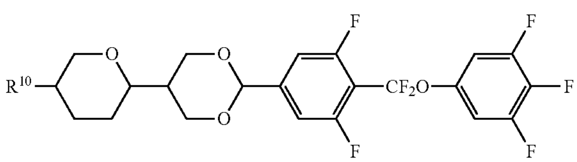

In the general formula (X-8), $R^{10}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably combined in consideration of solubility at low temperatures, transition temperature, electrical reliability, and birefringence index.

The amount of the compound(s) represented by the general formula (X-8) is appropriately adjusted in consideration of characteristics such as solubility at low temperatures, transition temperature, electrical reliability, and birefringence index.

For example, the amount of the compound(s) represented by the general formula (X-8) based on the total mass of a liquid crystal composition of the present invention ranges from 1% to 25% by mass in one embodiment of the present invention, 1% to 20% by mass in another embodiment, 1% to 15% by mass in still another embodiment, 1% to 10% by mass in still another embodiment, 1% to 5% by mass in still another embodiment, or 1% to 3% by mass in still another embodiment.

More specifically, the compound(s) represented by the general formula (X-8) is/are preferably at least one compound selected from a compound group represented by the formulae (44.21) to (44.24), particularly preferably a compound represented by the formula (44.22).

[Chem. 258]

(44.21)

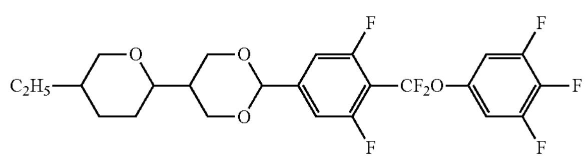

(44.22)

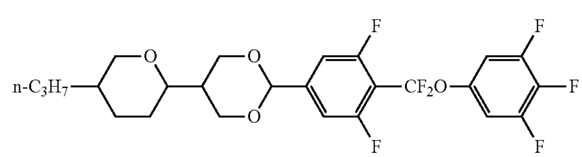

(44.23)

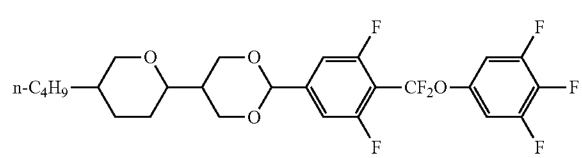

-continued (44.24)

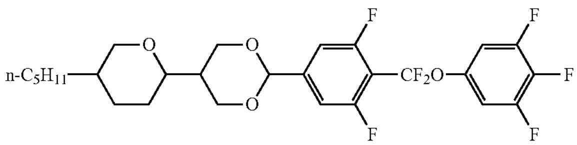

Alternatively or in addition, the compound(s) represented by the general formula (X) is/are preferably a compound or compounds represented by the general formula (X-9)

[Chem. 259]

(X-9)

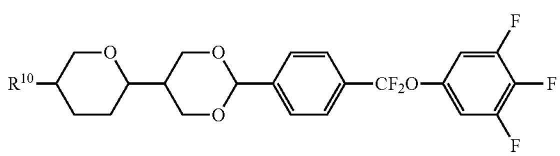

In the general formula (X-9), $R^{10}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably combined in consideration of solubility at low temperatures, transition temperature, electrical reliability, and birefringence index.

The amount of the compound(s) represented by the general formula (X-9) is appropriately adjusted in consideration of characteristics such as solubility at low temperatures, transition temperature, electrical reliability, and birefringence index.

For example, the amount of the compound(s) represented by the general formula (X-9) based on the total mass of a liquid crystal composition of the present invention ranges from 1% to 25% by mass in one embodiment of the present invention, 1% to 20% by mass in another embodiment, 1% to 15% by mass in still another embodiment, 1% to 10% by mass in still another embodiment, 1% to 5% by mass in still another embodiment, or 1% to 3% by mass in still another embodiment.

More specifically, the compound(s) represented by the general formula (X-9) is/are preferably at least one compound selected from a compound group represented by the formulae (44.31) to (44.34), particularly preferably a compound represented by the formula (44.33) or (44.34).

[Chem. 260]

(44.31)

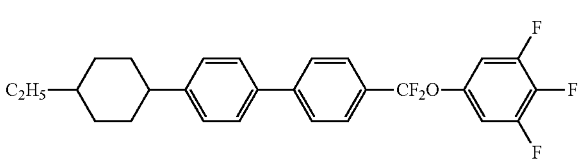

-continued (44.32)

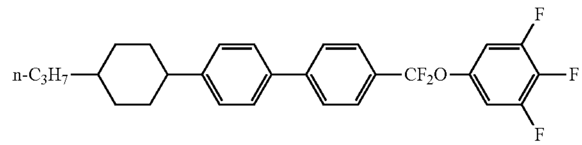

(44.33)

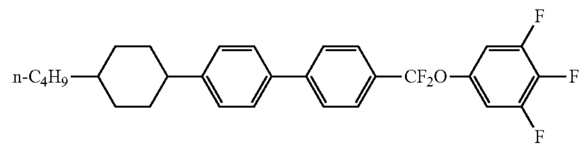

(44.34)

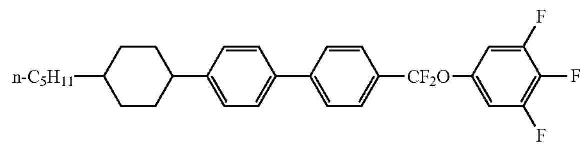

Alternatively, or in addition, the compound(s) represented by the general formula (X) is/are preferably at least one compound selected from a group represented by the general formula (XI).

[Chem. 261]

(XI)

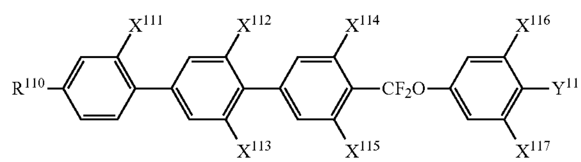

In the general formula (XI), $X^{111}$ to $X^{117}$ independently denote a fluorine atom or a hydrogen atom, at least one of $X^{111}$ to $X^{117}$ denotes a fluorine atom, $R^{110}$ denotes an alkyl group having 1 to 5 carbon atoms, an alkenyl group having 2 to 5 carbon atoms, or an alkoxy group having 1 to 4 carbon atoms, and $Y^{11}$ denotes a fluorine atom or —$OCF_3$.

Although any compounds may be combined, for example, one compound is used in one embodiment of the present invention, two compounds are combined in another embodiment, and three or more compounds are combined in still another embodiment, in consideration of solubility at low temperatures, transition temperature, electrical reliability, and birefringence index.

The amount of the compound(s) represented by the general formula (XI) is appropriately adjusted in consideration of characteristics such as solubility at low temperatures, transition temperature, electrical reliability, and birefringence index.

For example, the amount of the compound(s) represented by the general formula (XI) based on the total mass of a liquid crystal composition of the present invention ranges from 2% to 30% by mass in one embodiment of the present invention, 4% to 30% by mass in another embodiment, 5% to 30% by mass in still another embodiment, 7% to 30% by mass in still another embodiment, 9% to 30% by mass in still another embodiment, 10% to 30% by mass in still another embodiment, 12% to 30% by mass in still another embodiment, 13% to 30% by mass in still another embodiment, 15% to 30% by mass in still another embodiment, or 18% to 30% by mass in still another embodiment.

For example, the amount of the compound(s) represented by the general formula (XI) based on the total mass of a liquid crystal composition of the present invention ranges from 2% to 25% by mass in one embodiment of the present invention, 2% to 20% by mass in another embodiment, 2% to 15% by mass in still another embodiment, 2% to 10% by mass in still another embodiment, or 2% to 5% by mass in still another embodiment.

When a liquid crystal composition according to the present invention is used in liquid crystal display elements having small cell gaps, the amount of the compound(s) represented by the general formula (XI) is preferably increased. When a liquid crystal composition according to the present invention is used in liquid crystal display elements having low driving voltages, the amount of the compound(s) represented by the general formula (XI) is preferably increased. When a liquid crystal composition according to the present invention is used in liquid crystal display elements used in low-temperature environments, the amount of the compound(s) represented by the general formula (XI) is preferably decreased. When a liquid crystal composition is used in liquid crystal display elements having high response speeds, the amount of the compound(s) represented by the general formula (XI) is preferably decreased.

Alternatively, or in addition, the compound(s) represented by the general formula (XI) for use in a liquid crystal composition according to the present invention is/are preferably a compound or compounds represented by the general formula (XI-2).

[Chem. 262]

(XI-2)

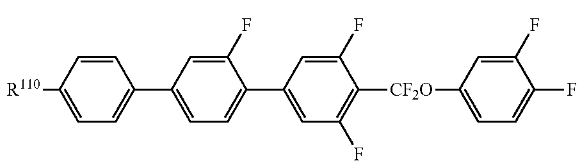

In the general formula (XI-2), $R^{110}$ denotes an alkyl group having 1 to 5 carbon atoms, an alkenyl group having 2 to 5 carbon atoms, or an alkoxy group having 1 to 4 carbon atoms.

Although any compounds may be combined, compounds are appropriately combined in each embodiment in consideration of solubility at low temperatures, transition temperature, electrical reliability, and birefringence index. For example, one compound is used in one embodiment of the present invention, two compounds are combined in another embodiment, and three or more compounds are combined in still another embodiment.

In consideration of solubility at low temperatures, transition temperature, and electrical reliability, the amount of the compound(s) represented by the general formula (XI-2) preferably ranges from 1% to 20% by mass, 3% to 20% by mass, 4% to 20% by mass, 6% to 15% by mass, or 9% to 12% by mass of the total mass of a liquid crystal composition of the present invention.

More specifically, the compound(s) represented by the general formula (XI-2) for use in a liquid crystal composition according to the present invention is/are preferably at least one compound selected from a compound group represented by the formulae (45.11) to (45.14), particularly preferably at least one compound selected from a compound group represented by the formulae (45.12) to (45.14), more preferably a compound represented by the formula (45.12).

[Chem. 263]

(45.11)

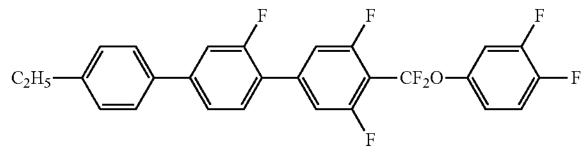

(45.12)

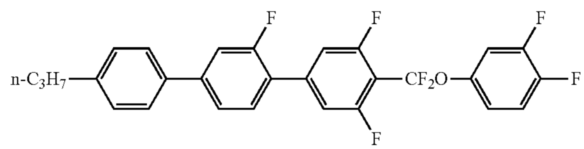

(45.13)

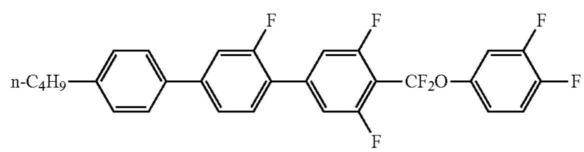

(45.14)

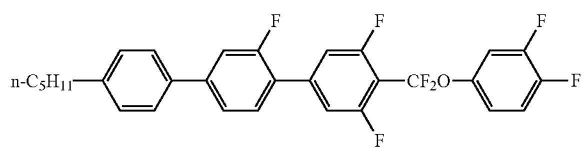

Alternatively, or in addition, the compound(s) represented by the general formula (X) is/are preferably at least one compound selected from a group represented by the general formula (XII).

[Chem. 264]

(XII)

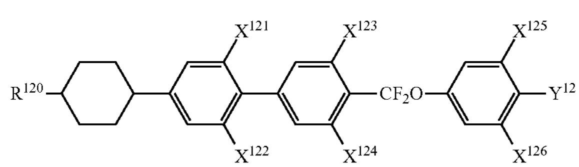

In the general formula (XII), $X^{121}$ to $X^{126}$ independently denote a fluorine atom or a hydrogen atom, $R^{120}$ denotes an alkyl group having 1 to 5 carbon atoms, an alkenyl group having 2 to 5 carbon atoms, or an alkoxy group having 1 to 4 carbon atoms, and $Y^{12}$ denotes a fluorine atom or —$OCF_3$.

Although any compounds may be combined, one to three or more compounds are preferably appropriately combined, and one to four or more compounds are more preferably combined, in consideration of solubility at low temperatures, transition temperature, electrical reliability, and birefringence index.

The compound(s) represented by the general formula (XII) for use in a liquid crystal composition according to the present invention is/are preferably a compound or compounds represented by the general formula (XII-1).

[Chem. 265]

(XII-1)

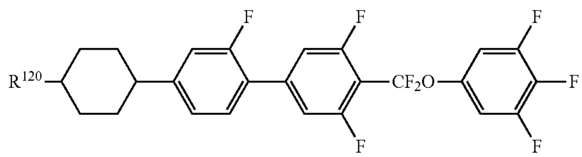

In the general formula (XII-1), $R^{120}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably appropriately combined, and one to three or more compounds are more preferably combined, in consideration of solubility at low temperatures, transition temperature, electrical reliability, and birefringence index.

In consideration of solubility at low temperatures, transition temperature, and electrical reliability, the amount of the compound(s) represented by the general formula (XII-1) preferably ranges from 1% to 15% by mass, 2% to 10% by mass, 3% to 8% by mass, or 4% to 6% by mass of the total mass of a liquid crystal composition of the present invention.

More specifically, the compound(s) represented by the general formula (XII-1) for use in a liquid crystal composition according to the present invention is/are preferably at least one compound selected from a compound group represented by the formulae (46.1) to (46.4), particularly preferably at least one compound selected from a compound group represented by the formulae (46.2) to (46.4).

[Chem. 266]

(46.1)

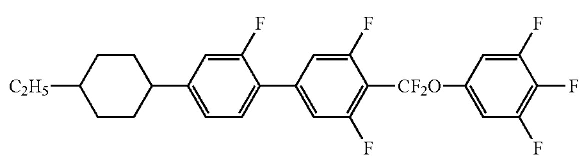

(46.2)

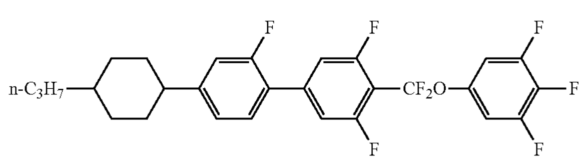

(46.3)

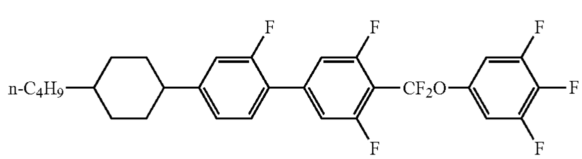

(46.4)

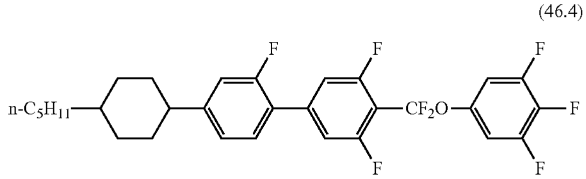

Alternatively, or in addition, the compound(s) represented by the general formula (XII) is/are preferably a compound or compounds represented by the general formula (XII-2).

[Chem. 267]

(XII-2)

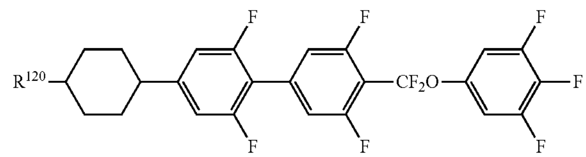

In the general formula (XII-2), $R^{120}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably appropriately combined, and one to three or more compounds are more preferably combined, in consideration of solubility at low temperatures, transition temperature, electrical reliability, and birefringence index.

In consideration of solubility at low temperatures, transition temperature, and electrical reliability, the amount of the compound(s) represented by the general formula (XII-2) preferably ranges from 1% to 20% by mass, 3% to 20% by mass, 4% to 17% by mass, 6% to 15% by mass, or 9% to 13% by mass of the total mass of a liquid crystal composition of the present invention.

More specifically, the compound(s) represented by the general formula (XII-2) for use in a liquid crystal composition according to the present invention is/are preferably at least one compound selected from a compound group represented by the formulae (47.1) to (47.4), particularly preferably at least one compound selected from a compound group represented by the formulae (47.2) to (47.4).

[Chem. 268]

(47.1)

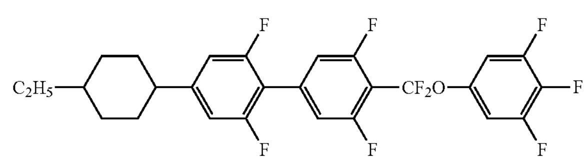

(47.2)

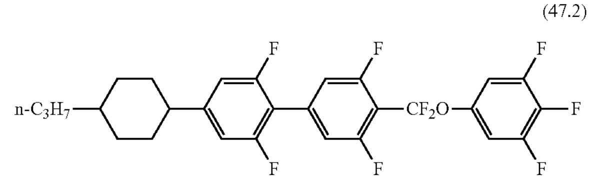

(47.3)

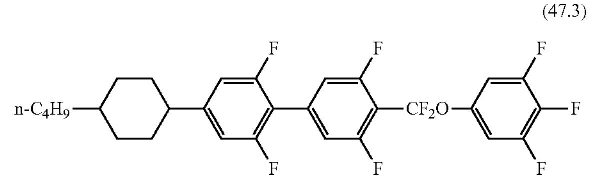

-continued (47.4)

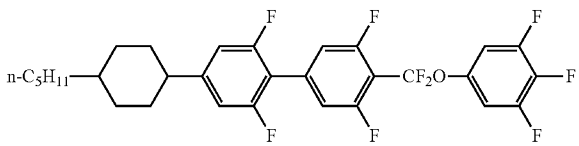

Alternatively, or in addition, the compound(s) represented by the general formula (M) is/are preferably at least one compound selected from a compound group represented by the general formula (XIII)

[Chem. 269]

(XIII)

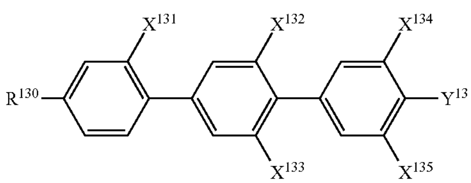

In the general formula (XIII), $X^{131}$ to $X^{135}$ independently denote a fluorine atom or a hydrogen atom, $R^{130}$ denotes an alkyl group having 1 to 5 carbon atoms, an alkenyl group having 2 to 5 carbon atoms, or an alkoxy group having 1 to 4 carbon atoms, and $Y^{13}$ denotes a fluorine atom or —$OCF_3$.

Although compounds of any types may be combined, one or two of these compounds are preferably contained, one to three of these compounds are more preferably contained, and one to four of these compounds are still more preferably contained.

The amount of the compound(s) represented by the general formula (XIII) is appropriately adjusted in consideration of characteristics such as solubility at low temperatures, transition temperature, electrical reliability, and birefringence index.

For example, the amount of the compound(s) represented by the general formula (XIII) based on the total mass of a liquid crystal composition of the present invention ranges from 2% to 30% by mass in one embodiment of the present invention, 4% to 30% by mass in another embodiment, 5% to 30% by mass in still another embodiment, 7% to 30% by mass in still another embodiment, 9% to 30% by mass in still another embodiment, 11% to 30% by mass in still another embodiment, 13% to 30% by mass in still another embodiment, 14% to 30% by mass in still another embodiment, 16% to 30% by mass in still another embodiment, or 20% to 30% by mass in still another embodiment.

For example, the amount of the compound(s) represented by the general formula (XIII) based on the total mass of a liquid crystal composition of the present invention ranges from 2% to 25% by mass in one embodiment of the present invention, 2% to 20% by mass in another embodiment, 2% to 15% by mass in still another embodiment, 2% to 10% by mass in still another embodiment, or 2% to 5% by mass in still another embodiment.

When a liquid crystal composition according to the present invention is used in liquid crystal display elements having small cell gaps, the amount of the compound(s) represented by the general formula (XIII) is preferably increased. When a liquid crystal composition according to the present invention is used in liquid crystal display elements having low driving voltages, the amount of the compound(s) represented by the general formula (XIII) is preferably increased. When a liquid crystal composition according to the present invention is used in liquid crystal display elements used in low-temperature environments, the amount of the compound(s) represented by the general formula (XIII) is preferably decreased. When a liquid crystal composition is used in liquid crystal display elements having high response speeds, the amount of the compound(s) represented by the general formula (XIII) is preferably decreased.

The compound(s) represented by the general formula (XIII) is/are preferably a compound or compounds represented by the general formula (XIII-1).

[Chem. 270]

(XIII-1)

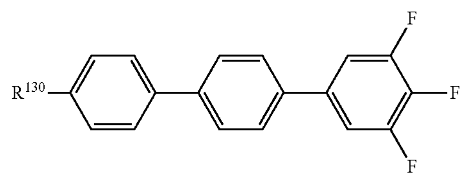

In the general formula (XIII-1), $R^{130}$ denotes an alkyl group having 1 to 5 carbon atoms, an alkenyl group having 2 to 5 carbon atoms, or an alkoxy group having 1 to 4 carbon atoms.

The amount of the compound(s) represented by the general formula (XIII-1) preferably ranges from 1% to 25% by mass, 3% to 25% by mass, 5% to 20% by mass, or 10% to 15% by mass of the total mass of a liquid crystal composition of the present invention.

The compound(s) represented by the general formula (XIII-1) is/are preferably at least one compound selected from a compound group represented by the formulae (48.1) to (48.4) or a compound represented by the formula (48.2).

[Chem. 271]

(48.1)

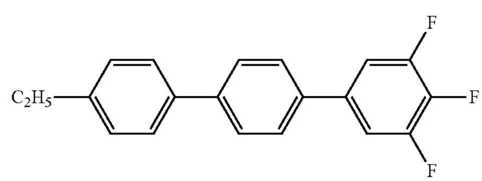

(48.2)

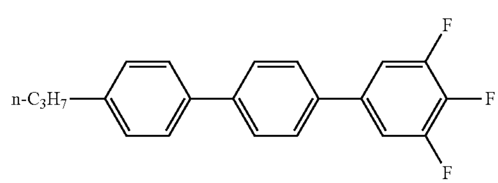

(48.3)

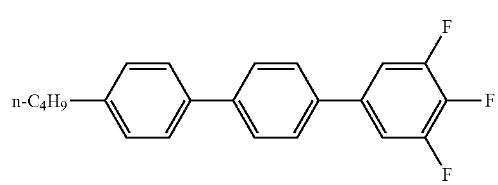

-continued (48.4)

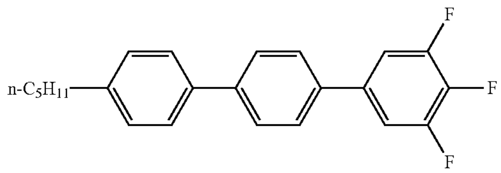

Alternatively, or in addition, the compound(s) represented by the general formula (XIII) is/are preferably a compound or compounds represented by the general formula (XIII-2).

[Chem. 272]

(XIII-2)

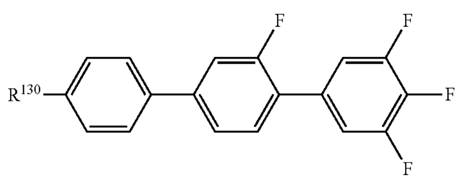

In the general formula (XIII-2), $R^{130}$ denotes an alkyl group having 1 to 5 carbon atoms, an alkenyl group having 2 to 5 carbon atoms, or an alkoxy group having 1 to 4 carbon atoms.

Although compounds of any types may be combined, one or two or more of these compounds are preferably contained.

The amount of the compound(s) represented by the general formula (XIII-2) preferably ranges from 1% to 25% by mass, 1% to 20% by mass, 1% to 15% by mass, or 3% to 14% by mass of the total mass of a liquid crystal composition of the present invention. Among these, the amount of the compound(s) represented by the general formula (XIII-2) preferably ranges from 3% to 10% by mass, 3% to 6% by mass, 6% to 14% by mass, or 10% to 14% by mass of the total mass of a liquid crystal composition of the present invention.

The compound(s) represented by the general formula (XIII-2) is/are preferably at least one compound selected from a compound group represented by the formulae (49.1) to (49.4) or a compound represented by the formula (49.1) and/or a compound represented by the formula (49.2).

[Chem. 273]

(49.1)

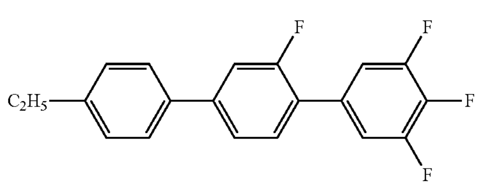

(49.2)

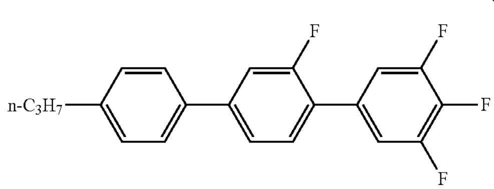

-continued (49.3)

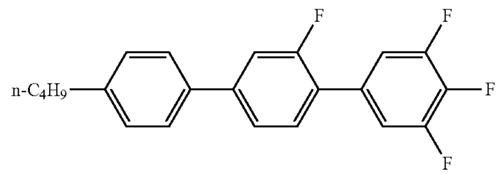

(49.4)

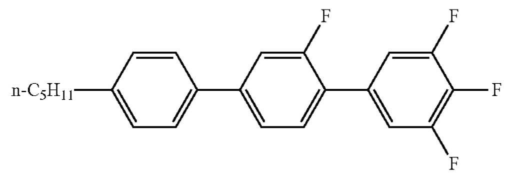

Alternatively, or in addition, the compound(s) represented by the general formula (XIII) is/are preferable a compound or compounds represented by the general formula (XIII-3).

[Chem. 274]

(XIII-3)

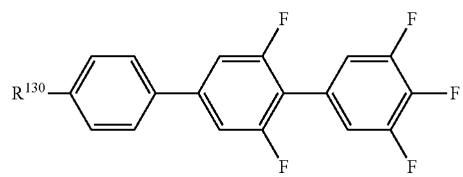

In the general formula (XIII-3), $R^{130}$ denotes an alkyl group having 1 to 5 carbon atoms, an alkenyl group having 2 to 5 carbon atoms, or an alkoxy group having 1 to 4 carbon atoms.

Although compounds of any types may be combined, one or two of these compounds are preferably contained.

The amount of the compound(s) represented by the general formula (XIII-3) preferably ranges from 2% to 20% by mass, 4% to 20% by mass, 9% to 17% by mass, or 11% to 14% by mass of the total mass of a liquid crystal composition of the present invention.

The compound(s) represented by the general formula (XIII-3) is/are preferably at least one compound selected from a compound group represented by the formulae (50.1) to (50.4) or a compound represented by the formula (50.1) and/or a compound represented by the formula (50.2).

[Chem. 275]

(50.1)

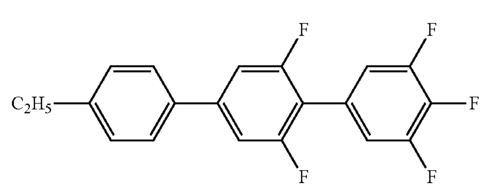

-continued (50.2)

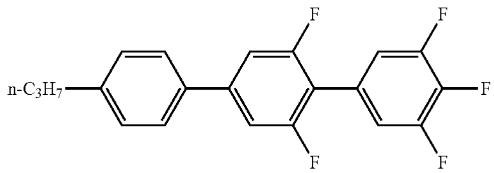

(50.3)

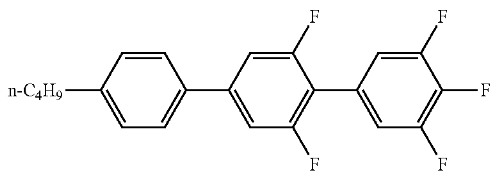

(50.4)

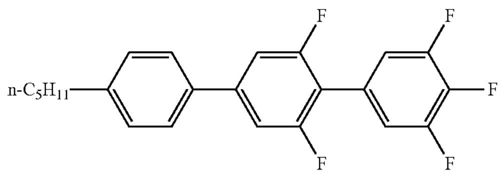

Alternatively, or in addition, the compound(s) represented by the general formula (M) is/are preferably at least one compound selected from a compound group represented by the general formula (XIV).

[Chem. 276]

(XIV)

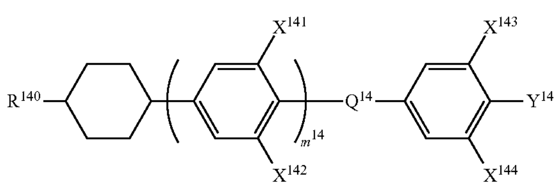

In the general formula (XIV), $R^{140}$ denotes an alkyl group having 1 to 7 carbon atoms, an alkenyl group having 2 to 7 carbon atoms, or an alkoxy group having 1 to 7 carbon atoms, $X^{141}$ to $X^{144}$ independently denote a fluorine atom or a hydrogen atom, $Y^{14}$ denotes a fluorine atom, a chlorine atom, or $OCF_3$, $Q^{14}$ denotes a single bond, —COO—, or —$CF_2O$—, and $m^{14}$ is 0 or 1.

Although compounds of any types may be combined, compounds are appropriately combined in each embodiment in consideration of solubility at low temperatures, transition temperature, electrical reliability, and birefringence index. For example, one compound is used in one embodiment of the present invention. Alternatively, two compounds are used in another embodiment of the present invention. Alternatively, three compounds are used in still another embodiment of the present invention. Alternatively, four compounds are used in still another embodiment of the present invention. Alternatively, five compounds are used in still another embodiment of the present invention. Alternatively, at least six compounds are used in still another embodiment of the present invention.

The amount of the compound(s) represented by the general formula (XIV) is appropriately adjusted in consideration of characteristics such as solubility at low temperatures, transition temperature, electrical reliability, and birefringence index.

For example, the amount of the compound(s) represented by the general formula (XIV) based on the total mass of a liquid crystal composition of the present invention ranges from 3% to 40% by mass in one embodiment of the present invention, 7% to 40% by mass in another embodiment, 8% to 40% by mass in still another embodiment, 11% to 40% by mass in still another embodiment, 12% to 40% by mass in still another embodiment, 16% to 40% by mass in still another embodiment, 18% to 40% by mass in still another embodiment, 19% to 40% by mass in still another embodiment, 22% to 40% by mass in still another embodiment, or 25% to 40% by mass in still another embodiment.

For example, the amount of the compound(s) represented by the general formula (XIV) based on the total mass of a liquid crystal composition of the present invention ranges from 3% to 35% by mass in one embodiment of the present invention, 3% to 30% by mass in another embodiment, 3% to 25% by mass in still another embodiment, 3% to 20% by mass in still another embodiment, or 3% to 15% by mass in still another embodiment.

When a liquid crystal composition according to the present invention is used in liquid crystal display elements having low driving voltages, the amount of the compound(s) represented by the general formula (XIV) is preferably increased. When a liquid crystal composition is used in liquid crystal display elements having high response speeds, the amount of the compound(s) represented by the general formula (XIV) is preferably decreased.

The compound(s) represented by the general formula (XIV) is/are preferably a compound or compounds represented by the general formula (XIV-1).

[Chem. 277]

(XIV-1)

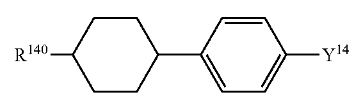

In the general formula (XIV-1), $R^{140}$ denotes an alkyl group having 1 to 7 carbon atoms, an alkenyl group having 2 to 7 carbon atoms, or an alkoxy group having 1 to 7 carbon atoms, and $Y^{14}$ denotes a fluorine atom, a chlorine atom, or —$OCF_3$.

Although compounds of any types may be combined, one to three compounds are preferably combined in consideration of solubility at low temperatures, transition temperature, electrical reliability, and birefringence index.

The compound(s) represented by the general formula (XIV-1) is/are preferably a compound or compounds represented by the general formula (XIV-1-1).

[Chem. 278]

(XIV-1-1)

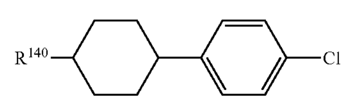

In the general formula (XIV-1-1), $R^{140}$ denotes an alkyl group having 1 to 7 carbon atoms, an alkenyl group having 2 to 7 carbon atoms, or an alkoxy group having 1 to 7 carbon atoms.

The amount of the compound(s) represented by the general formula (XIV-1) is appropriately adjusted in consideration of solubility at low temperatures, transition temperature, and electrical reliability.

For example, the amount of the compound(s) represented by the general formula (XIV-1) based on the total mass of a liquid crystal composition of the present invention ranges from 2% or more by mass 30% by mass in one embodiment of the present invention, 4% or more by mass 30% by mass in another embodiment, 7% to 30% by mass in still another embodiment, 10% to 30% by mass in still another embodiment, or 18% to 30% by mass in still another embodiment.

For example, the amount of the compound(s) represented by the general formula (XIV-1) based on the total mass of a liquid crystal composition of the present invention ranges from 2% to 27% by mass in one embodiment of the present invention, 2% to 24% by mass in another embodiment, or 2% or more by mass and less than 21% by mass in still another embodiment.

More specifically, the compound(s) represented by the general formula (XIV-1-1) is/are preferably at least one compound selected from a compound group represented by the formulae (51.1) to (51.4) or a compound represented by the formula (51.1).

[Chem. 279]

(51.1)

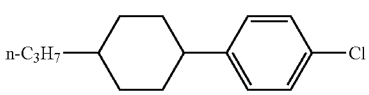

(51.2)

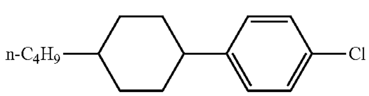

(51.3)

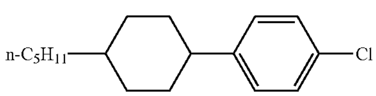

(51.4)

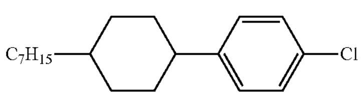

Alternatively, or in addition, the compound(s) represented by the general formula (XIV-1) is/are preferably a compound or compounds represented by the general formula (XIV-1-2).

[Chem. 280]

(XIV-1-2)

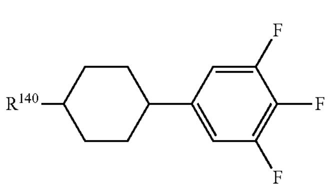

In the general formula (XIV-1-2), $R^{140}$ denotes an alkyl group having 1 to 7 carbon atoms, an alkenyl group having 2 to 7 carbon atoms, or an alkoxy group having 1 to 7 carbon atoms.

In consideration of solubility at low temperatures, transition temperature, and electrical reliability, the amount of the compound(s) represented by the general formula (XIV-1-2) preferably ranges from 1% to 15% by mass, 3% to 13% by mass, 5% to 11% by mass, or 7% to 9% by mass of the total mass of a liquid crystal composition of the present invention.

More specifically, the compound(s) represented by the general formula (XIV-1-2) is/are preferably at least one compound selected from a compound group represented by the formulae (52.1) to (52.4), particularly preferably a compound represented by the formula (52.4).

[Chem. 281]

(52.1)

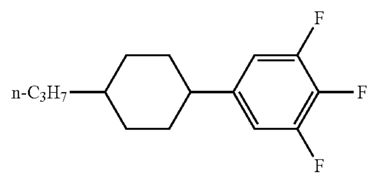

(52.2)

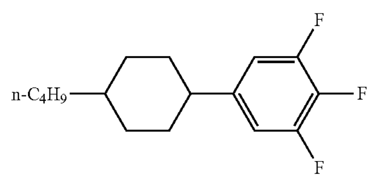

(52.3)

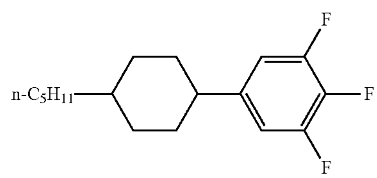

(52.4)

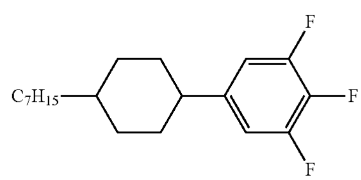

Alternatively, or in addition, the compound(s) represented by the general formula (XIV) is/are preferably a compound or compounds represented by the general formula (XIV-2).

[Chem. 282]

(XIV-2)

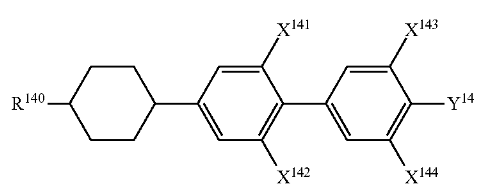

In the general formula (XIV-2), $R^{140}$ denotes an alkyl group having 1 to 5 carbon atoms, an alkenyl group having 2 to 5 carbon atoms, or an alkoxy group having 1 to 4 carbon atoms, $X^{141}$ to $X^{144}$ independently denote a fluorine atom or a hydrogen atom, and $Y^{14}$ denotes a fluorine atom, a chlorine atom, or —$OCF_3$.

Although compounds of any types may be combined, compounds are appropriately combined in each embodiment in consideration of solubility at low temperatures, transition temperature, electrical reliability, and birefringence index. For example, one compound is used in one embodiment of the present invention. Alternatively, two compounds are used in another embodiment of the present invention. Alternatively, three compounds are used in still another embodiment of the present invention. Alternatively, four compounds are used in still another embodiment of the present invention. Alternatively, at least five compounds are used in still another embodiment of the present invention.

The amount of the compound(s) represented by the general formula (XIV-2) is appropriately adjusted in consideration of characteristics such as solubility at low temperatures, transition temperature, electrical reliability, and birefringence index.

For example, the amount of the compound(s) represented by the general formula (XIV-2) based on the total mass of a liquid crystal composition of the present invention ranges from 3% to 40% by mass in one embodiment of the present invention, 7% to 40% by mass in another embodiment, 8% to 40% by mass in still another embodiment, 10% to 40% by mass in still another embodiment, 11% to 40% by mass in still another embodiment, 12% to 40% by mass in still another embodiment, 18% to 40% by mass in still another embodiment, 19% to 40% by mass in still another embodiment, 21% to 40% by mass in still another embodiment, or 22% to 40% by mass in still another embodiment.

For example, the amount of the compound(s) represented by the general formula (XIV-2) based on the total mass of a liquid crystal composition of the present invention ranges from 3% to 35% by mass in one embodiment of the present invention, 3% to 25% by mass in another embodiment, 3% to 20% by mass in still another embodiment, 3% to 15% by mass in still another embodiment, or 3% to 10% by mass in still another embodiment.

When a liquid crystal composition according to the present invention is used in liquid crystal display elements having low driving voltages, the amount of the compound(s) represented by the general formula (XIV-2) is preferably increased. When a liquid crystal composition is used in liquid crystal display elements having high response speeds, the amount of the compound(s) represented by the general formula (XIV-2) is preferably decreased.

The compound(s) represented by the general formula (XIV-2) is/are preferably a compound or compounds represented by the general formula (XIV-2-1).

[Chem. 283]

(XIV-2-1)

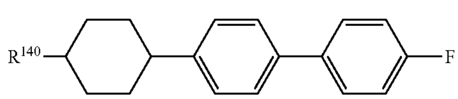

In the general formula (XIV-2-1), $R^{140}$ denotes an alkyl group having 1 to 5 carbon atoms, an alkenyl group having 2 to 5 carbon atoms, or an alkoxy group having 1 to 4 carbon atoms.

In consideration of solubility at low temperatures, transition temperature, and electrical reliability, the amount of the compound(s) represented by the general formula (XIV-2-1) preferably ranges from 1% to 15% by mass, 3% to 13% by mass, 5% to 11% by mass, or 7% to 9% by mass of the total mass of a liquid crystal composition of the present invention.

More specifically, the compound(s) represented by the general formula (XIV-2-1) is/are preferably at least one compound selected from a compound group represented by the formulae (53.1) to (53.4), particularly preferably a compound represented by the formula (53.4).

[Chem. 284]

(53.1)

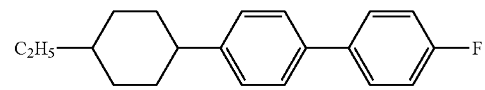

(53.2)

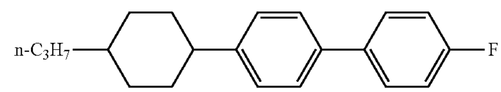

(53.3)

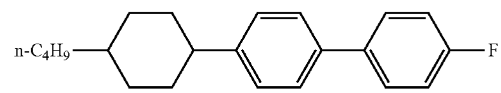

(53.4)

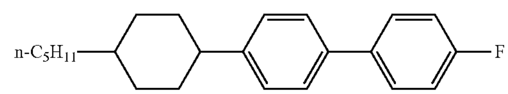

Alternatively, or in addition, the compound(s) represented by the general formula (XIV-2) is/are preferably a compound or compounds represented by the general formula (XIV-2-2).

[Chem. 285]

(XIV-2-2)

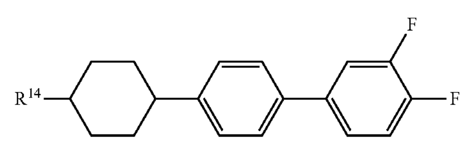

In the general formula (XIV-2-2), $R^{14}$ denotes an alkyl group having 1 to 5 carbon atoms, an alkenyl group having 2 to 5 carbon atoms, or an alkoxy group having 1 to 4 carbon atoms.

In consideration of solubility at low temperatures, transition temperature, and electrical reliability, the amount of the compound(s) represented by the general formula (XIV-2-2) preferably ranges from 3% to 20% by mass, 5% to 17% by mass, 5% to 15% by mass, or 5% to 9% by mass of the total mass of a liquid crystal composition of the present invention.

More specifically, the compound(s) represented by the general formula (XIV-2-2) is/are preferably at least one compound selected from a compound group represented by the formulae (54.1) to (54.4), particularly preferably a compound represented by the formula (54.2) and/or a compound represented by the formula (54.4).

[Chem. 286]

(54.1)

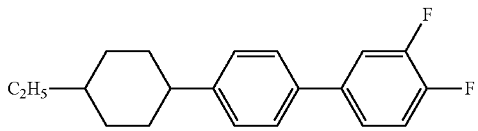

(54.2)

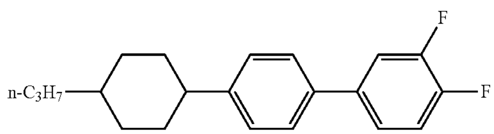

(54.3)

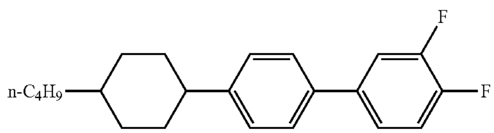

(54.4)

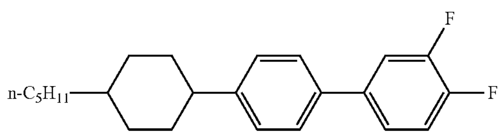

The amount of the compound represented by the formula (54.2) in a liquid crystal composition according to the present invention preferably ranges from 5% to 35% by mass, 5% by mass 25% or less by mass, 5% to 22% by mass, 6% to 20% by mass, 6% to 15% by mass, or 6% to 9% by mass of the total mass of the liquid crystal composition.

Alternatively, or in addition, the compound(s) represented by the general formula (XIV-2) is/are preferably a compound or compounds represented by the general formula (XIV-2-3)

[Chem. 287]

(XIV-2-3)

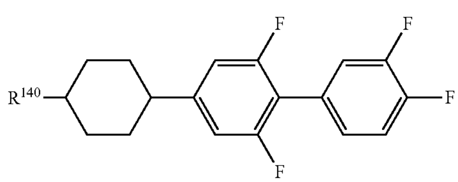

In the general formula (XIV-2-3), $R^{140}$ denotes an alkyl group having 1 to 5 carbon atoms, an alkenyl group having 2 to 5 carbon atoms, or an alkoxy group having 1 to 4 carbon atoms.

In consideration of solubility at low temperatures, transition temperature, and electrical reliability, the amount of the compound(s) represented by the general formula (XIV-2-3) preferably ranges from 5% to 30% by mass, 9% to 27% by mass, 12% to 24% by mass, or 12% to 20% by mass of the total mass of a liquid crystal composition of the present invention.

More specifically, the compound(s) represented by the general formula (XIV-2-3) is/are preferably at least one compound selected from a compound group represented by the formulae (55.1) to (55.4), particularly preferably a compound represented by the formula (55.2) and/or a compound represented by the formula (55.4).

[Chem. 288]

(55.1)

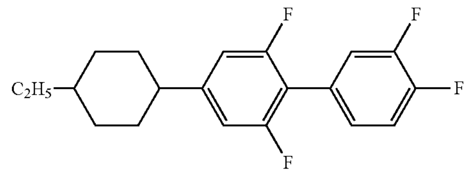

(55.2)

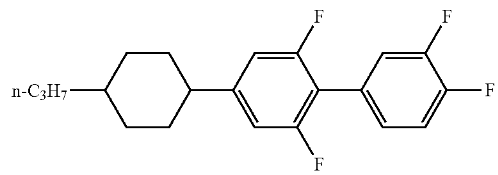

(55.3)

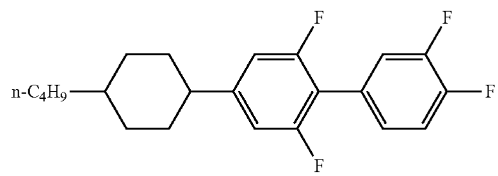

(55.4)

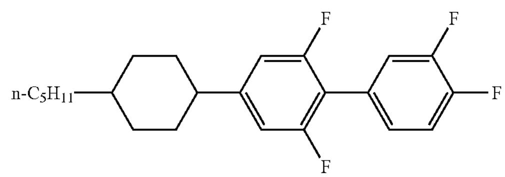

Alternatively, or in addition, the compound(s) represented by the general formula (XIV-2) is/are preferably a compound or compounds represented by the general formula (XIV-2-4).

[Chem. 289]

(XIV-2-4)

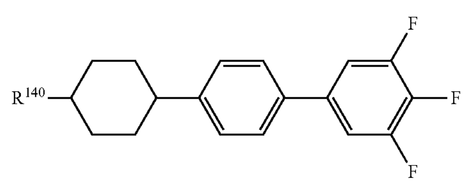

In the general formula (XIV-2-4), $R^{140}$ denotes an alkyl group having 1 to 5 carbon atoms, an alkenyl group having 2 to 5 carbon atoms, or an alkoxy group having 1 to 4 carbon atoms.

Although compounds of any types may be combined, compounds are appropriately combined in each embodiment in consideration of solubility at low temperatures, transition temperature, electrical reliability, and birefringence index. For example, one compound is used in one embodiment of the present invention. Alternatively, two compounds are used in another embodiment of the present invention. Alternatively, at least three compounds are used in still another embodiment of the present invention.

The amount of the compound(s) represented by the general formula (XIV-2-4) is appropriately adjusted in each embodiment in consideration of characteristics such as solubility at low temperatures, transition temperature, electrical reliability, and birefringence index.

For example, the amount of the compound(s) represented by the general formula (XIV-2-4) based on the total mass of a liquid crystal composition of the present invention ranges from 1% to 20% by mass in one embodiment of the present invention, 1% to 15% by mass in another embodiment, 1% to 10% by mass in still another embodiment, 1% to 9% by mass in still another embodiment, 1% to 3% by mass in still another embodiment, or 6% to 9% by mass in still another embodiment.

When a liquid crystal composition according to the present invention is used in liquid crystal display elements having low driving voltages, the amount of the compound(s) represented by the general formula (XIV-2-4) is preferably increased. When a liquid crystal composition is used in liquid crystal display elements having high response speeds, the amount of the compound(s) represented by the general formula (XIV-2-4) is preferably decreased.

More specifically, the compound(s) represented by the general formula (XIV-2-4) is/are preferably at least one compound selected from a compound group represented by the formulae (56.1) to (56.4), particularly preferably a compound represented by the formula (56.1), a compound represented by the formula (56.2), and/or a compound represented by the formula (56.4).

[Chem. 290]

(56.1)

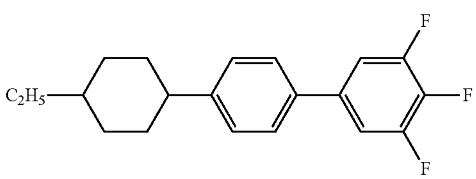

(56.2)

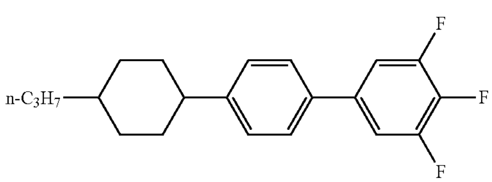

(56.3)

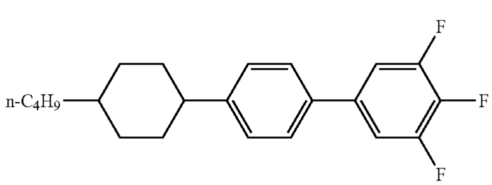

(56.4)

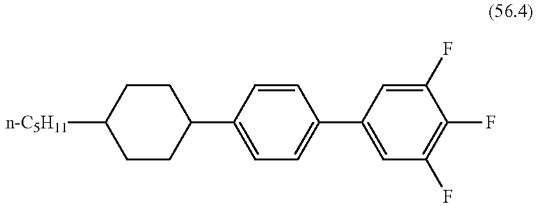

Alternatively, or in addition the compound(s) represented by the general formula (XIV-2) is/are preferably a compound or compounds represented by the general formula (XIV-2-5).

[Chem. 291]

(XIV-2-5)

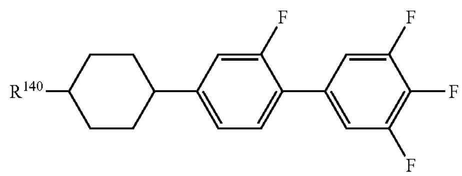

In the general formula (XIV-2-5), $R^{140}$ denotes an alkyl group having 1 to 5 carbon atoms, an alkenyl group having 2 to 5 carbon atoms, or an alkoxy group having 1 to 4 carbon atoms.

In consideration of solubility at low temperatures, transition temperature, and electrical reliability, the amount of the compound(s) represented by the general formula (XIV-2-5) preferably ranges from 5% to 25% by mass, 10% to 22% by mass, 13% to 18% by mass, or 13% to 15% by mass of the total mass of a liquid crystal composition of the present invention.

More specifically, the compound(s) represented by the general formula (XIV-2-5) is/are at least one compound selected from a compound group represented by the formulae (57.1) to (57.4). In particular, a compound represented by the formula (57.1) is preferably contained.

[Chem. 292]

(57.1)

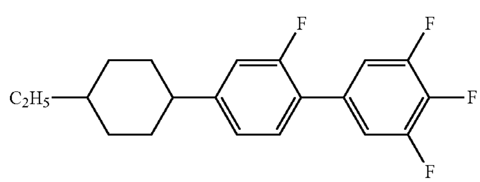

(57.2)

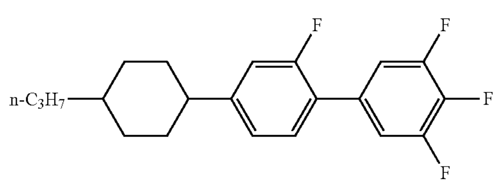

(57.3)

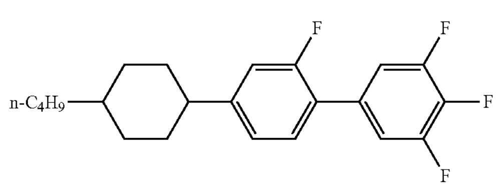

-continued (57.4)

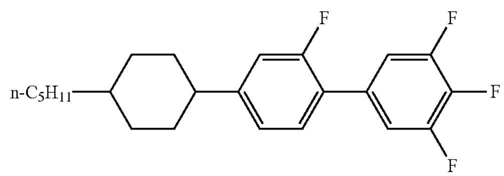

Alternatively, or in addition, the compound(s) represented by the general formula (XIV-2) is/are preferably a compound or compounds represented by the general formula (XIV-2-6).

[Chem. 293]

(XIV-2-6)

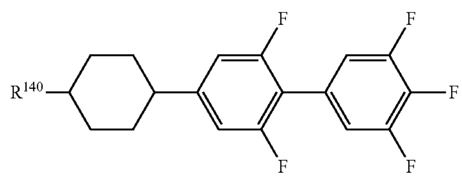

In the general formula (XIV-2-6), $R^{140}$ denotes an alkyl group having 1 to 5 carbon atoms, an alkenyl group having 2 to 5 carbon atoms, or an alkoxy group having 1 to 4 carbon atoms.

In consideration of solubility at low temperatures, transition temperature, and electrical reliability, the amount of the compound(s) represented by the general formula (XIV-2-6) preferably ranges from 5% to 25% by mass, 10% to 22% by mass, 15% to 20% by mass, or 15% to 17% by mass of the total mass of a liquid crystal composition of the present invention.

More specifically, the compound(s) represented by the general formula (XIV-2-6) is/are preferably at least one compound selected from a compound group represented by the formulae (58.1) to (58.4), particularly preferably a compound represented by the formula (58.2).

[Chem. 294]

(58.1)

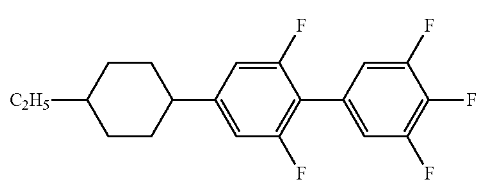

(58.2)

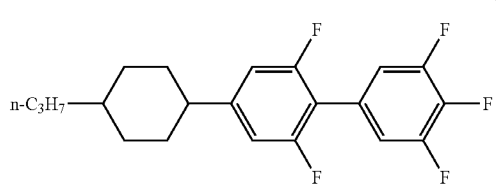

-continued (58.3)

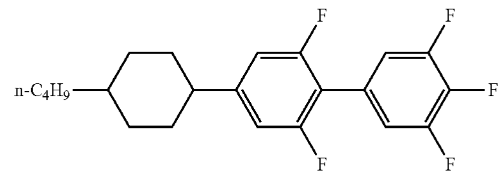

(58.4)

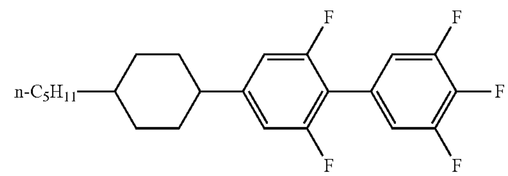

Alternatively, or in addition, the compound(s) represented by the general formula (XIV) is/are preferably a compound or compounds represented by the general formula (XIV-3).

[Chem. 295]

(XIV-3)

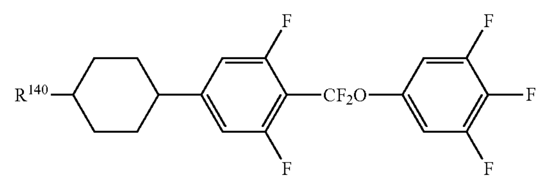

In the general formula (XIV-3), $R^{140}$ denotes an alkyl group having 1 to 5 carbon atoms, an alkenyl group having 2 to 5 carbon atoms, or an alkoxy group having 1 to 4 carbon atoms.

Although compounds of any types may be combined, these compounds are appropriately combined in a manner that depends on the desired characteristics, such as solubility at low temperatures, transition temperature, electrical reliability, and birefringence index. For example, one compound is used in one embodiment of the present invention. Alternatively, at least two compounds are used in another embodiment of the present invention.

In consideration of solubility at low temperatures, transition temperature, electrical reliability, and birefringence index, the amount of the compound(s) represented by the general formula (XIV-3) preferably ranges from 2.5% to 25% by mass, 3% to 15% by mass, or 3% to 10% by mass of the total mass of a liquid crystal composition of the present invention.

More specifically, the compound(s) represented by the general formula (XIV-3) is/are preferably at least one compound selected from a compound group represented by the formulae (61.1) to (61.4), more preferably a compound represented by the formula (61.1) and/or a compound represented by the formula (61.2).

[Chem. 296]

(61.1)

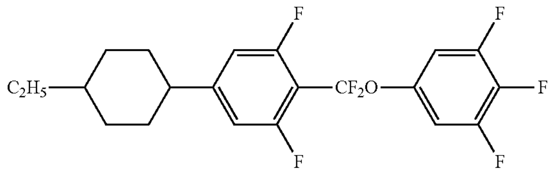

(61.2)

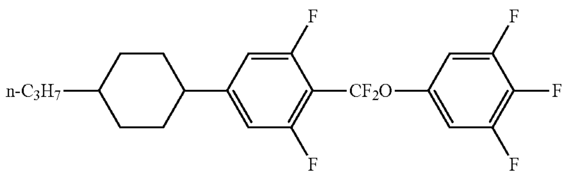

(61.3)

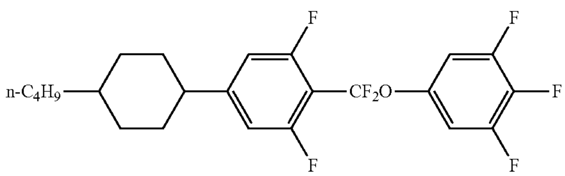

(61.4)

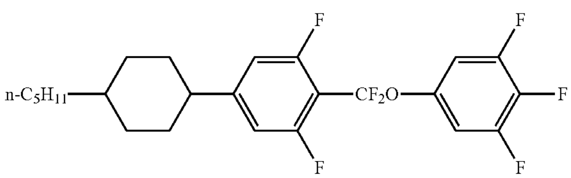

Alternatively, or in addition, the compound(s) represented by the general formula (M) is/are preferably a compound or compounds represented by the general formula (XV).

[Chem. 297]

(XV)

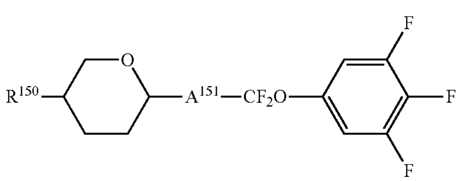

In the general formula (XV), $R^{150}$ denotes an alkyl group having 1 to 5 carbon atoms, an alkenyl group having 2 to 5 carbon atoms, or an alkoxy group having 1 to 4 carbon atoms, and $A^{151}$ denotes a 1,4-cyclohexylene group, a 1,4-phenylene group, or one of groups represented by the following formulae. A hydrogen atom of the 1,4-phenylene group may be substituted with a fluorine atom.

[Chem. 298]

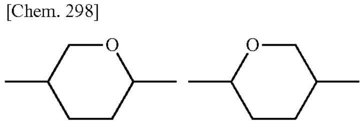

-continued

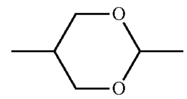

Although any compounds may be combined, compounds are appropriately combined in consideration of solubility at low temperatures, transition temperature, electrical reliability, and birefringence index. For example, one compound is used in one embodiment of the present invention. Alternatively, two compounds are used in another embodiment of the present invention. Alternatively, three compounds are used in still another embodiment. Alternatively, four compounds are used in still another embodiment. Alternatively, at least five compounds are used in still another embodiment.

The amount of the compound(s) represented by the general formula (XV) is appropriately adjusted in each embodiment in consideration of characteristics such as solubility at low temperatures, transition temperature, electrical reliability, and birefringence index. For example, the amount of the compound(s) represented by the general formula (XV) based on the total mass of a liquid crystal composition of the present invention ranges from 0.5% to 30% by mass in one embodiment of the present invention, 1% to 30% by mass in another embodiment, 3% to 30% by mass in still another embodiment, 6% to 30% by mass in still another embodiment, 9% to 30% by mass in still another embodiment, 11% to 30% by mass in still another embodiment, 12% to 30% by mass in still another embodiment, 18% to 30% by mass in still another embodiment, 19% to 30% by mass in still another embodiment, 23% to 30% by mass in still another embodiment, or 25% to 30% by mass in still another embodiment.

For example, the amount of the compound(s) represented by the general formula (XV) based on the total mass of a liquid crystal composition of the present invention ranges from 0.5% to 25% by mass in one embodiment of the present invention, 0.5% to 20% by mass in another embodiment, 0.5% to 13% by mass in still another embodiment, 0.5% to 9% by mass in still another embodiment, or 1% to 6% by mass in still another embodiment.

The compound(s) represented by the general formula (XV) for use in a liquid crystal composition according to the present invention is/are preferably a compound or compounds represented by the general formula (XV-1).

[Chem. 299]

(XV-1)

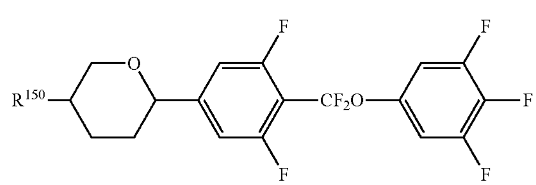

In the general formula (XV-1), $R^{150}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably combined in consideration of solubility at low temperatures, transition temperature, electrical reliability, and birefringence index.

The amount of the compound(s) represented by the general formula (XV-1) is appropriately adjusted in consideration of characteristics such as solubility at low temperatures, transition temperature, electrical reliability, and birefringence index.

For example, the amount of the compound(s) represented by the general formula (XV-1) based on the total mass of a liquid crystal composition of the present invention ranges from 1% to 25% by mass in one embodiment of the present invention, 1% to 20% by mass in another embodiment, 1% to 10% by mass in still another embodiment, 3% to 10% by mass in still another embodiment, 4% to 7% by mass in still another embodiment, 1% to 5% by mass in still another embodiment, or 5% to 10% by mass in still another embodiment.

More specifically, the compound(s) represented by the general formula (XV-1) for use in a liquid crystal composition according to the present invention is/are preferably at least one compound selected from a compound group represented by the formulae (59.1) to (59.4), particularly preferably a compound represented by the formula (59.2).

[Chem. 300]

(59.1)

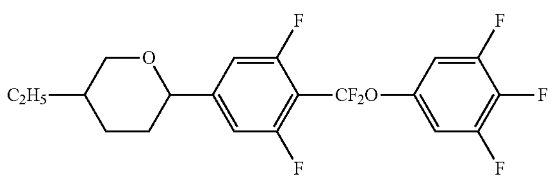

(59.2)

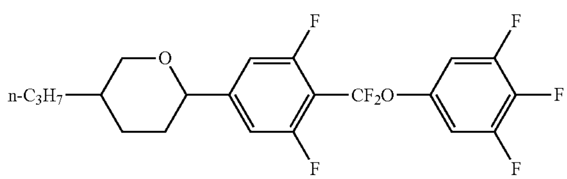

(59.3)

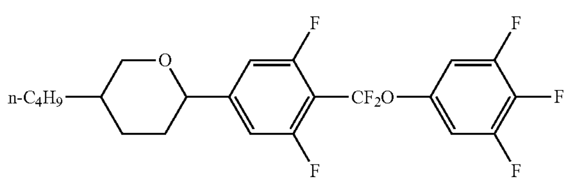

(59.4)

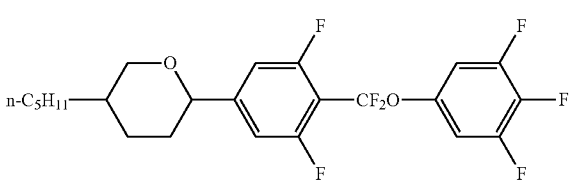

Alternatively, or in addition, the compound(s) represented by the general formula (XV) is/are preferably a compound or compounds represented by the general formula (XV-2).

[Chem. 301]

(XV-2)

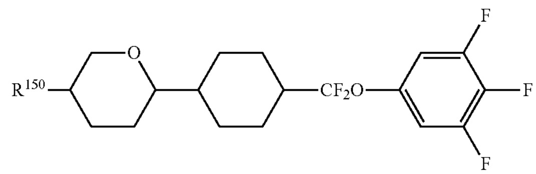

In the general formula (XV-2), $R^{150}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably combined in consideration of solubility at low temperatures, transition temperature, electrical reliability, and birefringence index.

The amount of the compound(s) represented by the general formula (XV-2) is appropriately adjusted in consideration of characteristics such as solubility at low temperatures, transition temperature, electrical reliability, and birefringence index.

For example, in consideration of solubility at low temperatures, transition temperature, electrical reliability, and birefringence index, the amount of the compound(s) represented by the general formula (XV-2) preferably ranges from 0.5% to 20% by mass, 1% to 15% by mass, 1% by mass 10% or less by mass, or 1% by mass 4% or less by mass of the total mass of a liquid crystal composition of the present invention.

More specifically, the compound(s) represented by the general formula (XV-2) for use in a liquid crystal composition according to the present invention is/are preferably at least one compound selected from a compound group represented by the formulae (60.1) to (60.4), particularly preferably a compound represented by the formula (60.2).

[Chem. 302]

(60.1)

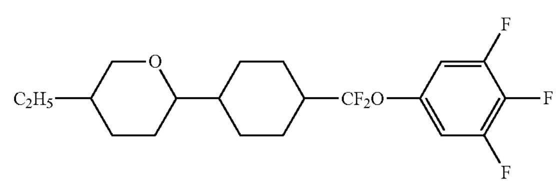

(60.2)

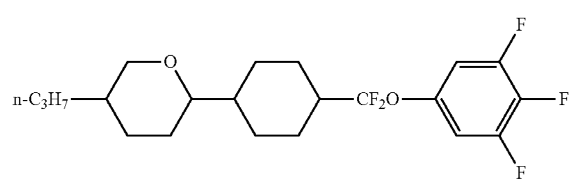

(60.3)

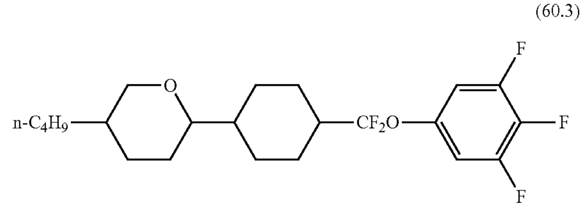

-continued (60.4)

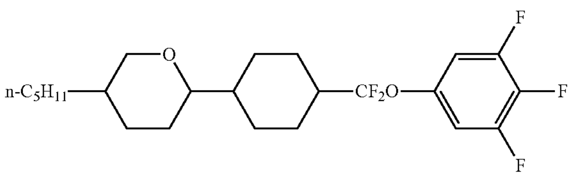

Alternatively, or in addition, the compound(s) represented by the general formula (XV) is/are preferably a compound or compounds represented by the general formula (XV-3).

[Chem. 303]

(XV-3)

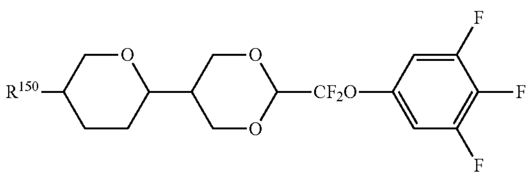

In the general formula (XV-3), $R^{150}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably combined in consideration of solubility at low temperatures, transition temperature, electrical reliability, and birefringence index.

The amount of the compound(s) represented by the general formula (XV-3) is appropriately adjusted in consideration of characteristics such as solubility at low temperatures, transition temperature, electrical reliability, and birefringence index.

For example, in consideration of solubility at low temperatures, transition temperature, electrical reliability, and birefringence index, the amount of the compound(s) represented by the general formula (XV-3) preferably ranges from 0.5% to 20% by mass, 1% to 15% by mass, 1% by mass 10% or less by mass, or 1% by mass 5% or less by mass of the total mass of a liquid crystal composition of the present invention.

More specifically, the compound(s) represented by the general formula (XV-3) for use in a liquid crystal composition according to the present invention is/are preferably at least one compound selected from a compound group represented by the formulae (64.1) to (64.4), more preferably a compound represented by the formula (64.1) or (64.2).

[Chem. 304]

(64.1)

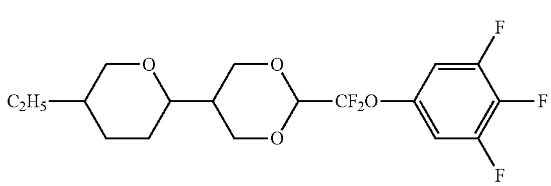

-continued (64.2)

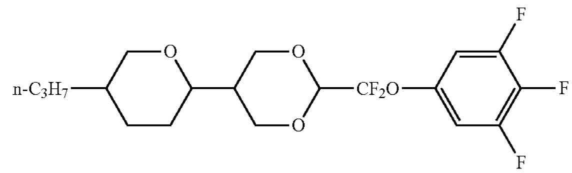

(64.3)

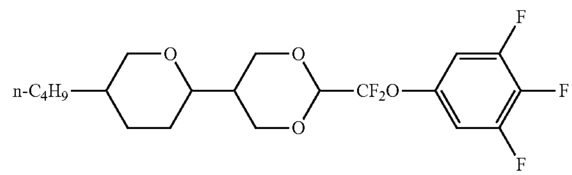

(64.4)

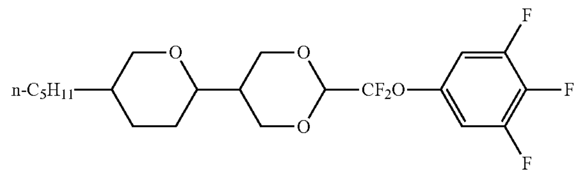

Alternatively, or in addition, the compound(s) represented by the general formula (M) is/are preferably a compound or compounds represented by the general formula (XV').

[Chem. 305]

(XV')

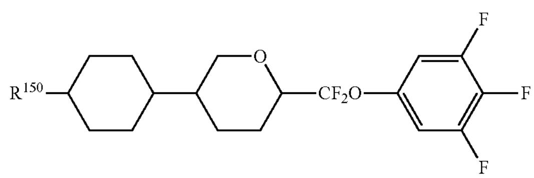

In the general formula (XV'), $R^{150}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably combined in consideration of solubility at low temperatures, transition temperature, electrical reliability, and birefringence index.

The amount of the compound(s) represented by the general formula (XV') is appropriately adjusted in consideration of characteristics such as solubility at low temperatures, transition temperature, electrical reliability, and birefringence index.

For example, in consideration of solubility at low temperatures, transition temperature, electrical reliability, and birefringence index, the amount of the compound(s) represented by the general formula (XV') preferably ranges from 0.5% to 20% by mass, 1% to 15% by mass, 1% by mass 10% or less by mass, or 1% by mass 4% or less by mass of the total mass of a liquid crystal composition of the present invention.

More specifically, the compound(s) represented by the general formula (XV') for use in a liquid crystal composition according to the present invention is/are preferably at least one compound selected from a compound group represented by the formulae (65.1) to (65.4), particularly preferably a compound represented by the formula (65.2).

[Chem. 306]

(65.1)

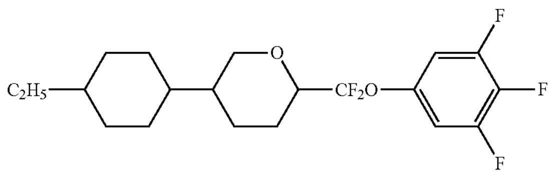

(65.2)

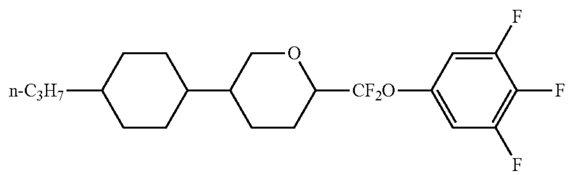

(65.3)

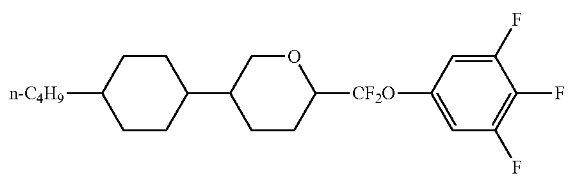

(65.4)

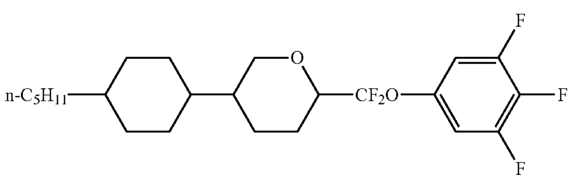

Alternatively, or in addition, the compound(s) represented by the general formula (M) is/are preferably a compound or compounds represented by the general formula (XVI).

[Chem. 307]

(XVI)

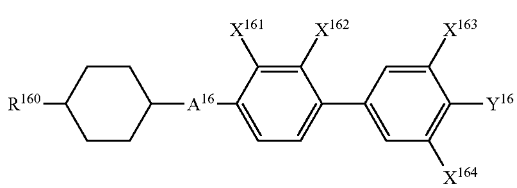

In the general formula (XVI), $R^{160}$ denotes an alkyl group having 1 to 5 carbon atoms, an alkenyl group having 2 to 5 carbon atoms, or an alkoxy group having 1 to 4 carbon atoms, $X^{161}$ to $X^{164}$ independently denote a fluorine atom or a hydrogen atom, $Y^{16}$ denotes a fluorine atom, a chlorine atom, or —$OCF_3$, and $A^{16}$ denotes a 1,4-cyclohexylene group or a 1,4-phenylene group. A hydrogen atom of the 1,4-phenylene group may be substituted with a fluorine atom.

Although any compounds may be combined, compounds are appropriately combined in consideration of solubility at low temperatures, transition temperature, electrical reliability, and birefringence index. For example, one compound is used in one embodiment of the present invention. Alternatively, two compounds are used in another embodiment of the present invention. Alternatively, three compounds are used in still another embodiment. Alternatively, four compounds are used in still another embodiment. Alternatively, at least five compounds are used in still another embodiment.

The amount of the compound(s) represented by the general formula (XVI) is appropriately adjusted in each embodiment in consideration of characteristics such as solubility at low temperatures, transition temperature, electrical reliability, and birefringence index. For example, the amount of the compound(s) represented by the general formula (XVI) based on the total mass of a liquid crystal composition of the present invention ranges from 1% to 30% by mass in one embodiment of the present invention, 3% to 25% by mass in another embodiment, 6% to 23% by mass in still another embodiment, 9% to 23% by mass in still another embodiment, 12% to 23% by mass in still another embodiment, 15% to 23% by mass in still another embodiment, or 19% to 23% by mass in still another embodiment.

The compound(s) represented by the general formula (XVI) for use in a liquid crystal composition according to the present invention is/are preferably a compound or compounds represented by the general formula (XVI-1).

[Chem. 308]

(XVI-1)

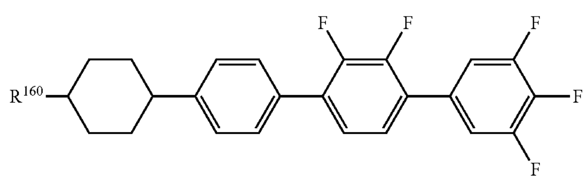

In the general formula (XVI-1), $R^{160}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably combined in consideration of solubility at low temperatures, transition temperature, electrical reliability, and birefringence index.

The amount of the compound(s) represented by the general formula (XVI-1) is appropriately adjusted in consideration of characteristics such as solubility at low temperatures, transition temperature, electrical reliability, and birefringence index.

For example, the amount of the compound(s) represented by the general formula (XVI-1) based on the total mass of a liquid crystal composition of the present invention ranges from 1% to 20% by mass in one embodiment of the present invention, 1% to 10% by mass in another embodiment, 3% to 10% by mass in still another embodiment, or 3% to 9% by mass in still another embodiment.

More specifically, the compound(s) represented by the general formula (XVI-1) for use in a liquid crystal composition according to the present invention is/are preferably at least one compound selected from a compound group represented by the formulae (62.1) to (62.4), particularly preferably a compound represented by the formula (62.2).

[Chem. 309]

(62.1)

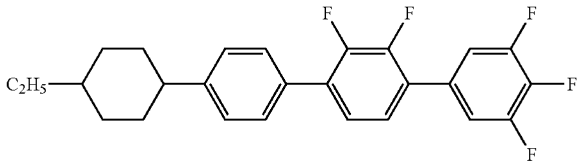

(62.2)

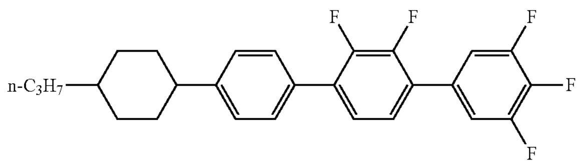

(62.3)

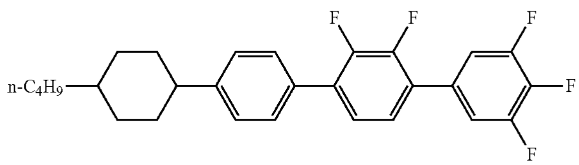

(62.4)

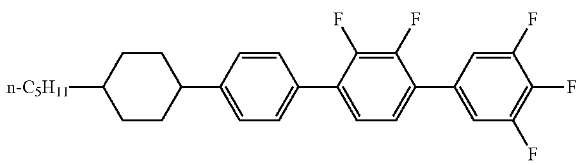

Alternatively, or in addition, the compound(s) represented by the general formula (XVI) is/are preferably a compound or compounds represented by the general formula (XVI-2).

[Chem. 310]

(XVI-2)

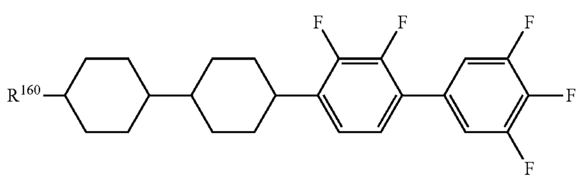

In the general formula (XVI-2), $R^{160}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably combined in consideration of solubility at low temperatures, transition temperature, electrical reliability, and birefringence index.

The amount of the compound(s) represented by the general formula (XV-2) is appropriately adjusted in consideration of characteristics such as solubility at low temperatures, transition temperature, electrical reliability, and birefringence index.

For example, in consideration of solubility at low temperatures, transition temperature, electrical reliability, and birefringence index, the amount of the compound(s) represented by the general formula (XV-2) preferably ranges from 0.5% to 20% by mass, 1% to 15% by mass, 1% by mass 10% or less by mass, or 1% by mass 4% or less by mass of the total mass of a liquid crystal composition of the present invention.

More specifically, the compound(s) represented by the general formula (XVI-2) for use in a liquid crystal composition according to the present invention is/are preferably at least one compound selected from a compound group represented by the formulae (63.1) to (63.4), particularly preferably a compound represented by the formula (63.2).

[Chem. 311]

(63.1)

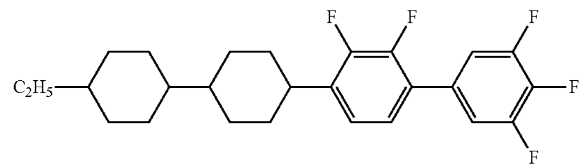

(63.2)

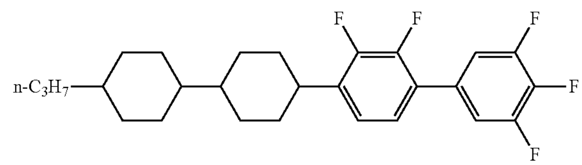

(63.3)

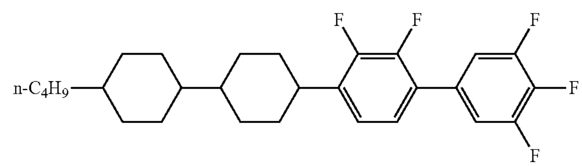

(63.4)

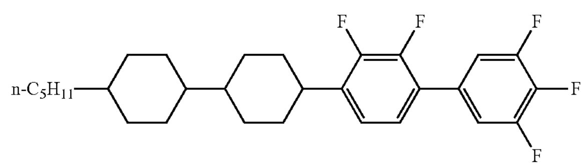

Alternatively, or in addition, the compound(s) represented by the general formula (X) is/are preferably a compound or compounds represented by the general formula (XVII).

[Chem. 312]

(XVII)

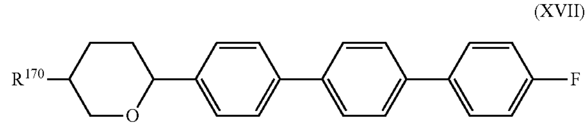

In the general formula (XVII), $R^{170}$ denotes an alkyl group having 1 to 5 carbon atoms, an alkenyl group having 2 to 5 carbon atoms, or an alkoxy group having 1 to 4 carbon atoms.

Although any compounds may be combined, one or two or more compounds are preferably combined in consideration of solubility at low temperatures, transition temperature, electrical reliability, and birefringence index.

The amount of the compound(s) represented by the general formula (XVII) is appropriately adjusted in consideration of characteristics such as solubility at low temperatures, transition temperature, electrical reliability, and birefringence index.

For example, in consideration of solubility at low temperatures, transition temperature, electrical reliability, and birefringence index, the amount of the compound(s) represented by the general formula (XVII) preferably ranges from 1% to 20% by mass, 1% to 15% by mass, 1% by mass 10% or less by mass, or 1% by mass 5% or less by mass of the total mass of a liquid crystal composition of the present invention.

More specifically, the compound(s) represented by the general formula (XVII) for use in a liquid crystal composition according to the present invention is/are preferably at least one compound selected from a compound group represented by the formulae (66.1) to (66.4), particularly preferably a compound represented by the formula (66.2).

[Chem. 313]

(66.1)

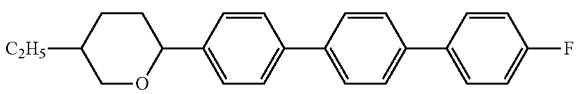

(66.2)

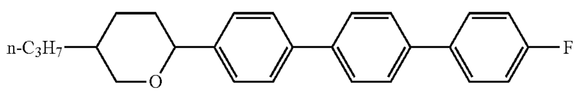

(66.3)

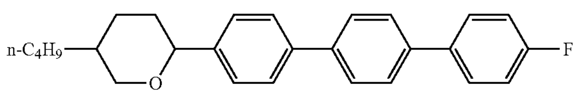

(66.4)

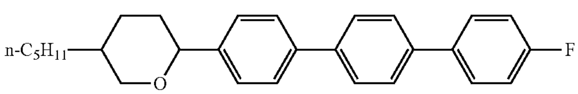

A liquid crystal composition according to the present invention preferably contains no compound having a structure in which oxygen atoms are bonded together, such as a peroxy (—CO—OO—) structure, in its molecule.

When the reliability and long-term stability of a liquid crystal composition are regarded as important, the amount of compound(s) having a carbonyl group is preferably 5% or less by mass, more preferably 3% or less by mass, still more preferably 1% or less by mass, most preferably substantially zero percent, of the total mass of the composition.

When stability under UV irradiation is regarded as important, the amount of compound(s) substituted with a chlorine atom is preferably 15% or less by mass, more preferably 10% or less by mass, still more preferably 5% or less by mass, most preferably substantially zero percent, of the total mass of the composition.

The amount of compound in which all the ring structures of its molecule are 6-membered rings is preferably increased. The amount of compound in which all the ring structures of its molecule are 6-membered rings is preferably 80% or more by mass, more preferably 90% or more by mass, still more preferably 95% or more by mass, of the total mass of the composition. Most preferably, a liquid crystal composition is composed substantially solely of a compound in which all the ring structures of its molecule are 6-membered rings.

In order to suppress the oxidation degradation of a liquid crystal composition, the amount of compound(s) having a cyclohexenylene group as a ring structure is preferably decreased. The amount of compound(s) having a cyclohexenylene group is preferably 10% or less by mass, more preferably 5% or less by mass, still more preferably substantially zero percent, of the total mass of the composition.

When improved viscosity and Tni are regarded as important, the amount of compound having a 2-methylbenzene-1,4-diyl group in its molecule in which a hydrogen atom may be substituted with a halogen is preferably decreased, and the amount of compound having the 2-methylbenzene-1,4-diyl group in its molecule is preferably 10% or less by mass, more preferably 5% or less by mass, still more preferably substantially zero percent, of the total mass of the composition.

When a compound in a composition according to a first embodiment of the present invention has an alkenyl group as a side chain, and the alkenyl group is bonded to cyclohexane, then the alkenyl group preferably has 2 to 5 carbon atoms. When the alkenyl group is bonded to benzene, the alkenyl group preferably has 4 or 5 carbon atoms, and an unsaturated bond of the alkenyl group is preferably not directly bonded to benzene.

A liquid crystal composition according to the present invention can contain a polymerizable compound in order to produce a PS mode, transverse electric field PSA mode, or transverse electric field PSVA mode liquid crystal display element. One possible polymerizable compound may be a photopolymerizable monomer, which can be polymerized by an energy beam, such as light. For example, the polymerizable compound has a liquid crystal skeleton in which a plurality of six-membered rings, such as a biphenyl derivative or a terphenyl derivative, are linked. More specifically, a bifunctional monomer represented by the general formula (XX) is preferred.

[Chem. 314]

(XX)

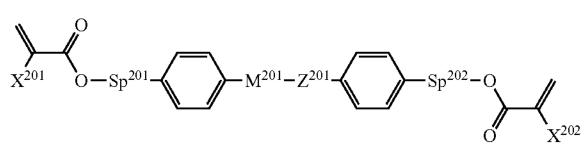

In the general formula (XX), $X^{201}$ and $X^{202}$ independently denote a hydrogen atom or a methyl group, $Sp^{201}$ and $Sp^{202}$ independently denote a single bond, an alkylene group having 1 to 8 carbon atoms, or —O—$(CH_2)_s$— (wherein s is an integer in the range of 2 to 7, and the oxygen atom is bonded to an aromatic ring), $Z^{201}$ denotes —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$— (wherein $Y^1$ and $Y^2$ independently denote a fluorine atom or a hydrogen atom), —C≡C—, or a single bond, and $M^{201}$ denotes a 1,4-phenylene group, a trans-1,4-cyclohexylene group, or a single bond. Any hydrogen atom of all the 1,4-phenylene groups in the formula may be substituted with a fluorine atom.

Both of $X^{201}$ and $X^{202}$ preferably denote a hydrogen atom (a diacrylate derivative) or a methyl group (a dimethacrylate derivative). Alternatively, one of $X^{201}$ and $X^{202}$ preferably denotes a hydrogen atom, and the other preferably denotes a methyl group. With respect to the rate of polymerization of these compounds, diacrylate derivatives have the highest rates, dimethacrylate derivatives have low rates, and asymmetric compounds have medium rates. The preferred embodiment depends on the application. Dimethacrylate derivatives are particularly suitable for PSA display elements.

$Sp^{201}$ and $Sp^{202}$ independently denote a single bond, an alkylene group having 1 to 8 carbon atoms, or —O—$(CH_2)_s$—. In PSA display elements, at least one of $Sp^{201}$ and $Sp^{202}$ is preferably a single bond, and a compound in which both of $Sp^{201}$ and $Sp^{202}$ are single bonds or an embodiment in which one of $Sp^{201}$ and $Sp^{202}$ is a single bond and the other is an alkylene group having 1 to 8 carbon atoms or —O—$(CH_2)_s$— is preferred. In this case, an alkyl group having 1 to 4 carbon atoms is preferred, and s is preferably in the range of 1 to 4.

$Z^{201}$ is preferably —$OCH_2$—, —$CH_2O$—, —COO—, —OCO—, —$CF_2O$—, —$OCF_2$—, —$CH_2CH_2$—, —$CF_2CF_2$—, or a single bond, more preferably —COO—, —OCO—, or a single bond, particularly preferably a single bond.

$M^{201}$ denotes a 1,4-phenylene group in which any hydrogen atom may be substituted with a fluorine atom, a trans-1,4-cyclohexylene group, or a single bond, preferably the 1,4-phenylene group or a single bond. In the case that $M^{201}$ denotes a ring structure other than a single bond, $Z^{201}$ preferably denotes a linking group other than a single bond. In the case that $M^{201}$ denotes a single bond, $Z^{201}$ preferably denotes a single bond.

Thus, in the general formula (XX), more specifically, the ring structures between $Sp^{201}$ and $Sp^{202}$ preferably have the following structure.

In the general formula (XX), if $M^{201}$ denotes a single bond, and the ring structures are composed of two rings, the ring structures are preferably represented by the following formulae (XXa-1) to (XXa-5), more preferably the formulae (XXa-1) to (XXa-3), particularly preferably the formula (XXa-1).

[Chem. 315]

(XXa-1)

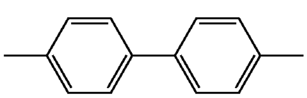

(XXa-2)

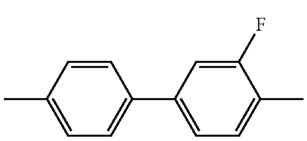

(XXa-3)

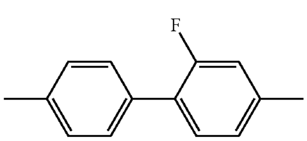

-continued (XXa-4)

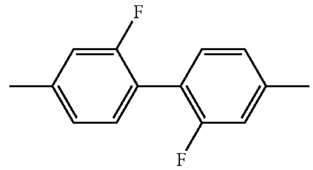

(XXa-5)

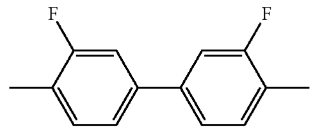

In the formulae (XXa-1) to (XXa-5), each end is bonded to $Sp^{201}$ or $Sp^{202}$.

Polymerizable compounds having such a skeleton are most suitable for PSA liquid crystal display elements with respect to alignment regulating force after polymerization and can provide a satisfactory alignment state, thus causing little or no variations in display.

Thus, the polymerizable monomer(s) is/are preferably at least one compound selected from a compound group represented by the general formulae (XX-1) to (XX-4), more preferably a compound represented by the general formula (XX-2).

[Chem. 316]

(XX-1)

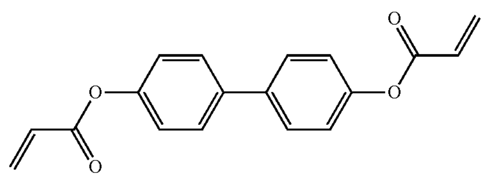

(XX-2)

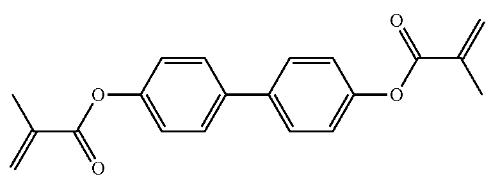

(XX-3)

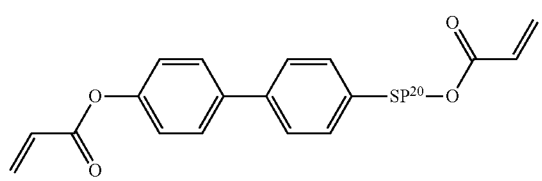

(XX-4)

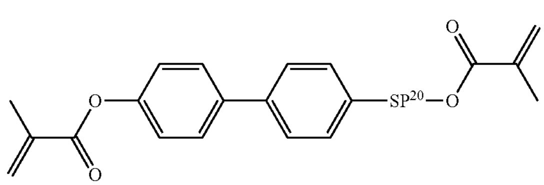

In the general formulae (XX-3) and (XX-4), $Sp^{20}$ denotes an alkylene group having 2 to 5 carbon atoms.

Although such a monomer in a liquid crystal composition according to the present invention can be polymerized without a polymerization initiator, the liquid crystal composition may contain a polymerization initiator so as to promote polymerization. Examples of the polymerization initiator include benzoin ethers, benzophenones, acetophenones, benzyl ketals, and acylphosphine oxides.

A liquid crystal composition in the present invention may further contain a compound represented by the general formula (Q).

[Chem. 317]

(Q)

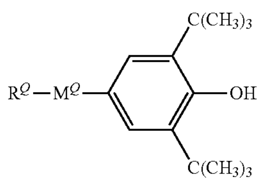

In the general formula (Q), $R^Q$ denotes a linear or branched alkyl group having 1 to 22 carbon atoms. One or two or more $CH_2$ groups in the alkyl group may be substituted with —O—, —CH═CH—, —CO—, —OCO—, —COO—, —C≡C—, —$CF_2O$—, and/or —$OCF_2$—, provided that oxygen atoms are not directly adjacent to each other. $M^Q$ denotes a trans-1,4-cyclohexylene group, a 1,4-phenylene group, or a single bond.

$R^Q$ denotes a linear or branched alkyl group having 1 to 22 carbon atoms. One or two or more $CH_2$ groups in the alkyl group may be substituted with —O—, —CH═CH—, —CO—, —OCO—, —COO—, —C≡C—, —$CF_2O$—, and/or —$OCF_2$—, provided that oxygen atoms are not directly adjacent to each other. $R^Q$ preferably denotes a linear alkyl group having 1 to 20 carbon atoms, a linear alkoxy group, a linear alkyl group in which one $CH_2$ group is substituted with —OCO— or —COO—, a branched alkyl group, a branched alkoxy group, or a branched alkyl group in which one $CH_2$ group is substituted with —OCO— or —COO—, more preferably a linear alkyl group having 1 to 10 carbon atoms, a linear alkyl group in which one $CH_2$ group is substituted with —OCO— or —COO—, a branched alkyl group, a branched alkoxy group, or a branched alkyl group in which one $CH_2$ group is substituted with —OCO— or —COO—.

$M^Q$ denotes a trans-1,4-cyclohexylene group, a 1,4-phenylene group, or a single bond, preferably a trans-1,4-cyclohexylene group or a 1,4-phenylene group.

The compound(s) represented by the general formula (Q) is/are preferably at least one compound selected from a compound group represented by the general formulae (Q-a) to (Q-d), more preferably a compound represented by the general formula (Q-c) and/or a compound represented by the general formula (Q-d).

[Chem. 318]

(Q-a)

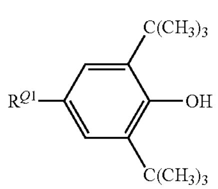

-continued (Q-b)

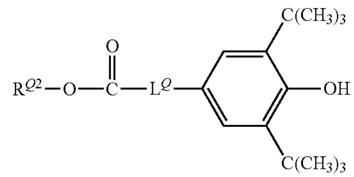

(Q-c)

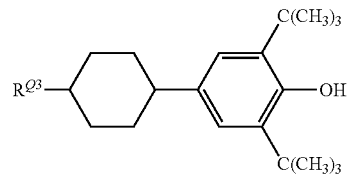

(Q-d)

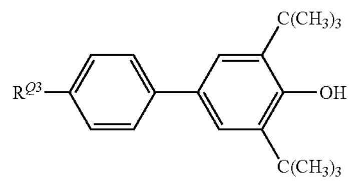

In these formulae, $R^{Q1}$ is preferably a linear or branched alkyl group having 1 to 10 carbon atoms, $R^{Q2}$ is preferably a linear or branched alkyl group having 1 to 20 carbon atoms, $R^{Q3}$ is preferably a linear alkyl group, a branched alkyl group, a linear alkoxy group, or a branched alkoxy group each having 1 to 8 carbon atoms, and $L^Q$ is preferably a linear or branched alkylene group having 1 to 8 carbon atoms.

A liquid crystal composition according to the present invention preferably contains one or two, more preferably one to five, compounds represented by the general formula (Q). The amount of the compound(s) represented by the general formula (Q) preferably ranges from 0.001% to 1% by mass, 0.001% to 0.1% by mass, or 0.001% to 0.05% by mass of the total mass of a liquid crystal composition of the present invention.

<Liquid Crystal Display Element>

In a liquid crystal composition containing a polymerizable compound of the present invention, the polymerizable compound is polymerized by ultraviolet irradiation to impart liquid crystal alignment capability to the liquid crystal composition. Such a liquid crystal composition can be used in liquid crystal display elements that can control the amount of transmitted light utilizing the birefringence of the liquid crystal composition. Such a liquid crystal composition can be used in ECB-LCD, VA-LCD, FFS-LCD, active-matrix liquid crystal display elements (AM-LCD), nematic liquid crystal display elements (TN), super-twisted nematic liquid crystal display elements (STN-LCD), OCB-LCD, and in-plane switching liquid crystal display elements (IPS-LCD), particularly in AM-LCD, and can be used in transmissive and reflective liquid crystal display elements.

Two substrates of a liquid crystal cell for use in liquid crystal display elements may be made of glass or a flexible transparent material, such as a plastic. One of the two substrates may be made of an opaque material, such as silicon. A transparent substrate having a transparent electrode layer may be produced by deposition of indium tin oxide (ITO) on a transparent substrate, such as a glass plate, by sputtering.

A color filter may be produced by a pigment dispersion method, a printing method, an electrodeposition method, or a staining method. For example, in a method for producing a color filter by a pigment dispersion method, a curable coloring composition for a color filter is applied to a transparent substrate, is patterned, and is cured by heating or light irradiation. This process is repeatedly performed to produce red, green, and blue pixel units for color filters. A pixel electrode that includes an active element, such as TFT or a thin-film diode, may be formed on the substrate.

The substrates face each other with the transparent electrode layer interposed therebetween. The distance between the substrates may be adjusted with a spacer. The distance between the substrates is preferably adjusted such that the resulting light control layer has a thickness in the range of 1 to 100 μm, more preferably 1.5 to 10 μm. When a polarizer is used, the product of the anisotropy of reflective index Δn of liquid crystals and the cell thickness d is preferably adjusted so as to maximize contrast. When two polarizers are used, a polarization axis of each of the polarizers may be adjusted to improve the view angle or contrast. A retardation film for increasing the view angle may also be used. For example, the spacer may be a columnar spacer formed of glass particles, plastic particles, alumina particles, or a photoresist material. Subsequently, a sealant, such as a thermosetting epoxy composition, is applied to the substrates by screen printing such that a liquid crystal inlet is formed. The substrates are then joined and heated to cure the sealant.

A liquid crystal composition containing a polymerizable compound may be applied between two substrates by a vacuum injection method or a one drop fill (ODF) method. The vacuum injection method does not form drop marks but leaves injection marks. The present invention can be suitably applied to display elements manufactured by the ODF method. In a process of manufacturing a liquid crystal display element by the ODF method, a light and heat curable epoxy sealant is applied in a closed-loop bank shape to a back or front plane substrate using a dispenser. A predetermined amount of a liquid crystal composition is dropped inside the closed-loop bank while degassing is performed. The front plane and the back plane are joined to manufacture the liquid crystal display element. A liquid crystal composition according to the present invention can be consistently dropped in the ODF process and can therefore be suitably used.

In order to achieve high liquid crystal alignment capability, an appropriate rate of polymerization is desirable. Thus, a polymerizable compound is preferably polymerized by irradiation of an active energy beam, such as ultraviolet light or an electron beam, alone, in combination, or in sequence. In the case of ultraviolet light, a polarized or unpolarized light source may be used. When the polymerizable compound(s) between two substrates is polymerized, at least the substrate to be irradiated must be transparent to an active energy beam. A particular portion of a polymerizable compound may be polymerized using a mask during light irradiation, and then the condition, such as an electric field, a magnetic field, or temperature, may be altered to change the alignment state of an unpolymerized portion, which is then polymerized by irradiation with an active energy beam. In particular, for ultraviolet exposure, a liquid crystal composition containing a polymerizable compound is preferably exposed to ultraviolet light in an alternating electric field. The alternating electric field preferably has a frequency in the range of 10 to 10,000 Hz, more preferably 60 to 10,000 Hz. The voltage depends on the desired pretilt angle of a liquid crystal display element. In other words, the pretilt angle of a liquid crystal display element can be controlled through the voltage to be applied. Transverse electric field MVA mode liquid crystal display elements preferably have a pretilt angle in the range of 80 to 89.9 degrees in terms of stability of alignment and contrast.

The irradiation temperature is preferably in such a range that a liquid crystal composition according to the present invention can retain its liquid crystal state. The polymerization temperature is preferably close to room temperature, typically in the range of 15° C. to 35° C. Examples of lamps for generating ultraviolet light include metal halide lamps, high-pressure mercury lamps, and ultrahigh-pressure mercury lamps. The wavelength of ultraviolet light is preferably outside the absorption wavelength range of a liquid crystal composition. Ultraviolet light is preferably filtered as required. The ultraviolet light intensity preferably ranges from 0.1 mW/cm$^2$ to 100 W/cm$^2$, more preferably 2 mW/cm$^2$ to 50 W/cm$^2$. The UV light energy can be appropriately determined and is preferably in the range of 10 mJ/cm$^2$ to 500 J/cm$^2$, more preferably 100 mJ/cm$^2$ to 200 J/cm$^2$. During ultraviolet irradiation, the ultraviolet light intensity may be changed. The UV irradiation time depends on the UV light intensity and is preferably in the range of 10 to 3600 seconds, more preferably 10 to 600 seconds.

A liquid crystal display element containing a liquid crystal composition according to the present invention is useful due to its high-speed response and reduced display defects, is particularly useful for liquid crystal display elements for active-matrix driving, and can be applied to VA mode, PSVA mode, PSA mode, in-plane switching (IPS) mode, fringe field switching (FFS) mode, and ECB mode liquid crystal display elements.

Preferred embodiments of a liquid crystal display unit according to the present invention will be described in detail below with reference to the accompanying drawings.

FIG. 1 is a cross-sectional view of a liquid crystal display element that includes two substrates facing each other, a sealant between the substrates, and liquid crystals in a sealing region surrounded by the sealant.

More specifically, the liquid crystal display element includes a back plane, a front plane, a sealant 301, and liquid crystal layers 303. In the back plane, TFT layers 102 and pixel electrodes 103 are disposed on a first substrate 100 and are covered with a passivation film 104 and a first alignment film 105. In the front plane, a black matrix 202, the color filters 203, a planarization film (overcoat layer) 201, and a transparent electrode 204 are disposed on a second substrate 200, and a second alignment film 205 is disposed on the transparent electrode 204. The front plane faces the back plane. The sealant 301 is disposed between the substrates. The liquid crystal layers 303 are disposed in a sealing region surrounded by the sealant. Protrusions (columnar spacers) 302 and 304 are disposed on a substrate face in contact with the sealant 301.

The first substrate or the second substrate may be made of any substantially transparent material, such as glass, a ceramic, or a plastic. Plastic substrates may be made of cellulose or a cellulose derivative, such as cellulose triacetate or cellulose diacetate, a polycycloolefin derivative, a polyester, such as poly(ethylene terephthalate) or poly(ethylene naphthalate), a polyolefin, such as polypropylene or polyethylene, a polycarbonate, poly(vinyl alcohol), poly (vinyl chloride), poly(vinylidene chloride), a polyamide, a polyimide, a poly(imide amide), a polystyrene, a polyacrylate, poly(methyl methacrylate), polyethersulfone, a polyarylate, or an inorganic-organic composite material, such as glass fiber-epoxy resin or glass fiber-acrylic resin.

For plastic substrates, a barrier film is preferably provided. The barrier film functions to decrease the moisture permeability of plastic substrates and improve the reliability of the electrical characteristics of liquid crystal display elements. The barrier film may be any barrier film having high transparency and low water permeability and is generally a thin film formed from an inorganic material, such as silicon oxide, by vapor deposition, sputtering, or a chemical vapor deposition (CVD) method.

In the present invention, the first substrate or the second substrate may be made of the same material or different materials. Glass substrates are preferred because heat-resistant and dimensionally stable liquid crystal display elements can be manufactured. Plastic substrates are preferred because they are suitable for manufacturing methods utilizing a roll-to-roll method and suitable for the purpose of weight reduction or flexibility. When flatness and heat resistance are desired, a plastic substrate and a glass substrate may be combined.

In the examples described later, a substrate is used as a material for the first substrate 100 or the second substrate 200.

In the back plane, the TFT layers 102 and the pixel electrodes 103 are disposed on the first substrate 100. These are produced in a general array process. The passivation film 104 and the first alignment film 105 are formed on the TFT layers 102 and the pixel electrodes 103, thus forming the back plane.

The passivation film 104 (also referred to as an inorganic protective film) protects the TFT layers and is generally a nitride film (SiNx) or an oxide film (SiOx) formed by a chemical vapor deposition (CVD) technique.

The first alignment film 105 functions to align liquid crystals and is generally formed of a polymeric material, such as polyimide. An alignment agent solution composed of a polymeric material and a solvent is used as a coating liquid. The alignment film may decrease the adhesive strength of the sealant and is therefore formed in a pattern in the sealing region. A printing method, such as flexography, or a droplet ejection method, such as ink jet, is used for coating. An applied alignment agent solution is temporarily dried to evaporate the solvent and is cross-linked and cured by baking. Alignment treatment is then performed to activate the alignment function.

Alignment treatment is generally performed by a rubbing method. A polymer film formed as described above is rubbed in one direction with a rubbing cloth made of fibers, such as rayon, to produce liquid-crystal alignment capability.

A photo-alignment method may also be used. In the photo-alignment method, an alignment film containing a photosensitive organic material is irradiated with polarized light to produce alignment capability. Thus, unlike the rubbing method, the photo-alignment method does not cause scratches on substrates and dust. An organic material for use in the photo-alignment method may be a material containing a dichroic dye. The dichroic dye may have a group that causes a photoreaction leading to liquid-crystal alignment capability (hereinafter referred to as a photo-alignment group), such as an alignment inducing or isomerization reaction (for example, an azobenzene group), a dimerization reaction (for example, a cinnamoyl group), a photocross-linking reaction (for example, a benzophenone group), or a photolysis reaction (for example, a polyimide group) of molecules due to the Weigert effect resulting from photodichroism. An applied alignment agent solution is temporarily dried to evaporate the solvent and is irradiated with light having polarization (polarized light), forming an alignment film having alignment capability in a certain direction.

In the front plane, the black matrix 202, the color filters 203, the planarization film 201, the transparent electrode 204, and the second alignment film 205 are disposed on the second substrate 200.

The black matrix 202 may be formed by a pigment dispersion method. More specifically, a color resin liquid containing a uniformly dispersed black colorant for a black matrix is applied to the second substrate 200 having a barrier film 201, thereby forming a color layer. The color layer is then cured by baking. A photoresist is applied to the color layer and is prebaked. The photoresist is exposed to light through a mask pattern and is then developed to pattern the color layer. The photoresist layer is then removed, and the color layer is baked to complete the black matrix 202.

Alternatively, a photoresist type pigment dispersion liquid may also be used. In this case, a photoresist type pigment dispersion liquid is applied, is prebaked, is exposed to light through a mask pattern, and is developed to pattern the color layer. The photoresist layer is then removed, and the color layer is baked to complete the black matrix 202.

The color filters 203 may be formed by a pigment dispersion method, an electrodeposition method, a printing method, or a staining method. For example, in the pigment dispersion method, a color resin liquid containing a uniformly dispersed (for example, red) pigment is applied to the second substrate 200 and is cured by baking. A photoresist is then applied to the color layer and is prebaked. The photoresist is exposed to light through a mask pattern and is then developed to pattern the color layer. The photoresist layer is then removed, and the color layer is baked again to complete the (red) color filters 203. The colors may be formed in any order. Green color filters 203 and blue color filters 203 are formed in the same manner.

The transparent electrode 204 is disposed on the color filters 203 (if necessary, the overcoat layer (201) for surface planarization is formed on the color filters 203). The transparent electrode 204 is preferably transparent to light and preferably has low electrical resistance. The transparent electrode 204 may be an oxide film, such as ITO, formed by a sputtering method.

A passivation film may be formed on the transparent electrode 204 in order to protect the transparent electrode 204.

The second alignment film 205 is the same as the first alignment film 105.

Although specific embodiments of the back plane and the front plane for use in the present invention have been described, the present application is not limited to these specific embodiments. The embodiments may be modified in each desired liquid crystal display element.

The columnar spacers may have any shape and may have various horizontal cross sections, such as circular and polygonal, including tetragonal. In consideration of misalignment margins in a process, a circular or regular polygonal horizontal cross section is particularly preferred. The protrusions preferably have a truncated cone or truncated pyramid shape.

The columnar spacers may be made of any material that is not dissolved in the sealant, an organic solvent of the sealant, or the liquid crystals, and are preferably made of a synthetic resin (curable resin) in terms of processing and weight reduction. The protrusions may be formed on a surface of the first substrate in contact with the sealant by a photolithography method or a droplet ejection method. For such reasons, a photocurable resin suitable for the photolithography method or the droplet ejection method is preferably used.

Figure 2:
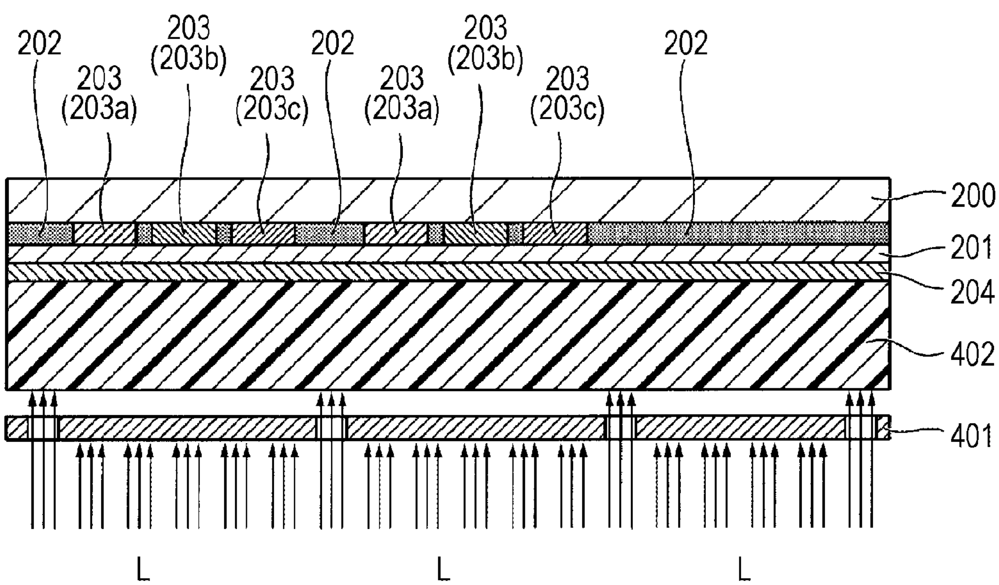
FIG. 2 is a schematic view of an exposure treatment process in which a columnar spacer forming pattern on a black matrix is used as a photomask pattern.

The columnar spacers formed by the photolithography method will be described below by way of example. FIG. 2 is a schematic view of an exposure treatment process in which a columnar spacer forming pattern on a black matrix is used as a photomask pattern.

A resin liquid for forming a columnar spacer (containing no colorant) is applied to the transparent electrode 204 in the front plane. The resin layer 402 is then cured by baking. A photoresist is applied to the color layer and is prebaked. The photoresist is exposed to light through a mask pattern 401 and is then developed to pattern the resin layer. The photoresist layer is then removed, and the resin layer is baked to complete the columnar spacers (302 and 304 in FIG. 1).

The positions of the columnar spacers can be determined as desired using the mask pattern. Thus, both the inside and the outside (a portion to which a sealant is applied) of a sealing region of a liquid crystal display element can be simultaneously formed. The columnar spacers are preferably disposed on a black matrix so as not to reduce the quality of the sealing region. Such columnar spacers formed by the photolithography method are sometimes referred to as column spacers or photo-spacers.

The materials of the spacers include a mixture of a negative water-soluble resin, such as a PVA-stilbazo photosensitive resin, a polyfunctional acrylic monomer, an acrylic acid copolymer, and a triazole initiator. In another method, a color resin that contains a colorant dispersed in a polyimide resin is used. The materials of the spacers are not particularly limited in the present invention. The spacers may be formed from known materials that match the liquid crystal and the sealant.

After the columnar spacers are formed in the sealing region in the front plane in this manner, a sealant is applied to a surface of the back plane with which the sealant comes into contact (301 in FIG. 1).

The materials of the sealant are not particularly limited and may be a curable resin composition that contains an epoxy or acrylic photocurable, thermosetting, or light and heat curable resin and a polymerization initiator. A filler composed of an inorganic or organic substance may be added to the sealant in order to control the moisture permeability, modulus of elasticity, and viscosity. The filler may have any shape, such as spherical, fibrous, or amorphous. The sealant may be mixed with a spherical or fibrous gap material having a monodisperse diameter in order to control the cell gap or with a fibrous substance that is easily wound around the protrusions on the substrate in order to increase adhesion to the substrate. The fibrous substance preferably has a diameter of approximately ⅕ to 1/10 or less of the cell gap and preferably has a length shorter than the sealing width.

The material of the fibrous substance may be any material that can form a predetermined shape, for example, synthetic fibers, such as cellulose, polyamide, or polyester, or an inorganic material, such as glass or carbon.

The sealant may be applied by a printing method or a dispense method. The dispense method is preferred because the amount of sealant to be used can be decreased. The sealant is generally applied over the black matrix so as not to adversely affect the sealing region. In order to form a liquid crystal dropping region used in the next process (in order to prevent the leakage of liquid crystals), the sealant is applied in a closed loop shape.

Liquid crystals are dropped into the closed loop (sealing region) in the front plane to which the sealant is applied. In general, a dispenser is used. In order to match the amount of liquid crystals to be dropped to the liquid crystal cell volume, the amount of liquid crystals is basically the same as the volume calculated by multiplying the height of the columnar spacers by the sealing area. However, in order to prevent the leakage of liquid crystals in a cell joining process or optimize the display characteristics, the amount of liquid crystals to be dropped may be appropriately adjusted, or the positions at which liquid crystals are dropped may be dispersed.

The back plane is then joined to the front plane to which the sealant is applied and onto which the liquid crystals are dropped. More specifically, the front plane and the back plane are adsorbed on a stage having a mechanism for adsorbing a substrate, such as an electrostatic chuck, such that the second alignment film of the front plane faces the first alignment film of the back plane. The front plane and the back plane are disposed at a position (distance) at which the sealant is not in contact with the substrate. The system is evacuated under these conditions. After evacuation, the positions of the substrates are adjusted for the joining position between the front plane and the back plane (alignment operation). After the joining position is adjusted, the substrates are brought closer together to bring the sealant in the front plane into contact with the back plane. The system is filled with an inert gas under this condition, and the pressure is increased to normal pressure. The front plane and the back plane are joined together due to the atmospheric pressure, and the cell gap reaches the height of the columnar spacers. The sealant is cured under this condition by ultraviolet irradiation, thereby forming a liquid crystal cell. After that, a heating process is performed if necessary to promote curing of the sealant. In order to enhance the adhesion of the sealant or improve the reliability of electrical characteristics, a heating process is often performed.

EXAMPLES

Although the present invention will be further described in the following examples, the present invention is not limited to these examples. Unless otherwise specified, the term "%" with respect to compositions in the following examples and comparative examples refers to "% by mass".

The following characteristics were measured in the examples.

Tni: Nematic phase-isotropic liquid phase transition temperature (° C.)

Δn: Anisotropy of reflective index (also referred to as birefringence index) at 298 K Δ∈: Anisotropy of dielectric constant at 298 K η: Viscosity (mPa·s) at 293 K γ1: Rotational viscosity (mPa·s) at 298 K VHR: Voltage holding ratio (%) at a frequency of 60 Hz, at an applied voltage of 5 V, and at 333 K VHR after heat resistance test: After a test element group (TEG) for the evaluation of electro-optical characteristics containing a liquid crystal composition sample was held in a thermostat at 130° C. for 1 hour, VHR was measured under the conditions described above.

Burn-in:

In the evaluation of burn-in in a liquid crystal display element, a predetermined fixed pattern was displayed in a display area for a test time. The test time at which the after-image of the fixed pattern being uniformly displayed on the entire screen reached an unacceptable level was measured.

1) The test time refers to the display time of the fixed pattern. A longer test time indicates suppression of an after-image and higher performance.

2) An unacceptable after-image level means that the observed after-image fails to meet inspection standards.

Drop Marks:

In the evaluation of drop marks in a liquid crystal display unit, white drop marks on a black background on the entire screen were visually inspected according to the following five ratings:

5: No drop mark (excellent)

4: A few acceptable drop marks (good)

3: Several drop marks on the borderline of acceptability (fair under certain conditions)

2: Unacceptable drop marks (poor)

1: Terrible drop marks (very poor)

Process Compatibility:

The process compatibility in an ODF process was evaluated by dropping 100 drops of liquid crystals with a constant delivery pump, the volume of each drop being 50 pL, repeatedly performing this procedure ("0 to 100 drops, 101 to 200 drops, 201 to 300 drops, . . . "), measuring the mass of 100 drops each, and determining the number of drops at which the variations in mass fail to meet the specifications of the ODF process.

A larger number of drops indicates consistent dropping for longer periods and higher process compatibility.

Solubility at Low Temperatures:

Solubility at low temperatures was evaluated by preparing a liquid crystal composition, weighing 1 g of the liquid crystal composition in a 2-mL sample bottle, subjecting the sample bottle to cycles of temperature changes of "−20° C. (for 1 hour)→temperature rise (0.1° C./min)→0° C. (for 1 hour)→temperature rise (0.1° C./min)→20° C. (for 1 hour)→temperature drop (−0.1° C./min)→0° C. (for 1 hour)→temperature drop (−0.1° C./min)→−20° C." in a temperature controlled test chamber, visually inspecting the sample bottle for precipitates from the liquid crystal composition, and determining the test time at which precipitates were observed.

A longer test time indicates a stable liquid crystal phase for longer periods and higher solubility at low temperatures.

Volatility/Contamination of Manufacturing Apparatus:

The volatility of a liquid crystal material was evaluated by observing the operational status of a vacuum stirring and degassing mixer with a stroboscope and visually inspecting the mixer for foaming of the liquid crystal material. More specifically, 0.8 kg of the liquid crystal composition was poured into a 2.0-L special-purpose container of the vacuum stirring and degassing mixer. The vacuum stirring and degassing mixer was operated at a reduced pressure of 4 kPa, at an orbital speed of 15 $S^{-1}$, and at a rotational speed of 7.5 $S^{-1}$. The time to foam was measured.

A longer time to foam indicates lower volatility, lower likelihood of contamination of the manufacturing apparatus, and higher performance.

Examples 1 and 2 and Comparative Example 1

The following compounds were used to prepare compositions listed in Table 1. IPS liquid crystal display units having the structure illustrated in FIGS. 1 and 2 were manufactured. Table 2 shows the evaluation results for the compositions and the liquid crystal display units.

[Chem. 319]

(i) (45.3)

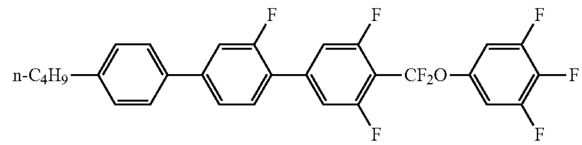

(ii) (18.1)

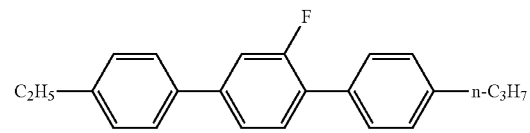

(ii) (18.6)

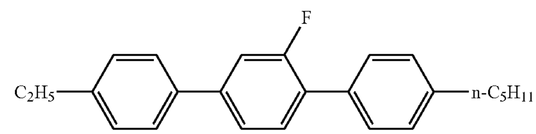

(28.3)

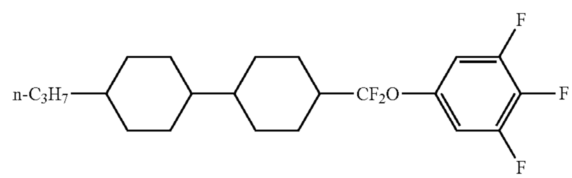

(26.2)

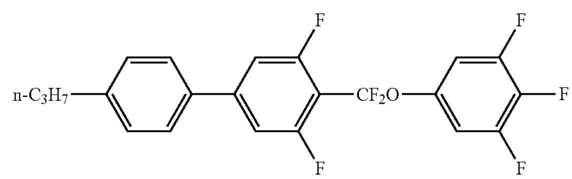

(36.1)

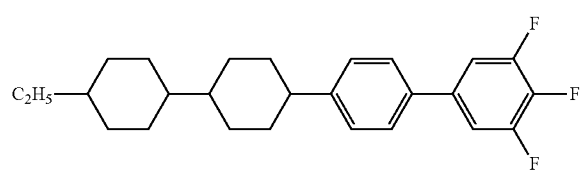

(30.2)

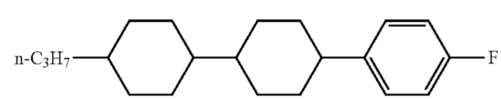

(2.2)

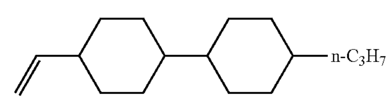

(1.3)

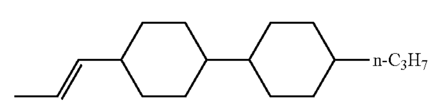

(11.1)

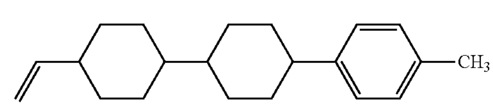

-continued (25.24)

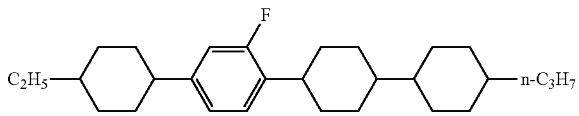

(25.23)

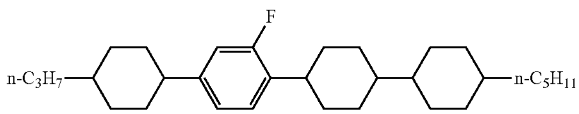

(36.3)

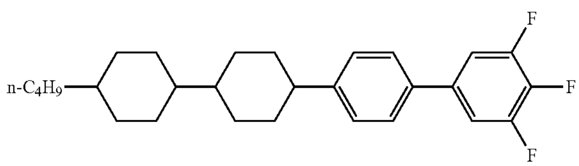

TABLE 1

| Formula No. of chemical structure | Ratio (%) Comparative example 1 | Example 1 | Example 2 |
|---|---|---|---|
| (i) (45.3) | 5 | 5 | 5 |
| (ii) (18.1) | | | 5 |
| (ii) (18.6) | | 6 | 6 |
| (28.3) | 14 | 14 | 14 |
| (26.2) | 16 | 16 | 16 |
| (36.1) | 4 | 4 | 4 |
| (30.2) | 2 | 2 | 2 |
| (2.2) | 27 | 27 | 27 |
| (1.3) | 10 | 10 | 10 |
| (11.1) | 11 | 5 | |
| (25.24) | 2 | 2 | 2 |
| (25.23) | 5 | 5 | 5 |
| (36.3) | 4 | 4 | 4 |

TABLE 2

| | Comparative example 1 | Example 1 | Example 2 |
|---|---|---|---|
| Tni/° C. | 97.2 | 94.2 | 90.8 |
| Δn | 0.095 | 0.101 | 0.105 |
| Δϵ | 6.3 | 6.7 | 7.2 |
| η/mPa · s | 13 | 15 | 15 |
| $\gamma_1$/mPa · s | 71 | 77 | 82 |
| Initial voltage holding ratio (%) | 99.0 | 99.4 | 99.3 |
| Voltage holding ratio after heat resistance test (%) | 97.0 | 98.6 | 98.5 |
| Evaluation of burn-in (h) | 80 | 160 | 600 |
| Evaluation of drop marks | 2 | 5 | 4 |
| Evaluation of contamination of manufacturing apparatus (s) | 100 | 110 | 110 |
| Evaluation of process compatibility (×100 drops) | 175 | 320 | 400 |
| Evaluation of solubility at low temperatures (h) | 145 | 600 | 390 |

The compositions prepared in Examples 1 and 2 had higher Δn and Δ∈, much higher solubility at low temperatures, higher drop mark ratings, and higher resistance to burn-in than the composition prepared in Comparative Example 1.

Examples 3 to 6

The following compounds were used to prepare compositions listed in Table 3. IPS liquid crystal display units having the structure illustrated in FIGS. 1 and 2 were manufactured. Table 4 shows the evaluation results for the compositions and the liquid crystal display units.

[Chem. 320]

(i) (45.2)

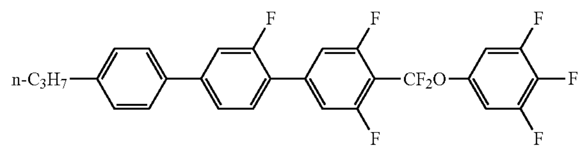

(ii) (19.2)

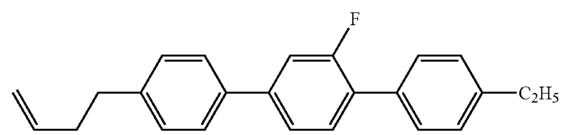

(26.2)

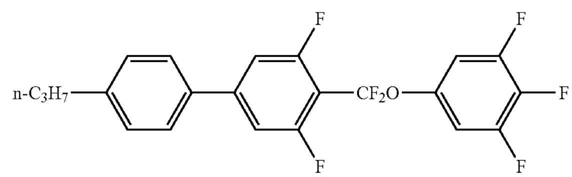

(1.3)

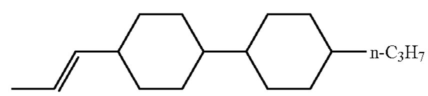

(11.1)

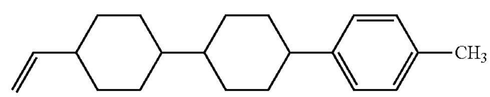

(11.2)

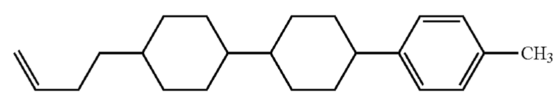

(37.2)

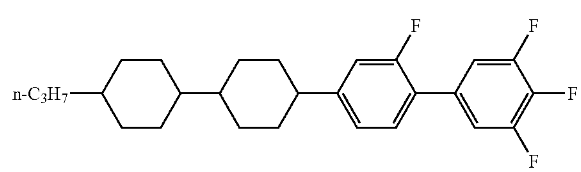

(44.2)

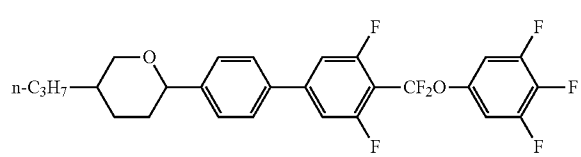

(2.4)

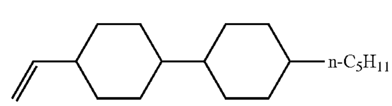

-continued (31.2)

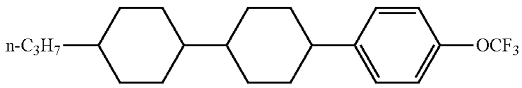

(2.3)

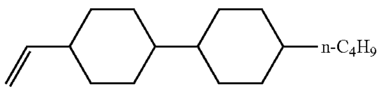

(3.3)

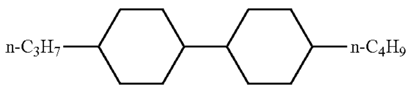

(41.2)

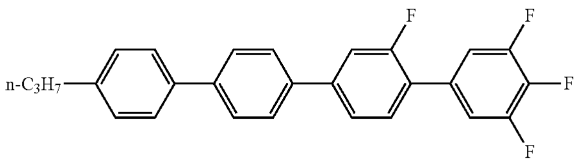

(6.3)

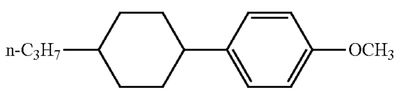

(2.2)

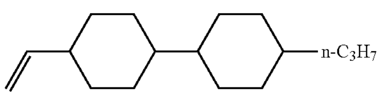

(3.1)

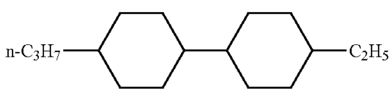

(23.3)

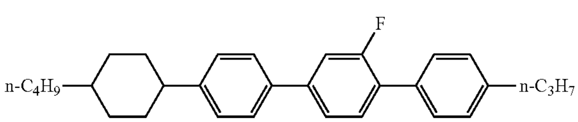

(6.6)

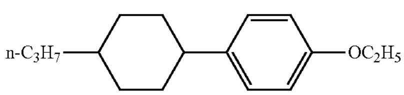

TABLE 3

| Formula No. of | Ratio (%) | | | |
|---|---|---|---|---|
| chemical structure | Example 3 | Example 4 | Example 5 | Example 6 |
| (i) (45.2) | 5 | 5 | 5 | 5 |
| (ii) (19.2) | 1 | 1 | 1 | 2 |
| (26.2) | 9 | 9 | 9 | 9 |
| (1.3) | 8 | 8 | 8 | 13 |
| (11.1) | 17 | 17 | 13 | 13 |
| (11.2) | 9 | 9 | 13 | 13 |
| (37.2) | 7 | 7 | 6 | 6 |
| (44.2) | 4 | 4 | 4 | 4 |
| (2.4) | 10 | 10 | | |
| (31.2) | 3 | 3 | 3 | 3 |
| (2.3) | 11 | | 11 | |
| (3.3) | 4 | 4 | 4 | |
| (41.2) | 1 | 1 | 2 | 2 |
| (6.3) | 11 | 10 | | 6 |
| (2.2) | | 11 | 9 | 15 |
| (3.1) | | | | 4 |
| (23.3) | | 1 | 1 | |
| (6.6) | | | 11 | 5 |

TABLE 4

| | Example 3 | Example 4 | Example 5 | Example 6 |
|---|---|---|---|---|
| Tni/° C. | 89.9 | 93.3 | 94.8 | 92.8 |
| Δn | 0.105 | 0.106 | 0.111 | 0.109 |
| Δϵ | 6.7 | 6.7 | 7.2 | 7.1 |
| η/mPa · s | 14 | 13 | 18 | 14 |
| $\gamma_1$/mPa · s | 70 | 66 | 70 | 62 |
| Initial voltage holding ratio (%) | 99.6 | 99.5 | 99.0 | 99.0 |
| Voltage holding ratio after heat resistance test (%) | 98.6 | 98.4 | 98.0 | 97.6 |
| Evaluation of burn-in (h) | 600 | 600 | 480 | 550 |
| Evaluation of drop marks | 5 | 5 | 3 | 4 |
| Evaluation of contamination of manufacturing apparatus (s) | 200 | 200 | 170 | 180 |
| Evaluation of process compatibility (×100 drops) | 1011 | 1000 | 850 | 900 |
| Evaluation of solubility at low temperatures (h) | 600 | 600 | 430 | 500 |

Examples 7 to 10

The following compounds were used to prepare compositions listed in Table 5. IPS liquid crystal display units having the structure illustrated in FIGS. 1 and 2 were manufactured. Table 6 shows the evaluation results for the compositions and the liquid crystal display units.

[Chem. 321]

(i) (45.2)

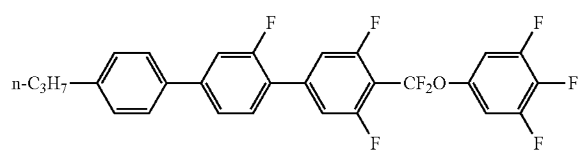

(i) (45.3)

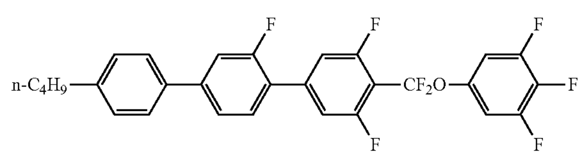

(i) (45.4)

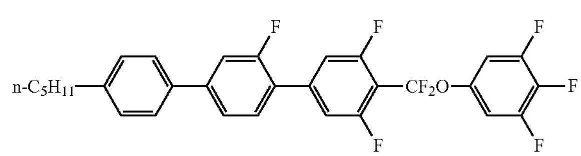

(ii) (18.3)

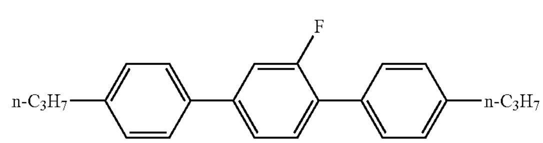

(ii) (18.9)

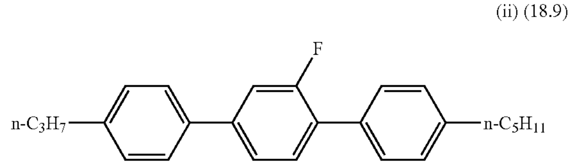

-continued (26.2)

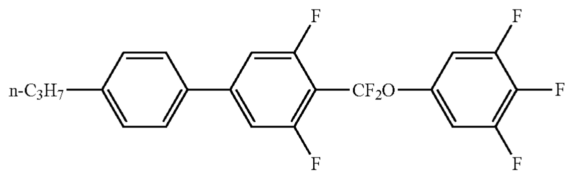

(1.3)

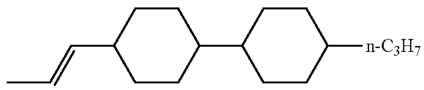

(2.2)

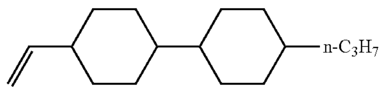

(37.2)

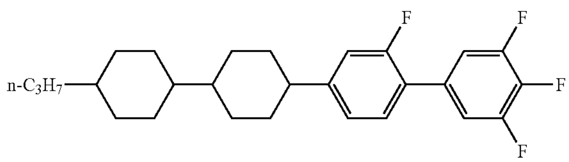

(15.1)

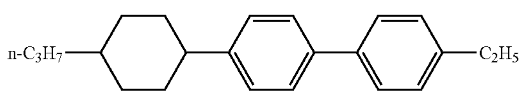

(54.2)

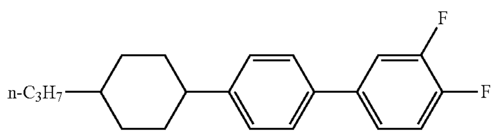

(5.4)

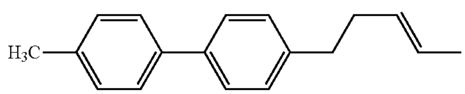

(54.4)

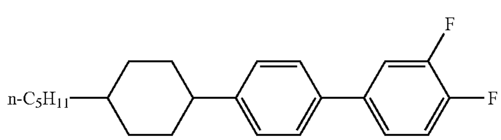

(5.2)

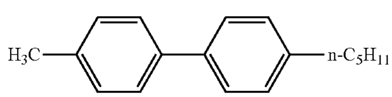

TABLE 5

| Formula No. of chemical structure | Ratio (%) Example 7 | Example 8 | Example 9 | Example 10 |
|---|---|---|---|---|
| (i) (45.2) | 5 | | | 5 |
| (i) (45.3) | | 5 | | |
| (i) (45.4) | | | 5 | |
| (ii) (18.3) | 8 | 8 | | |
| (ii) (18.9) | | | 8 | 8 |
| (26.2) | 6 | 6 | 6 | 6 |
| (1.3) | 5 | | 10 | 14 |
| (2.2) | 43 | 48 | 38 | 34 |
| (37.2) | 6 | 6 | 6 | 6 |
| (15.1) | 9 | 9 | 9 | 9 |
| (54.2) | 7 | 7 | 7 | 5 |

TABLE 5-continued

| Formula No. of chemical structure | Ratio (%) Example 7 | Example 8 | Example 9 | Example 10 |
|---|---|---|---|---|
| (5.4) | 6 | 6 | 6 | |
| (54.4) | 5 | 5 | 5 | 7 |
| (5.2) | | | | 6 |

TABLE 6

| | Example 7 | Example 8 | Example 9 | Example 10 |
|---|---|---|---|---|
| Tni/° C. | 76.4 | 75.3 | 80.5 | 81.1 |
| Δn | 0.112 | 0.111 | 0.117 | 0.115 |
| Δϵ | 4.7 | 4.7 | 4.3 | 4.3 |
| η/mPa · s | 12 | 12 | 14 | 14 |
| $\gamma_1$/mPa · s | 44 | 42 | 48 | 51 |
| Initial voltage holding ratio (%) | 99.4 | 99.6 | 99.6 | 99.5 |
| Voltage holding ratio after heat resistance test (%) | 98.8 | 98.0 | 98.0 | 99.0 |
| Evaluation of burn-in (h) | 180 | 190 | 175 | 200 |
| Evaluation of drop marks | 5 | 4 | 4 | 5 |
| Evaluation of contamination of manufacturing apparatus (s) | 150 | 140 | 180 | 200 |
| Evaluation of process compatibility (×100 drops) | 1000 | 800 | 650 | 1000 |
| Evaluation of solubility at low temperatures (h) | 610 | 420 | 336 | 625 |

Examples 11 to 14

The following compounds were used to prepare compositions listed in Table 7. IPS liquid crystal display units having the structure illustrated in FIGS. 1 and 2 were manufactured. Table 8 shows the evaluation results for the compositions and the liquid crystal display units.

[Chem. 322]

(i) (45.2)

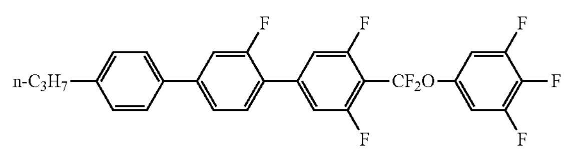

(i) (45.3)

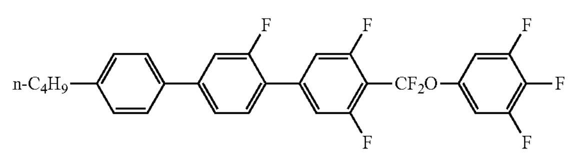

(i) (45.4)

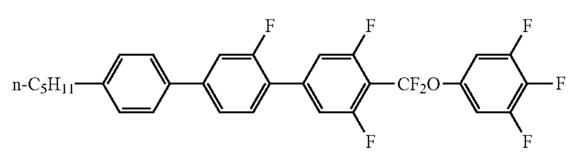

-continued (ii) (18.1)

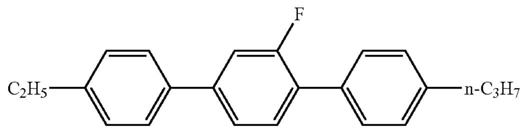

(ii) (18.3)

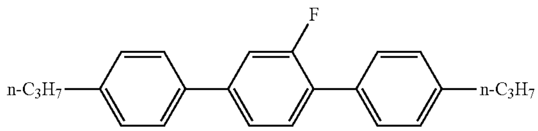

(ii) (18.4)

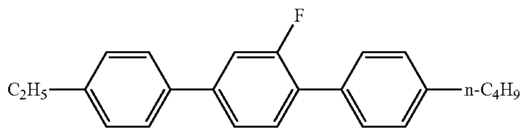

(26.2)

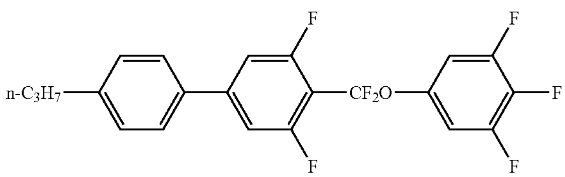

(1.3)

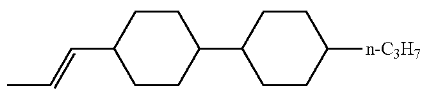

(2.2)

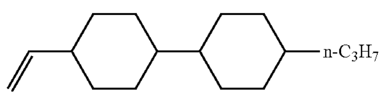

(39.2)

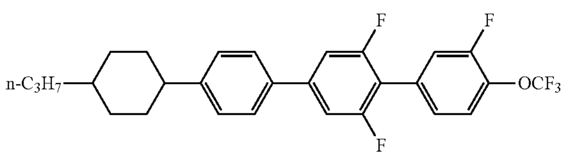

(15.1)

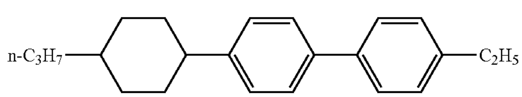

(5.4)

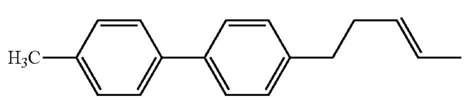

(42.3)

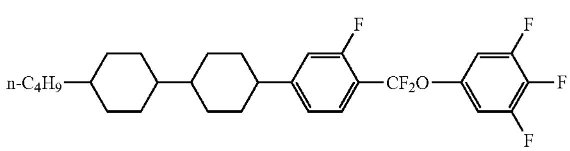

(11.2)

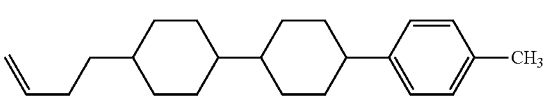

TABLE 7

| Formula No. of | Ratio (%) | | | |
|---|---|---|---|---|
| chemical structure | Example 11 | Example 12 | Example 13 | Example 14 |
| (i) (45.2) | 5 | | | 5 |
| (i) (45.3) | | 5 | | |
| (i) (45.4) | | | 5 | |
| (ii) (18.1) | 8 | 8 | 8 | |
| (ii) (18.3) | 7 | | | 7 |
| (ii) (18.4) | | 7 | | 8 |
| (26.2) | 4 | 4 | 4 | 4 |
| (1.3) | 4 | 2 | 6 | 0 |
| (2.2) | 48 | 50 | 46 | 52 |
| (39.2) | 6 | 6 | 6 | 6 |
| (15.1) | 7 | 7 | 7 | |
| (5.4) | 8 | 8 | 8 | 8 |
| (42.3) | 3 | 3 | 3 | 3 |
| (11.2) | | | 7 | 7 |

TABLE 8

| | Example 11 | Example 12 | Example 13 | Example 14 |
|---|---|---|---|---|
| Tni/° C. | 75.1 | 74.5 | 81.2 | 74.9 |
| Δn | 0.12 | 0.120 | 0.115 | 0.114 |
| Δϵ | 4.6 | 4.5 | 4.1 | 4.6 |
| η/mPa · s | 13 | 14 | 14 | 14 |
| $\gamma_1$/mPa · s | 44 | 43 | 43 | 41 |
| Initial voltage holding ratio (%) | 99.4 | 99.6 | 99.4 | 99.6 |
| Voltage holding ratio after heat resistance test (%) | 98.8 | 98.9 | 98.8 | 98.9 |
| Evaluation of burn-in (h) | 600 | 620 | 590 | 600 |
| Evaluation of drop marks | 5 | 5 | 4 | 5 |
| Evaluation of contamination of manufacturing apparatus (s) | 175 | 160 | 180 | 140 |
| Evaluation of process compatibility (×100 drops) | 890 | 900 | 750 | 920 |
| Evaluation of solubility at low temperatures (h) | 550 | 590 | 500 | 600 |

Examples 15 to 18

The following compounds were used to prepare compositions listed in Table 9. IPS liquid crystal display units having the structure illustrated in FIGS. 1 and 2 were manufactured. Table 10 shows the evaluation results for the compositions and the liquid crystal display units.

[Chem. 323]

(i) (45.2)

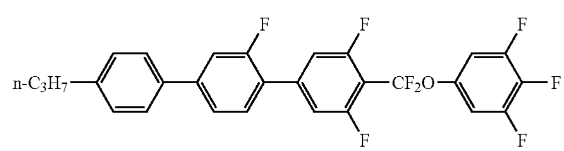

(i) (45.3)

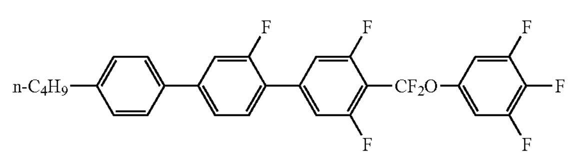

-continued (ii) (18.1)

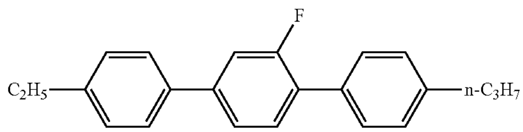

(ii) (18.4)

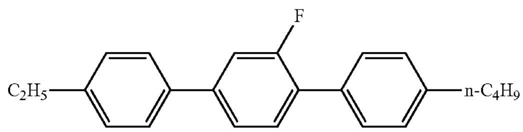

(ii) (18.6)

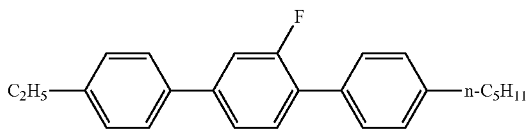

(2.2)

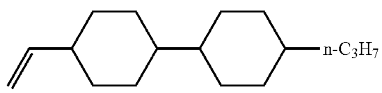

(1.3)

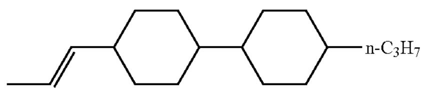

(26.1)

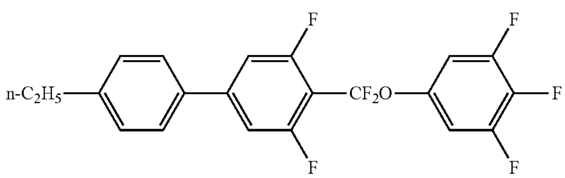

(39.2)

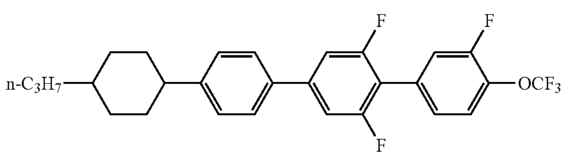

(10.1)

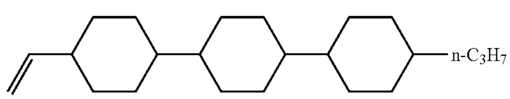

(5.2)

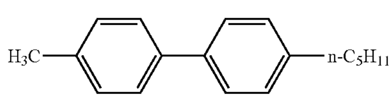

(26.2)

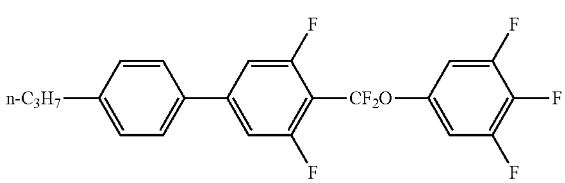

(11.2)

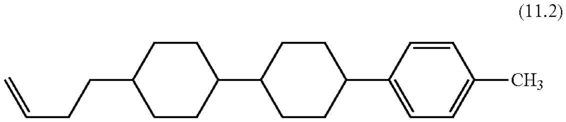

-continued (5.4)

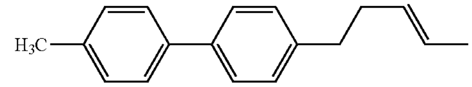

TABLE 9

| Formula No. of | Ratio (%) | | | |
|---|---|---|---|---|
| chemical structure | Example 15 | Example 16 | Example 17 | Example 18 |
| (i) (45.2) | 5 | 5 | 5 | |
| (i) (45.3) | | | | 5 |
| (ii) (18.1) | 7 | 7 | 7 | |
| (ii) (18.4) | 8 | | | 8 |
| (ii) (18.6) | | 8 | 8 | 7 |
| (2.2) | 34 | 37 | 37 | 32 |
| (1.3) | 15 | 12 | 12 | 15 |
| (26.1) | 5 | | | 5 |
| (39.2) | 6 | 6 | 6 | 6 |
| (10.1) | 8 | 8 | 4 | 8 |
| (5.2) | 12 | 12 | | 10 |
| (26.2) | | 5 | 5 | |
| (11.2) | | | 4 | |
| (5.4) | | | 12 | 4 |

TABLE 10

| | Example 15 | Example 16 | Example 17 | Example 18 |
|---|---|---|---|---|
| Tni/° C. | 75.3 | 76.5 | 75.2 | 76.0 |
| Δn | 0.121 | 0.122 | 0.126 | 0.127 |
| Δε | 3.9 | 3.8 | 3.9 | 3.7 |
| η/mPa · s | 11 | 11 | 12 | 13 |
| $\gamma_1$/mPa · s | 42 | 41 | 42 | 44 |
| Initial voltage holding ratio (%) | 99.7 | 99.4 | 99.6 | 99.7 |
| Voltage holding ratio after heat resistance test (%) | 98.8 | 98.1 | 98.3 | 98.8 |
| Evaluation of burn-in (h) | 750 | 530 | 600 | 710 |
| Evaluation of drop marks | 5 | 3 | 4 | 5 |
| Evaluation of contamination of manufacturing apparatus (s) | 240 | 180 | 200 | 220 |
| Evaluation of process compatibility (×100 drops) | 1000 | 680 | 890 | 990 |
| Evaluation of solubility at low temperatures (h) | 600 | 400 | 500 | 600 |

Examples 19 to 22

The following compounds were used to prepare compositions listed in Table 11. IPS liquid crystal display units having the structure illustrated in FIGS. 1 and 2 were manufactured. Table 12 shows the evaluation results for the compositions and the liquid crystal display units.

[Chem. 324]

(i) (45.2)

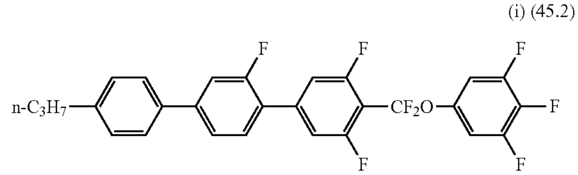

-continued (i) (45.3)

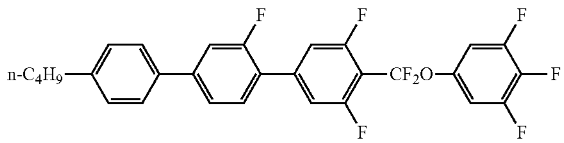

(i) (45.4)

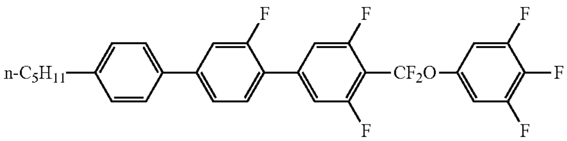

(ii) (18.1)

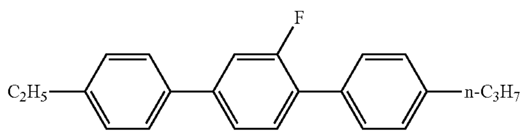

(ii) (18.6)

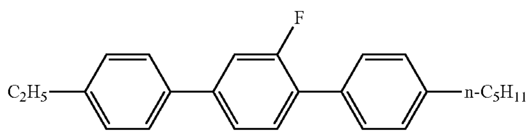

(ii) (18.9)

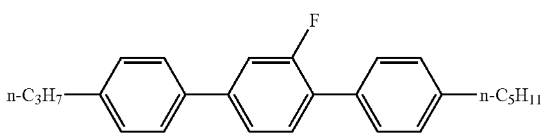

(26.2)

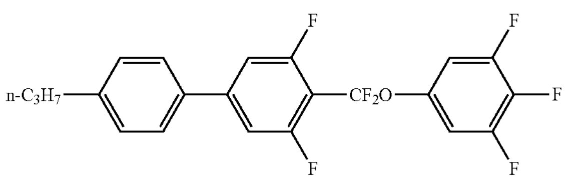

(1.3)

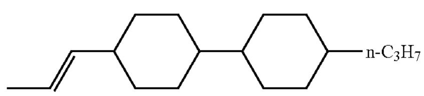

(2.2)

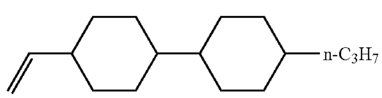

(11.1)

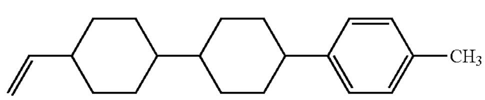

(36.2)

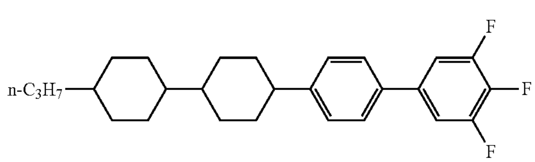

(11.2)

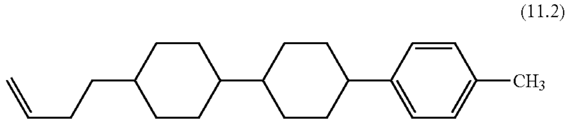

-continued (41.2)

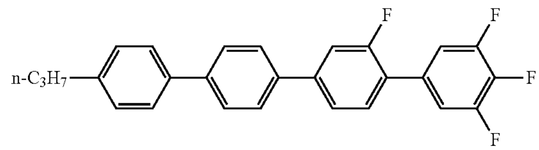

(9.2)

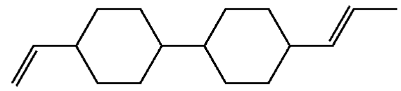

TABLE 11

| Formula No. of chemical structure | Example 19 | Example 20 | Example 21 | Example 22 |
|---|---|---|---|---|
| (i) (45.2) | | | 4 | |
| (i) (45.3) | 4 | 4 | | |
| (i) (45.4) | | | | 4 |
| (ii) (18.1) | 11 | 11 | 11 | 7 |
| (ii) (18.6) | 11 | | 11 | 7 |
| (ii) (18.9) | | 11 | | 8 |
| (26.2) | 9 | 9 | 9 | 9 |
| (1.3) | 7 | 7 | 4 | |
| (2.2) | 41 | 35 | 44 | 44 |
| (11.1) | 11 | 11 | | 6 |
| (36.2) | 6 | 6 | | |
| (11.2) | | | 11 | 5 |
| (41.2) | | | 6 | 6 |
| (9.2) | | 6 | | 4 |

TABLE 12

| | Example 19 | Example 20 | Example 21 | Example 22 |
|---|---|---|---|---|
| Tni/° C. | 80.8 | 82.7 | 73.6 | 74.0 |
| Δn | 0.116 | 0.119 | 0.120 | 0.123 |
| Δϵ | 4.30 | 4.34 | 5.12 | 4.81 |
| η/mPa · s | 12.0 | 12.7 | 12.8 | 14.1 |
| $\gamma_1$/mPa · s | 45 | 48 | 48 | 48 |
| Initial voltage holding ratio (%) | 99.6 | 99.4 | 99.4 | 99.6 |
| Voltage holding ratio after heat resistance test (%) | 98.8 | 98.5 | 98.0 | 98.8 |
| Evaluation of burn-in (h) | 480 | 500 | 250 | 530 |
| Evaluation of drop marks | 4 | 5 | 3 | 5 |
| Evaluation of contamination of manufacturing apparatus (s) | 180 | 200 | 75 | 190 |
| Evaluation of process compatibility (×100 drops) | 870 | 950 | 310 | 1000 |
| Evaluation of solubility at low temperatures (h) | 575 | 590 | 168 | 230 |

Examples 23 to 26

The following compounds were used to prepare compositions listed in Table 13. IPS liquid crystal display units having the structure illustrated in FIGS. 1 and 2 were manufactured. Table 14 shows the evaluation results for the compositions and the liquid crystal display units.

[Chem. 325]

(i) (45.2)

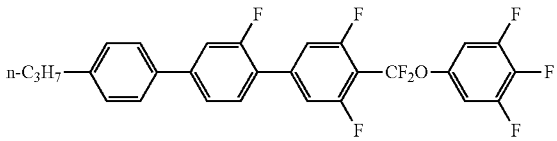

(ii) (18.1)

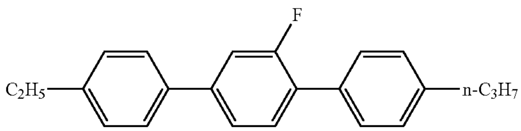

(ii) (18.4)

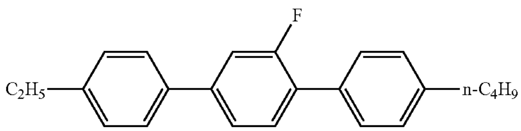

(1.3)

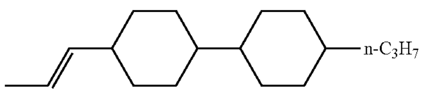

(2.2)

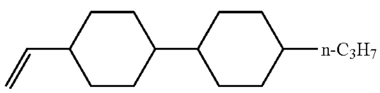

(11.1)

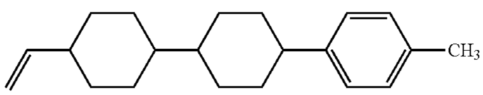

(26.1)

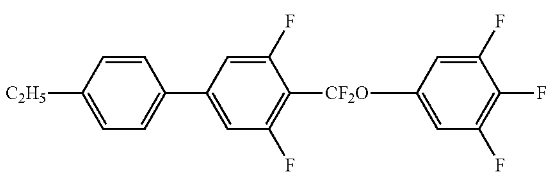

(39.2)

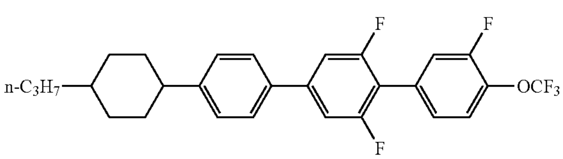

(5.2)

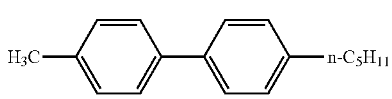

(3.1)

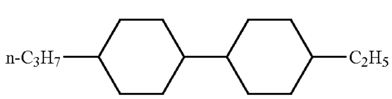

(1.2)

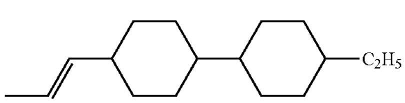

-continued (37.2)

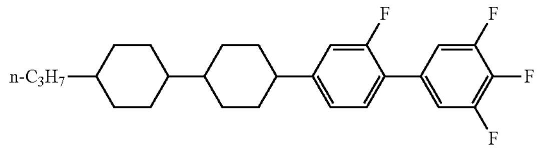

(5.4)

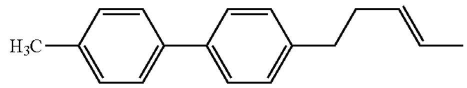

TABLE 13

| | Ratio (%) | | | |
|---|---|---|---|---|
| Formula No. of chemical structure | Example 23 | Example 24 | Example 25 | Example 26 |
| (i) (45.2) | 5 | 5 | 5 | 5 |
| (ii) (18.1) | 8 | 8 | 8 | 8 |
| (ii) (18.4) | 10 | 10 | 10 | 10 |
| (1.3) | 15 | 14 | 10 | 10 |
| (2.2) | 34 | 35 | 30 | 30 |
| (11.1) | 8 | 8 | 8 | 8 |
| (26.1) | 5 | 5 | 5 | 5 |
| (39.2) | 5 | | | |
| (5.2) | 10 | 10 | 10 | 5 |
| (3.2) | | | 5 | 5 |
| (1.2) | | | 4 | 4 |
| (37.2) | | 5 | 5 | 5 |
| (5.4) | | | | 5 |

TABLE 14

| | Example 23 | Example 24 | Example 25 | Example 26 |
|---|---|---|---|---|
| Tni/° C. | 75.3 | 78.1 | 76.2 | 77.3 |
| Δn | 0.121 | 0.119 | 0.117 | 0.109 |
| Δε | 3.9 | 3.8 | 3.8 | 3.7 |
| η/mPa · s | 12 | 11 | 11 | 11 |
| $\gamma_1$/mPa · s | 41 | 39 | 37 | 39 |
| Initial voltage holding ratio (%) | 99.7 | 99.5 | 99.3 | 99.3 |
| Voltage holding ratio after heat resistance test (%) | 98.7 | 98.5 | 98.2 | 98.1 |
| Evaluation of burn-in (h) | 710 | 600 | 500 | 490 |
| Evaluation of drop marks | 5 | 4 | 4 | 3 |
| Evaluation of contamination of manufacturing apparatus (s) | 250 | 240 | 230 | 210 |
| Evaluation of process compatibility (×100 drops) | 1005 | 995 | 805 | 660 |
| Evaluation of solubility at low temperatures (h) | 610 | 585 | 535 | 525 |

Examples 27 to 30

The following compounds were used to prepare compositions listed in Table 15. IPS liquid crystal display units having the structure illustrated in FIGS. 1 and 2 were manufactured. Table 16 shows the evaluation results for the compositions and the liquid crystal display units.

[Chem. 326]

(i) (45.2)

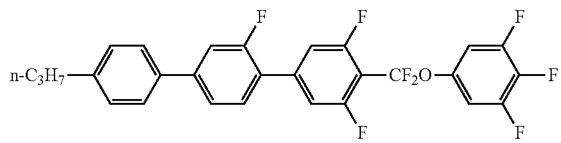

(i) (45.3)

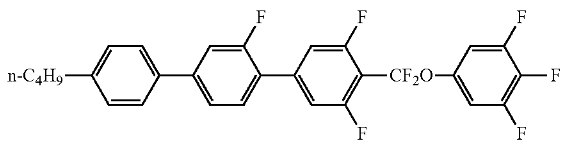

(i) (45.4)

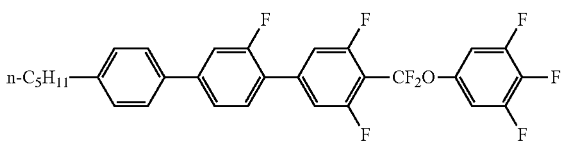

(ii) (18.4)

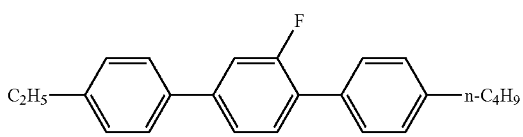

(ii) (19.2)

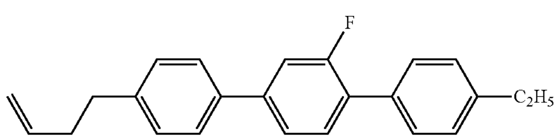

(26.2)

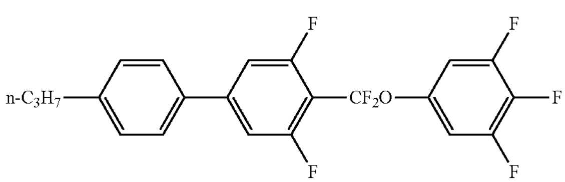

(1.3)

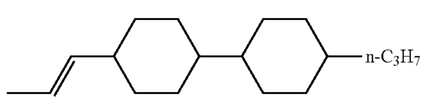

(2.2)

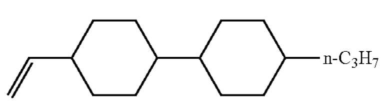

(11.2)

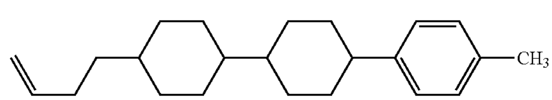

(44.2)

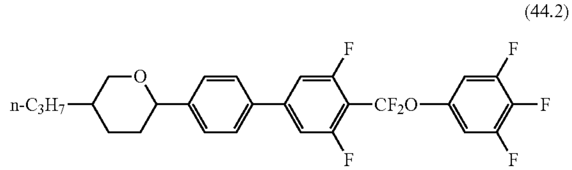

-continued (44.1)

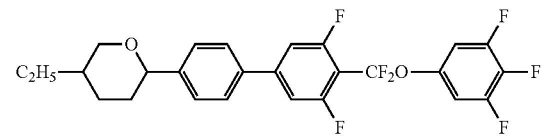

(31.2)

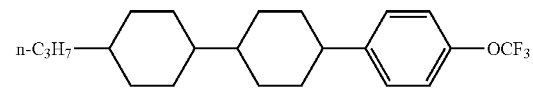

(11.1)

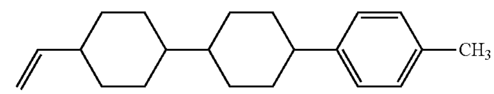

TABLE 15

| Formula No. of chemical structure | Ratio (%) Example 27 | Example 28 | Example 29 | Example 30 |
|---|---|---|---|---|
| (i) (45.2) | | 7 | 7 | |
| (i) (45.3) | 8 | 8 | | 8 |
| (i) (45.4) | 7 | | 8 | 7 |
| (ii) (18.4) | | | 1 | 8 |
| (ii) (19.2) | 1 | 1 | | |
| (26.2) | 4 | 4 | 4 | 4 |
| (1.3) | 13 | 12 | 11 | 13 |
| (2.2) | 34 | 35 | 36 | 34 |
| (11.2) | 16 | 8 | 8 | |
| (44.2) | 7 | 6 | 5 | 7 |
| (44.1) | 4 | 5 | 6 | 4 |
| (31.2) | 6 | 6 | 6 | 6 |
| (11.1) | | 8 | 8 | 9 |

TABLE 16

| | Example 27 | Example 28 | Example 29 | Example 30 |
|---|---|---|---|---|
| Tni/° C. | 91.8 | 88.6 | 88.1 | 84.8 |
| Δn | 0.109 | 0.107 | 0.107 | 0.115 |
| Δϵ | 10.3 | 10.3 | 10.1 | 10.4 |
| η/mPa · s | 19 | 17 | 17 | 20 |
| $\gamma_1$/mPa · s | 99 | 93 | 94 | 101 |
| Initial VHR (%) | 99.6 | 99.6 | 99.4 | 99.2 |
| Evaluation of burn-in (h) | 650 | 650 | 580 | 490 |
| Evaluation of drop marks | 5 | 5 | 4 | 3 |
| Evaluation of contamination of manufacturing apparatus (s) | 250 | 245 | 200 | 170 |
| Evaluation of process compatibility (×100 drops) | 1090 | 1050 | 880 | 665 |
| Evaluation of solubility at low temperatures (h) | 600 | 600 | 500 | 400 |

Examples 31 to 34

The following compounds were used to prepare compositions listed in Table 17. IPS liquid crystal display units having the structure illustrated in FIGS. 1 and 2 were manufactured. Table 18 shows the evaluation results for the compositions and the liquid crystal display units.

[Chem. 327]
(i) (45.2)
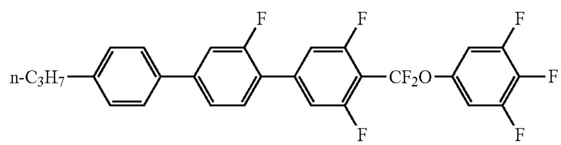
(i) (45.3)
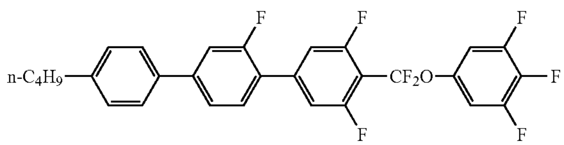
(i) (45.4)
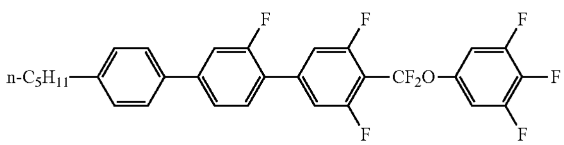
(ii) (18.1)
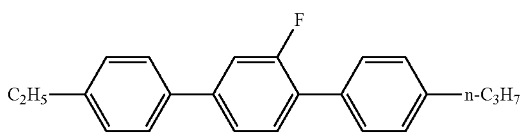
(ii) (19.2)
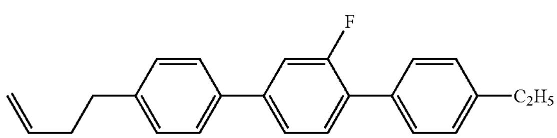
(26.2)
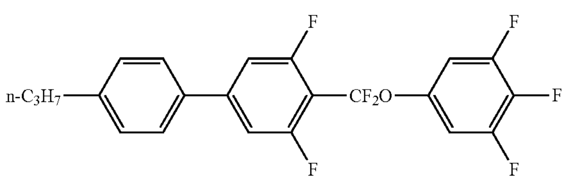
(1.3)
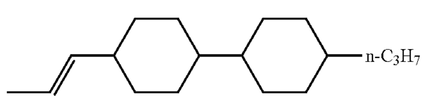
(2.4)
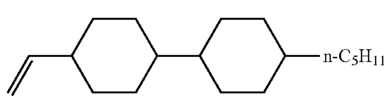
(2.3)
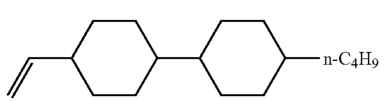
(2.2)
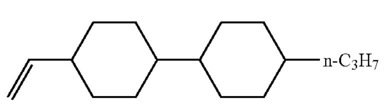
(15.1)
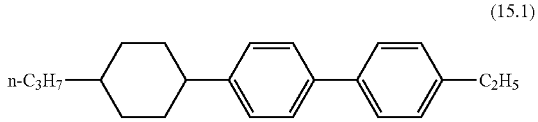
-continued
(23.1)
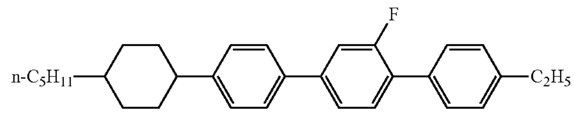
(23.2)
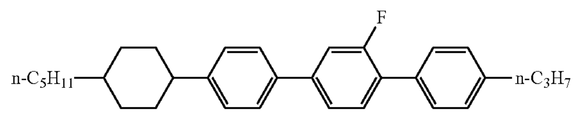
(6.6)
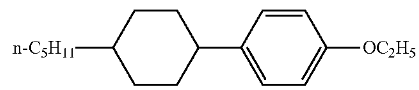
(6.3)
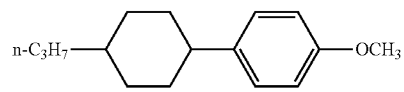
(11.1)
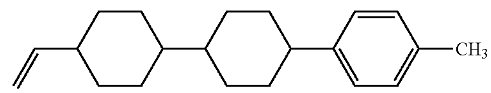
(11.2)
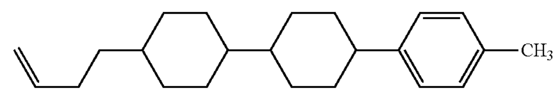
TABLE 17
| | Ratio (%) | | | |
|---|---|---|---|---|
| Formula No. of chemical structure | Example 31 | Example 32 | Example 33 | Example 34 |
| (i) (45.2) | 2 | 3 | 5 | 5 |
| (i) (45.3) | 5 | 5 | 3 | 3 |
| (i) (45.4) | 3 | 2 | 2 | 2 |
| (ii) (18.1) | 3 | | | |
| (ii) (19.2) | | | 3 | 3 |
| (26.2) | 8 | 8 | 8 | 8 |
| (1.3) | 11 | 11 | 11 | 11 |
| (2.4) | 12 | | 12 | |
| (2.3) | 15 | 15 | | |
| (2.3) | | 12 | 15 | 27 |
| (15.1) | | 3 | | |
| (23.1) | 5 | 5 | 5 | 5 |
| (23.2) | 5 | 5 | 5 | 5 |
| (6.6) | 5 | 5 | | |
| (6.3) | | | 5 | 5 |
| (11.1) | 15 | 15 | 13 | 11 |
| (11.2) | 11 | 11 | 13 | 15 |
TABLE 18
| | Example 31 | Example 32 | Example 33 | Example 34 |
|---|---|---|---|---|
| Tni/° C. | 104.9 | 105.6 | 106.7 | 105.5 |
| Δn | 0.121 | 0.117 | 0.119 | 0.116 |
| Δϵ | 5.5 | 5.5 | 5.6 | 5.8 |
| η/mPa · s | 16 | 14 | 13 | 11 |
| $\gamma_1$/mPa · s | 90 | 75 | 78 | 66 |
| Initial voltage holding ratio (%) | 99.8 | 99.6 | 99.4 | 99.3 |
| Voltage holding ratio after heat resistance test (%) | 98.7 | 98.5 | 98.3 | 98.2 |

TABLE 18-continued

| | Example 31 | Example 32 | Example 33 | Example 34 |
|---|---|---|---|---|
| Evaluation of burn-in (h) | 600 | 580 | 530 | 500 |
| Evaluation of drop marks | 5 | 5 | 4 | 4 |
| Evaluation of contamination of manufacturing apparatus (s) | 220 | 200 | 190 | 170 |
| Evaluation of process compatibility (×100 drops) | 1000 | 890 | 760 | 690 |
| Evaluation of solubility at low temperatures (h) | 635 | 600 | 580 | 550 |

Examples 35 to 38

The following compounds were used to prepare compositions listed in Table 19. IPS liquid crystal display units having the structure illustrated in FIGS. 1 and 2 were manufactured. Table 20 shows the evaluation results for the compositions and the liquid crystal display units.

[Chem. 328]

(i) (45.2)

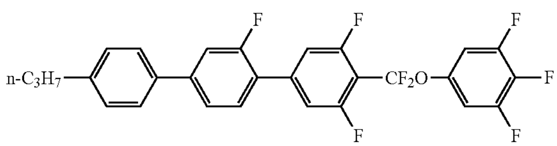

(i) (45.3)

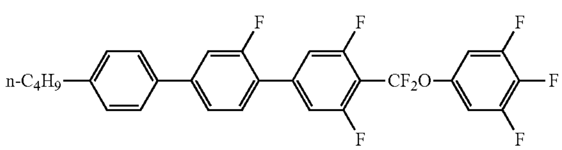

(ii) (18.6)

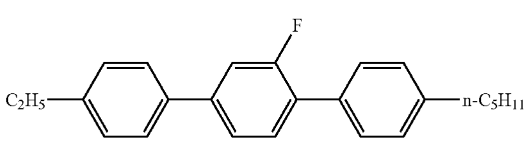

(ii) (19.2)

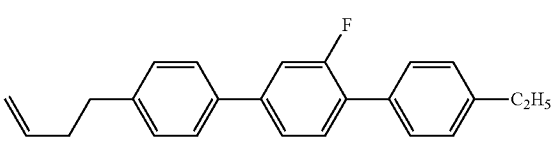

(ii) (19.4)

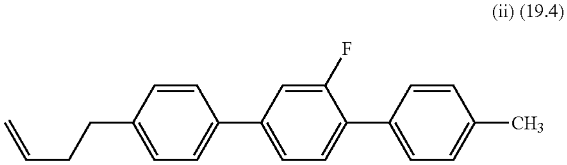

(1.3)

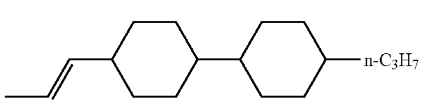

(2.2)

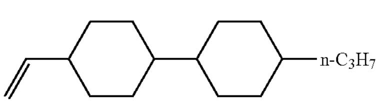

-continued (11.1)

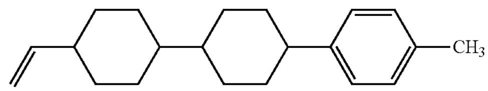

(28.3)

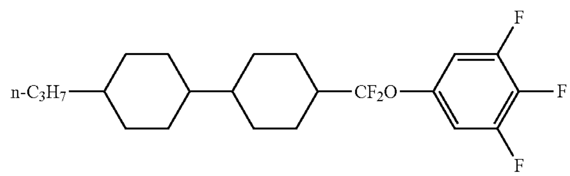

(11.2)

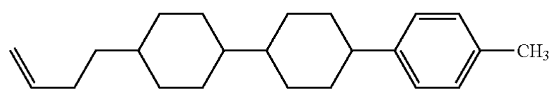

(44.2)

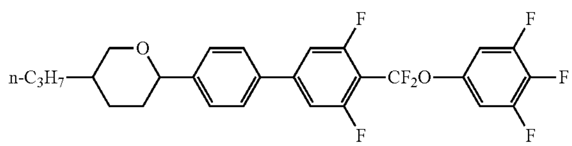

(44.1)

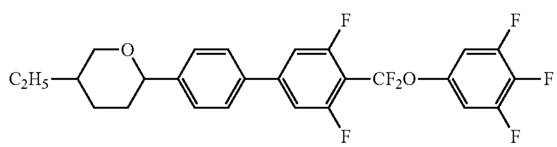

(31.2)

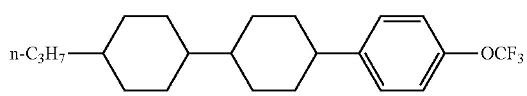

(15.1)

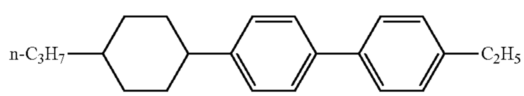

(23.1)

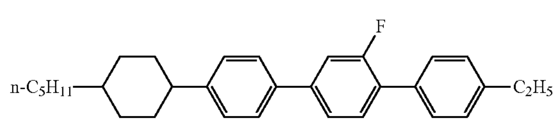

(39.2)

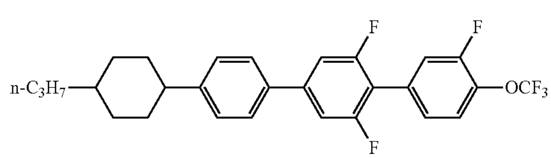

(31.4)

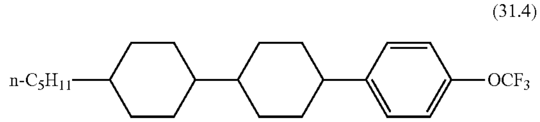

TABLE 19

| | Ratio (%) | | | |
|---|---|---|---|---|
| Formula No. of chemical structure | Example 35 | Example 36 | Example 37 | Example 38 |
| (i) (45.2) | 2 | 3 | 5 | 4 |
| (i) (45.3) | 3 | 2 | | 4 |
| (ii) (18.6) | | 4 | | |
| (ii) (19.2) | | 4 | | |
| (ii) (19.4) | 12 | 4 | 8 | 10 |
| (1.3) | 10 | 13 | 6 | 16 |
| (2.2) | 37 | 35 | 42 | 29 |
| (11.1) | 12 | 8 | 6 | 14 |
| (28.3) | 2 | 3 | 2 | 2 |
| (11.2) | 4 | 7 | 9 | 2 |
| (44.2) | 4 | 3 | 5 | 2 |
| (44.1) | 4 | 4 | 3 | 6 |
| (31.2) | 8 | 5 | 10 | 4 |
| (15.1) | | | | 2 |
| (23.1) | | | 4 | |
| (39.2) | | 3 | | |
| (31.4) | 2 | 2 | | 5 |

TABLE 20

| | Example 35 | Example 36 | Example 37 | Example 38 |
|---|---|---|---|---|
| Tni/° C. | 95.1 | 95.0 | 98.4 | 97.6 |
| Δn | 0.106 | 0.106 | 0.103 | 0.110 |
| Δε | 4.7 | 4.9 | 4.8 | 5.2 |
| η/mPa · s | 14 | 13 | 14 | 16 |
| $\gamma_1$/mPa · s | 60 | 68 | 61 | 75 |
| Initial VHR (%) | 99.6 | 99.5 | 99.4 | 99.6 |
| VHR after heat resistance test (%) | 98.7 | 98.5 | 98.3 | 98.8 |
| Evaluation of burn-in (h) | 600 | 500 | 450 | 600 |
| Evaluation of drop marks | 5 | 4 | 4 | 5 |
| Evaluation of contamination of manufacturing apparatus (s) | 200 | 190 | 185 | 200 |
| Evaluation of process compatibility (×100 drops) | 1000 | 880 | 850 | 1000 |
| Evaluation of solubility at low temperatures (h) | 615 | 575 | 530 | 620 |

Examples 39 to 42

The following compounds were used to prepare compositions listed in Table 21. IPS liquid crystal display units having the structure illustrated in FIGS. 1 and 2 were manufactured. Table 22 shows the evaluation results for the compositions and the liquid crystal display units.

[Chem. 329]

(i) (45.2)

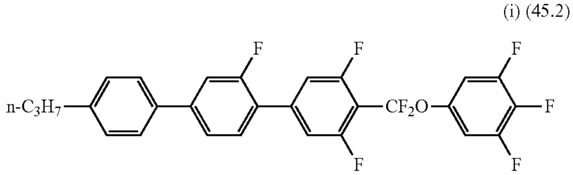

-continued (i) (45.3)

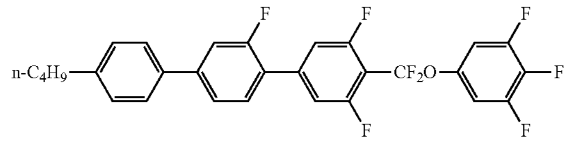

(ii) (19.2)

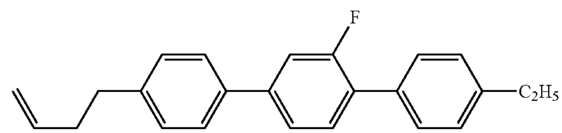

(ii) (19.31)

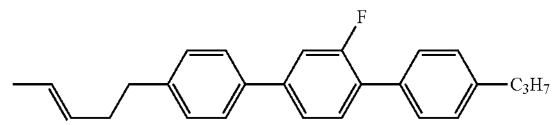

(ii) (19.4)

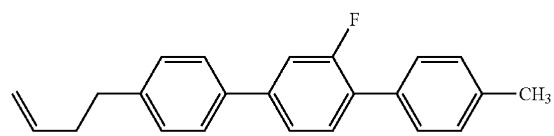

(26.2)

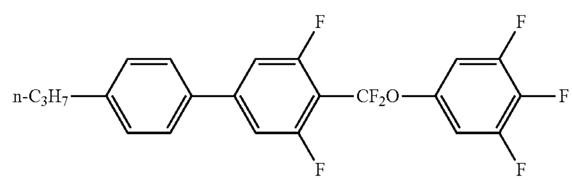

(1.3)

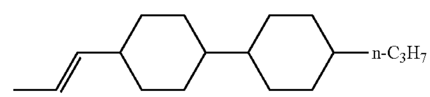

(2.2)

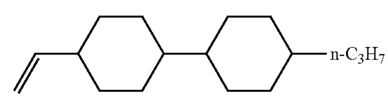

(36.2)

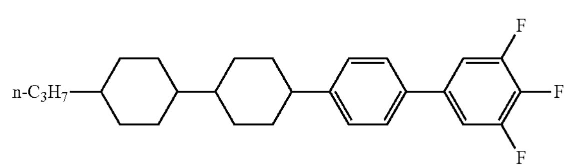

(36.1)

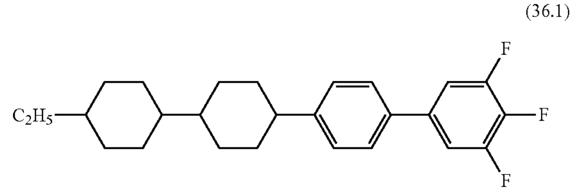

(60.1)

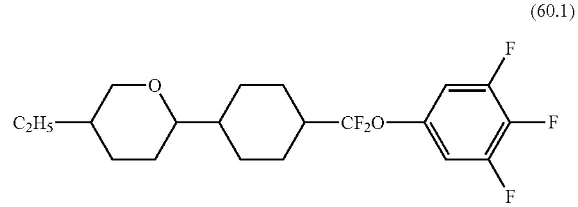

-continued (60.2)

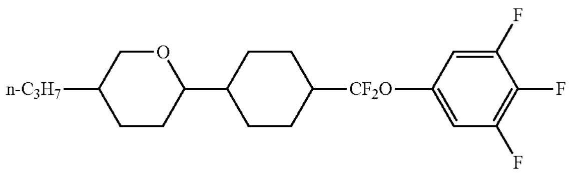

(64.1)

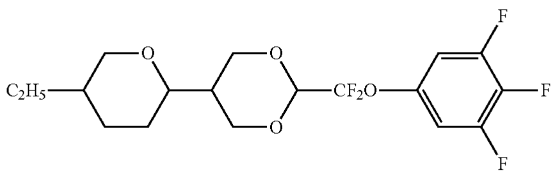

(64.2)

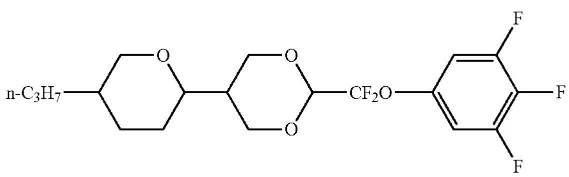

(41.2)

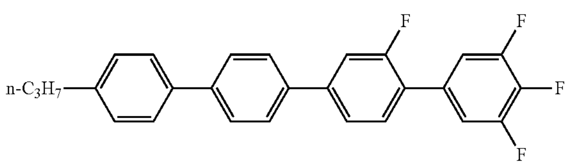

TABLE 21

| Formula No. of chemical structure | Ratio (%) Example 39 | Example 40 | Example 41 | Example 42 |
|---|---|---|---|---|
| (i) (45.2) | | | | 5 |
| (i) (45.3) | 5 | 5 | 5 | |
| (ii) (19.2) | 5 | 5 | 5 | 5 |
| (ii) (19.31) | 2 | | 2 | 2 |
| (ii) (19.4) | | 2 | | |
| (26.2) | 8 | 8 | 8 | 8 |
| (1.3) | 7 | | 6 | 7 |
| (2.2) | 49 | 56 | 50 | 49 |
| (36.2) | 4 | 4 | 3 | 4 |
| (36.1) | 3 | 3 | 4 | |
| (60.1) | 4 | 4 | 5 | 4 |
| (60.2) | 5 | 4 | 4 | 5 |
| (64.1) | 4 | 5 | 4 | 4 |
| (64.2) | 4 | 4 | 4 | 4 |
| (41.2) | | | | 3 |

TABLE 22

| | Example 39 | Example 40 | Example 41 | Example 42 |
|---|---|---|---|---|
| Tni/° C. | 80.7 | 78.4 | 79.7 | 77.5 |
| Δn | 0.113 | 0.112 | 0.113 | 0.115 |
| Δϵ | 7.5 | 7.7 | 7.5 | 7.8 |
| η/mPa · s | 11 | 10 | 10 | 11 |
| $\gamma_1$/mPa · s | 61 | 59 | 61 | 62 |
| Initial voltage holding ratio (%) | 99.4 | 99.4 | 99.6 | 99.4 |
| Voltage holding ratio after heat resistance test (%) | 98.8 | 98.8 | 98.9 | 98.8 |
| Evaluation of burn-in (h) | 460 | 400 | 470 | 410 |
| Evaluation of drop marks | 5 | 4 | 4 | 5 |
| Evaluation of contamination of manufacturing apparatus (s) | 135 | 100 | 120 | 135 |
| Evaluation of process compatibility (×100 drops) | 1000 | 900 | 990 | 750 |
| Evaluation of solubility at low temperatures (h) | 380 | 230 | 260 | 380 |

Examples 43 to 46

The following compounds were used to prepare compositions listed in Table 23. IPS liquid crystal display units having the structure illustrated in FIGS. 1 and 2 were manufactured. Table 24 shows the evaluation results for the compositions and the liquid crystal display units.

[Chem. 330]

(i) (45.2)

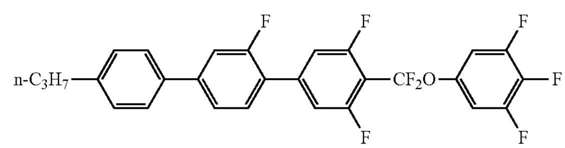

(i) (45.3)

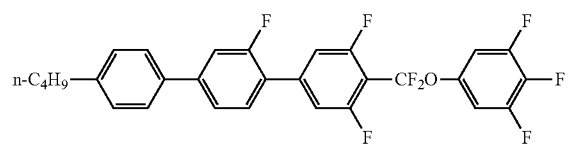

(i) (45.4)

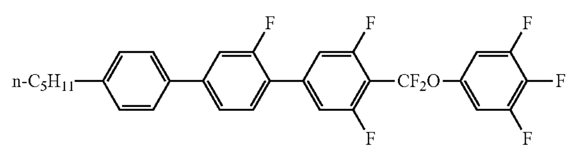

(ii) (18.1)

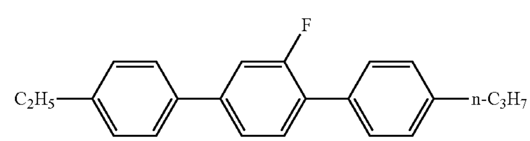

(ii) (18.4)

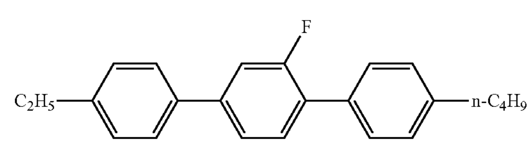

(ii) (19.2)

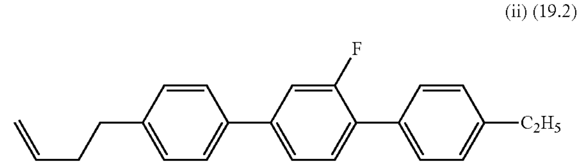

-continued (3.1)

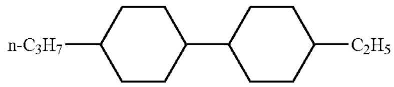

(3.3)

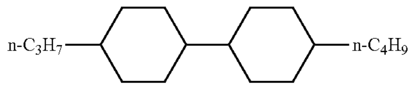

(3.4)

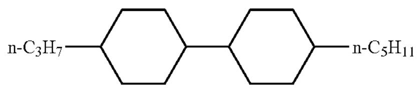

(2.2)

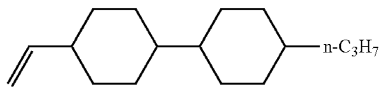

(1.3)

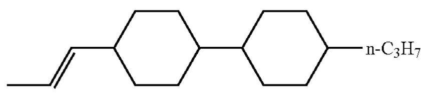

(23.1)

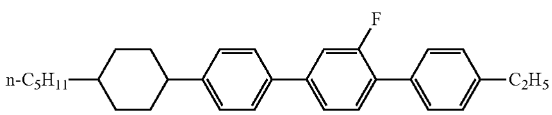

(23.2)

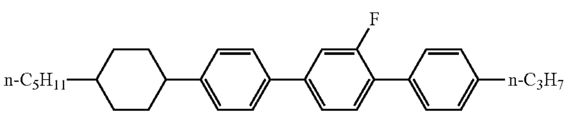

(26.2)

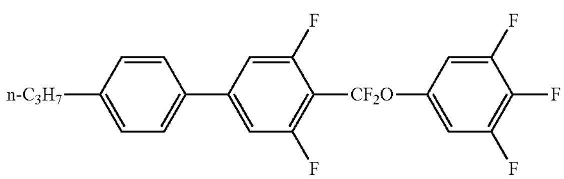

(51.1)

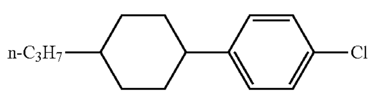

(31.2)

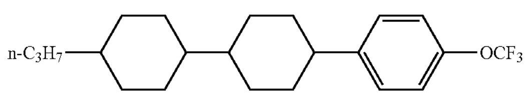

(31.4)

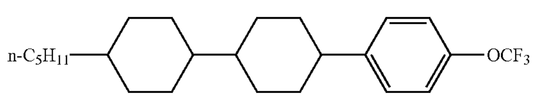

TABLE 23

| Formula No. of chemical structure | Ratio (%) Example 43 | Example 44 | Example 45 | Example 46 |
|---|---|---|---|---|
| (i) (45.2) | 3 | 4 | 3 | 6 |
| (i) (45.3) | 6 | 5 | 7 | 2 |
| (i) (45.4) | 2 | 2 | 3 | 3 |
| (ii) (18.1) | 4 | 5 | | |
| (ii) (18.4) | | | 5 | |

TABLE 23-continued

| Formula No. of chemical structure | Ratio (%) Example 43 | Example 44 | Example 45 | Example 46 |
|---|---|---|---|---|
| (ii) (19.2) | | | | 4 |
| (3.1) | 22 | 23 | | |
| (3.3) | 13 | | 10 | |
| (3.4) | 3 | 2 | 5 | |
| (2.2) | | | 22 | 35 |
| (1.3) | | 13 | | 3 |
| (23.1) | 9 | 8 | 7 | 8 |
| (23.2) | 8 | 7 | 10 | 9 |
| (26.2) | 3 | 6 | 2 | 3 |
| (51.1) | 19 | 17 | 16 | 15 |
| (31.2) | 4 | 4 | 6 | 8 |
| (31.4) | 4 | 4 | 4 | 4 |

TABLE 24

| | Example 43 | Example 44 | Example 45 | Example 46 |
|---|---|---|---|---|
| Tni/° C. | 86.7 | 81.9 | 96.1 | 94.3 |
| Δn | 0.121 | 0.124 | 0.129 | 0.128 |
| Δε | 5.57 | 6.32 | 5.99 | 5.91 |
| η/mPa · s | 14.9 | 14.9 | 189 | 16.0 |
| $\gamma_1$/mPa · s | 83 | 76 | 88 | 65 |
| Initial voltage holding ratio (%) | 98.6 | 98.5 | 98.5 | 98.0 |
| Voltage holding ratio after heat resistance test (%) | 97.0 | 97.0 | 96.5 | 95.9 |
| Evaluation of burn-in (h) | 290 | 280 | 250 | 190 |
| Evaluation of drop marks | 5 | 5 | 4 | 3 |
| Evaluation of contamination of manufacturing apparatus (s) | 230 | 220 | 210 | 180 |
| Evaluation of process compatibility (×100 drops) | 1000 | 900 | 800 | 700 |
| Evaluation of solubility at low temperatures (h) | 600 | 550 | 500 | 400 |

A liquid crystal composition according to the present invention having positive anisotropy of dielectric constant has high solubility at low temperatures and has a specific resistance and a voltage holding ratio negligibly affected by heat and light. Thus, the resulting products have high practicality. Liquid crystal display elements containing the liquid crystal composition have high-speed response. The liquid crystal composition can be consistently dropped in a process of manufacturing a liquid crystal display element. Thus, liquid crystal display elements having reduced display defects resulting from a process can be manufactured in high yield. Thus, the liquid crystal composition is very useful.

INDUSTRIAL APPLICABILITY

A liquid crystal composition according to the present invention having positive anisotropy of dielectric constant has high solubility at low temperatures and has a specific resistance and a voltage holding ratio negligibly affected by heat and light. Thus, the resulting products have high practicality. Liquid crystal display elements containing the liquid crystal composition have high-speed response. The liquid crystal composition can be consistently dropped in a process of manufacturing a liquid crystal display element. Thus, liquid crystal display elements having reduced display defects resulting from a process can be manufactured in high yield. Thus, the liquid crystal composition is very useful.

REFERENCE SIGNS LIST

100 First substrate
102 TFT layer
103 Pixel electrode
104 Passivation layer
105 First alignment film
200 Second substrate
201 Planarization film
202 Black matrix
203 Color filter
204 Transparent electrode
205 Second alignment film
301 Sealant
302 Protrusion (columnar spacer)
303 Liquid crystal layer
304 Protrusion (columnar spacer)
401 Mask pattern
402 Resin layer

The invention claimed is:

1. A liquid crystal composition comprising:

at least one compound represented by a general formula (i);

at least one compound represented by a general formula (ii), a compound represented by a general formula (X), 43% to 70% by mass of a compound represented by general formula (I-1), and 15% to 35% by mass of a compound represented by general formula (II-2), (i)

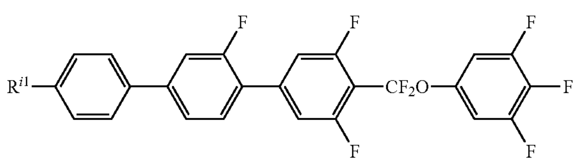

(wherein in the general formula (i), $R^{i1}$ denotes an alkyl group having 2 to 5 carbon atoms), (ii)

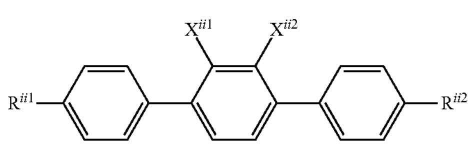

(wherein in the general formula (ii), $R^{ii1}$ and $R^{ii2}$ independently denote an alkyl group having 1 to 5 carbon atoms or an alkenyl group having 2 to 5 carbon atoms, and $X^{ii1}$ and $x^{ii2}$ independently denote a hydrogen atom or a fluorine atom), (X)

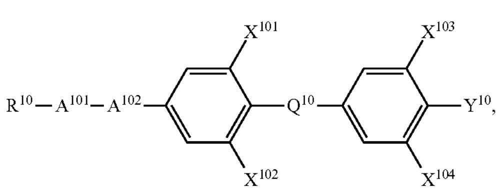

(wherein in the general formula (X), $X^{101}$ to $X^{104}$ independently denote a fluorine atom or a hydrogen atom, $Y^{10}$ denotes a fluorine atom, a chlorine atom, or —$OCF_3$, $Q^{10}$ denotes a single bond or —$CF_2O$—, $R^{10}$ denotes an alkyl group having 1 to 5 carbon atoms, an alkenyl group having 2 to 5 carbon atoms, or an alkoxy group having 1 to 4 carbon atoms, and $A^{101}$ and $A^{102}$ independently denote a 1,4-cyclohexylene group, a 1,4-phenylene group, or one of

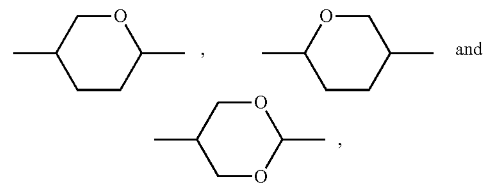

in which $A^{101}$ is

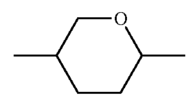

in which a hydrogen atom of the 1,4-phenylene group may be substituted with a fluorine atom), (I-1)

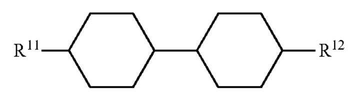

(wherein in the general formula (I-1), $R^{11}$ and $R^{12}$ independently denote an alkyl group having 1 to 5 carbon atoms, an alkoxy group having 1 to 5 carbon atoms, or an alkenyl group having 2 to 5 carbon atoms), (II-2)

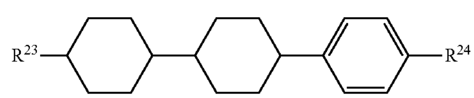

(wherein in the general formula (II-2), $R^{23}$ denotes an alkenyl group having 2 to 5 carbon atoms, and $R^{24}$ denotes an alkyl group having 1 to 5 carbon atoms or an alkoxy group having 1 to 4 carbon atoms).

2. The liquid crystal composition according to claim 1, further comprising at least one compound represented by a general formula (L), $$R^{L1}—B^{L1}—L^{L1}—B^{L2}—(L^{L2}—B^{L3})_{OL}—R^{L2} \quad (L)$$

(wherein $R^{L1}$ and $R^{L2}$ independently denote an alkyl group having 1 to 8 carbon atoms, and one or two or more nonadjacent —$CH_2$— of the alkyl group may be independently substituted with —CH═CH—, —C≡C—, —O—, —CO—, —COO—, or —OCO—, OL is 0, 1, 2, or 3, $B^{L1}$, $B^{L2}$, and $B^{L3}$ independently denote a group selected from the group consisting of (a) a 1,4-cyclohexylene group (one —CH2- or two or more nonadjacent —CH2- of this group may be substituted with —O—), and (b) a 1,4-phenylene group (one —CH= or two or more nonadjacent —CH= of this group may be substituted with —N=), the group (a) and the group (b) may be independently substituted with a cyano group, a fluorine atom, or a chlorine atom, $L^{L1}$ and $L^{L2}$ independently denote a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—, and in the case that OL is 2 or 3 and there are a plurality of LL2s, the plurality of LL2s may be the same or different, and in the case that OL is 2 or 3 and there are a plurality of $B^{L3}$s, the plurality of $B^{L3}$s may be the same or different, provided that the at least one compound is not the compound(s) selected from a group represented by the general formula (ii)).

3. The liquid crystal composition according to claim 1 or 2, further comprising at least one compound represented by a general formula (M), (M)

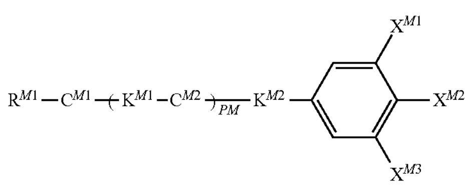

(wherein $R^{M1}$ denotes an alkyl group having 1 to 8 carbon atoms, and one or two or more nonadjacent —CH2- of the alkyl group may be independently substituted with —CH=CH—, —C≡C—, —O—, —CO—, —COO—, or —OCO—, PM is 0, 1, 2, 3, or 4, $C^{M1}$ and $CM^{M2}$ independently denote a group selected from the group consisting of (d) a 1,4-cyclohexylene group (one —CH2- or two or more nonadjacent —CH2- of this group may be substituted with —O— or —S—), and (e) a 1,4-phenylene group (one —CH= or two or more nonadjacent —CH= of this group may be substituted with —N=), the group (d) and the group (e) may be independently substituted with a cyano group, a fluorine atom, or a chlorine atom, $K^{M1}$ and $K^{M2}$ independently denote a single bond, —$CH_2CH_2$—, —$(CH_2)_4$—, —$OCH_2$—, —$CH_2O$—, —$OCF_2$—, —$CF_2O$—, —COO—, —OCO—, or —C≡C—, in the case that PM is 2, 3, or 4 and there are a plurality of $K^{M1}$s, the plurality of $K^{M1}$ s may be the same or different, and in the case that PM is 2, 3, or 4 and there are a plurality of CM2s, the plurality of CM2s may be the same or different, $X^{M1}$ and $X^{M3}$ independently denote a hydrogen atom, a chlorine atom, or a fluorine atom, and $X^{M2}$ denotes a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group, the at least one compound being not the compound(s) represented by the general formula (i)).

4. The liquid crystal composition according to claim 1, comprising at least one compound represented by a general formula (IV-1) as a compound or compounds represented by the general formula (ii), (IV-1)

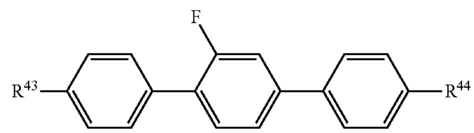

(wherein $R^{43}$ and $R^{44}$ independently denote an alkyl group having 1 to 5 carbon atoms).

5. The liquid crystal composition according to claim 2, comprising a compound represented by a general formula (I-1-1) as a compound represented by the general formula (L), the compound represented by the general formula (I-1-1) constituting 14% or more, (I-1-1)

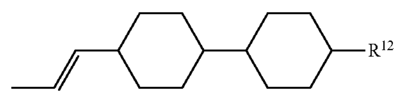

(wherein $R^{12}$ denotes an alkyl group having 1 to 5 carbon atoms, an alkenyl group having 2 to 5 carbon atoms, or an alkoxy group having 1 to 5 carbon atoms).

6. The liquid crystal composition according to claim 2, comprising a compound represented by a general formula (II-2) as a compound represented by the general formula (L), the compound represented by the general formula (II-2) constituting 5% or more, (II-2)

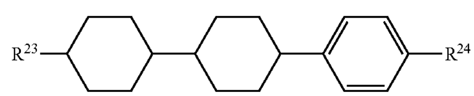

($R^{23}$ denotes an alkenyl group having 2 to 5 carbon atoms, and $R^{24}$ denotes an alkyl group having 1 to 5 carbon atoms or an alkoxy group having 1 to 4 carbon atoms).

7. The liquid crystal composition according to claim 1, comprising a compound represented by a general formula (IV-2) as a compound represented by the general formula (ii), (IV-2)

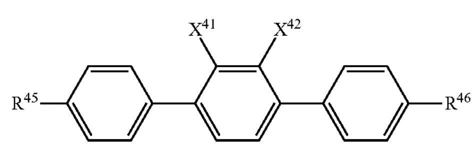

(wherein $R^{45}$ and $R^{46}$ independently denote an alkyl group having 1 to 5 carbon atoms or an alkenyl group having 2 to 5 carbon atoms, at least one of $R^{45}$ and $R^{46}$ denotes an alkenyl group having 2 to 5 carbon atoms, and $X^{41}$ and $X^{42}$ independently denote a hydrogen atom or a fluorine atom).

8. The liquid crystal composition according to claim 3, comprising a compound represented by a general formula (X-6) as a compound represented by the general formula (M), the compound represented by the general formula (X-6) constituting 0.5% or more and less than 5%, (X-6)

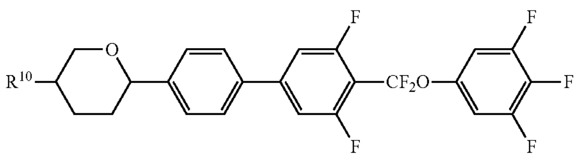

(wherein $R^{10}$ denotes an alkyl group having 1 to 5 carbon atoms, an alkenyl group having 2 to 5 carbon atoms, or an alkoxy group having 1 to 4 carbon atoms).

9. The liquid crystal composition according to claim 8, comprising a compound represented by a formula (44.1) as a compound represented by the general formula (X-6), the compound represented by the formula (44.1) constituting 0.5% or more and less than 5%, (44.1)

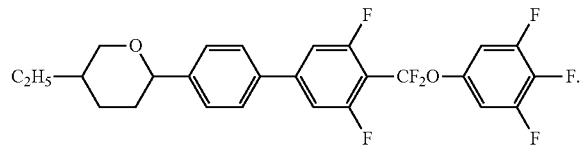

10. The liquid crystal composition according to claim 2, comprising a compound represented by a general formula (III) as a compound represented by the general formula (L), the compound represented by the general formula (III) constituting 6% or more, (III)

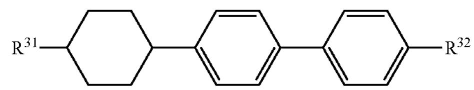

($R^{31}$ and $R^{32}$ independently denote an alkenyl group having 2 to 5 carbon atoms, an alkyl group having 1 to 5 carbon atoms, or an alkoxy group having 1 to 4 carbon atoms).

11. A liquid crystal display element for active-matrix driving, comprising the liquid crystal composition according to claim 1.

* * * * *